US011921271B2

(12) United States Patent
Wetzstein et al.

(10) Patent No.: US 11,921,271 B2
(45) Date of Patent: Mar. 5, 2024

(54) MULTIFOCAL MACROSCOPE FOR LARGE FIELD OF VIEW IMAGING OF DYNAMIC SPECIMENS

(71) Applicant: The Board of Trustees of the Leland Stanford Junior University, Stanford, CA (US)

(72) Inventors: Gordon Wetzstein, Palo Alto, CA (US); Tim Machado, Stanford, CA (US); Karl A. Deisseroth, Stanford, CA (US); Isaac Kauvar, Palo Alto, CA (US)

(73) Assignee: The Board of Trustees of the Leland Stanford Junior Univeristy, Stanford, CA (US)

( * ) Notice: Subject to any disclaimer, the term of this patent is extended or adjusted under 35 U.S.C. 154(b) by 197 days.

(21) Appl. No.: 17/326,021

(22) Filed: May 20, 2021

(65) Prior Publication Data

US 2021/0364771 A1    Nov. 25, 2021

Related U.S. Application Data

(60) Provisional application No. 63/029,289, filed on May 22, 2020.

(51) Int. Cl.
*G02B 21/00* (2006.01)
(52) U.S. Cl.
CPC ....... *G02B 21/0028* (2013.01); *G02B 21/006* (2013.01); *G02B 21/008* (2013.01)
(58) Field of Classification Search
CPC   G02B 21/0028; G02B 21/006; G02B 21/008; G02B 21/365; G02B 2207/114
See application file for complete search history.

(56) References Cited

U.S. PATENT DOCUMENTS

| 4,734,578 A | 3/1988 | Horikawa |
| 6,348,990 B1 | 2/2002 | Igasaki et al. |

(Continued)

FOREIGN PATENT DOCUMENTS

| WO | WO 2011116238 | 9/2011 |
| WO | WO 2014020513 | 2/2014 |

(Continued)

OTHER PUBLICATIONS

Packer et al., (2015) "Simultaneous All-Optical Manipulation and Recording of Neural Circuit Activity with Cellular Resolution in vivo", Nature Methods 12(2):140-149.

*Primary Examiner* — Robert E. Tallman
(74) *Attorney, Agent, or Firm* — Rudy J. Ng; Mandar Joshi; Bozicevic, Field & Francis LLP

(57) ABSTRACT

Provided herein is a macroscope comprising an objective apparatus comprising a multifocal widefield optics comprising a plurality of optical components configured to focus on a plurality of planes. Also provided herein are methods for analyzing a three-dimensional specimen, the method comprising obtaining, via a macroscope, synchronous multifocal optical images of a plurality of planes of the three-dimensional specimen, wherein the macroscope comprises an objective apparatus comprising a multifocal widefield optics comprising a plurality of optical components configured to focus on a plurality of planes. The three-dimensional specimen can be a biological specimen, such as brain.

20 Claims, 96 Drawing Sheets

(56) References Cited

U.S. PATENT DOCUMENTS

| | | |
|---|---|---|
| 6,662,039 B2 | 12/2003 | Yuste et al. |
| 7,932,873 B2 | 4/2011 | Smith et al. |
| 8,696,722 B2 | 4/2014 | Deisseroth et al. |
| 8,834,546 B2 | 9/2014 | Deisseroth et al. |
| 8,956,363 B2 | 2/2015 | Schneider et al. |
| 9,084,885 B2 | 7/2015 | Deisseroth et al. |
| 9,271,674 B2 | 3/2016 | Deisseroth et al. |
| 9,522,288 B2 | 12/2016 | Deisseroth et al. |
| 9,615,789 B2 | 4/2017 | Deisseroth et al. |
| 10,568,516 B2 | 2/2020 | Yang et al. |
| 2007/0171502 A1 | 7/2007 | Birk et al. |
| 2009/0112133 A1 | 4/2009 | Deisseroth et al. |
| 2009/0118800 A1 | 5/2009 | Deisseroth et al. |
| 2011/0249866 A1 | 8/2011 | Piestun et al. |
| 2011/0279893 A1 | 11/2011 | Vizi et al. |
| 2013/0317575 A1 | 11/2013 | Deisseroth et al. |
| 2016/0015996 A1 | 1/2016 | Deisseroth et al. |
| 2016/0317658 A1 | 11/2016 | Deisseroth et al. |
| 2017/0160360 A1 | 6/2017 | Deisseroth et al. |
| 2019/0056581 A1* | 2/2019 | Tomer ................ G02B 21/0076 |
| 2019/0170646 A1* | 6/2019 | Fiolka ................ G02B 21/0076 |

FOREIGN PATENT DOCUMENTS

| | | |
|---|---|---|
| WO | WO 2014117079 | 7/2014 |
| WO | WO 2015148974 | 10/2015 |
| WO | WO 2017087542 | 5/2017 |

\* cited by examiner

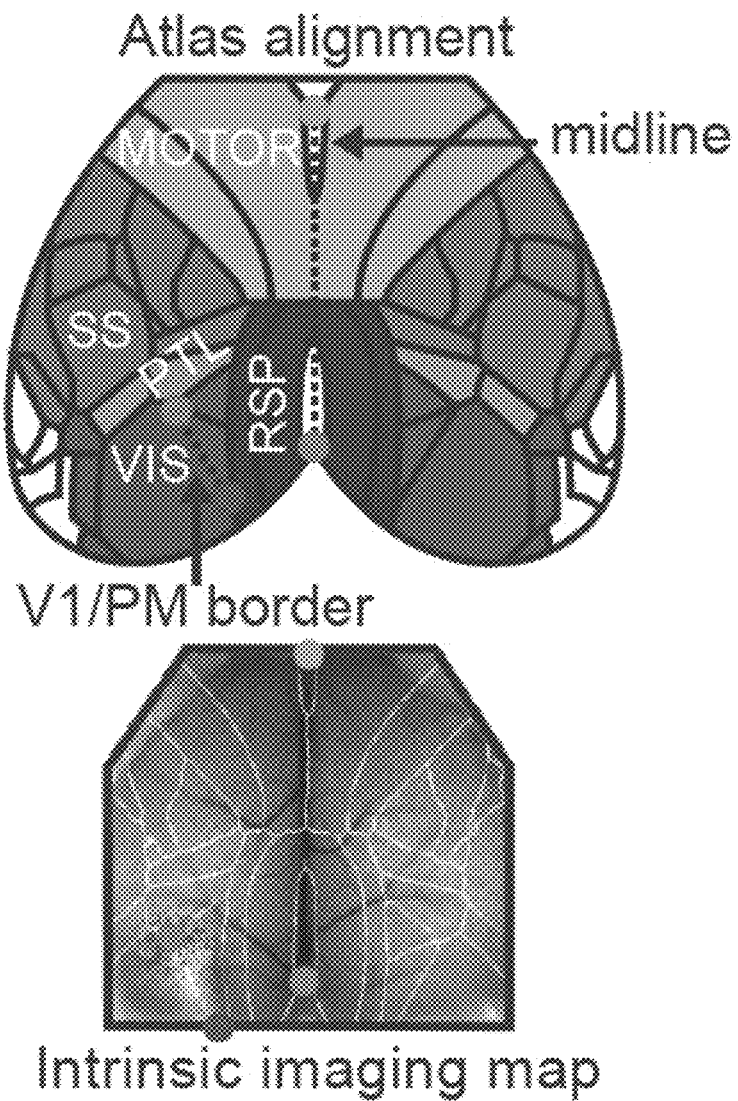
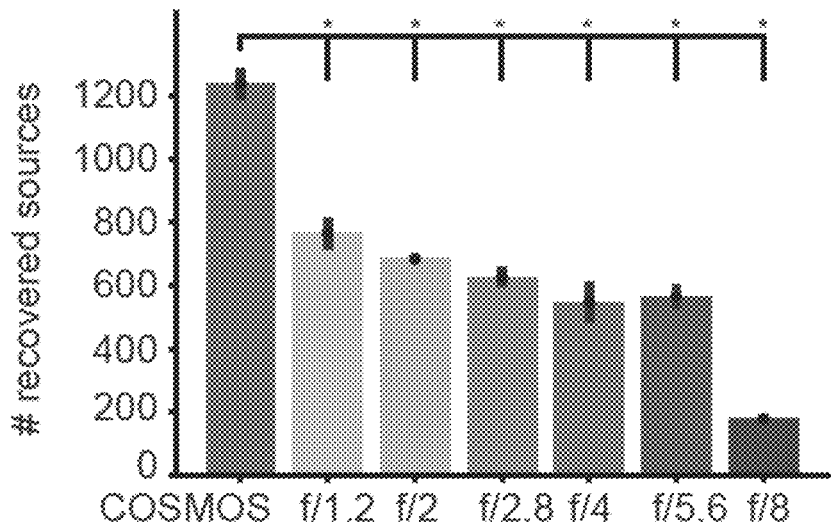
FIGURE 1J
FIGURE 1K

| Y (mm) | X (mm) | Depth (μm) |
| --- | --- | --- |
| 2.70 | -2.50 | 200-400 |
| 1.45 | -3.35 | 450-700 |
| 0.20 | -4.30 | 400-700 |
| -1.85 | -4.30 | 400-600 |
| -3.85 | -4.30 | 250-600 |
| -4.90 | -4.30 | 800-1000 |
| -4.90 | -3.00 | 500-800 |
| -4.90 | -1.00 | 500-800 |
| -4.90 | 1.00 | 500-800 |
| -4.90 | 3.00 | 500-800 |
| -4.90 | 4.30 | 800-1000 |
| -3.85 | 4.30 | 250-600 |
| -1.85 | 4.30 | 400-600 |
| 0.20 | 4.30 | 400-700 |
| 1.45 | 3.35 | 450-700 |
| 2.70 | 2.50 | 200-400 |
| 2.70 | 1.00 | 100-200 |
| 2.70 | -1.00 | 100-200 |

Record intrinsic imaging
↓
Locate V1/PM retinotopic reversal
↓
Align atlas using V1/PM border and midline Regions of Interest

MULTIFOCAL MACROSCOPE FOR LARGE FIELD OF VIEW IMAGING OF DYNAMIC SPECIMENS

CROSS-REFERENCE TO RELATED APPLICATIONS

This application claims the benefit of U.S. Provisional Application No. 63/029,289, filed May 22, 2020, the disclosure of which is incorporated herein by reference.

INTRODUCTION

A technical barrier to studying distributed neural (and other biological) processes, such as the function of the mammalian cerebral cortex, has been the lack of a method for simultaneously measuring fast neuronal activity dynamics at or near cellular resolution across three-dimensional centimeter-scale fields of view. Despite recent progress in neural recording techniques, persistent limitations have underscored the need for new approaches. Large field of view two-photon microscopes have enabled simultaneous recording from a few cortical areas at single-cell resolution, revealing structured large-scale correlations in neural activity, but at low temporal rates. Widefield imaging has also revealed cortex-wide task involvement and activity patterns, albeit with low spatial resolution. Despite the merits of these approaches, each is limited by one or more of several key parameters including field of view, acquisition speed, and spatial resolution.

SUMMARY

Certain embodiments of the disclosure provide a macroscope configured to provide synchronous multifocal optical imaging of a three-dimensional specimen. In some cases, the macroscope comprises an objective apparatus comprising a multifocal widefield optics comprising a plurality of optical components configured to focus on a plurality of planes.

Also provided herein are methods for analyzing a three-dimensional specimen, the method comprising obtaining, via a macroscope disclosed herein, synchronous multifocal optical images of a plurality of planes of the three-dimensional specimen. The three-dimensional specimen can be a biological specimen, such as brain.

Certain embodiments of the invention provide a macroscope comprising an objective apparatus comprising a multifocal optics comprising a plurality of optical components configured to focus on a plurality of planes. The multifocal optics can comprise a dual-focus array of lenses configured to focus on two planes. The multifocal optics can also comprise an array of lenses configured to focus on more than two planes.

In some cases, the macroscope further comprises a camera configured to capture a plurality of images captured by the macroscope, wherein the plurality of images are focused on a plurality of planes. The camera can have: a) a field of view of at least 1 cm in the longest dimension; b) a frame rate of between of at least 10 Hz, for example, between 30 Hz and 60 Hz; and/or c) a pixel size of between 10 μm to 20 μm.

In some cases, the macroscope is operably connected to a processor and a non-transitory machine-readable medium encoding instructions, which when executed by the processor, cause the processor to process the plurality of images captured by the camera, wherein the plurality of images are focused on the plurality of planes. For example, the non-transitory machine-readable medium can encode instructions, which, when executed by the processor, cause the processor to merge the focused regions from the plurality of images or videos to produce an image or video that is focused in substantially the entire field of view.

The phrase "an image or video that is focused in substantially the entire field of view" as used herein indicates that the image or video is focused in at least 80%, at least 85%, at least 90%, at least 95%, or at least 99% of the entire field of view.

Also provided herein is a method for analyzing a three-dimensional specimen, the method comprising obtaining, via a macroscope disclosed herein, synchronous multifocal optical images of a plurality of planes of the three-dimensional specimen.

In some cases, the three-dimensional specimen is a biological tissue and the optical imaging of the biological tissue indicates cellular activity in the biological tissue. A biological tissue can be placenta, brain, eyes, pineal gland, pituitary gland, thyroid gland, parathyroid glands, thorax, heart, lung, esophagus, thymus gland, pleura, adrenal glands, appendix, gall bladder, urinary bladder, large intestine, small intestine, kidneys, liver, pancreas, spleen, stoma, ovaries, uterus, testis, skin, a cultured organoid, and a cultured cell.

The biological specimen can also be organoid or a cultured cell and the method can further comprise contacting the organoid or the culture cell with a compound and imaging the organoid or the culture cell cellular activity in the biological specimen to detect the effect of the compound on the organoid.

In some embodiments, the three-dimensional specimen comprises particles in motion and the optical imaging of the three-dimensional specimen indicates the movement of the particles in the specimen.

In the methods disclosed herein, the three-dimensional specimen can have a thickness of between 1 and 2 mm and the longest dimension in of at least 5 mm, 6 mm, 7 mm, 8 mm, 9 mm, or 10 mm.

BRIEF DESCRIPTION OF DRAWINGS

The patent or application file contains at least one drawing executed in color. Copies of this patent or patent application publication with color drawings will be provided by the Office upon request and payment of the necessary fee.

(A) Schematic of cortical window superimposed upon the Allen Brain Atlas. (B) Example preparation. (C) Transgenic strategy (bottom) to drive sparse GCaMP expression (green; top) in superficial cortical layers. (D) COSMOS macroscope (left) and lenslet array (right). (E) Raw macroscope data contains two juxtaposed images focused at different depths (offset by 620 μm). (F) Point spread function captured using a 10 μm fluorescent source. (G) Light transmission vs. a conventional macroscope at different aperture settings. (H) Merged image quality vs. a conventional macroscope with the same light throughput. (I) Data processing pipeline. (J) Procedure for brain atlas alignment using intrinsic imaging. (K) Neural sources extracted vs. a conventional macroscope (one mouse, n=3 separate recordings per configuration, mean±S.E.M., * denotes corrected p<0.05 Kruskal-Wallis H-test and posthoc t-test). (L) Peak-signal-to-noise ratio (PSNR) for the best 100 sources recorded using each configuration. Circles represent outliers. (M) Example spatial footprints of extracted sources with f/2 macroscope. (N) Example spatial footprints with COSMOS. Numbering corresponds to traces in next panel. (O) Example z-scored traces from COSMOS. (P) An example of a triple-focus lenslet array.

FIGS. 2A-2K. Characterization of COSMOS sources using visual stimuli.

(A) Sinusoidal grating stimuli were presented to mice during both COSMOS and two-photon imaging, using an identical monitor. (B) Highlighted COSMOS sources that were stimulus-responsive (in a Cux2-CreER; Ai148 mouse; one-way ANOVA, p<0.01). Box indicates field of view size for the two-photon microscope used to collect comparative data. (C) Single-trial and (D) peak-normalized trial-averaged responses from selected visually responsive sources (from the mouse shown in B) from right visual cortex under the COSMOS macroscope (top in C, right in D; black contours denote selected sources in B) and sources imaged under the two-photon microscope (bottom in C, left in D). In D, vertical lines indicate grating onset times, error bars represent S.E.M. (E) Orientation Selectivity Index (OSI) distributions for all extracted sources within visual areas compared to sources in all other areas (pooled over three mice; corrected p-values from Mann-Whitney U test shown). (F) OSI distributions plotted for all visually responsive sources in right visual areas, across three mice, under COSMOS (top) and two-photon microscopy (bottom). Red lines denote OSI=0.8. (G) OSI distributions for two additional mice (with cleared skulls but no windows). (H) Generation of neural trajectories using PCA. (I) Trial-averaged, visually responsive sources pooled across both visual cortices (from a single mouse), imaged under the COSMOS microscope (left). PCA trajectories for trial-averaged (middle) and single-trial data (right). (J-K) Trajectories for control mice lacking cranial windows. * corrected p<0.05,  p<0.01, * p<0.001, **** p<0.0001.

Figure 3A:
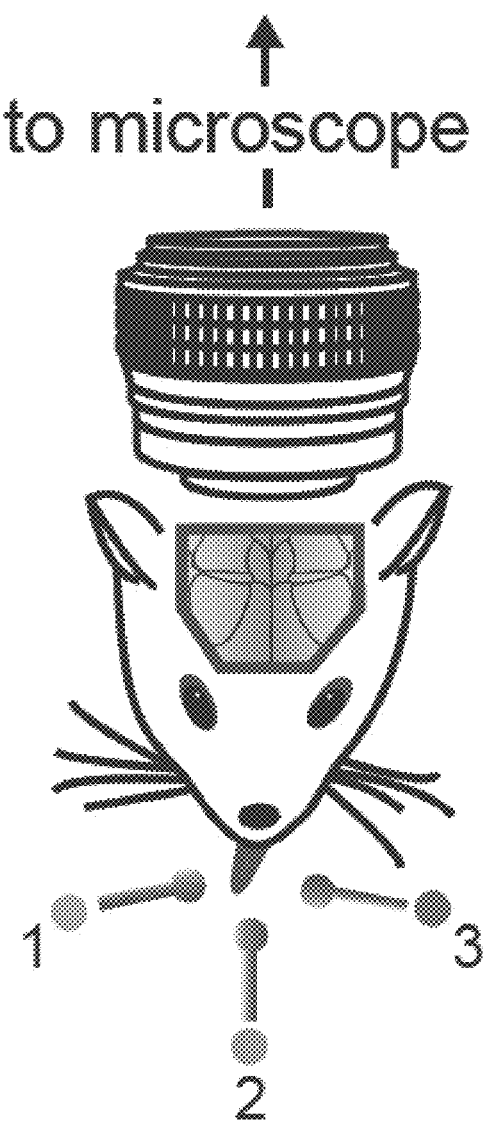
Figure 3B:
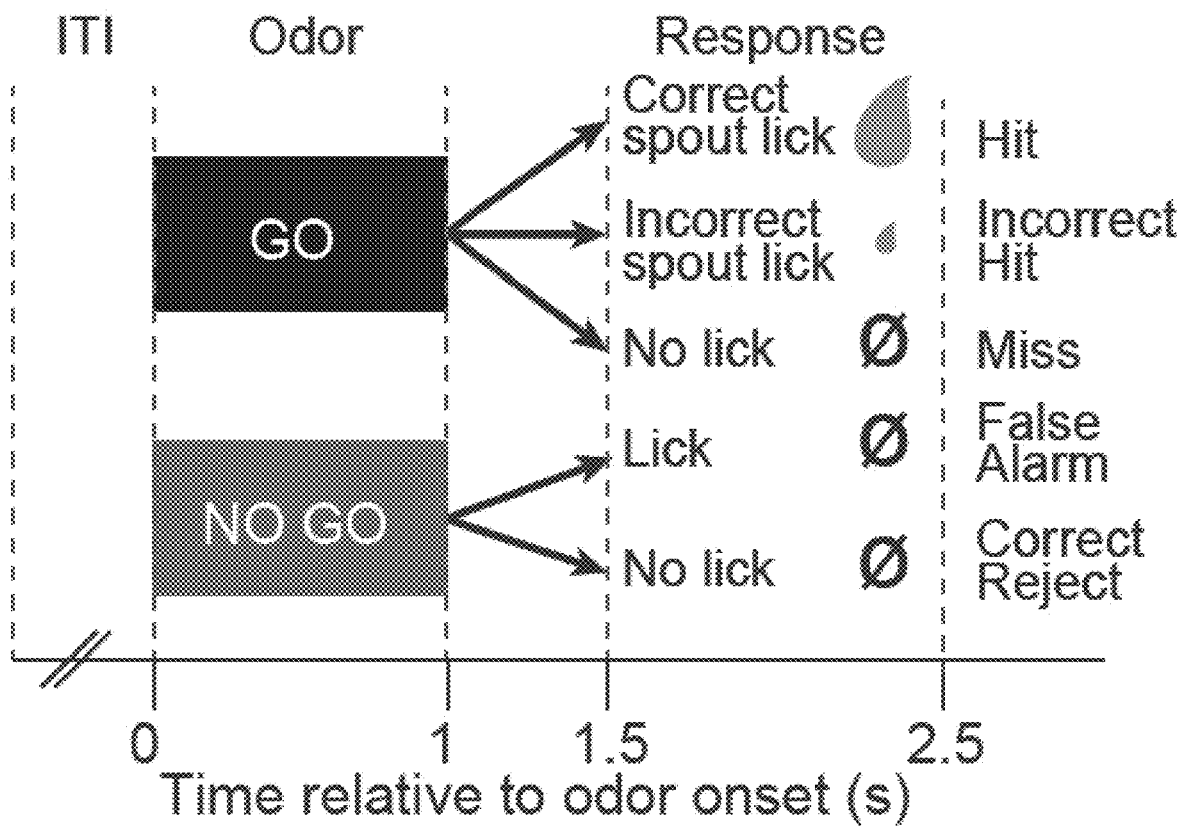
Figure 3B:
Figure 3C:
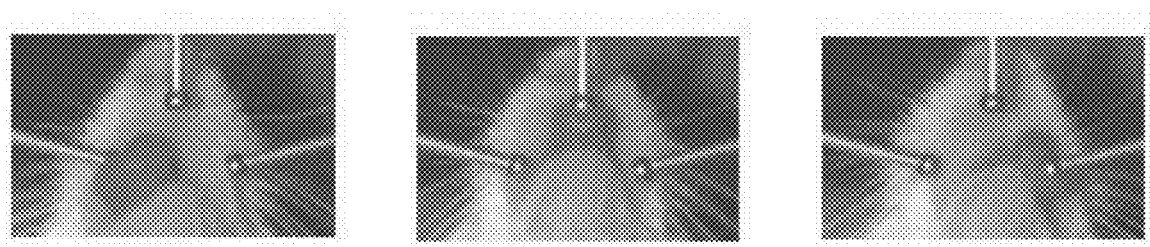
Figure 3D:
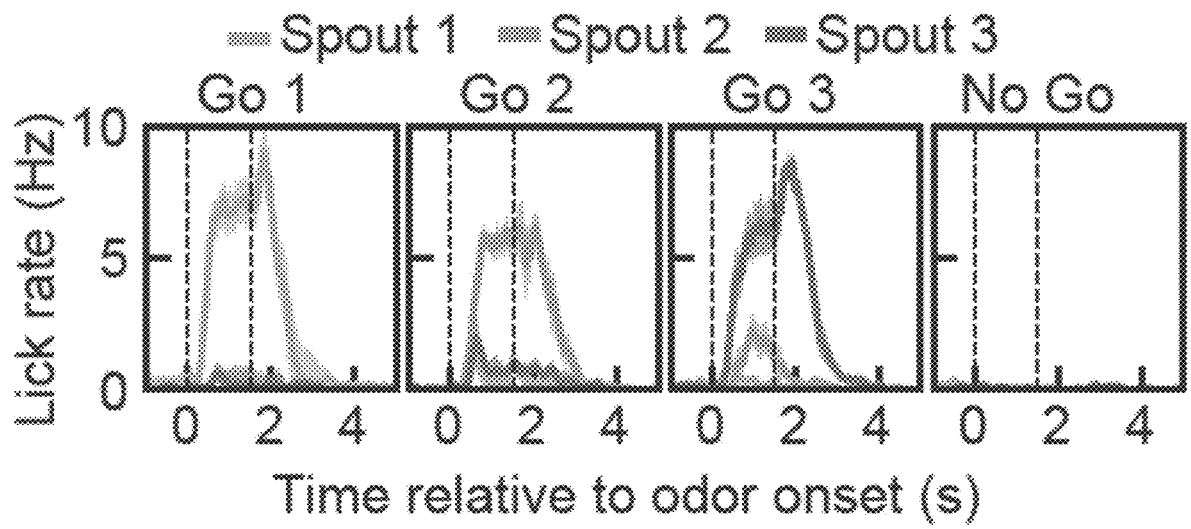
Figure 3E:
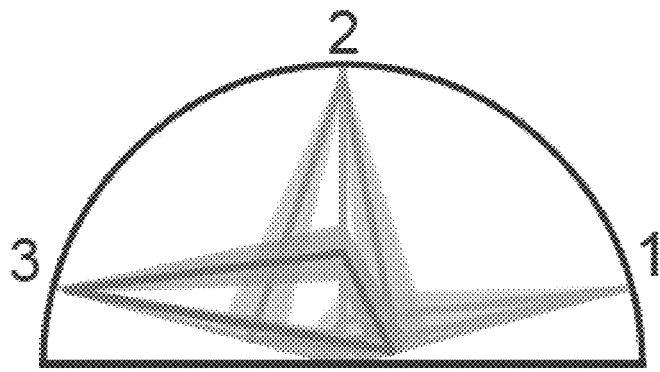
Figure 3E:
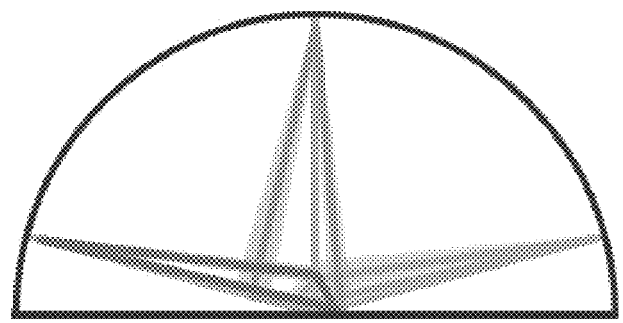
Figure 3F:
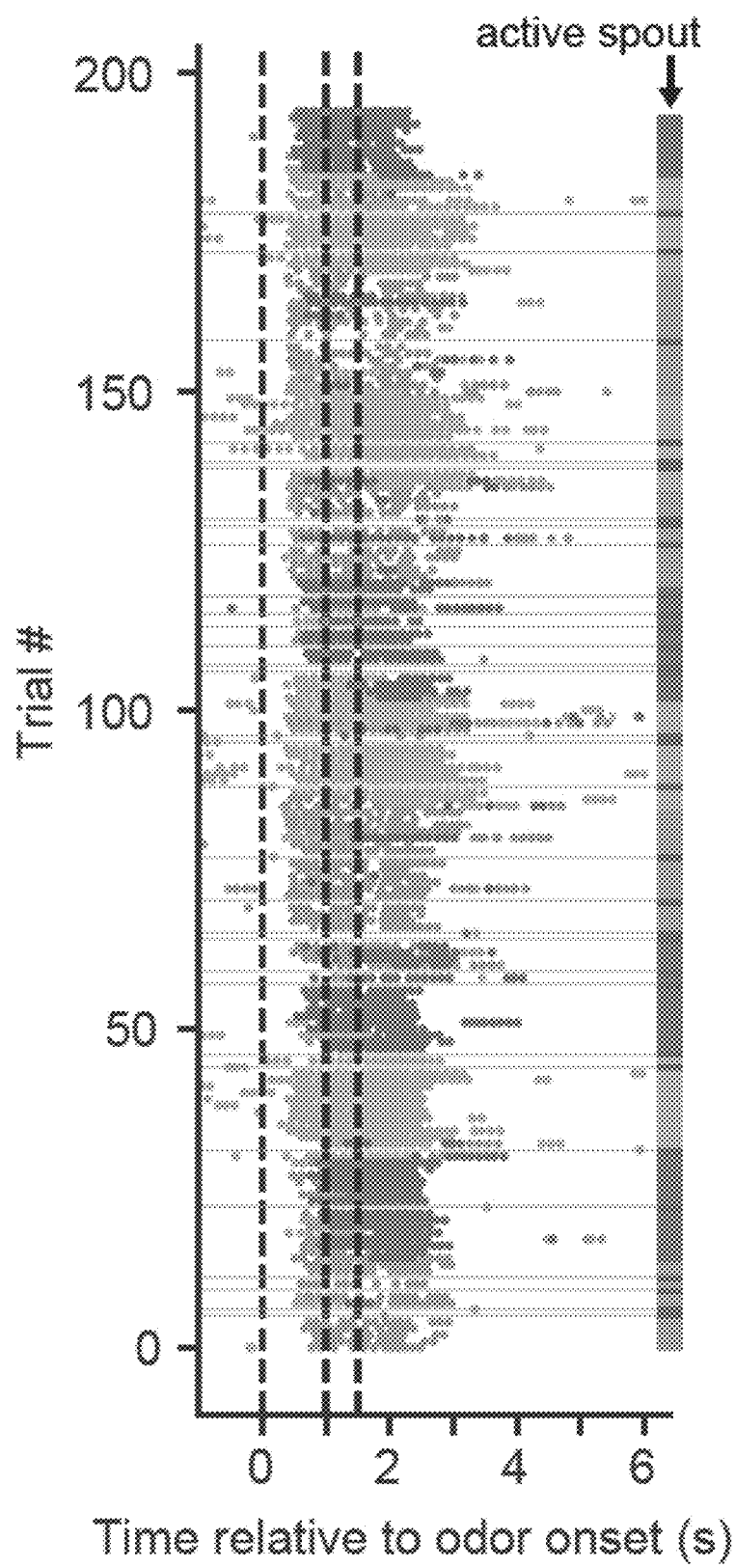
Figure 3G:
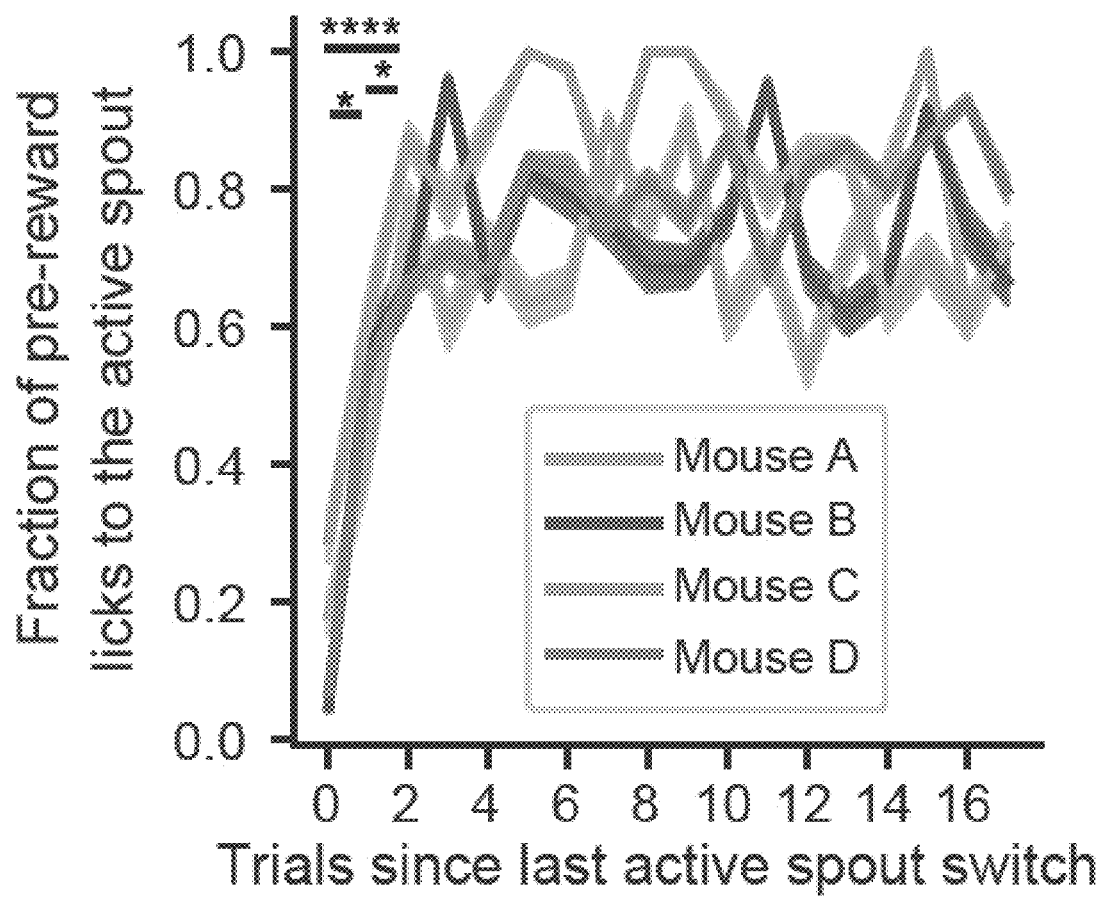
Figure 3H:
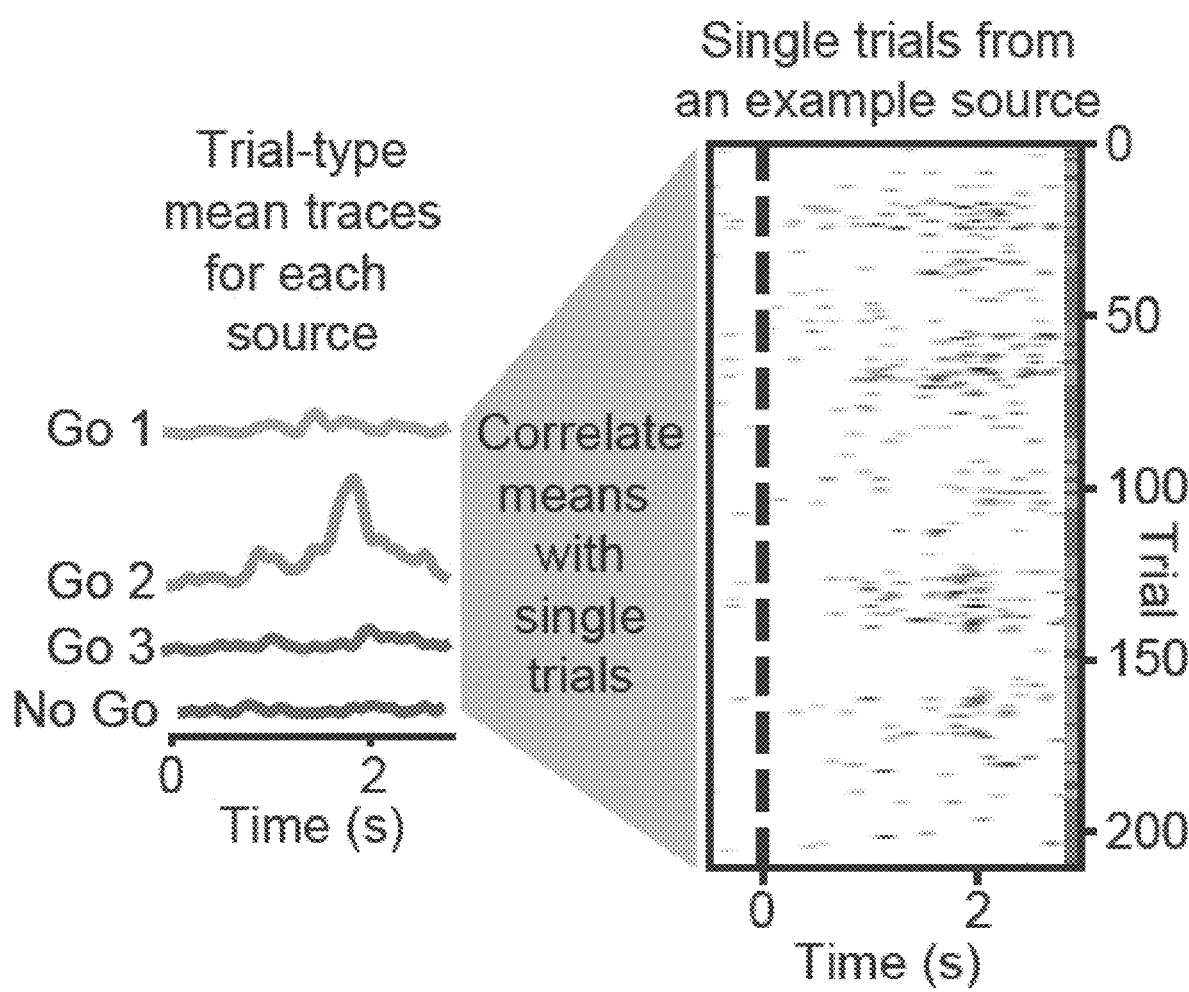
Figure 3I:
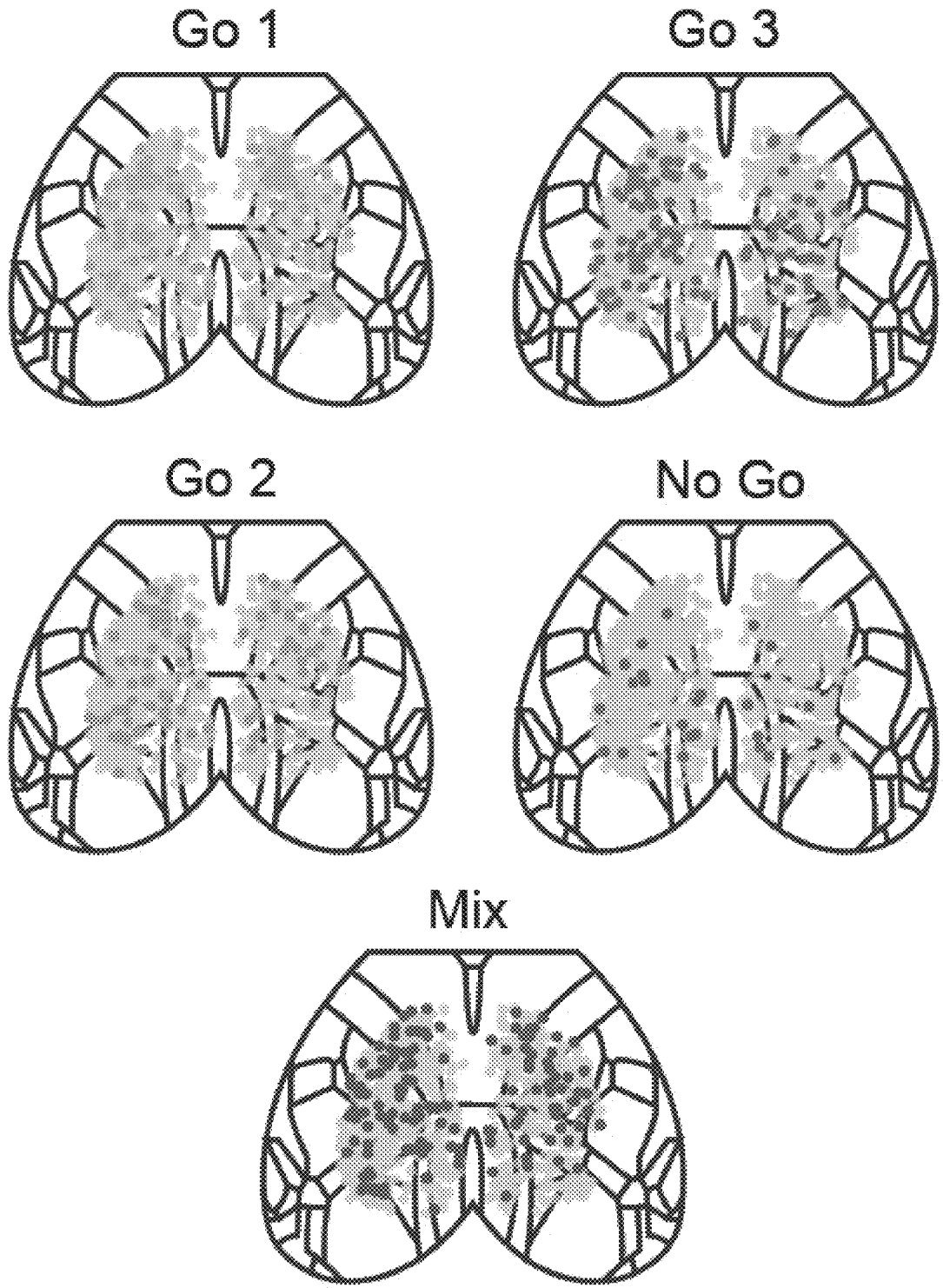
Figure 3J:
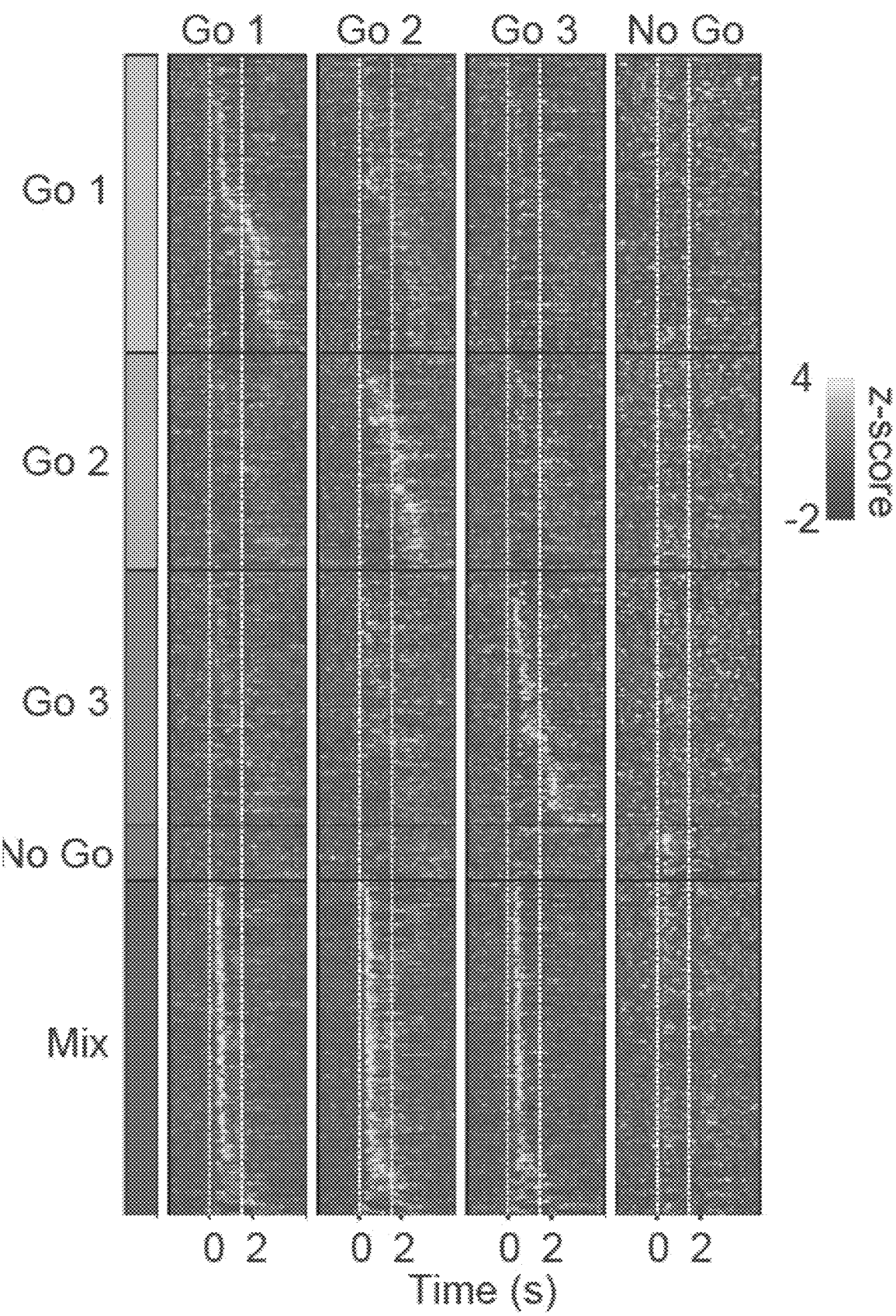
Figure 3K:
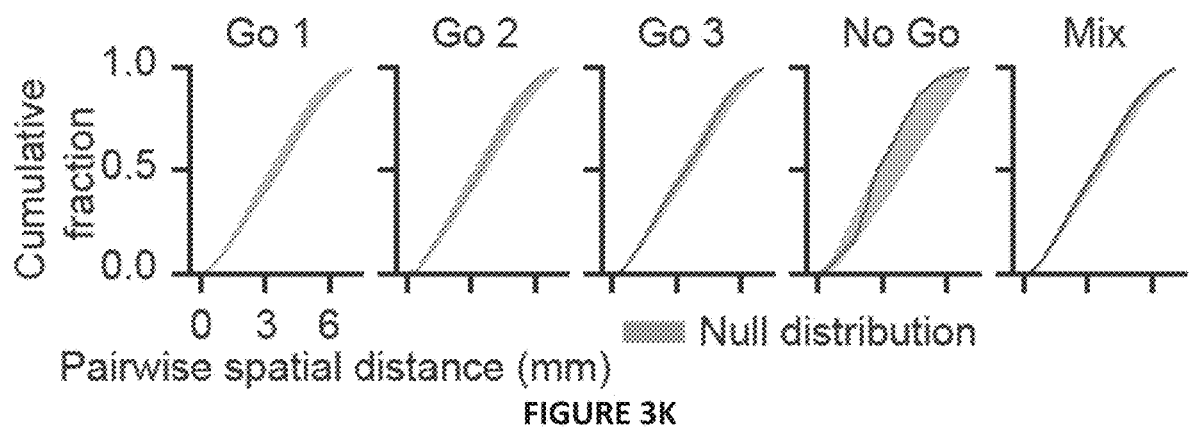
Figure 3L:
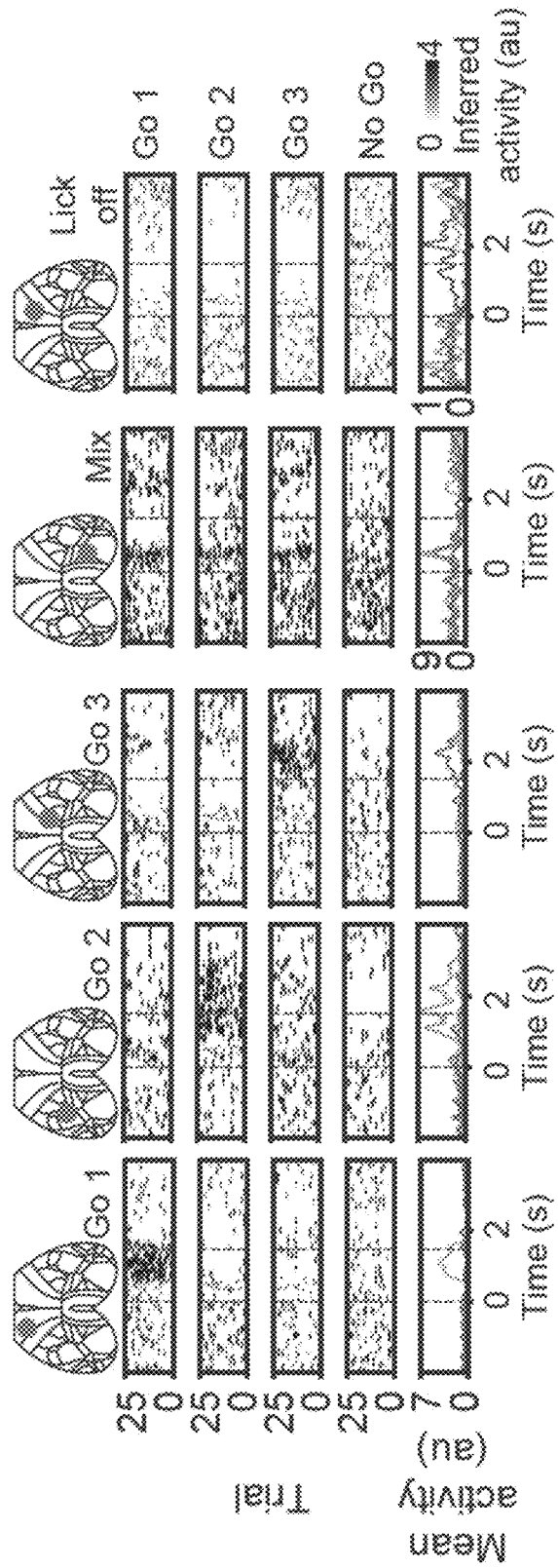
Figure 3M:
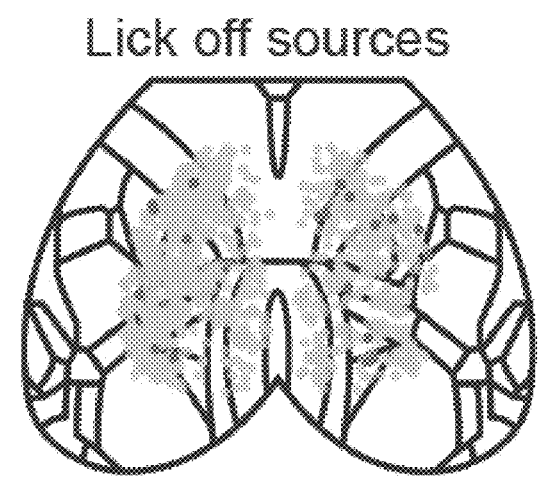
Figure 3N:
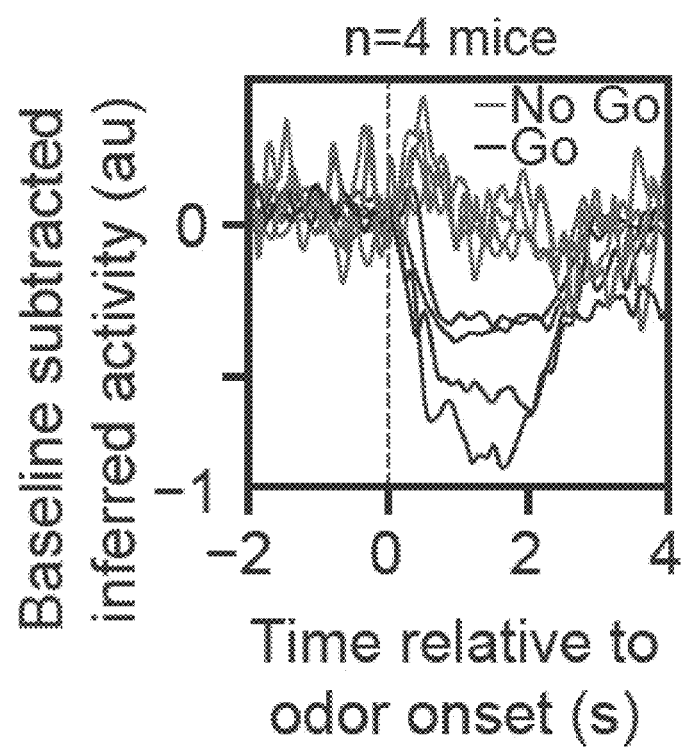

FIGS. 3A-3N. Behavioral and neural correlates of specific targeted motor actions.

(A) Head-fixed behavioral task. (B) Trial structure. (C) Video frames illustrating mouse licking each spout. (D) Lick rate during each trial type averaged across n=4 mice. Error bars are S.E.M. across animals. (E) Lick selectivity averaged across n=4 mice. Error bars are S.E.M. across animals. Licks taken after odor presentation, but before (left) or after (right) reward delivery. Colored lines represent normalized lick count towards each spout on trials when a given spout is active. (F) Raster showing all licks during a single experimental session. "No go" trials indicated in green. (G) Lick selectivity after active spout switch (error bars show S.E.M.; corrected p-values from paired-t-test). (H) Analysis for establishing tuning of sources to different trial types. (I) Spatial distribution of task-related classes. (J) Trial-averaged traces, ordered by task-related class and cross-validated peak time. (K) Cumulative fraction of source separations at each distance. For this mouse no task classes were significantly different than the null distribution (p>0.05). (L) Example single trial traces that exhibit different responses to each trial type. (M) All "lick OFF" sources from one mouse. (N) Averaged, baseline-subtracted, "lick OFF" sources for each mouse. * corrected p<0.05, **** p<0.0001.

FIGS. 4A-4D. Unaveraged data exhibit more localized correlation structure than trial-averaged data.

(A) Seeded trial-averaged activity correlations (for a single seed): (top) spatial distribution, (bottom) correlation vs. distance to the seed (black dot). (B) Seeded unaveraged activity correlations (format matches A). (C) Example illustrating unaveraged activity correlation (locations indicated on atlas inset). Red arrows indicate timepoints when the seed source and its neighbor are active simultaneously. (D) Summary across all mice of correlation analyses shown in Panels A-B. Lines for each mouse represent the mean correlation across all pairs of sources (binned and normalized). Statistic shown at 1 mm distance (paired t-test, corrected p=0.0001, n=4 mice, denoted by ***).

FIGS. 5A-5F. Representations of distinct motor actions are distributed across dorsal cortex.

(A) Schematic for decoding ongoing licks. (B) Row-normalized lick confusion matrix for one mouse. (C) Receiver operating characteristic (ROC) curve for each mouse, averaged across folds. Dashed lines are ROC curves for shuffled data. (D) Improvement in the Area Under the ROC Curve (AUC) as more neural sources are included. Red lines indicate means across mice. Gray lines indicate circularly permuted control. Corrected p-values from paired t-test shown for each of sources vs. closest evaluated number of sources. (E) Decoding using only sources from within single cortical regions (using the 75 sources/area with best discrimination ability; M=motor, S=somatosensory, P=parietal, R=retrosplenial, V=visual). Corrected p-values for two-sided t-test shown for each region vs. AUC=0.5. (F) Unique contribution of each region to decoding accuracy, measured as 1-AUC (without region)/AUC(with region). Corrected p-values from Two-sided t-test shown for each region vs. AUC=0.0. * corrected p<0.05,  p<0.01, * p<0.001, **** p<0.0001.

FIGS. 6A-6G. The direction of future licks is encoded by neurons distributed across dorsal cortex.

(A) Schematic of approach. (B) Row-normalized confusion matrix predicting preferred spout location from pre-odor neural data (chance is 0.33). (C) Predictions for one behavioral session (training trials and trials that contain any licks during the pre-odor period not shown). (D) Preferred spout neural decoding performance using data from three different time epochs. Red lines denote means across mice. Black lines and gray lines denote random shuffle and circularly permuted controls, respectively. (E) Pre-odor neural decoding performance quantified for: M=motor, S=somatosensory, P=parietal, R=retrosplenial, and V=visual areas. Each area-specific decoder used the 75 sources with best discrimination ability. Corrected paired t-test values shown vs. both random controls in (D-E). Error bars in (D-E) show 99% bootstrapped confidence intervals over 20 model fits to different sets of training data. (F) Pre-reward neural decoding of the spout most-licked during the pre-reward period (purple), and fraction of pre-reward licks towards the active spout (cyan), shown as a function of location within a trial block. Note that both sets of lines use identical data taken from testing trials. (G) Pre-odor behavioral decoding performance using data from both lower and upper cameras and a decoder trained on motion energy principal components derived from both the upper and lower videos (1000 from each). ns denotes corrected p>0.05, * p<0.05,  p<0.01, * p<0.001, **** p<0.0001.

FIGS. 7A-7F. Population neural activity encodes upcoming lick bouts towards specific spouts.

(A-C) Neural trajectories from Mouse A (trial averaged in first and third columns, single-trial in second column). Basis vectors computed as in the previous figure using PLS regression on entire training trials and sources from all (A), only motor (B), or only visual areas (C). (D) Schematic of analysis scheme used in (E-F). Bottom panel shows summed intercluster Mahalanobis distance for clusters fit to data from each mouse. Corrected p-values from a paired t-test shown vs. visual data. M=motor, S=somatosensory, V=visual, All=all sources. (E) Distributions of (same cluster Mahalanobis distances)−(next closest cluster distances).

Data pooled across four mice. Comparisons vs. zero computed using a Wilcoxon test. Comparisons vs. "correct go" trials used a Mann-Whitney U test. 223 correct go, 110 no go, 29 incorrect go, and 37 2nd trials from 4 mice. (F) Format matches E, using sources from all areas, and comparing pre-odor clusters to single test trial trajectories averaged over different time epochs: before odor, during odor, and after reward onset. Statistics were computed across time intervals using a Wilcoxon test. Error bars in (E-F) show 99% bootstrapped confidence intervals. * corrected p<0.05,  p<0.01, * p<0.001, **** p<0.0001. All statistical comparisons were FDR-corrected and comparisons that yielded corrected p>0.05 are not shown in panels E-F.

FIGS. 8A-8L. Surgical procedure for implantation of large-scale window (relates to FIG. 1).

(A) Geometry of curved glass window implant. (B) Screenshot of software interface for selecting keypoints. (C) Coordinates of keypoints in Panel B, with approximate thickness of the skull at each keypoint. Thickness varies for mice of different ages and sizes. (D) Photograph of robotic stereotax and setup. (E) After cutting skin back, ear bars are placed above skin and muscle, and skull is cleaned. (F) Conductive clip is attached to inside of the skin, and keypoints are drilled using robotic stereotax. Depth is determined using a conductivity-based autostop mechanism, or alternatively, inspection and knowledge of the rough depth of each keypoint based on previous mice. (G) Based on keypoints, robotic stereotax interpolates and automatically cuts full craniotomy. (H) After skull flap is loose, it is pulled off quickly using forceps and blood is cleaned using absorptive sponge swabs. (I) Curved glass implant is positioned using a blunt needle connected to vacuum, and pushed down such that glass is in contact with brain across the full window. (J) Window is cemented into position. (K) A depth-colored 120 mm thick two-photon stack demonstrating density and health of the neurons. (L) High magnification histological section demonstrating GCaMP expression, with DAPI nuclear staining.

Figure 9A:
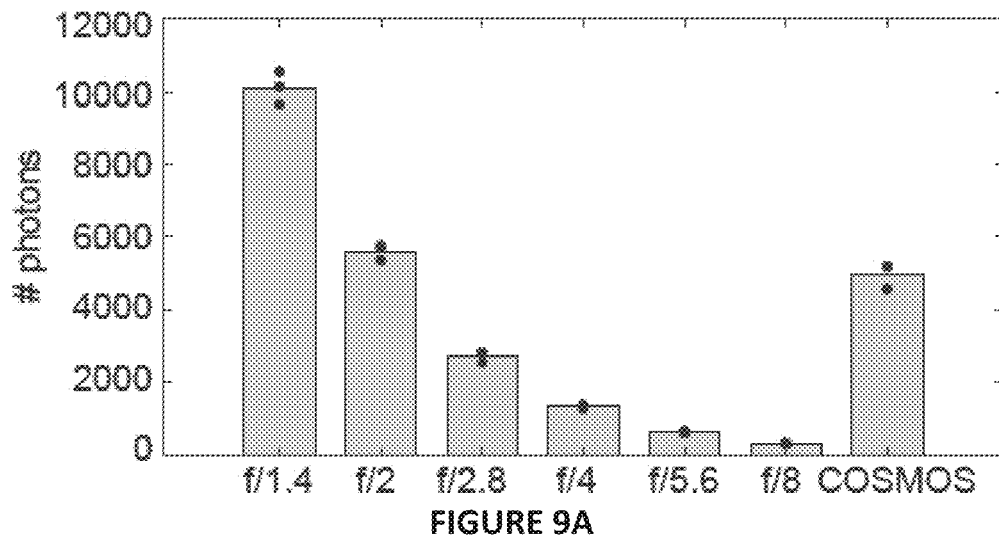
Figure 9B:
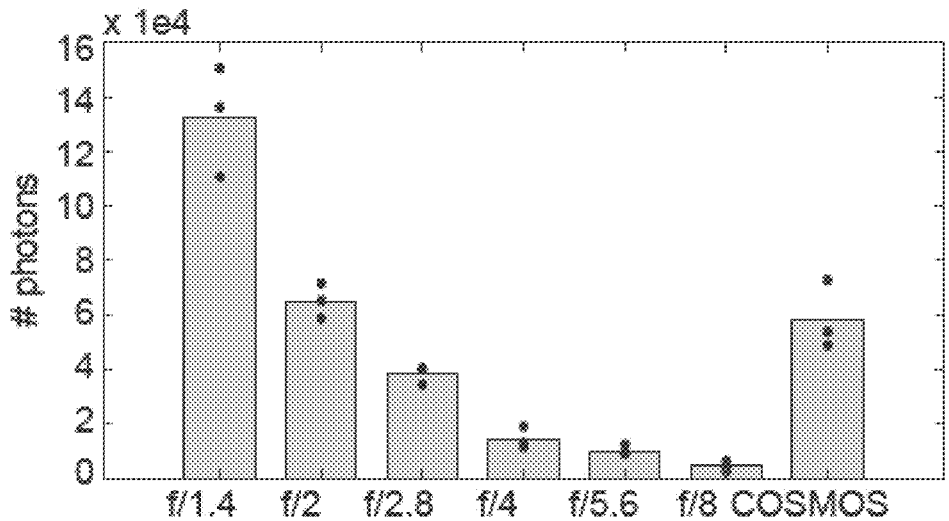
Figure 9C:
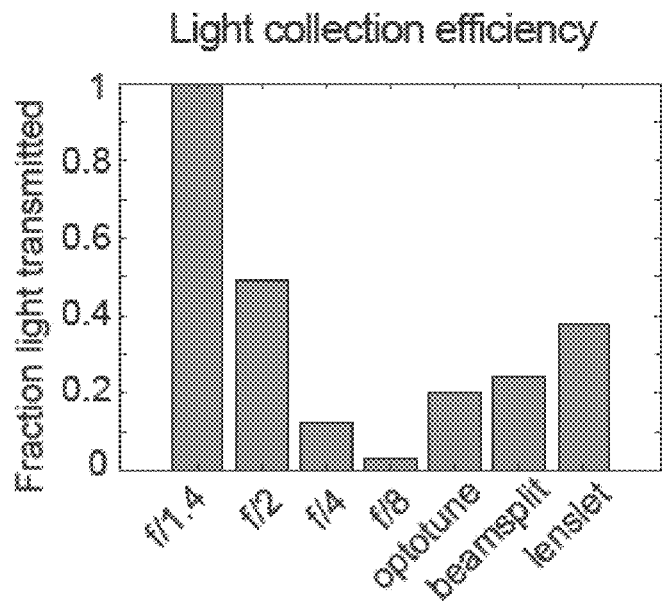
Figure 9D:
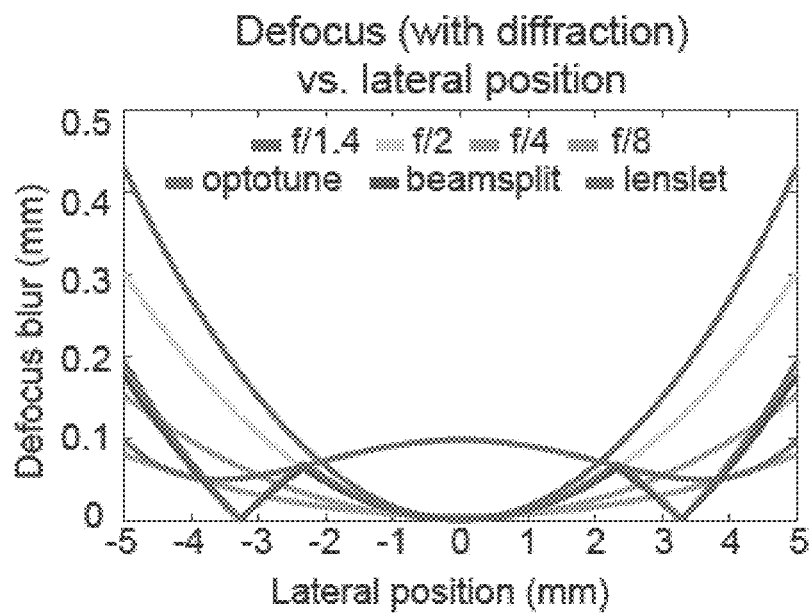
Figure 9E:
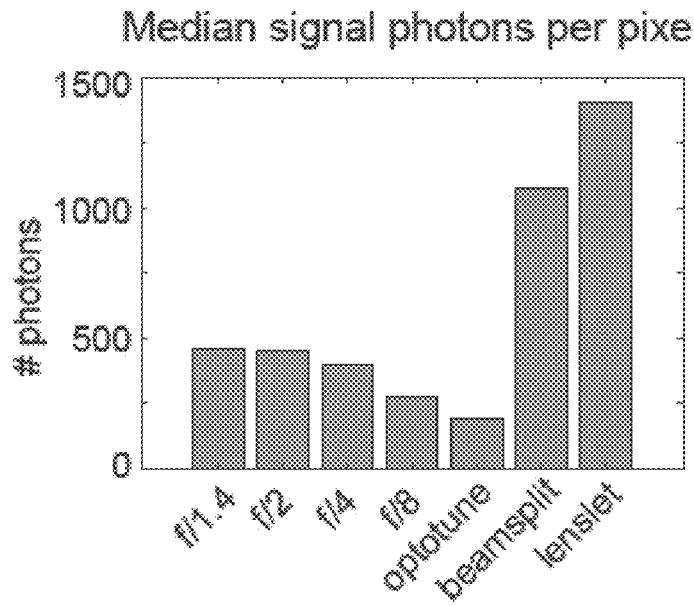
Figure 9F:
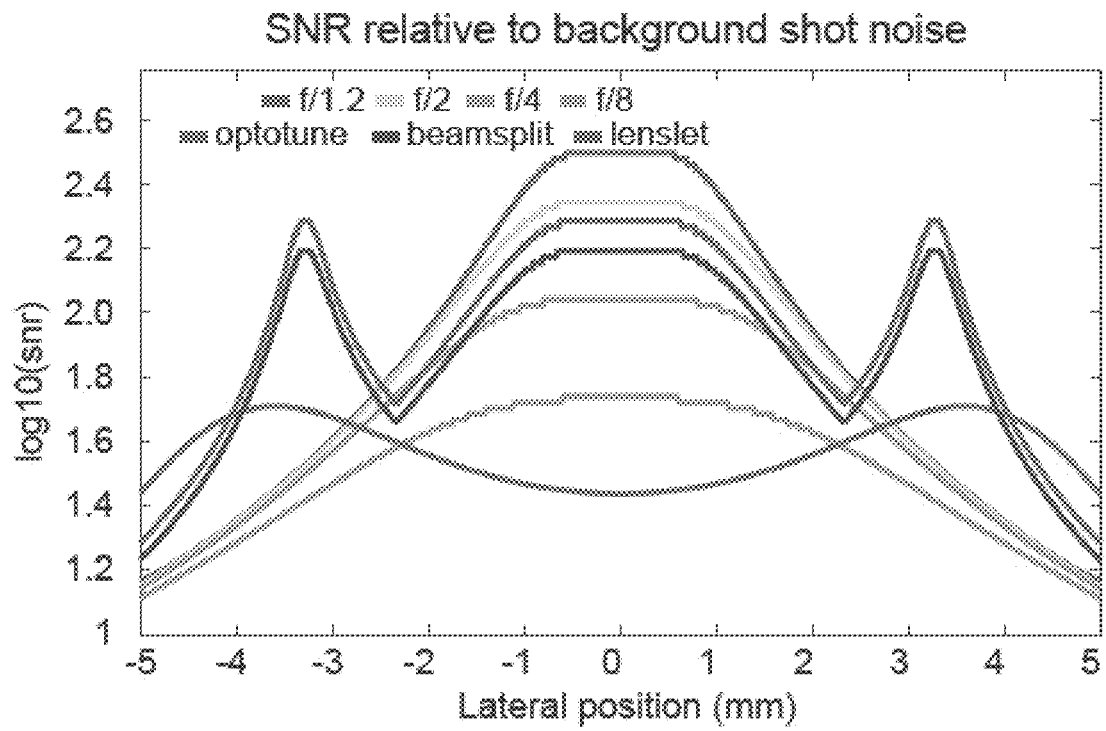
Figure 9G:
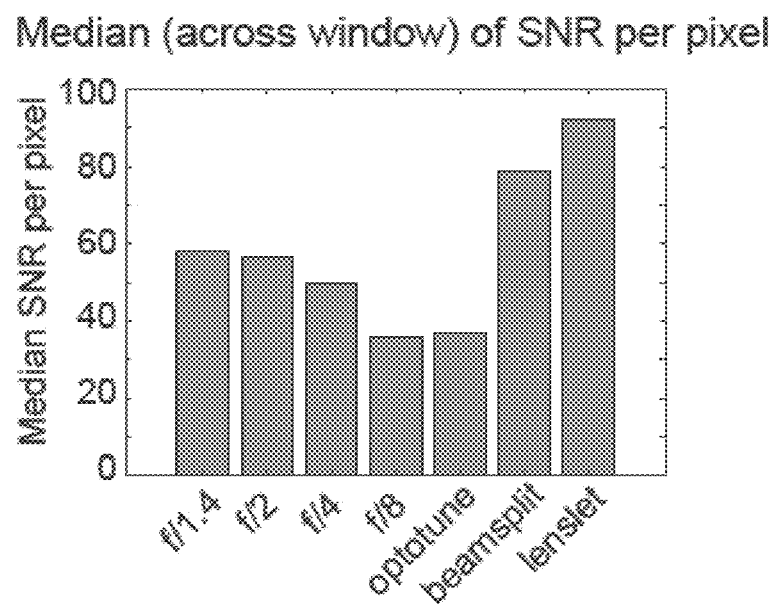
Figures 9H, 9I, 9J, 9K, 9L:
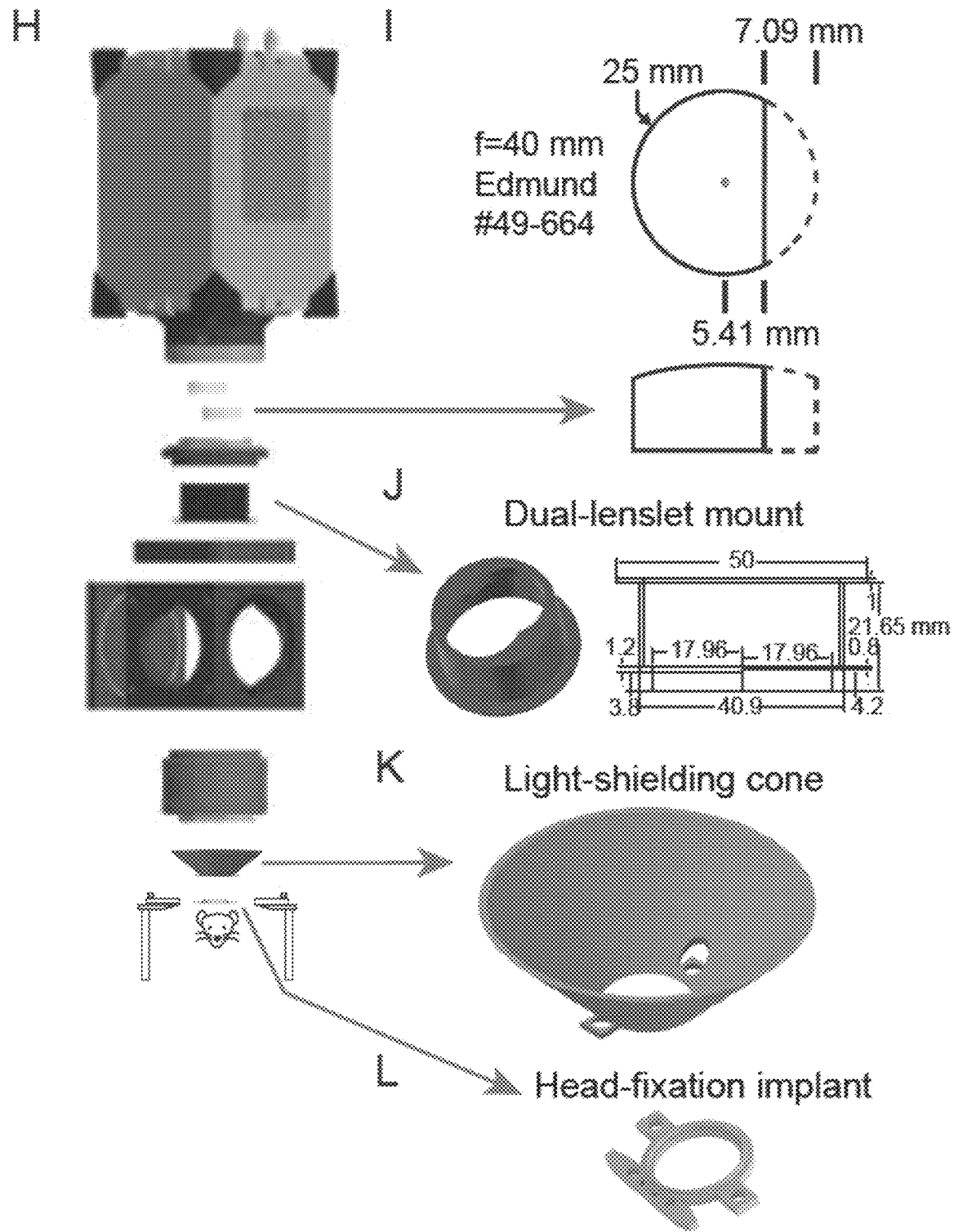
Figure 9M:
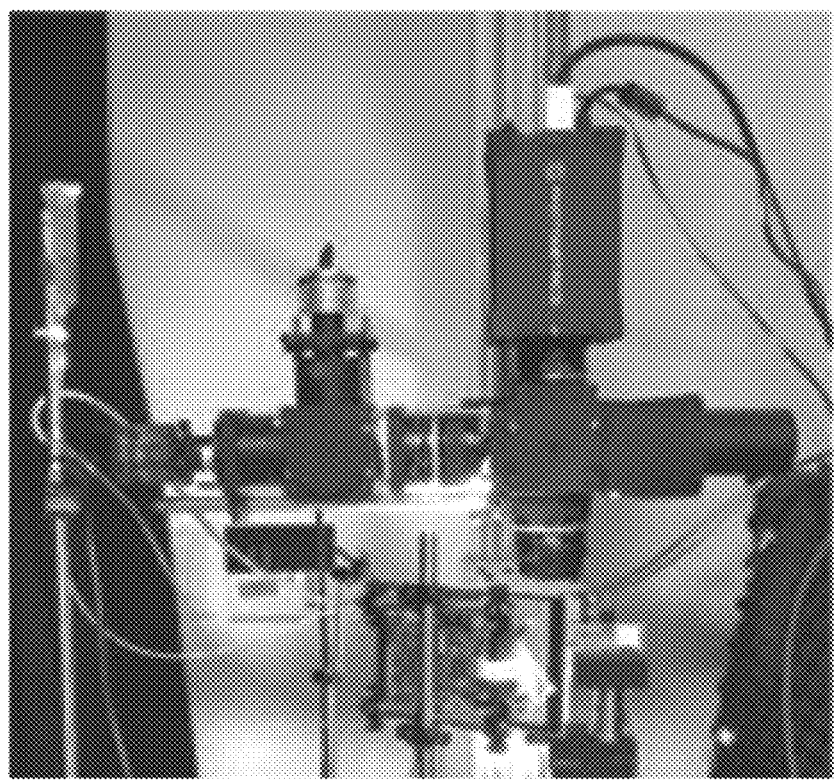
Figure 9N:
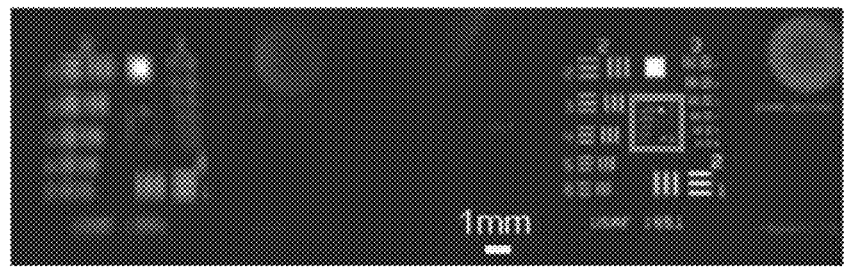
Figure 9N:
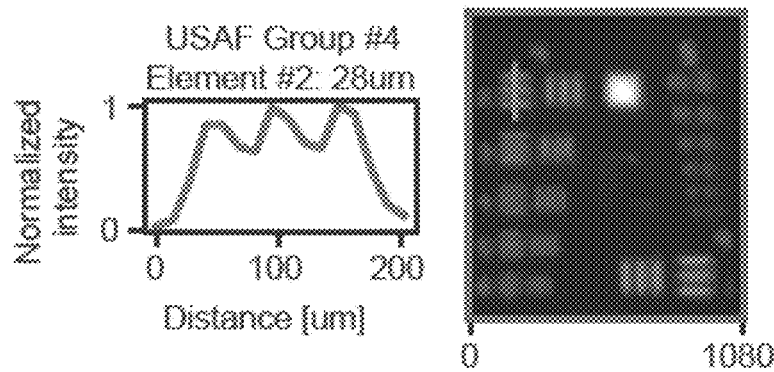

FIGS. 9A-9N. Theory, simulation, and design underlying the enhanced performance of COSMOS (relates to FIG. 1).

(A) Median background per pixel (across recovered neurons) for three recording epochs per detection design, from an in-focus ROI. Background is estimated using the CNMF-E algorithm. (B) Total signal per neuron (across recovered neurons) for three recording epochs per detection design, from an in-focus ROI. Signal is derived based on the spatial footprint and raw temporal traces estimated using the CNMF-E algorithm. (C) Simulated comparison of light collection efficiency of a conventional macroscope with different aperture settings, a tunable lens with a 16 mm aperture, a multifocal two-camera beamsplitter design with f/2 objective aperture setting, and the multifocal dual lenslet design of COSMOS. Although the beamsplitter has a depth of field of f/2 it only has half the light collection. (D) Simulated defocus blur vs. lateral distance along the curved glass window (with 11 mm radius of curvature) for each design. (E) Simulated median (taken laterally across the window) of photon density for each design. (F) Simulated signal to noise ratio vs. lateral position for each design. Assumes a Gaussian point spread function. Secondary peaks are visible for the two multifocal designs. Although f/1.4 has a higher peak SNR when in focus, SNR drops off quickly as the image defocuses. (G) Simulated median (taken laterally across the window) of the SNR for each pixel. Lenslet outperforms the other designs. (H) CAD model of dual-lenslet system. (I) Specifications of an individual lenslet. 7.09 mm from the edge of an off-the-shelf aspherical achromatic lenslet was milled away. (J) Schematic and dimensions of dual-lenslet mount. (K) CAD model of light-blocking cone used to mitigate imaging artifacts induced by visual stimuli. (L) CAD model of headbar used for head-fixing the mouse. (M) Photograph of COSMOS microscope and behavioral setup. (N) Raw sensor image of USAF 1950 Resolution test chart.

FIGS. 10A-10E. Intrinsic imaging and atlas alignment method (relates to FIG. 1).

(A) Experimental setup for intrinsic imaging with a moving bar visual stimulus. (B) Flowchart of intrinsic imaging-based alignment procedure. (C) Example raw phase map with midline and V1/PM border overlaid, also indicated on the atlas. (D) (top) Alignment maps for all mice. (middle) The 700 nm illuminated images used for intrinsic imaging which were aligned to (bottom) the COSMOS fluorescence images. (E) Example raw traces with overlaid smoothed traces (both as output from CNMF-E algorithm) of a few example sources for different imaging conditions. The f/8 macroscope setting shows a clear degradation of signal-to-noise ratio in the raw traces.

FIGS. 11A-11H. Additional analysis of visual-stimulus source characterization (relates to FIG. 2).

(A) Simulation-based estimate of number of neurons per source. First column: Histograms of orientation selectivity index (OSI) for two-photon data shown in FIG. 2F (bottom row) generated by resampling with replacement 500 times. Second column: on each of 500 iterations, groups of neurons (quantities chosen by sampling uniformly from the range indicated on the subplot) were averaged together. These 500 mixed sources then used to generate OSI histograms. Third column: true OSI histograms derived from COSMOS data. Red percentages denote the fraction of neurons with OSI>0.8. Fourth column: similarity between simulated COSMOS OSI distributions and the true COSMOS distribution measured by KL Divergence (lower is more similar). The most similar range of sources to mix together is denoted by a red dot. White dots denote ranges that are statistically indistinguishable from the red dot range (one-sample T-test vs. model marked with red dot, p>0.05). 10 simulated histograms were generated for each point in parameter space. Results shown for three mice. (B) Format matches the above panels using data from Mouse D but where the target COSMOS distribution has all sources with OSI>0.8 removed. The best fitting simulated histogram corresponds to one with a larger degree of neuron mixing. (C) Atlas aligned to cleared skull of a Cux2-CreER; Ai148 (GCaMP6F) mouse. Highlighted sources were identified as visually responsive (one-way ANOVA, p<0.01) to a drifting grating stimulus presented in eight directions. The orientation selectivity of each visually-responsive source is indicated in color. (D) Stimulus-averaged fluorescence responses to each grating direction from sources extracted from right visual cortex of the mouse from Panel C under the COSMOS microscope. Each source is normalized to its peak response. Error bars represent S.E.M. (E-F) Format matches Panels C-D but for a Thy1 (GCaMP6S) mouse imaged through its cleared skull. (G) Trial-averaged, max-normalized, fluorescence traces taken from visually responsive neurons found in right visual cortex of Mouse 1 (Cux2-CreER; Ai148, curved window) under a two-photon microscope. The right panel shows neural population responses for trial-averaged data shown in the left panel projected onto the basis vectors defined by PCA. (H) The same visual stimuli were presented to Mouse 1, under the COSMOS microscope, to reveal the trial-averaged, max-normalized fluorescence traces of sources taken from both visual cortical areas of Mouse 1 (left) and corresponding trajectories in PC space (right).

FIGS. 12A-12F. Further details about task-responsive sources and their spatial distributions (relates to FIG. 3).

(A) Four additional mice, same format as FIG. 3J, showing average traces of sources assigned to each of five task-related classes. This includes one Rasgrf2-2A-dCre: ai93, a different genetic line that labels a potentially non-identical subset of superficial neurons as Cux2-CreER. Similar response profiles were seen in both genotypes. No further analyses was done with the Rasgrf mouse data. (B) Spatial distribution of sources assigned to each task-related class. (C) Spatial autocorrelation analysis of distributions shown in Panel B (CDF is cumulative fraction of source-pairs separated by a given distance). Only five task classes had any significant deviations from the null distribution across all mice and distances (corrected $p<0.05$, permutation test, significant values are indicated with black line overlay), and the significant task classes or CDF values were not consistent across mice. (D) Spatial autocorrelation analysis on simulated data to investigate sensitivity to clusters of different sizes. Clusters at least 1 mm in diameter (⅓ of sources within the cluster area were assigned to the cluster) displayed clear significant ($p<0.05$) differences from the null distribution (marked with black line overlay). (E) Distribution of task classes within each region (M=motor, P=parietal, R=retrosplenial, S=somatosensory, V=visual). Error bars are S.E.M. across n=4 Cux2-CreER mice. (F) Additional spatial distributions and examples of sources exhibiting "lick OFF" dynamics.

Figure 13A:
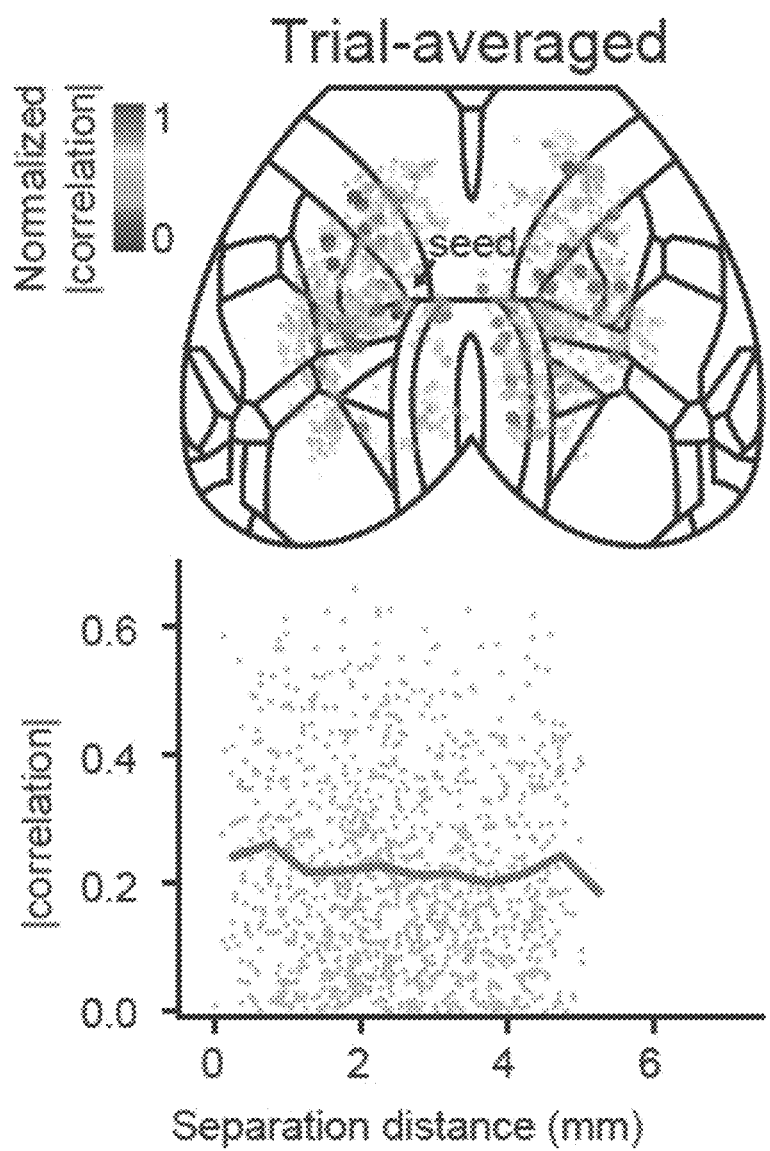
Figure 13B:
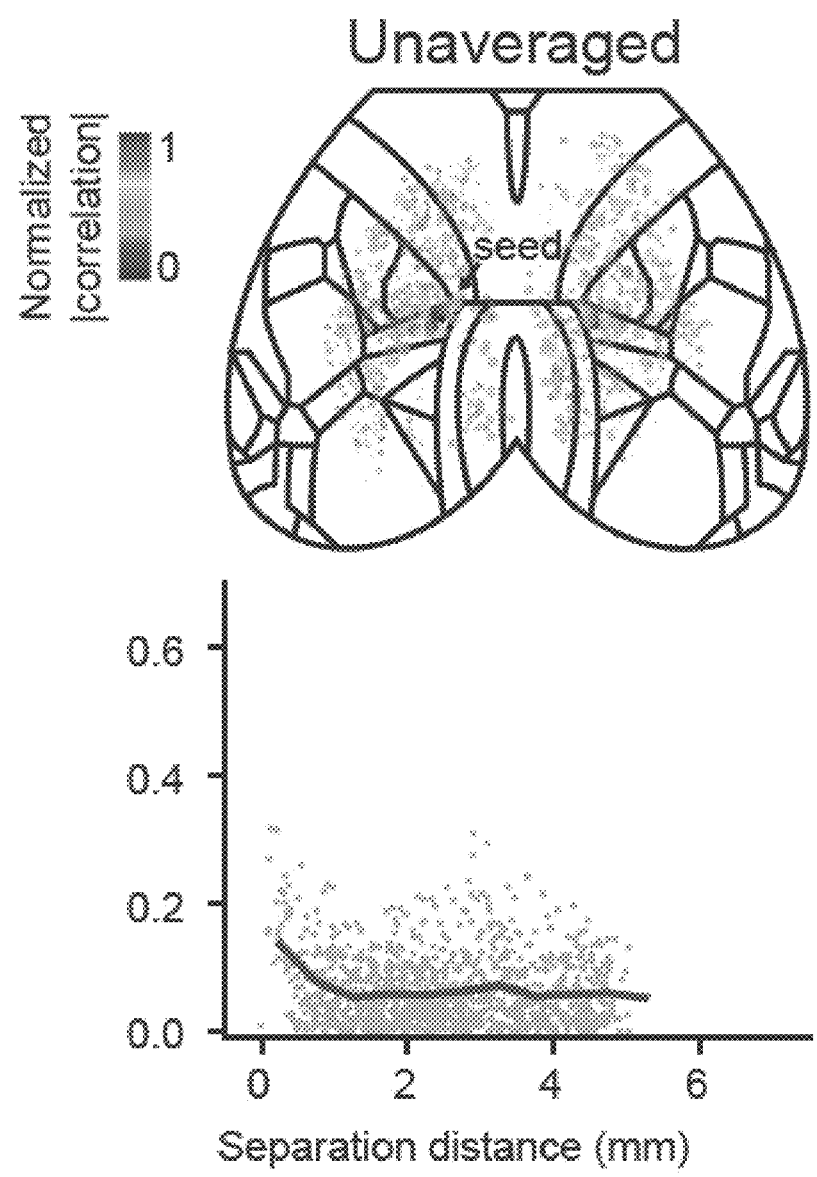
Figure 13C:
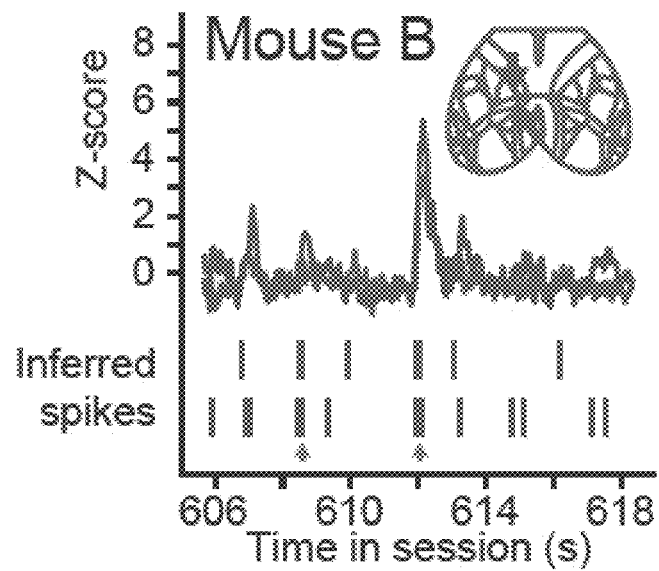
Figure 13D:
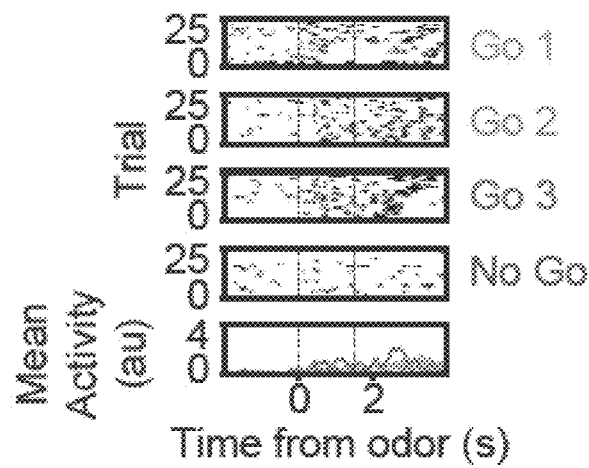
Figure 13E:
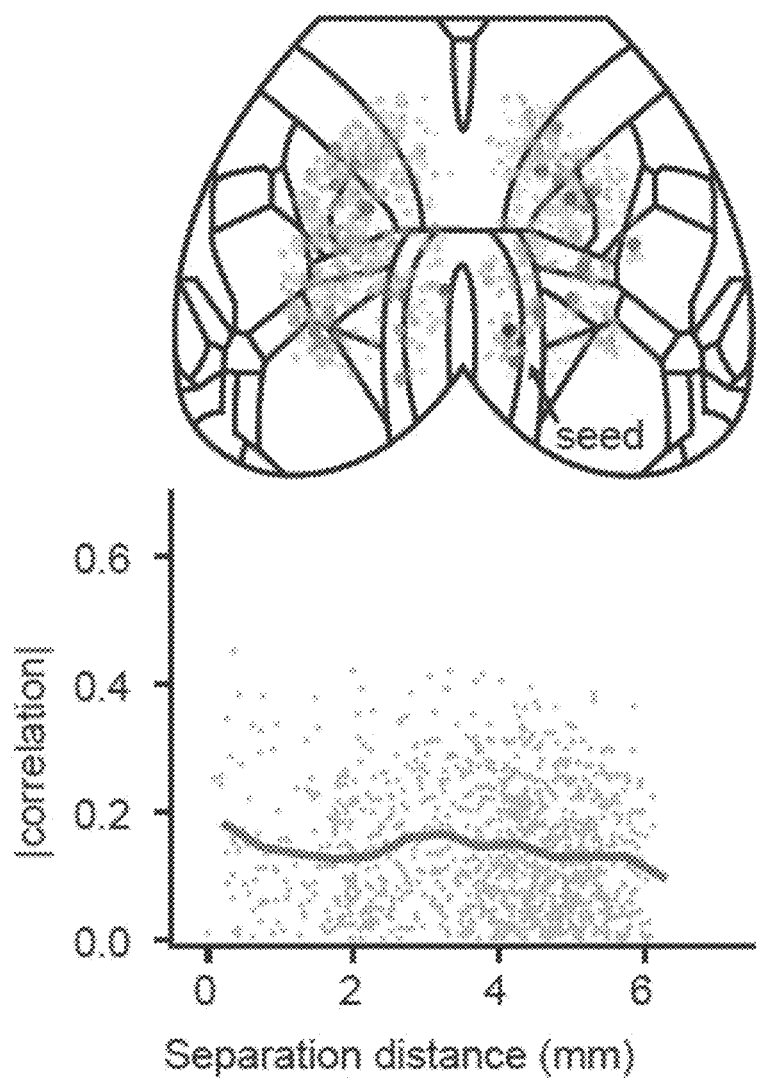
Figure 13F:
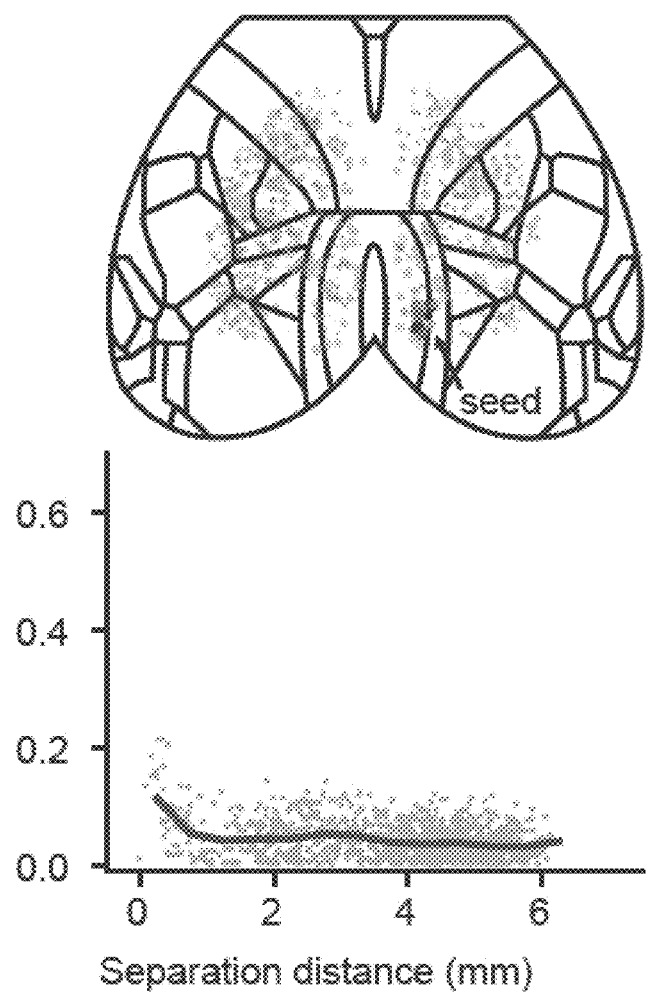
Figure 13G:
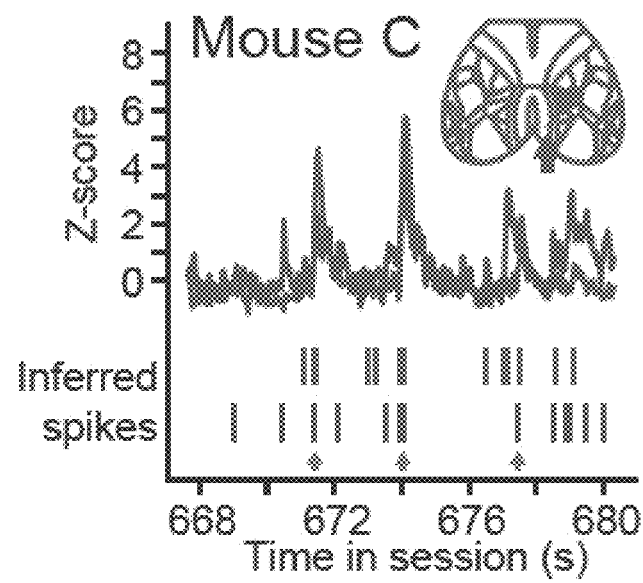
Figure 13H:
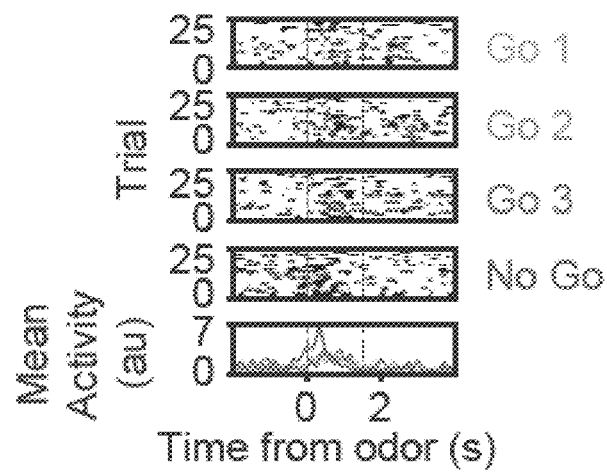
Figure 13I:
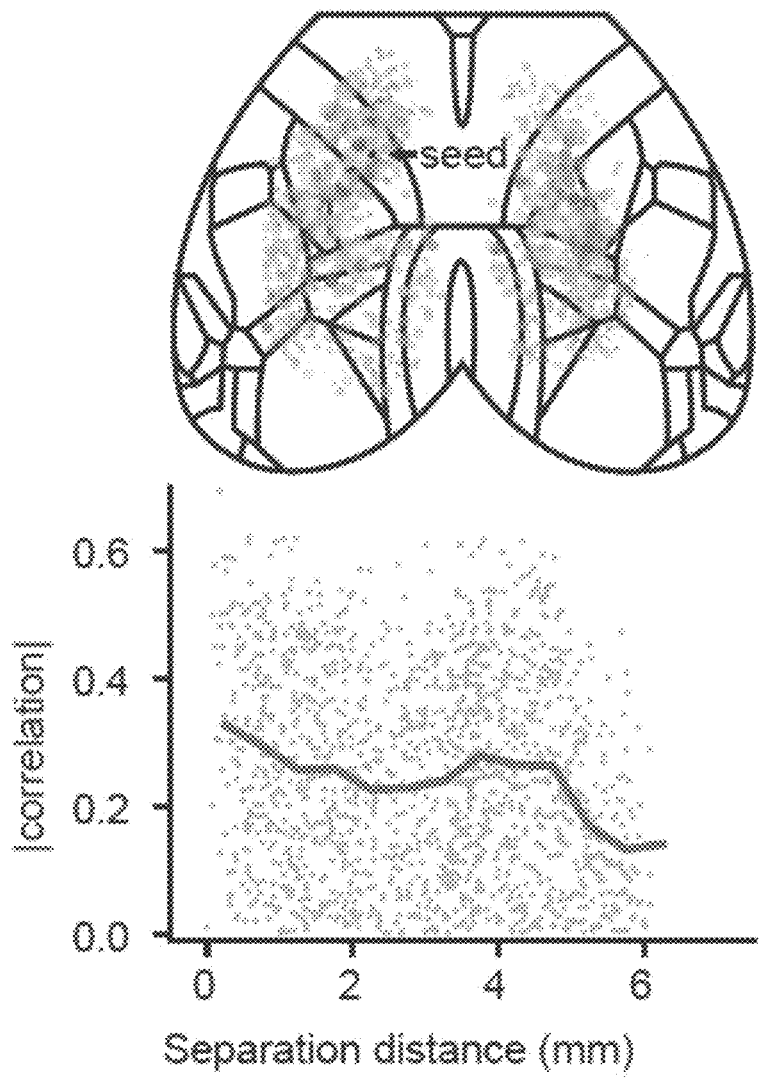
Figure 13J:
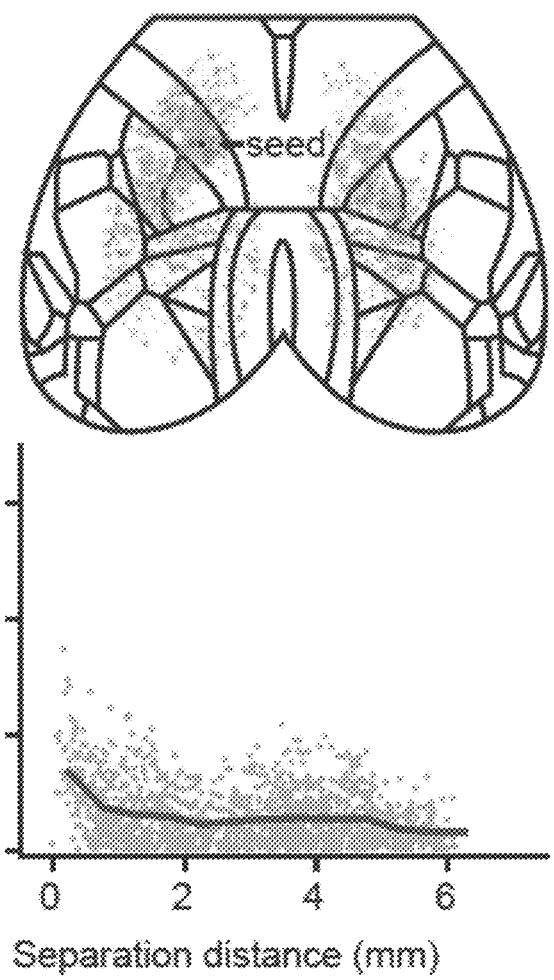
Figure 13K:
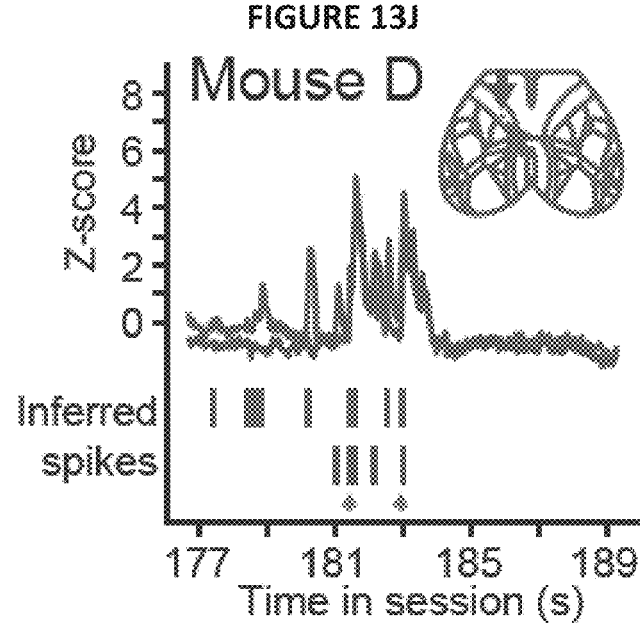
Figure 13L:
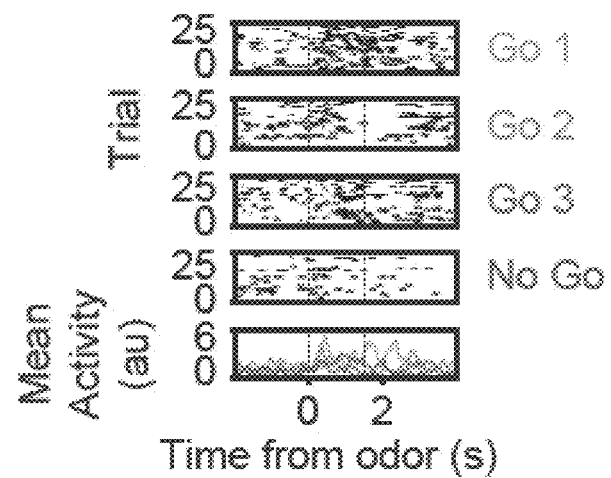

FIGS. 13A13L. Additional data related to unaveraged correlation structure (relates to FIG. 4).

(A) Trial-averaged activity correlations: (top) spatial distribution, (bottom) correlation vs. distance to the seed. Seed location is represented as a black dot in right visual cortex, referenced by the labelled arrow. (B) Unaveraged activity correlations: (top) spatial distribution), (bottom) correlation vs. distance to the seed. This source exhibits symmetrically bilateral localized correlation. (C) Example of unaveraged correlated activity between the seed source and a neighboring source (locations indicated on atlas inset). Z-scored fluorescence and inferred spikes are shown. Red arrows indicate timepoints when the seed source and its neighbor are active simultaneously. (D) Single trial responses of seed source. (E-H) Same, but for an additional mouse, with seed source in retrosplenial cortex. (I-L) Same, but for an additional mouse, with seed source in motor cortex.

FIGS. 14A-14J. Additional analyses related to decoding motor actions and plans (relates to FIGS. 5-7).

(A) Ability of each neural source to discriminate between any of four behavioral states (licks towards one of the three spouts, or no lick). P-value computed for each source using Kruskal-Wallis H-test and FDR-corrected. Dashed horizontal line represents $p=0.05$. (B) Spatial distribution of sources with significant motor action discrimination capacity ($p<0.05$). (C) Example decoding of lick direction from neural activity at 30 Hz (on test dataset). Vertical lines represent trial onsets. (D) Model prediction accuracy versus the number of PLS basis vectors used. Five models were trained for each basis set size. (E) Pre-odor neural decoding performance as a function of number of neuronal sources used. Red lines indicate means across mice. Gray lines indicate performance of models trained and evaluated against circularly permuted true-spout labels. Black lines similarly represent models trained against randomly shuffled true-spout labels. Red lines indicate means across mice. Error bars show 99% bootstrapped confidence intervals. Vertical line at 500 indicates that all analyses that pooled across cortical regions used only the top 500 sources with most discrimination capacity for decoding to avoid model overfitting. (F) Spatial distribution of sources with significant discrimination capacity ($p<0.05$) for the spout that was most-licked during the pre-reward period. P-values were computed for each source using a Kruskal-Wallis H-test and FDR-corrected. (G) Comparison of decoding performance of either the active spout (left) or the most-licked spout (right). Corrected paired t-test p-value shown between the active and preferred conditions. Note that trials where the active spout and most-licked spout were not identical were never used for the training of any PLS models. (H) Neural decoding of the preferred spout as a function of fraction of pre-reward licks towards the preferred spout. (I) Model AUC when evaluated on "correct go trials" (defined as those where at least 70% of total licks were to the active spout), "no go" trials, "2nd trials", and "incorrect go trials" ("go" trials where less than 70% total trial licks were towards the active spout). "Incorrect go trials" are defined differently here, versus the main text (where less than 30% was the criterion), because multiple unique trials towards each spout were needed to accurately compute the AUC. (J) The total variance explained, shown for the top four basis vectors computed using either PLS (bottom, gray) or Principal Components Analysis (PCA, top, black), averaged across all four mice.

FIG. 15A-15G. Active spout decoding from high speed videos of mouse behavior and cross-temporal neural decoding (relates to FIGS. 6 and 7).

(A) Extracting motion-related features from high-speed behavior videos. (B) Variance explained by behavioral video motion energy principal components. (C) Results from PLS decoding of active spout from pre-odor video motion features. (D) Results of decoding using pre-odor motion features from specific regions of interest. (E) It was tested whether there might be a difference between widespread neural representations of motor plans, and of motor plan execution. To do this, sets of PLS models trained on different epochs of the trial were compared. By training models on a single time bin (e.g. during the pre-odor period) and evaluating prediction performance on a different time bin (e.g. during movement), the similarity of the PLS models over the trial was tested. The goal was to understand whether a single projection of the data might best discriminate the trial types, or whether cortex might represent motor plans during the intertrial interval differently from actual directed licking during the peri-movement period (between lick onset and lick offset). Examining how well each of the time-specific models predicted other time bins revealed clear structure. In grouping these time bins into pre-, peri-, and post-task epochs based on the average time of lick onset and offset, a dissociation was found between models trained on intertrial interval data (from the pre- and post-task epochs) versus those trained using peri-task period data. Specifically in this panel, AUC was computed for PLS bases trained to predict the active spout position from neural data in one time window, and then tested on neural data from all time windows and each mouse. AUC is normalized by the maximum AUC for each testing time window, and averaged across four mice. Dashed lines represent the average time of lick onset and offset within the trial. For this analysis (panels E-G), testing was only done on trials where the active spout and preferred spout were identical (trials where the active spout and preferred spout were not the same were always excluded from training in all analyses). (F) Quantification of results in Panel E for individual mice, comparing cross-temporal prediction performance of three distinct time blocks: pre-task, peri-task, and post-task. For each testing time block, the mean prediction performance of bases trained on each time block (corrected t-test) were statistically compared. These results are consistent with the interpretation that motor plans and consequent movements are represented by two distinct, but related, neural population representations. (G) Unnormalized cross-temporal AUC for each mouse. ns denotes corrected $p>0.05$, * $p<0.05$,  $p<0.01$, * $p<0.001$, **** $p<0.0001$.

Figure 16A:
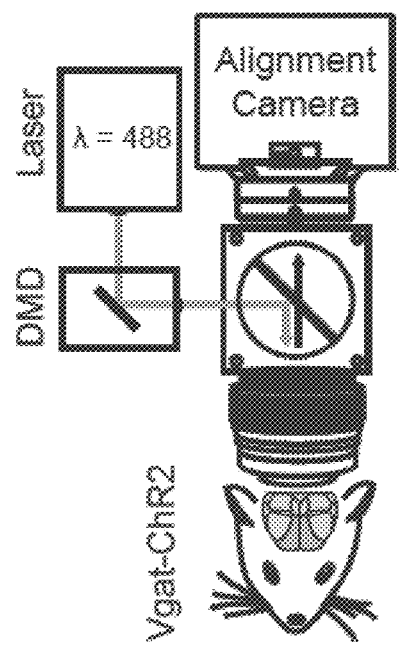
Figure 16B:
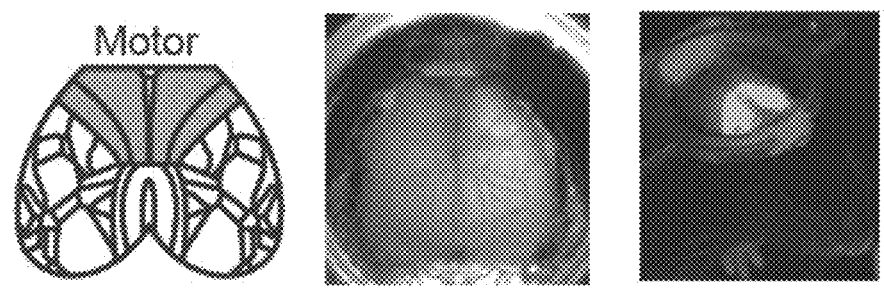
Figure 16C:
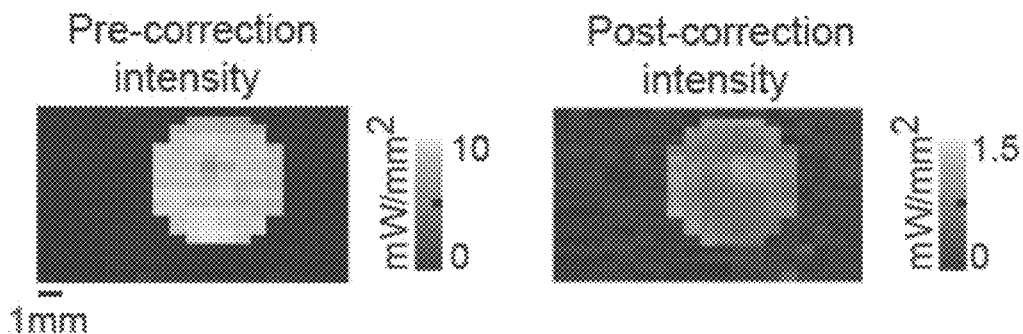
Figure 16D:
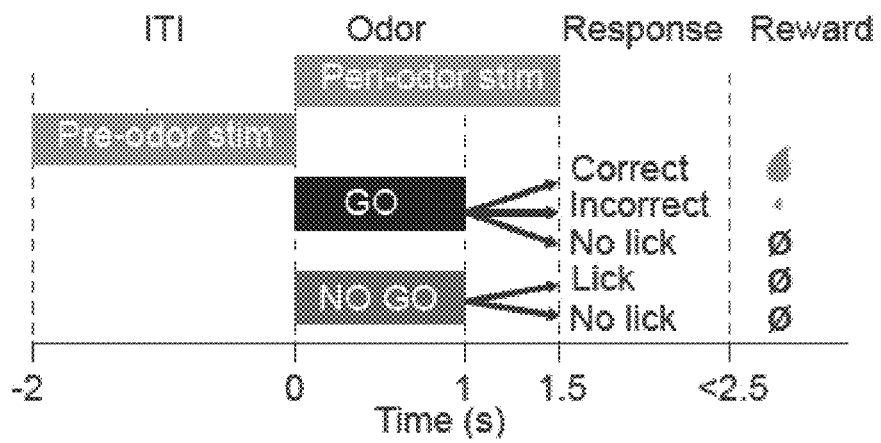
Figure 16E:
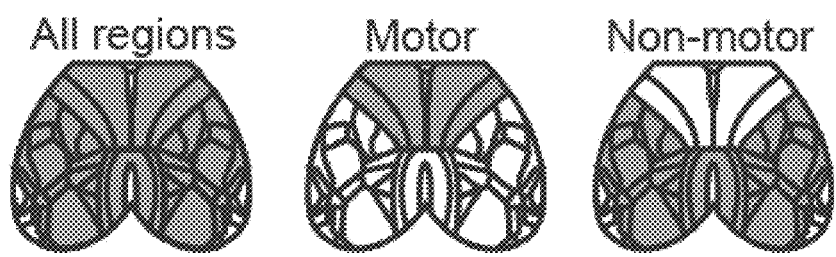
Figure 16F:
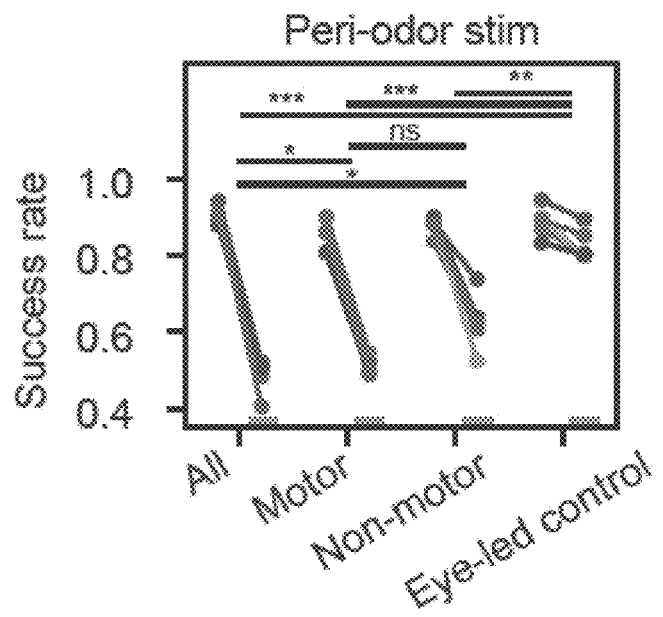
Figure 16G:
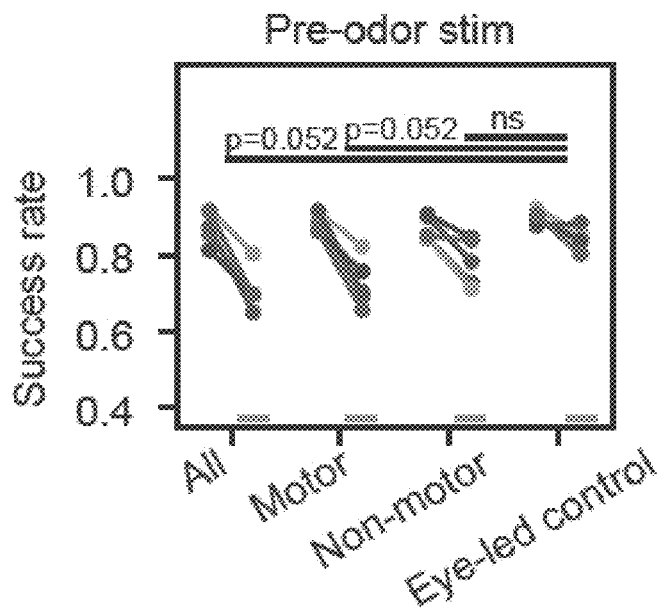
Figure 16H:
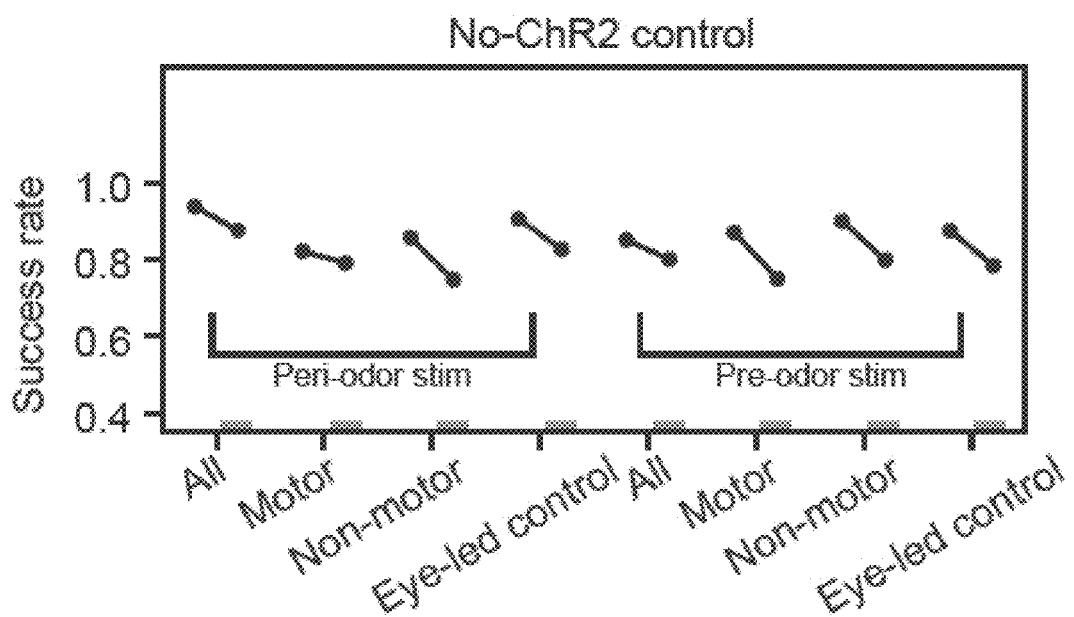
Figure 16I:
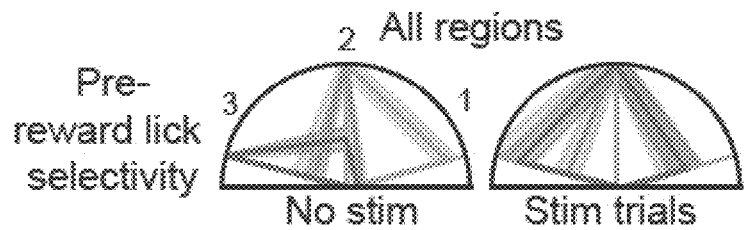
Figure 16I:
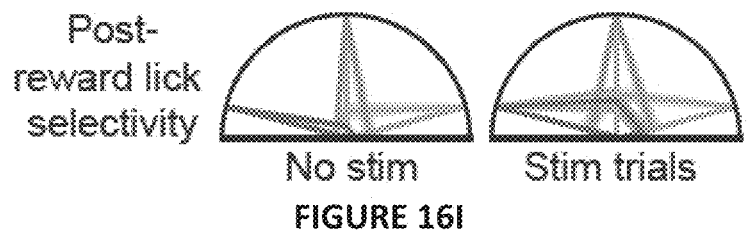
Figure 16J:
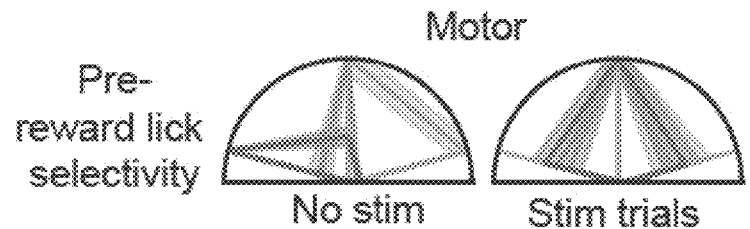
Figure 16J:
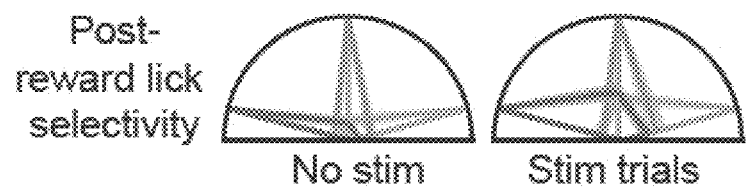
Figure 16K:
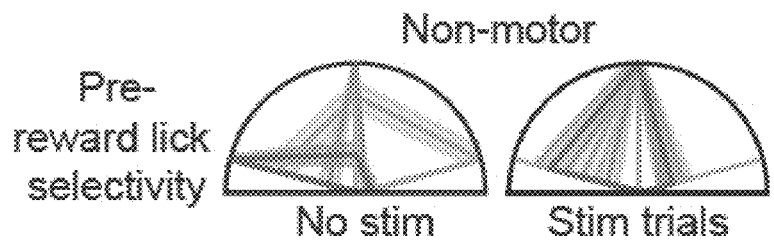
Figure 16K:
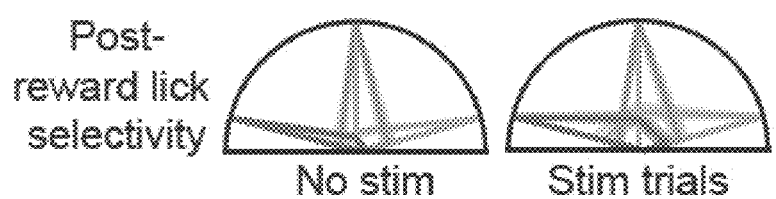
Figure 16L:
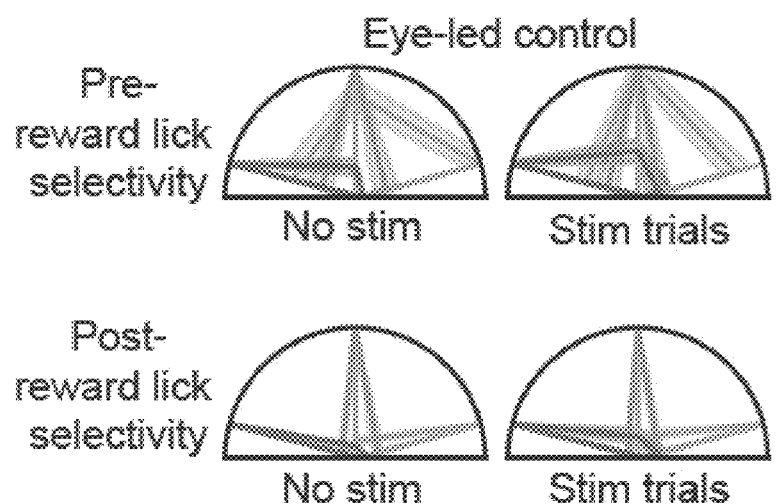
Figure 16M:
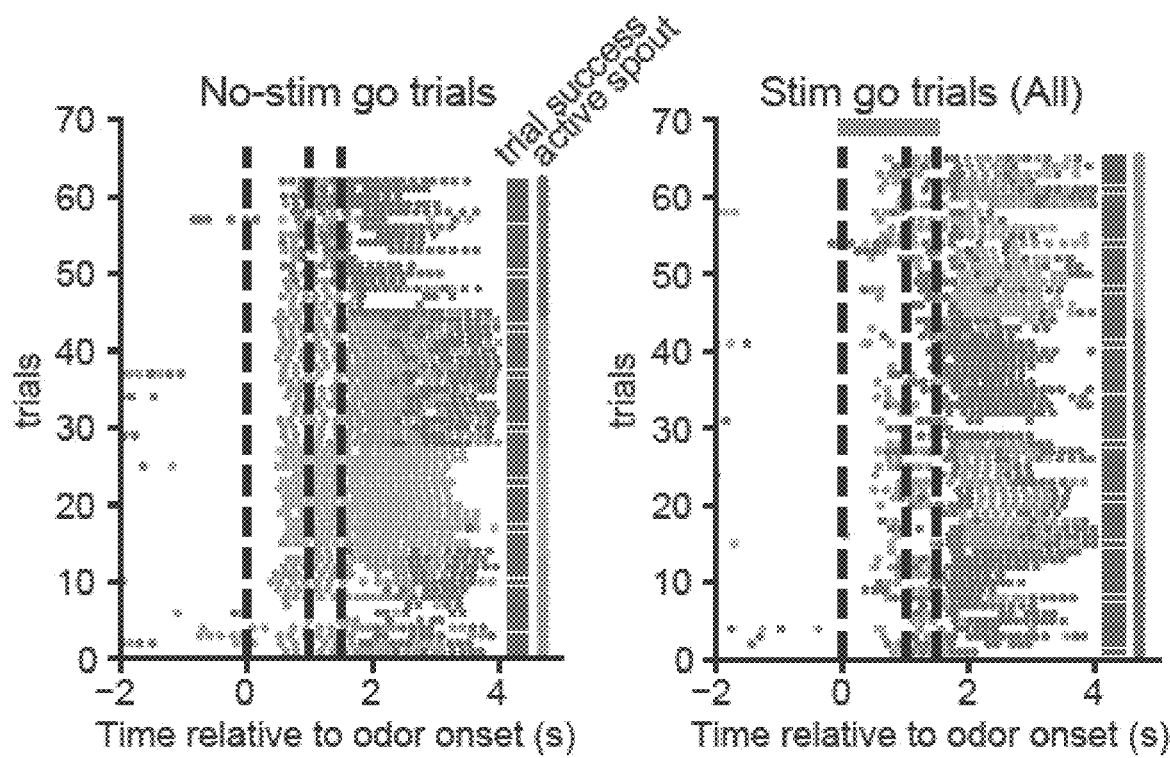
Figure 16N:
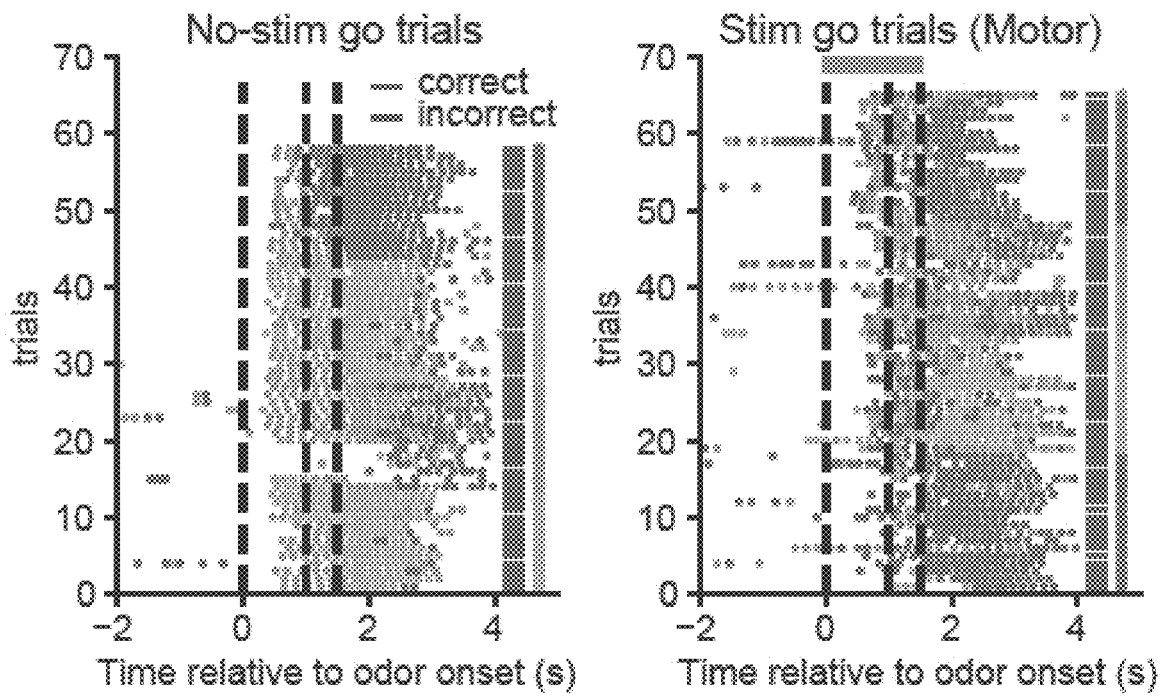
Figure 16O:
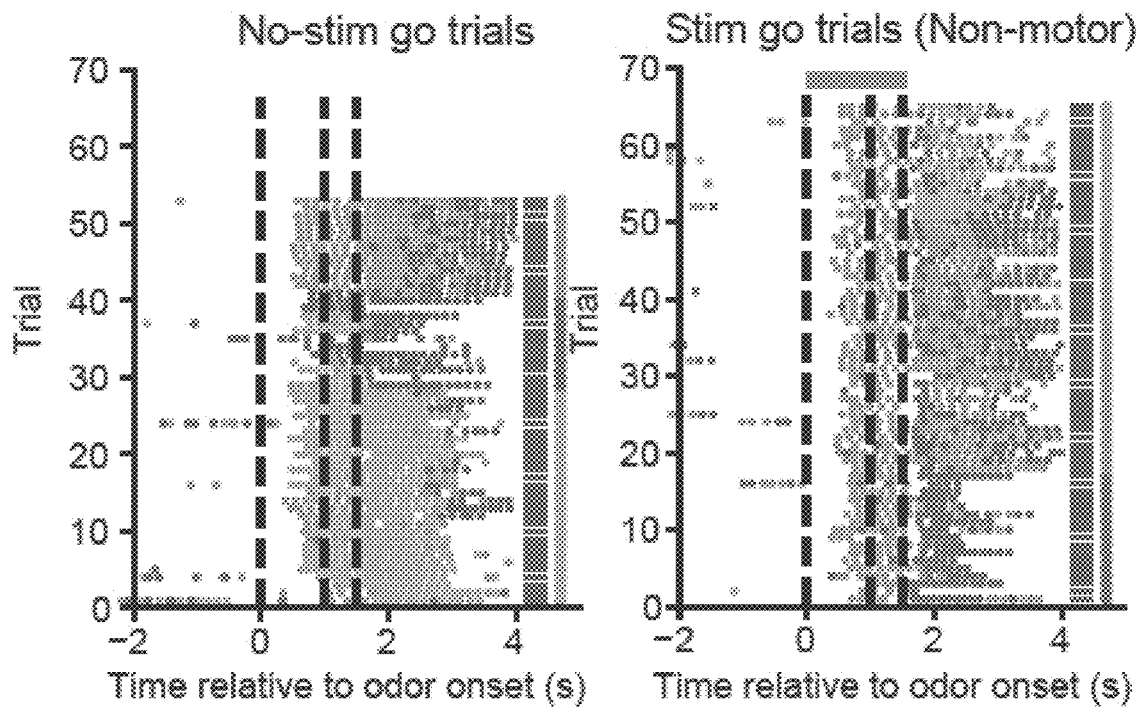
Figure 16P:
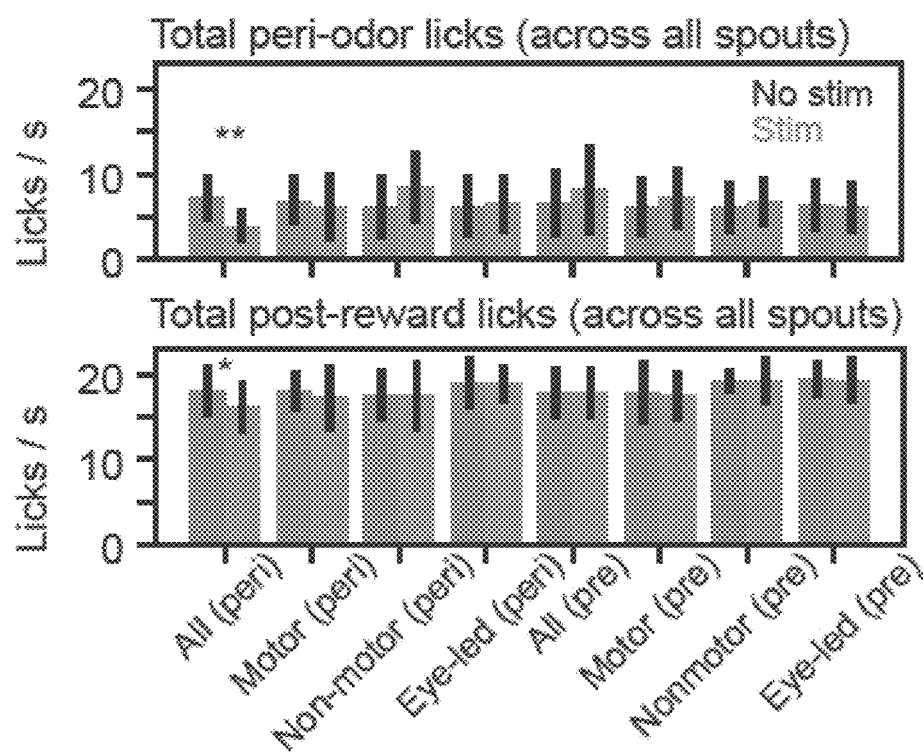

FIG. 16A-16P. Inhibition of non-motor areas impairs lick-to-target task performance (relates to FIGS. 5-7).

(A) In addition to recording neuronal activity, it was tested if the task-activity observed to be distributed across many non-motor areas was causally involved in task performance. This was investigated because it is known that specific areas of cortex can modulate the firing of neurons in primary and secondary motor cortex. For example, projections from S1 can drive M1 activity and drive the initiation of whisking (Sreenivasan et al., 2016). But in addition, posterior regions like retrosplenial cortex and primary sensory areas (Barthas and Kwan, 2017; Yamawaki, Radulovic, and Shepherd, 2016; Zingg et al., 2014), also project to secondary motor cortex and may thus play an important role in producing any dynamics observed in motor areas. A study was set to test whether mice could accomplish the task without normal input from all of these non-motor areas by simultaneously inhibiting multiple cortical regions using the Digital Micromirror Device (DMD) system shown here. This approach avoided the possibility that uninhibited areas in cortex might compensate for the acute shutdown of a single area. (B) Atlas alignment. (C) Intensity calibration. (D) Stimulation protocol. (E) Stimulation patterns. (F) Success rate on peri-odor stimulation vs. no stimulation trials, for each stimulation pattern, n=5 mice, corrected paired t-test between stimulation patterns. (G) Success rate on pre-odor stimulation vs. no stimulation trials, for each stimulation pattern, n=5 mice, corrected paired t-test between stimulation patterns. (H) Success rate on peri- and pre-odor stimulation for a mouse not expressing ChR2. (I-L) Summary of lick selectivity averaged across n=5 mice (with S.E.M. shown) after odor delivery, but before (top) or after (bottom) reward delivery during non-stimulation trials or stimulation trials, for each stimulation pattern. Colors denote the normalized number of licks towards each spout on trials when a given spout is active. (M-O) Example lick rasters demonstrating that licking is not fully abolished during photoinhibition, but rather the specificity of it is disrupted (for each stimulation pattern, some sessions showed incorrect preference for a single spout, while others showed nonspecific licking towards multiple spouts). (P) Comparison of total number of peri-odor and post-reward licks during no-stimulation (gray) and stimulation (blue) trials (mean+/−S.E.M. across mice, corrected paired t-test between stimulation patterns). ns denotes corrected $p>0.05$, * $p<0.05$,  $p<0.01$, * $p<0.001$.

DETAILED DESCRIPTION

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a," "an," and "the" include plural referents unless the context clearly dictates otherwise. Thus, for example, reference to "a neuron" includes a plurality of such neurons and reference to "the light-activated polypeptide" includes reference to one or more light-activated polypeptides and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

The devices and methods disclosed herein can be used in wide range of applications, for example, from basic brain science research to pharmaceutical development using three-dimensional cultured tissues, such as organoids, or broadly, for treating the movement or dynamics of particles in a three-dimensional space.

Devices

Certain embodiments of the disclosure provide a macroscope for simultaneously obtaining images from a plurality of planes in a three-dimensional specimen. In certain embodiments, the macroscope comprises an objective apparatus comprising a multifocal optics comprising a plurality of optical components configured to focus on a plurality of planes.

The term "macroscope" as used herein refers to an imaging device that can produce a "magnified image" of an entire field of view that is more than 5 mm, for example, more than 6 mm, more than 7 mm, more than 8 mm, more than 9 mm, or more than 1 cm in the longest dimension. Thus, a field of view can be about 5 mm, 6 mm, 7 mm, 8 mm, 9 mm, or 1 cm in the longest dimension. The term "magnified image" also encompasses slightly demagnified images, such that the recorded image of the field of view is scaled by a factor greater than 0.1×, for example, more than 0.2×, more than 0.5×, more than 0.9×, more than 1×, more than 5×, more than 10×, or more than 20×. Thus, the recorded image can be magnified by a factor of about 0.1×, 0.5×, 0.9×, 1×, 5×, 10×, or 20× relative to the size of the specimens in the field of view.

The phrase "objective apparatus" as used herein refers to the portion of the macroscope that gathers light from a specimen. The objective apparatus can comprise one or more lenses or sets of lenses. For example, an objective apparatus can comprise an objective lens, for example, a front lens, and a multifocal optics. The objective lens, for example, the front lens is closer to the specimen that the remaining parts of the objective apparatus and provides a magnified image of the specimen to the multifocal optics. In some embodiments, the objective lens, for example, the front lens can be selected so that it can provide, for a large field of view, one or more of: a micron scale resolution, high light throughput, and fast imaging.

The phrase "multifocal optics" as used herein refers to a combination of optical components that are configured to focus on a plurality of planes, such as, two, three, four, five, or more than five planes. Thus, multifocal optics can comprise a plurality of optical components, such as lenses, each of which focuses on one plane such that the multifocal optics, as a whole, can simultaneously focus on a plurality of planes.

Thus, an embodiment of the disclosure provides a macroscope comprising an objective apparatus comprising a multifocal optics comprising a plurality of optical components configured to focus on a plurality of planes.

In one embodiment, the multifocal optics comprises a dual-focus array of lenses configured to focus on two planes.

Figure 1A:
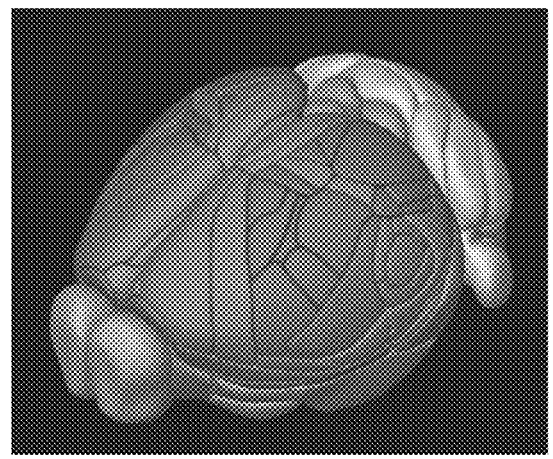
FIGS. 1A-1P. The COSMOS dual-focus macroscope enables the recovery of high signal-to-noise neural sources across the curved surface of dorsal cortex.
Figure 1B:
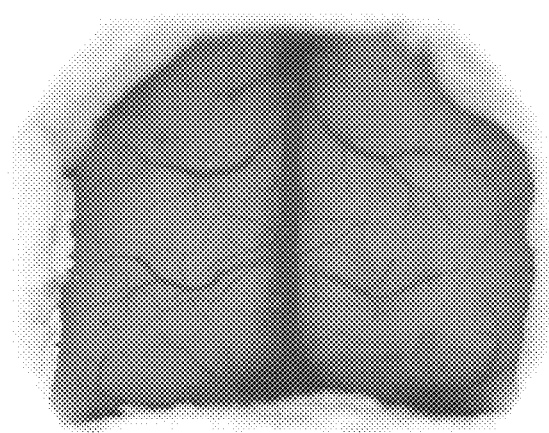
Figure 1C:
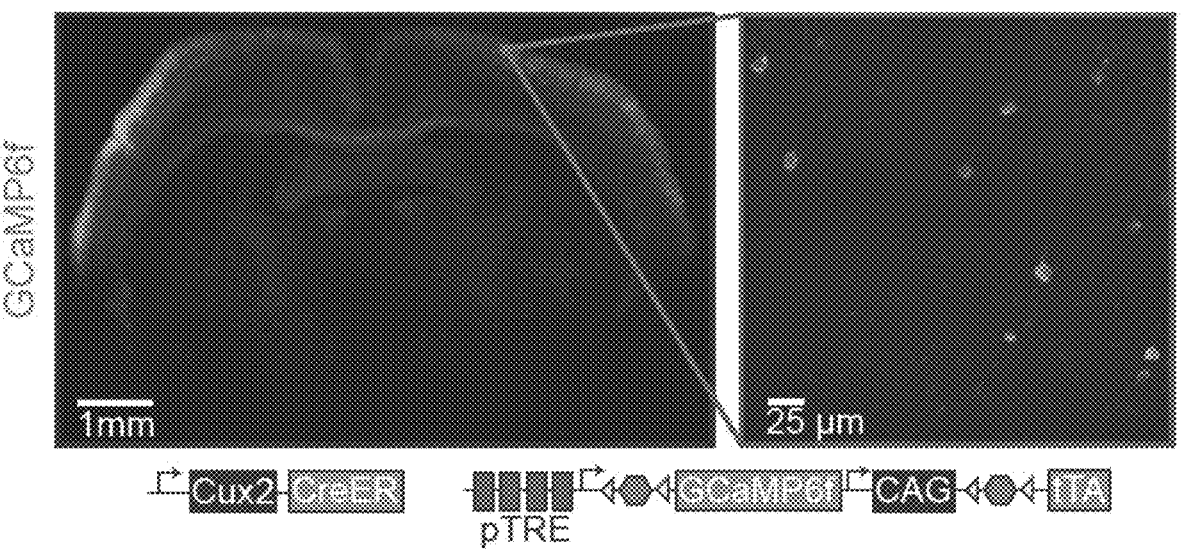
Figure 1D:
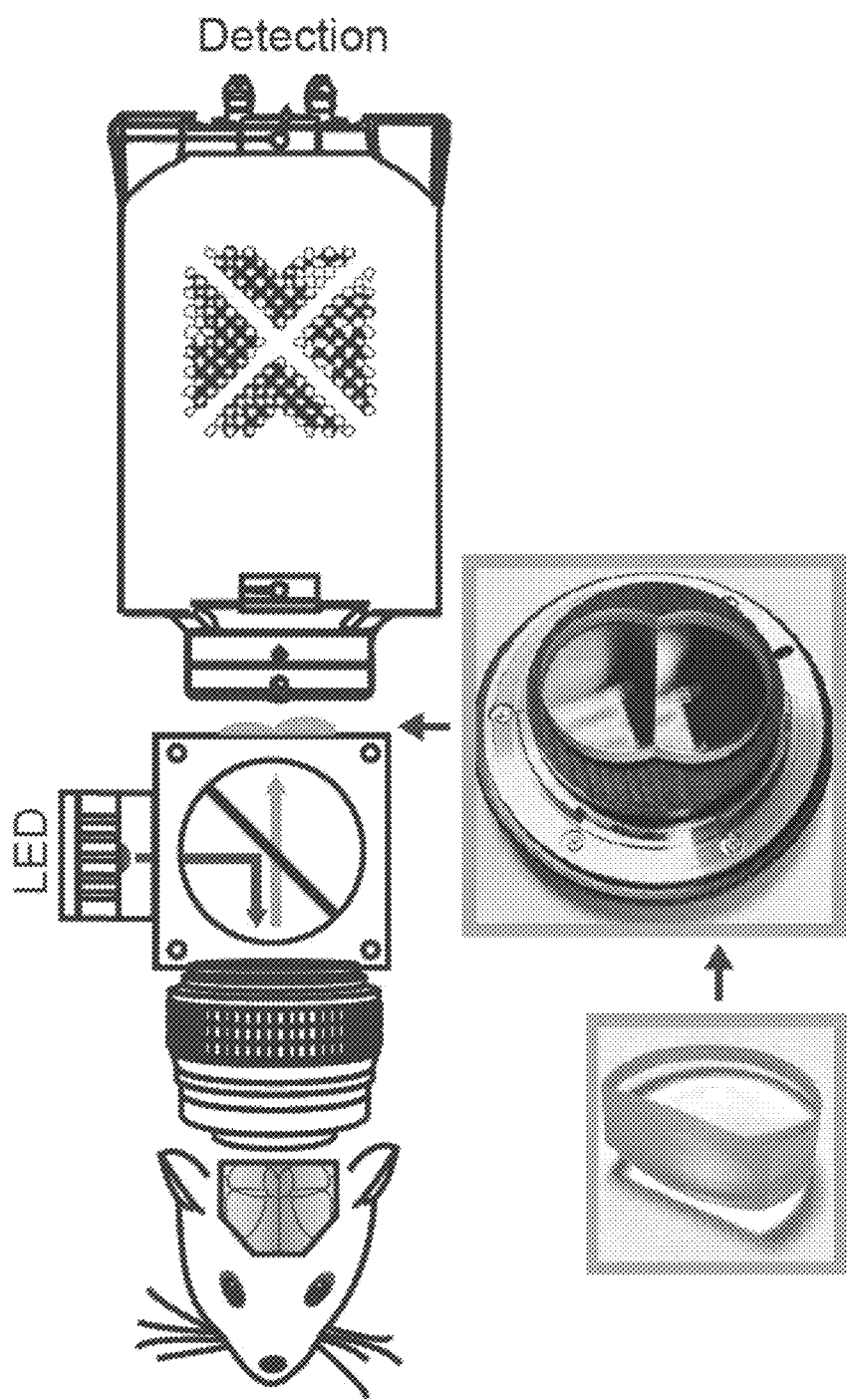

In one embodiment, a dual-focus array of lenses configured to focus on two planes is as described in FIG. 1D or FIG. 9I-9J.

For example, two lenses, each with different focal length can be cut to remove a part of the periphery (as shown in FIG. 1D). These two lenses can be arranged along the cut portion of the lenses to produce a dual-focus lenslet array, where, depending on the focal lengths of the two lenses, one lens focuses on one plane and the other lens focuses on a different plane.

In another embodiment, two lenses each with the same focal length can be cut to remove a part of the periphery (as shown in FIG. 1D). These two lenses can be arranged along the cut portion of the lenses to produce a dual-focus lenslet array in such a way that the focal planes of the two lenses are different from each other by a fixed amount (e.g. 100 microns, 200 microns, or 1 mm). The specific arrangement of lenses is designed such that an image of the whole or part of the field of view fills the camera sensor on the macroscope. Therefore, depending on the distance from the specimen for each lens in the dual-focus lenslet, one lens focuses on one plane and the other lens focuses on a different plane, and the images from each lens are non-overlapping on the sensor.

In a further embodiment, a plurality of lenses, such as, two, three, four, or five lenses, with different focal lengths can be cut in a manner that they can be assembled together to form a multi-focus lenslet.

Figure 1E:
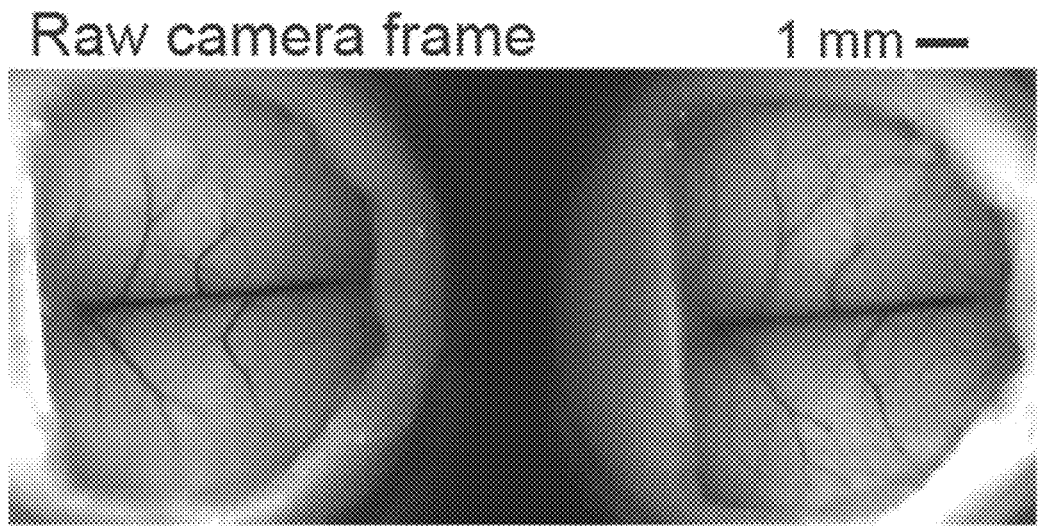
Figure 1F:
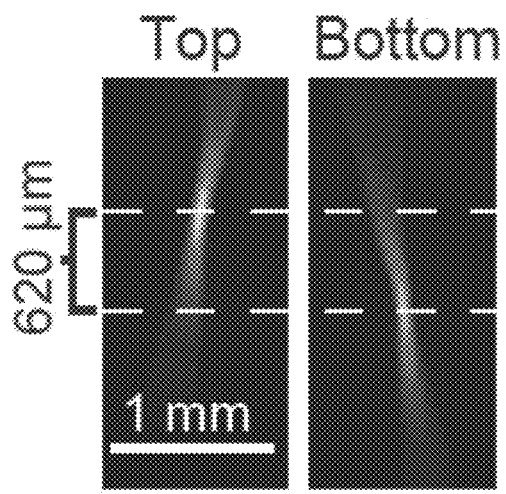
Figure 1G:
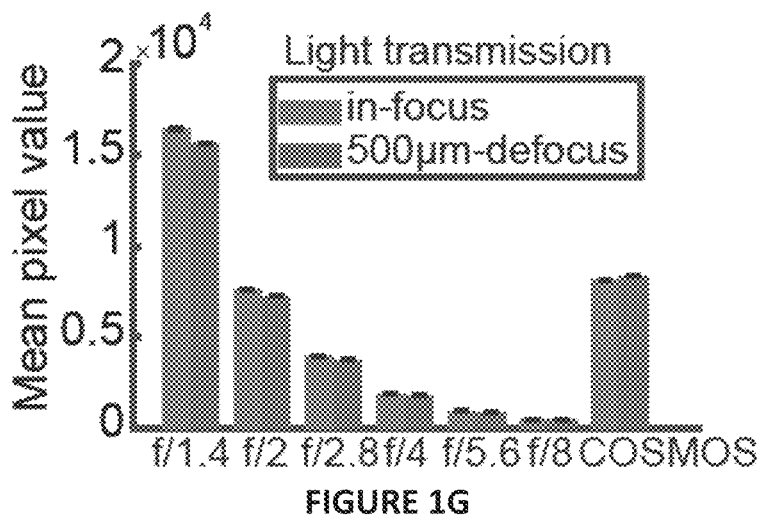
Figure 1H:
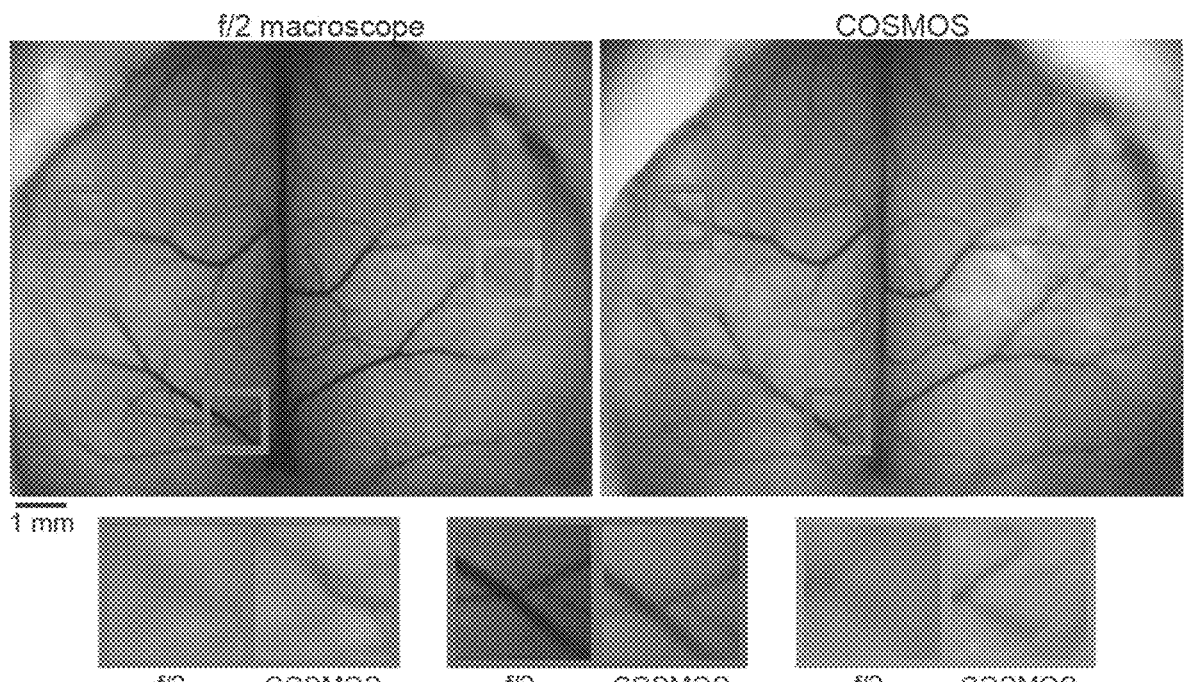
Figure 1I:
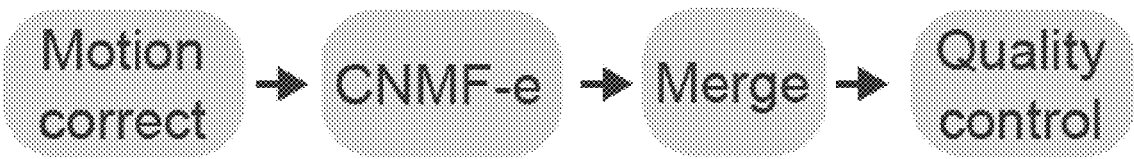
Figure 1L:
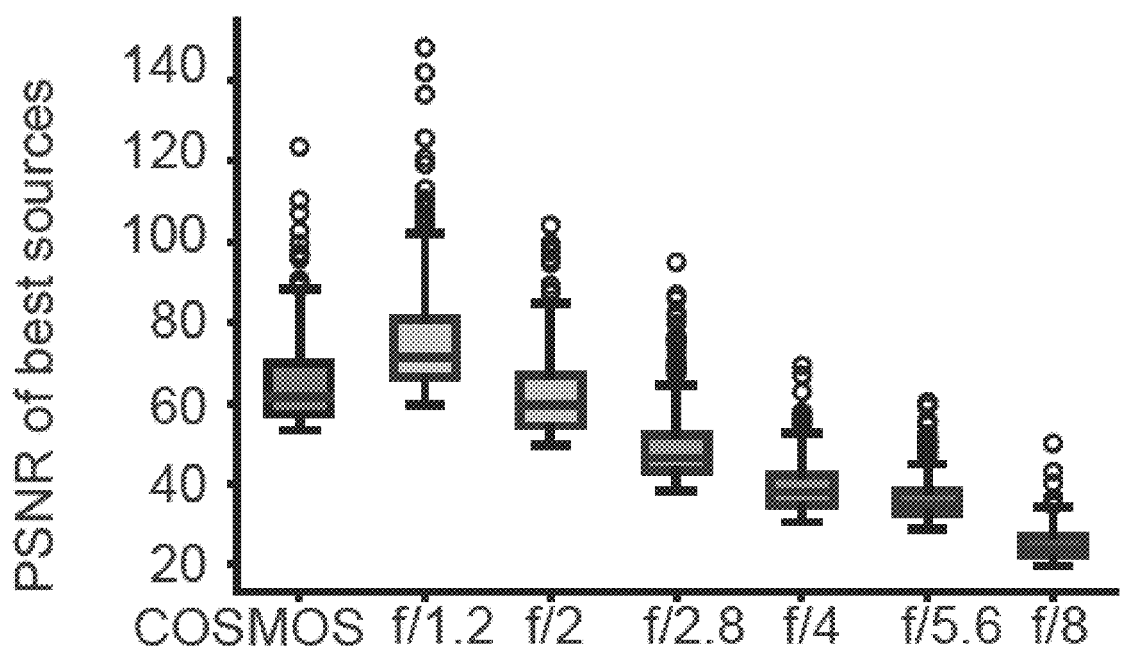
Figure 1M:
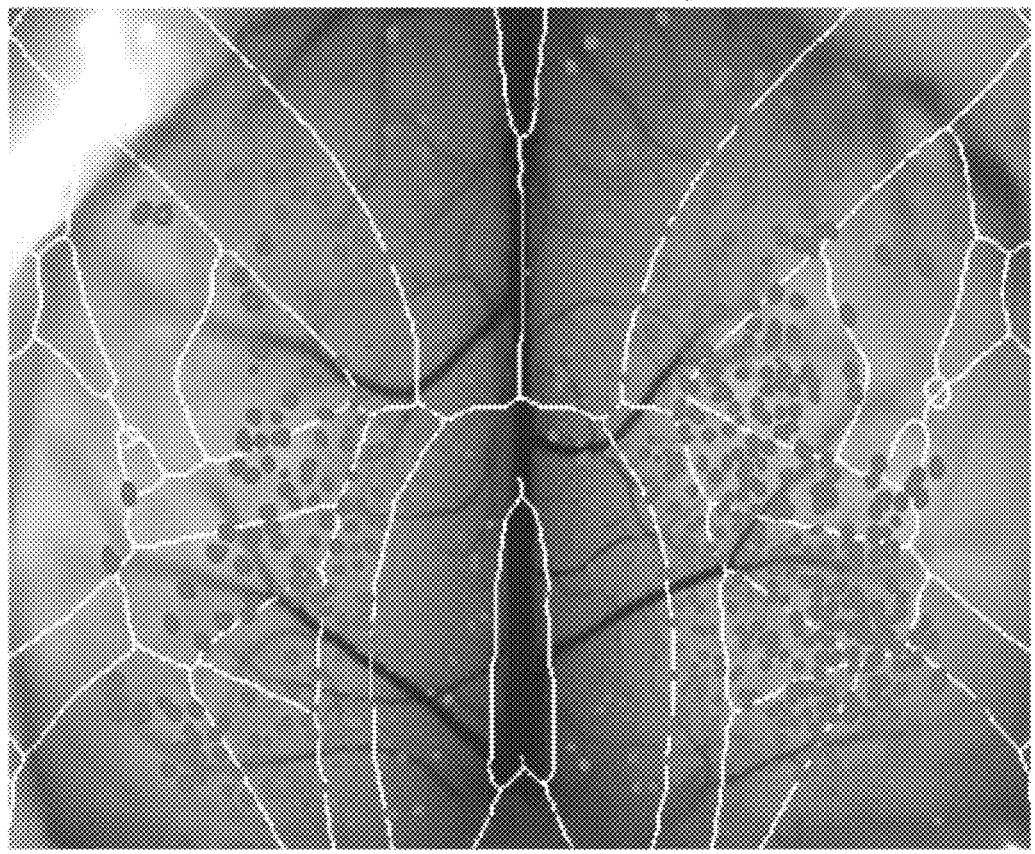
Figure 1N:
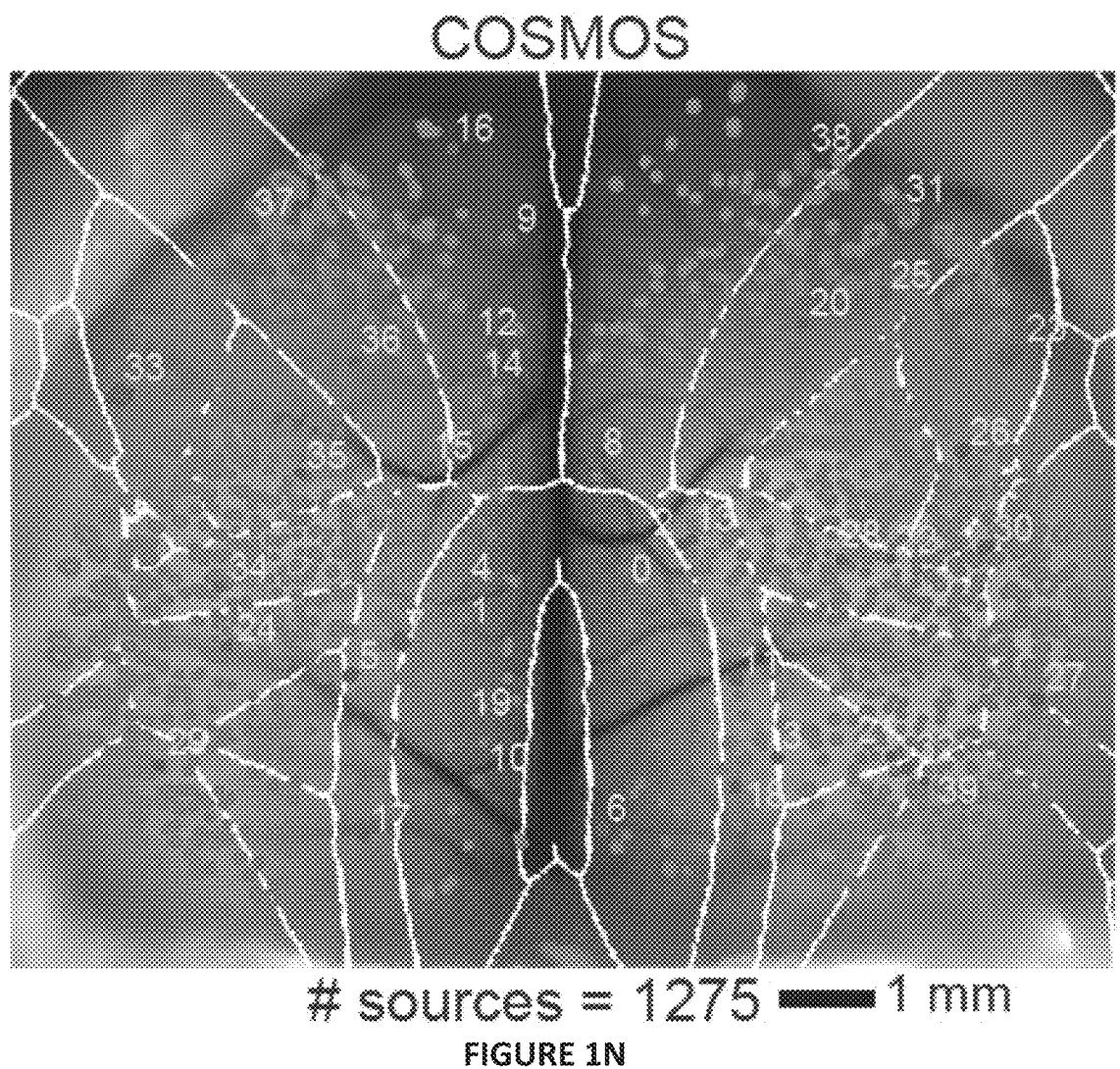
Figure 1O:
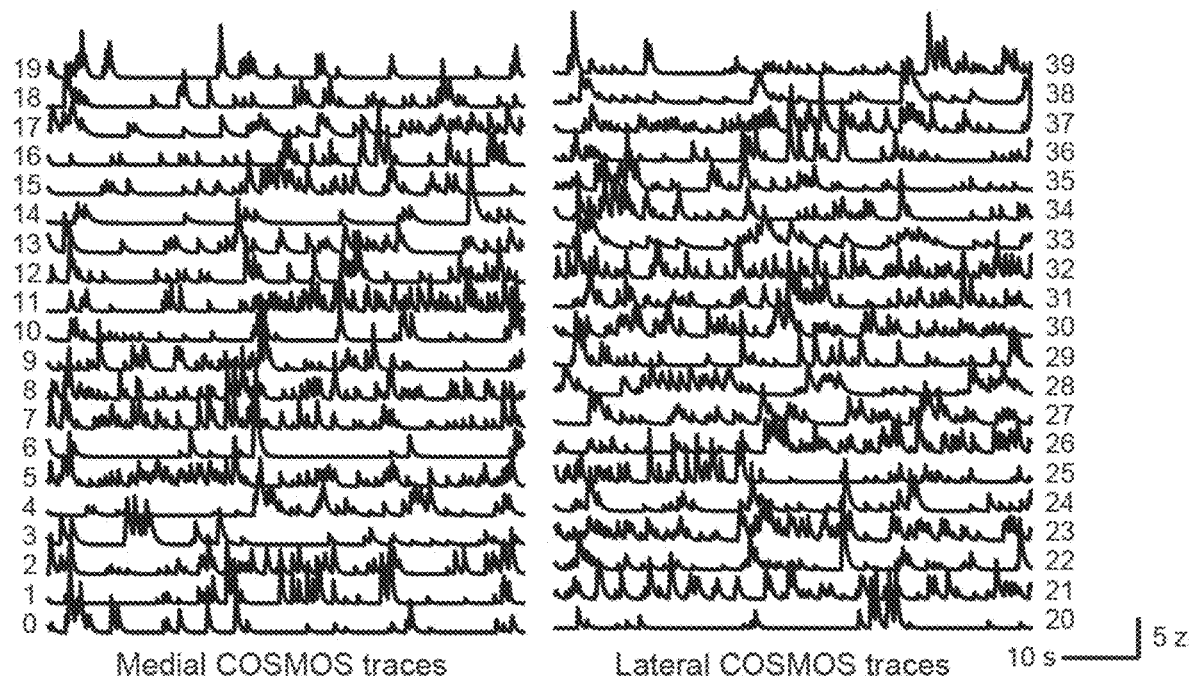
Figure 1P:
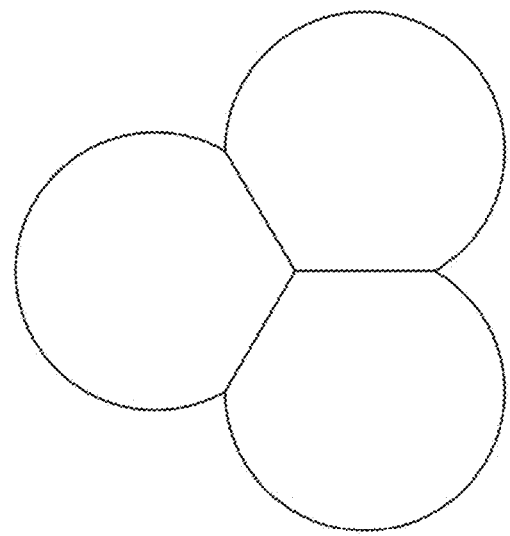

For example, three lenses can be cut in a manner such that the three lenses can be arranged to form a triple-focus lenslet array. In one embodiment, three lenses are cut to each produce one-third section of a circle and the three lenses are arranged to produce a circular triple-focus lenslet array, where each section has a different focal plane. The three lenses in a triple-focus lenslet array, depending on the focal plane of the three lenses, a first lens focuses on one plane, a second lens focuses on another plane, and the third lens focuses on a third plane. In a different embodiment, the three lenses are each cut such that they align with each other, but do not together form a circle, as shown in FIG. 1P.

Similarly, four lenses can be cut to each produce one section of a circle and the four lenses can be arranged to form a quadruple-focus lenslet array. In one embodiment, four lenses are cut to each produce one-fourth section of a circle and the four lenses are arranged to produce a circular quadruple-focus lenslet array, where each section has a different focal plane. The four lenses in a quadruple-focus lenslet array, depending on the focal plane of the four lenses, a first lens focuses on one plane, a second lens focuses on another plane, the third lens focuses on a third plane, and the fourth lens focuses on a fourth plane.

Based on the description provided herein, a person of ordinary skill in the art can design a multi-focal lenslet array that focuses on multiple planes.

In some cases, the macroscope comprises a camera configured to capture the images obtained by the objective apparatus comprising the multifocal optics. The camera can capture still images and/or videos of a specimen. The camera can be a digital camera, such as a charge-coupled device (CCD) or complementary metal-oxide semiconductor (CMOS) camera.

A camera can capture a plurality of images from a plurality of planes of the specimen on which the multi-focal lenslet array of the macroscope is focused. In some cases, the camera can simultaneously capture a plurality of images from a plurality of planes of the specimen on which the multi-focal lenslet array of the macroscope is focused.

For example, if the objective apparatus of the microscope comprises a dual-focus array, the camera captures two images: one image focused on one plane of the specimen and another image focused on a different plane of the specimen. For example, as shown in FIG. 1E, a camera in a macroscope having a dual-lenslet array, captures one image (left panel of FIG. 1E) of the mouse brain that is focused on the middle portion of the brain and another image of the mouse brain that is focused on the peripheral portion of the brain.

Similarly, a camera can capture a plurality of videos from a plurality of planes of the specimen on which the multi-focal lenslet array of the macroscope is focused. In some cases, the camera can simultaneously capture a plurality of videos from a plurality of planes of the specimen on which the multi-focal lenslet array of the macroscope is focused. For example, if the objective apparatus of the microscope comprises a dual-focus array, the camera captures two videos: one video focused on one plane of the specimen and another video focused on a different plane of the specimen.

In some cases, the camera is designed such that it has a field of view that is at least 5 mm, at least 6 mm, at least 7 mm, at least 8 mm, at least 9 mm, or at least 1 cm in the longest dimension. In some cases, the camera is designed such that it has a field of view that between 5 mm and 15 mm, 6 mm and 14 mm, 7 mm and 13 mm, 8 mm and 12 mm, 9 mm and 11 mm, or about 10 mm in the longest dimension. A camera with a large field of view facilitates capturing a plurality of images in a large field of view that are focused on a plurality of planes, and thus, in a plurality of areas of a three-dimensional specimen.

In one embodiment, the camera is designed such that it has a frame rate of at least 10 Hz, particularly, between 10 Hz and 60 Hz, for example, about 15 Hz, 20 Hz, 25 Hz, 30 Hz, 35 Hz, 40 Hz, 45 Hz, 50 Hz, 55 Hz.

In some cases, the camera has a pixel size of between 10 µm to 30 µm, for example, about 10 µm, 12 µm, 14 µm, 16 µm, 18 µm, 20 µm, 22 µm, 24 µm, 26 µm, or 28 µm.

In one embodiment, the camera has a CMOS sensor or a scientific CMOS (sCMOS) sensor.

In some embodiments, the macroscope can be operably connected to a processor and a non-transitory machine-readable medium encoding instructions, which when executed by the processor, cause the processor to process a plurality of images captured by the camera, wherein the plurality of images are focused on a plurality of planes.

In some cases, the instructions encoded by the non-transitory machine-readable medium, when executed by the processor, can cause the processor to merge the plurality of images into one image. For example, a merged image can be produced which contains only the focused portions from the plurality of images that are focused on different planes. Thus, when such processing is applied to the two images in FIG. 9E, a new image can be produced which contains the focused portion towards the center of the image of the brain in the left panel of FIG. 9E and the focused portion towards the periphery of the image of the brain in the right panel of FIG. 9E. Thus, one image is produced that is focused in its entire field of view.

Similarly, a merged video can be produced which contains only the focused portions from the plurality of videos that are focused on different planes. Thus, when such processing is applied, a new video can be produced which contains only the focused portions of a plurality of videos so that a video is produced that is focused in its entire field of view.

In some cases, the instructions encoded by the non-transitory machine-readable medium, when executed by the processor, can cause the processor to extract information of interest from the plurality of images focused on a plurality of planes. In some cases, the instructions can cause the processor to extract information of interest without making a single-focused image.

process the plurality of images captured by the camera, wherein the plurality of images are focused on the plurality of planes. For example, the non-transitory machine-readable medium can encode instructions, which, when executed by the processor, cause the processor to merge the focused regions from the plurality of images or videos to produce an image or video that is focused in substantially the entire field of view.

Methods

Certain embodiments of the invention also provide methods for analyzing a three-dimensional specimen, the method comprising obtaining synchronous multifocal optical images of a plurality of planes of the three-dimensional specimen via the macroscope described herein.

In some cases, the specimen is about 1 mm, 2 mm, 3 mm, 4 mm, or 5 mm in the dimension perpendicular to the optical axis of the lenses of the macroscope.

The aspects of the macroscope described in this disclosure, for example, under the "Devices" section of this disclosure, are appliable to the macroscopes used in the methods disclosed herein.

In certain embodiments, wherein the three-dimensional specimen is a biological specimen and the optical imaging of the biological specimen indicates cellular activity in the biological specimen. The biological specimen can be placenta, brain, eyes, pineal gland, pituitary gland, thyroid gland, parathyroid glands, thorax, heart, lung, esophagus, thymus gland, pleura, adrenal glands, appendix, gall bladder, urinary bladder, large intestine, small intestine, kidneys, liver, pancreas, spleen, stoma, ovaries, uterus, testis, skin, cultured organoid, or cultured cells.

An "organoid" is a miniaturized and simplified version of an organ produced in vitro in three dimensions. An organoid can have only one type of cells or multiple types of cells. Also, an organoid can show micro-anatomy, for example, the connections between different types of cells, that is similar to an organ as present in an animal.

In some cases, the biological specimen comprises light emitting molecules, for example, fluorescent proteins. In some cases, the biological specimen comprises cells that express fluorescent protein. Non-limiting examples of fluorescent proteins that can be detected in a biological specimen include: green fluorescent proteins, such as GFP (wt), Dasher, EGFP, Emerald, Superfolder GFP, Azami Green, mWasabi, TagGFP, TurboGFP, AcGFP, ZsGreen, T-Sapphire; blue fluorescent proteins, such as EBFP, EBFP2, Azurite, mTagBFP; cyan fluorescent proteins, such as ECFP, mECFP, Cerulean, mTurquoise, CyPet, AmCyan1, Midori-Ishi Cyan, TagCFP, mTFP1 (Teal); yellow fluorescent proteins such as, EYFP, Topaz, Venus, mCitrine, YPet, TagYFP, PhiYFP, ZsYellow1, mBanana; orange fluorescent proteins, such as Kusabira Orange, Kusabira Orange2, mOrange, mOrange2, dTomato, dTomato-Tandem, TagRFP, TagRFP-T, DsRed, DsRed2, DsRed-Express (T1), DsRed-Monomer, mTangerine; and red fluorescent proteins, such Cayenne, mRuby, mApple, mStrawberry, AsRed2, mRFP1, JRed, mCherry, HcRed1, mRaspberry, dKeima-Tandem, HcRed-Tandem, mPlum, AQ143.

In one embodiment, the methods comprise imaging a brain of a live animal. The animal can be modified to contain fluorescent molecules that can be detected using the macroscope disclosed herein. Particularly, the animal can be modified to express fluorescent activity in that indicate neuronal activity. For example, the animal can be genetically modified to express in nerve cells a fluorescent sensor, such as GcaMP, which is a synthetic fusion of green fluorescent protein (GFP) and calmodulin (CaM) and M13, a peptide sequence from myosin light-chain kinase. When bound to $Ca^{2+}$, GcaMP fluoresces green thereby indicating neuronal activity in the cell.

In some embodiments, the three-dimensional specimen comprises particles in motion and the optical imaging of the three-dimensional specimen indicates the movement of the particles in the specimen. Thus, the methods include obtaining still images of particles or tracking motion of particles in a three-dimensional space, for example, for observing a dye flow through the vascular system in a tissue, microorganisms swimming in a three-dimensional volume, or making volumetric time-lapse videos of tissue or cell culture growth.

In some cases, the methods comprise imaging biological specimen from a primate, including a human, or other large animal, for example a pig or a sheep. For example, specimens of tissue that have been removed from a primate can be imaged. These specimens may have a curved surface that requires the ability to focus an imaging system on multiple planes. These specimens be treated with fluorescent agents that emit light when, for example, neurons are active. Additionally, biological specimens may consist of intact tissue in a living animal. For example, a craniotomy can be performed to implant a glass window in a primate's skull, and the imaging system can record images of the tissue through the window. The surface of this intact tissue may be curved. This tissue may be treated with fluorescent agents that emit light when, for example, neurons are active.

In some embodiments, the methods comprise analyzing organoids.

As noted above, an "organoid" is a miniaturized and simplified version of an organ produced in vitro in three dimensions that shows realistic micro-anatomy. An organoid can have only one type of cells or multiple types of cells. Also, an organoid can show micro-anatomy, for example, the connections between different types of cells, that is similar to an organ as present in an animal.

In some cases, analyzing organoids comprise imaging organoids in the presence or absence of a candidate drug to detect the effect of the candidate drug on the organoid.

"A candidate drug" as used herein refers to a drug or a combination of drug or a specific concentration of a drug or a combination of drugs. A candidate drug can be obtained from screening compound libraries or known drugs.

In some cases, a method disclosed for detecting the effect of a candidate drug on an organoid comprises: culturing the organoid in the presence and absence of the candidate drug; imaging the organoid in the presence and absence of the candidate drug; detecting the effects on the organoid of the presence the candidate drug as compared to the effects on the organoid in the absence of the candidate drug.

The term "organoid culture" or "culturing of an organoid" refers to maintaining, propagating, and/or passaging organoids in an in vitro environment.

Computer-Readable Media and Devices

Also provided herein are computer readable media for incorporation into or operably connecting to the macroscopes disclosed herein and for implementing the methods disclosed herein for imaging three-dimensional specimens using the macroscopes disclosed herein.

In certain aspects, provided is a non-transitory computer readable medium connected to a processor, the non-transitory computer readable medium including instructions for carrying out the methods disclosed herein.

Such instructions can be coded onto a non-transitory computer-readable medium in the form of "programming," where the term "computer-readable medium" as used herein refers to any non-transitory storage or transmission medium that participates in providing instructions and/or data to a computer for execution and/or processing. Examples of storage media include a hard disk, optical disk, magneto-optical disk, CD-ROM, CD-R, magnetic tape, non-volatile memory card, ROM, DVD-ROM, Blue-ray disk, solid state disk, network attached storage (NAS), etc., whether such devices are internal or external to the computer. A file containing information can be "stored" on computer readable medium, where "storing" means recording information such that it is later accessible and retrievable by a computer.

The instructions may be in the form of programming that is written in one or more of any number of computer programming languages. Such languages include, for example, Java (Sun Microsystems, Inc., Santa Clara, California), Visual Basic (Microsoft Corp., Redmond, WA), and C++ (AT&T Corp., Bedminster, NJ), as well as many others.

The present disclosure also provides computer devices. The computer devices include one or more processors and any of the non-transitory computer readable media of the present disclosure. Accordingly, in some embodiments, the computer devices can perform any of the methods described in the Methods section herein.

In certain aspects, a computer device of the present disclosure is a local computer device, preferably, a portable computer device, such as a smart-phone or tablet. In some embodiments, the computer device is a remote computer device (e.g., a remote server), meaning that the instructions are executed on a computer device different from a local computer device and/or the instructions are downloadable from the remote computer device to a local computer device, e.g., for execution on the local computer device. In some embodiments, the instructions constitute a web-based application stored on a remote server.

Utility

The device and methods disclosed herein can be used for non-invasive, chronic neural activity recording in rodents; imaging particle motion; brain machine interfaces/neural decoding; monitoring neural activity during rodent testing of novel psychopharmaceuticals; or monitoring blood flow in rodent testing of models for stroke/cortical infarction.

For example, the devices and methods can be used to image biological materials (i.e. genetically modified mice).

The system can be applied to new biological studies. The system can be used for two color imaging (so different activity signals arising from different neuronal cell types can be observed from the same areas simultaneously). The system can be used for other cell types. The system can also be used in a freely moving context (as in Scott, et al. or by Inscopix). A similar approach through a cranial window can be employed in primates or humans (for either hemodynamic or genetic-encoded sensor based imaging).

In some cases, the devices and methods disclosed herein can be used for organoid imaging and drug testing. For example, a group of drugs, such as compounds in a library or a combination of known drugs, can be tested to detect their effects on organoids. Such testing can be used to select lead compounds in drug screening. Such testing can also be used to select a suitable drug for the treatment of a patient in a personalized medicinal application.

In certain embodiments, the devices and methods disclosed herein can be used for tracking particles in a three-dimensional space. The particles can be fluorescent particles. The particles can also be illuminated via an external light source and imaged using the devices disclosed herein.

EXAMPLES

The following examples are put forth so as to provide those of ordinary skill in the art with a complete disclosure and description of how to make and use the subject invention, and are not intended to limit the scope of what is regarded as the invention. Efforts have been made to ensure accuracy with respect to the numbers used (e.g. amounts, temperature, concentrations, etc.) but some experimental errors and deviations should be allowed for. Unless otherwise indicated, parts are parts by weight, molecular weight is weight average molecular weight, temperature is in degrees centigrade, and pressure is at or near atmospheric.

Example 1—Cortical Observation by Synchronous Multifocal Optical Sampling Reveals Widespread Population Encoding of Actions This Example describes devices and methods that leverage multifocal widefield optics to enable high-speed, synchronous, genetically-specified recording of neural activity across the entirety of mouse dorsal cortex at near-cellular resolution. Imaging fast cortex-wide neural activity in mice trained on a motor task revealed a scale-crossing interplay between localized activity and distributed population encoding on single trials. The device comprises a one-photon multifocal macroscope with a large field of view, high light collection, high sampling rate, and good image quality that is compatible with fluorescent specimens. This example leverages and applies existing technology in new ways to enable advanced performance in application to biological systems, namely: protein expression of an engineered fluorescent neural activity sensor (e.g. GCaMP6 or a voltage indicator) in a sparse subset of cells or restricted to the cell somas; and modified signal-demixing and source-extraction tools.

To advance the measurement of distributed neuronal population-representations of targeted motor actions on single trials, an optical method (COSMOS) was developed for tracking neural activity in a largely uncharacterized spatiotemporal regime. COSMOS allowed simultaneous recording of neural dynamics at ~30 Hz from over a thousand near-cellular resolution neuronal sources spread across the entire dorsal neocortex of awake, behaving mice during a three-option lick-to-target task. Spatially distributed neuronal population-representations were identified spanning dorsal cortex that precisely encoded ongoing motor actions on single trials. Neuronal correlations measured at videorate using unaveraged, whole-session data had localized spatial structure—whereas trial-averaged data exhibited widespread correlations. Separable modes of neural activity encoded history-guided motor plans, with similar population dynamics in individual areas throughout cortex. These initial experiments illustrate how COSMOS enables investigation of large-scale cortical dynamics, and that information about motor actions is widely shared between areas, potentially underlying distributed computations.

Cortical computations may depend on the synchronous activity of neurons distributed across many areas. Anatomical evidence includes the observation that many individual pyramidal cells send axons to functionally distinct cortical areas (Economo et al., 2018; Oh et al., 2014); for example, nearly all layer 2/3 pyramidal cells in primary visual cortex project to at least one other cortical area—often hundreds of microns away (Han et al., 2018). Physiological evidence has shown that ongoing and past sensory information relevant for decision making is widely encoded across cortex (Akrami et al., 2018; Allen et al., 2017; Gilad et al., 2018; Harvey et al., 2012; Hattori et al., 2019; Hernandez et al., 2010; Makino et al., 2017; Mante et al., 2013; Mohajerani et al., 2013; Pinto et al., 2019; Vickery et al., 2011). In addition, neural activity tuned to spontaneous or undirected movements is found in many cortical areas (Musall et al., 2019; Stringer et al., 2019). In the motor system, persistent activity may be mediated by inter-hemispheric feedback in mouse motor cortex (Li et al., 2016) in addition to other long-range loops between motor cortex and the thalamus (Guo et al., 2017; Sauerbrei et al., 2019), and the cerebellum (Chabrol et al., 2019; Gao et al., 2018). Finally, studies in primates have shown that non-motor regions of frontal cortex contain neurons that encode information related to decisions that drive specific motor actions (Campo et al., 2015; Hernández et al., 2010; Lemus et al., 2007; Ponce-Alvarez et al., 2012; Siegel et al., 2015).

Thus, while specialized computations for motor (Georgopoulos, 2015; Mountcastle, 1997) versus sensory (Hubel and Wiesel, 1968) or cognitive (Shadlen and Newsome, 1996) processes may be performed in each cortical area, the results of these computations may be propagated to dozens of other areas via direct, often monosynaptic, pathways. Prior work, often limited by technological capabilities, has primarily focused on the tuning properties of individual neurons or population encoding in individual regions, potentially missing an alternative systems-level viewpoint of how distributed populations together encode behavior (Saxena and Cunningham, 2019; Yuste, 2015). Thus, it remains unclear how widespread population activity is involved in transforming sensory stimuli and contextual information into specific actions.

A technical barrier to studying distributed encoding has been the lack of a method for simultaneously measuring fast, cortex-wide neural dynamics at or near cellular resolution. Despite recent progress in neural recording techniques, persistent limitations have underscored the need for new approaches. Large field of view two-photon microscopes have enabled simultaneous recording from a few cortical areas at single-cell resolution, revealing structured large-scale correlations in neural activity, but at low rates (Chen et al., 2015; Lecoq et al., 2014; Sofroniew et al., 2016; Stirman et al., 2016; Tsai et al., 2015). Widefield imaging has also revealed cortex-wide task involvement and activity patterns, albeit with low spatial resolution (Allen et al., 2017; Ferezou et al., 2007; Makino et al., 2017; Mayrhofer et al., 2019; Musall et al., 2019; Pinto et al., 2019; Wekselblatt et al., 2016). Furthermore, multi-electrode extracellular recording has revealed inter-regional correlations in spiking, information flow between a few cortical areas, and phase alignment of local field potentials across a macaque cortical hemisphere (Campo et al., 2015; Dotson et al., 2017; Feingold et al., 2012; Hernandez et al., 2008; Ponce-Alvarez et al., 2012). However, despite the merits of these approaches, each is limited by one or more of several key parameters including field of view, acquisition speed, spatial resolution, and cell-type targeting capability. Thus, a complementary technique was developed that leveraged multifocal widefield optics to enable high-speed, simultaneous, genetically-specified recording of neural activity across the entirety of mouse dorsal cortex at near-cellular resolution. To illustrate utility of this new methodology, a task was devised requiring mice to initiate bouts of targeted licking based on past actions. Imaging fast cortex-wide neural activity during this task revealed a scale-crossing interplay between localized activity and distributed population encoding on single trials.

Results

A Multi Focal Macroscope for Imaging the Curved Cortical Surface with High Signal-to-Noise The activity of neurons dispersed across the entirety of dorsal cortex was recorded at fast sampling rates. Since many mouse behaviors, such as licking, can occur at 10 Hz or faster (Boughter et al., 2007) and widely-used spike-inference algorithms can only estimate firing rate information at up to the data acquisition rate (Pnevmatikakis et al., 2016; Theis et al., 2016), one-photon widefield optics was used with its potential for highly parallel sampling at rates >20 Hz over a large field of view, as well as genetic specificity; this combination is difficult to achieve with other approaches such as two-photon microscopy or electrophysiology (Harris et al., 2016; Weisenburger and Vaziri, 2018). Other imaging techniques either lack the desired sampling rate (Sofroniew et al., 2016; Stirman et al., 2016), spatial resolution (Allen et al., 2017; Kim et al., 2016; Making et al., 2017; Wekselblatt et al., 2016), or field of view (Bouchard et al., 2015; Lecoq et al., 2014; Nöbauer et al., 2017; Rumyantsev et al., 2020). The approach described here, Cortical Observation by Synchronous Multifocal Optical Sampling (COSMOS), records in-focus projections of 1 cm×1 cm×1.3 mm volumes at video rate (29.4 Hz for the presented data) with high light-collection efficiency and resolution across the entire field of view.

In conjunction with this macroscope, a surgical approach was advanced enabling long-term, high-quality optical access to a large fraction of dorsal cortex (based on Kim et al., 2016, Alien et al., 2017). A trapezoidal window curved was used along a 10 mm radius (FIG. 1A, 8A), and the craniotomy was performed using a robotic stereotaxic apparatus (Pak et al., 2015; FIG. 1B, 8B-J).

Figure 8A:
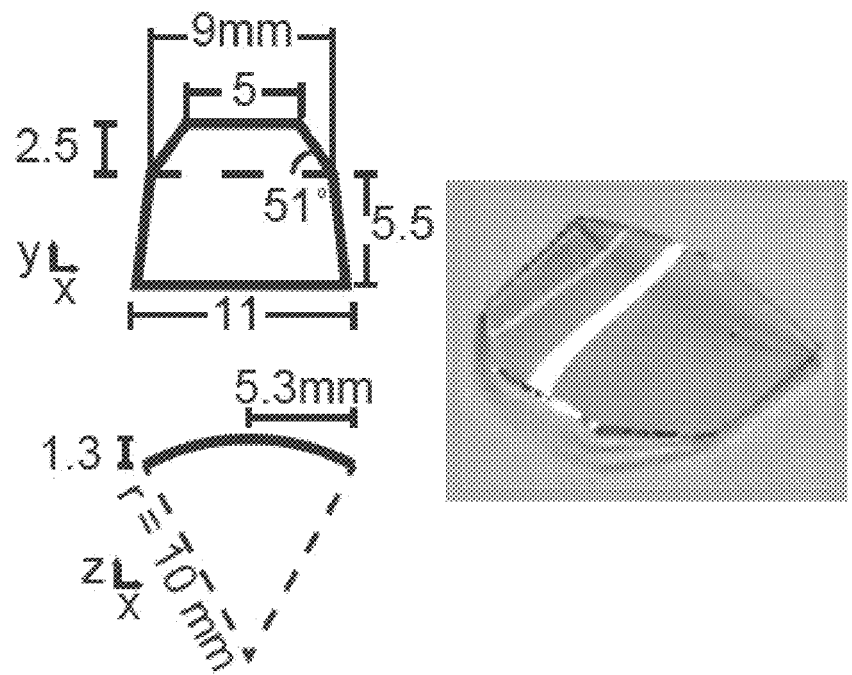
Figure 8B:
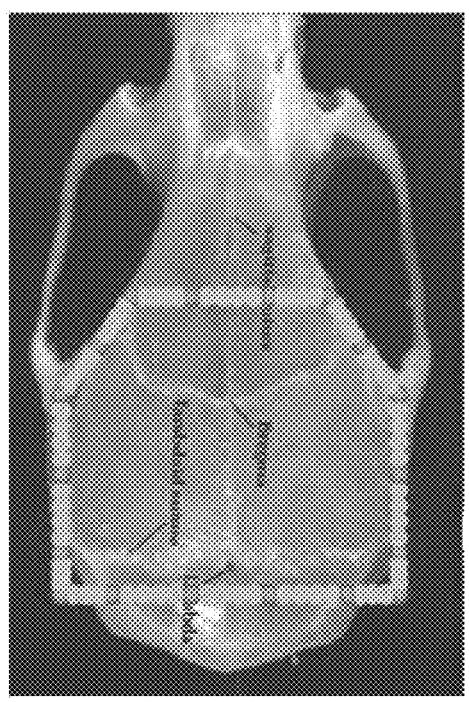
Figures 8C, 8D:
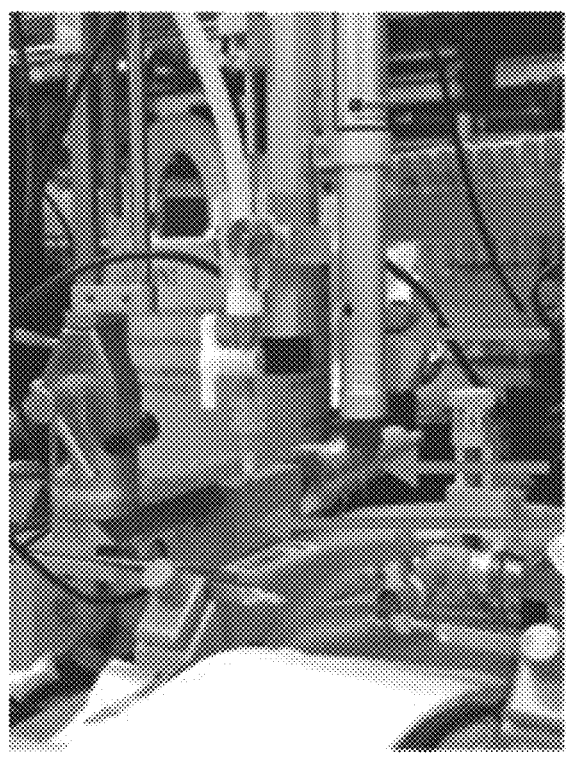
Figure 8E:
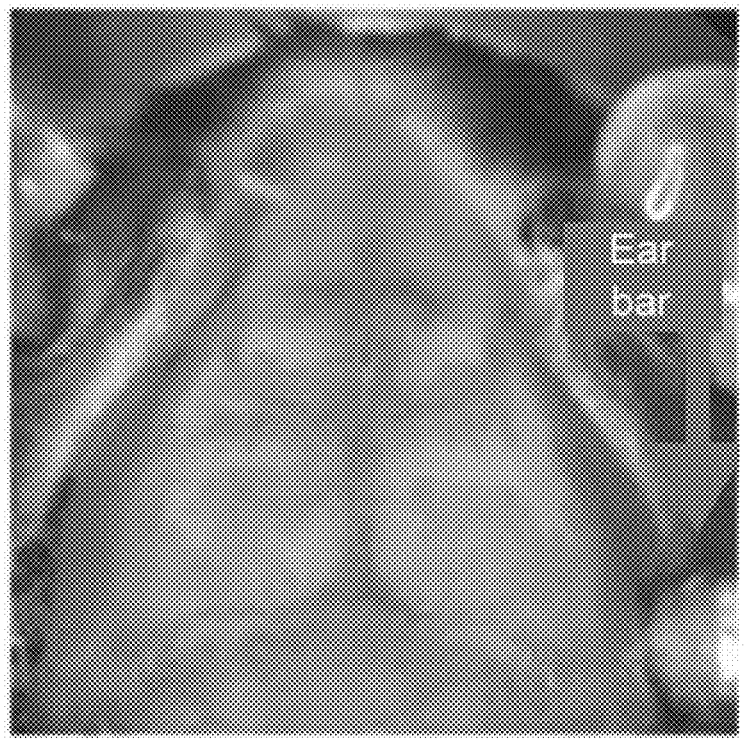
Figure 8F:
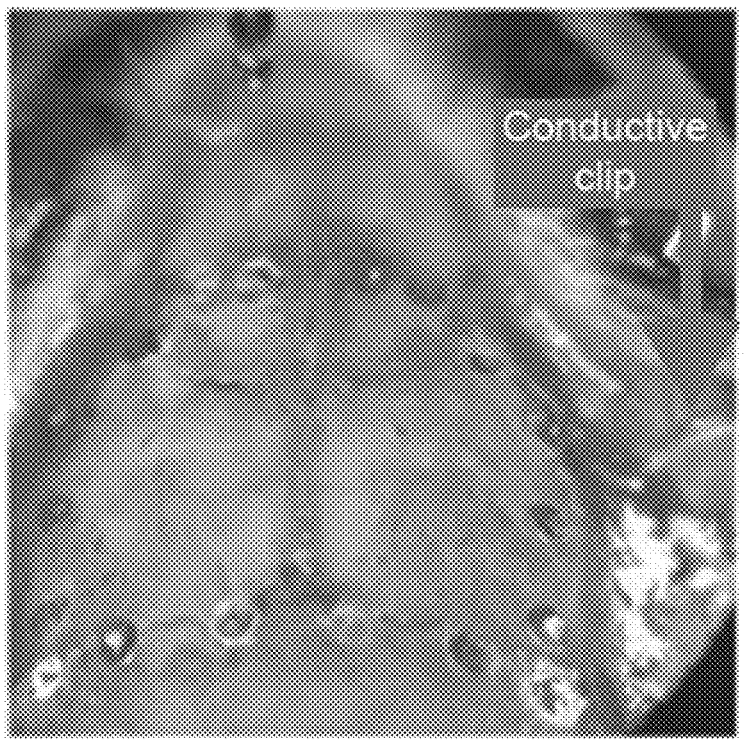
Figure 8G:
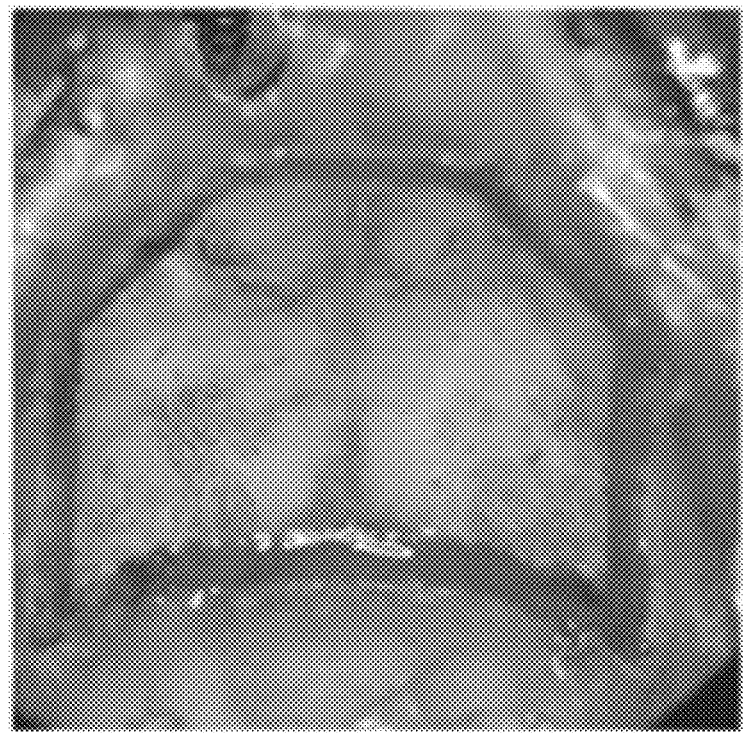
Figure 8H:
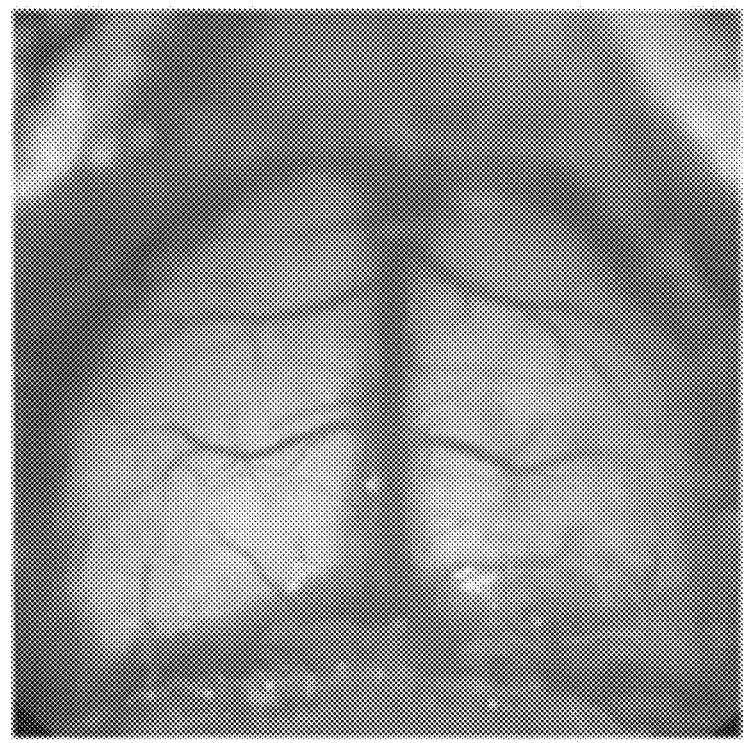
Figure 8I:
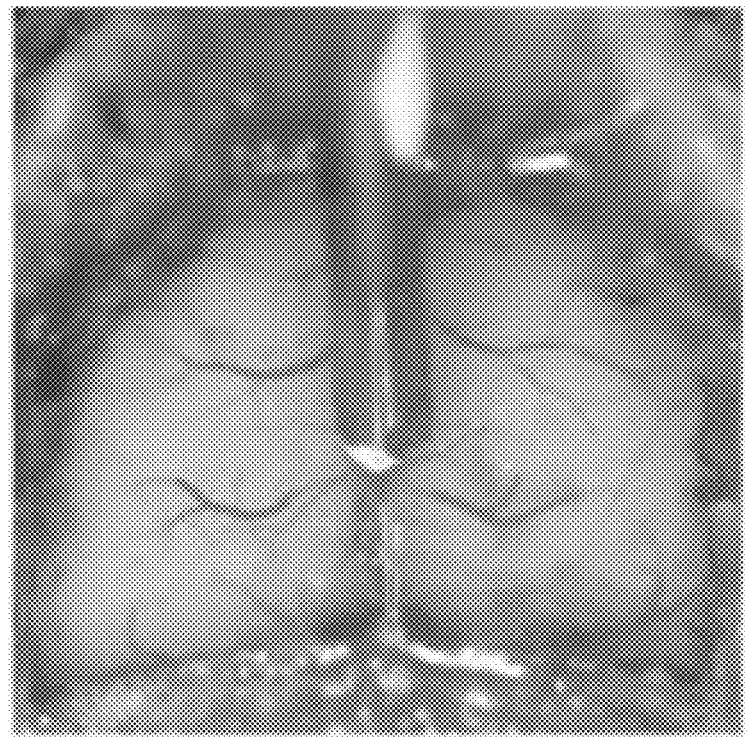
Figure 8J:
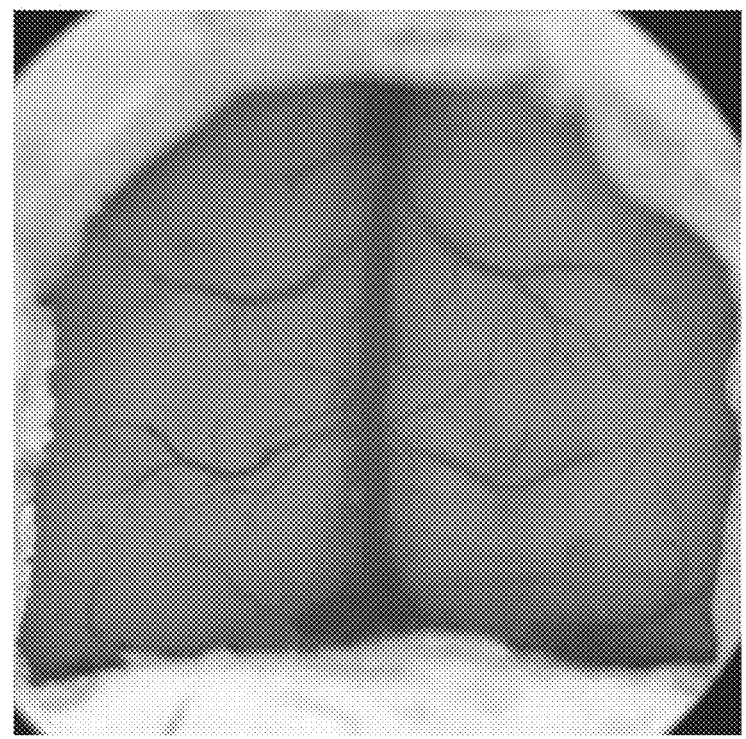
Figure 8K:
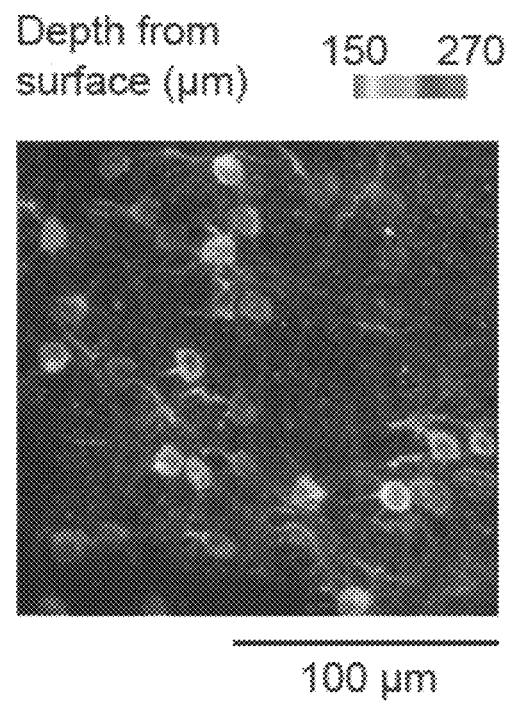
Figure 8L:
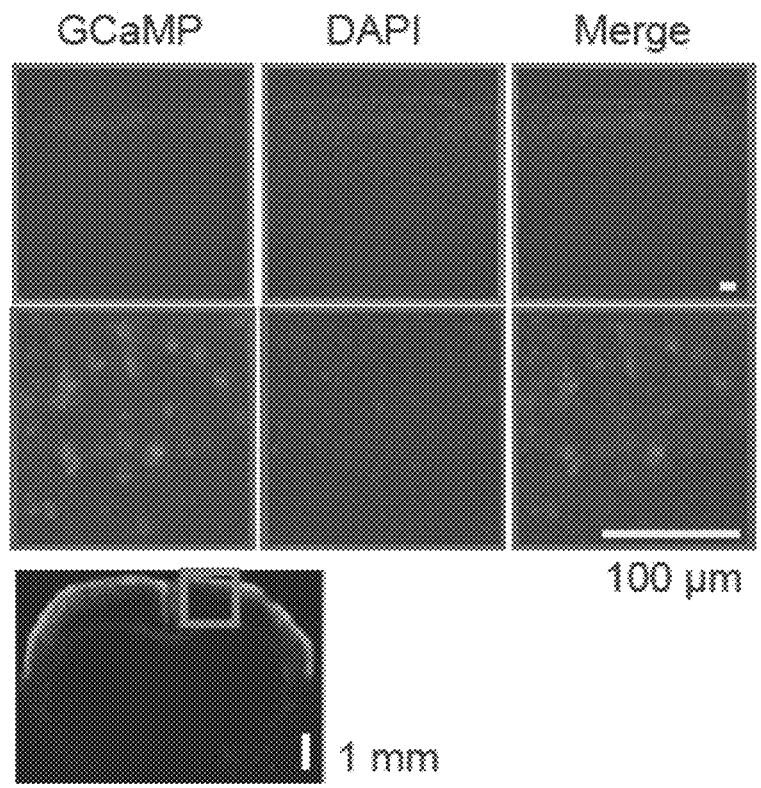

Sparse $Ca^{2+}$ sensor expression was selectively driven in superficial cortico-cortical projection neurons using a Cre-dependent. TTA-amplified, GCaMP6F reporter mouse line (Ai148) crossed to a Cux2-CreER driver line (Daigle et al., 2017; Franco et al., 2012; FIG. 1C). CreER allowed control over the fraction of neurons expressing GCaMP—and obviated potential abnormalities from expressing GCaMP during development (Steinmetz et al., 2017). Even one year after window implantation, little evidence was found of filled nuclei indicative of impaired cell health (FIGS. 1C, 8K-L). By sparsely labeling only a subset of superficial cortical cells (from layers 2/3 and 4), the widefield signal origin was biased towards somatic sources from cortico-cortical neurons, instead of layer 1 neuropil (Allen et al., 2017). Post-experiment histology (FIG. 8L) validated that the GCaMP6F spatial expression pattern was consistent with previous descriptions of Cux2-CreER mice (Franco et al., 2012).

The optical design for the COSMOS macroscope used a dual-focus lenslet array (FIG. 1D), balancing high light throughput, long depth-of-field, ease of implementation. and resolution, with modest data processing requirements and reasonable system cost. Theoretical analysis demonstrated that, in terms of light collection, defocus, and extracted neuronal source signal-to-noise ratio (SNR) across the extent of the curved window, the COSMOS macroscope design outperformed other potential solutions (Abrahamsson et al., 2013; Brady and Marks, 2011; Cossairt et al., 2013: Hasinoff et al., 2009; Levin et al., 2009; Schechner et al., 2007; FIG. 9). Empirical comparisons demonstrated that a COSMOS macroscope, with focal planes offset by ~600 μm (FIG. 1E-F). outperformed a comparable conventional macroscope in terms of depth of field while maintaining equivalent light throughput (FIG. 1G-H).

$Ca^{2+}$-dependent fluorescence videos were captured with the COSMOS macroscope and extracted putative neuronal sources-taking advantage of an improved version of the constrained non-negative matrix factorization (CNMF) algorithm (Pnevmatikakis et al., 2016). which was designed specifically to handle high-background one-photon data (CNMF-E: Zhou et al., 2018; FIG. 11; for atlas registration methods see FIG. 1J. STAR Methods. FIG. 10). In contrast to output of a conventional macroscope, high quality sources detected by the COSMOS macroscope spanned the entire curved window-thus providing simultaneous coverage of visual. somatosensory, motor. and association areas. Furthermore, the COSMOS macroscope recovered significantly more sources than a conventional macroscope at any single aperture setting. Nearly twice as many neuronal sources were detected compared to a macroscope with equivalent light collection (aperture open to f/2 setting)—and with comparable SNR (FIG. 1K-O).

Characterization of Extracted Neuronal Sources Using a Visual Stimulus Assay

Next, whether the sources extracted from COSMOS data originated from single neurons or mixtures of multiple cells was assessed. The finding were leveraged that, in rodents, neurons in visual cortex tuned to differently oriented visual stimuli are spatially intermixed in a salt-and-pepper manner (Chen et al., 2013; Niell and Stryker, 2008; Ohki et al., 2005). In the data disclosed herein, merging of adjacent neurons into a single extracted source would thus diminish orientation tuning relative to sub-cellular resolution two-photon measurements.

Figure 2A:
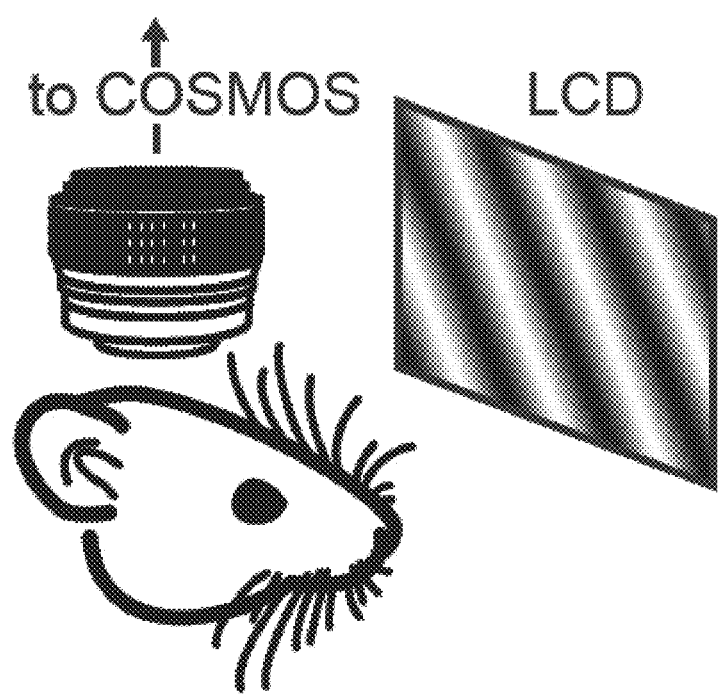
Figure 2B:
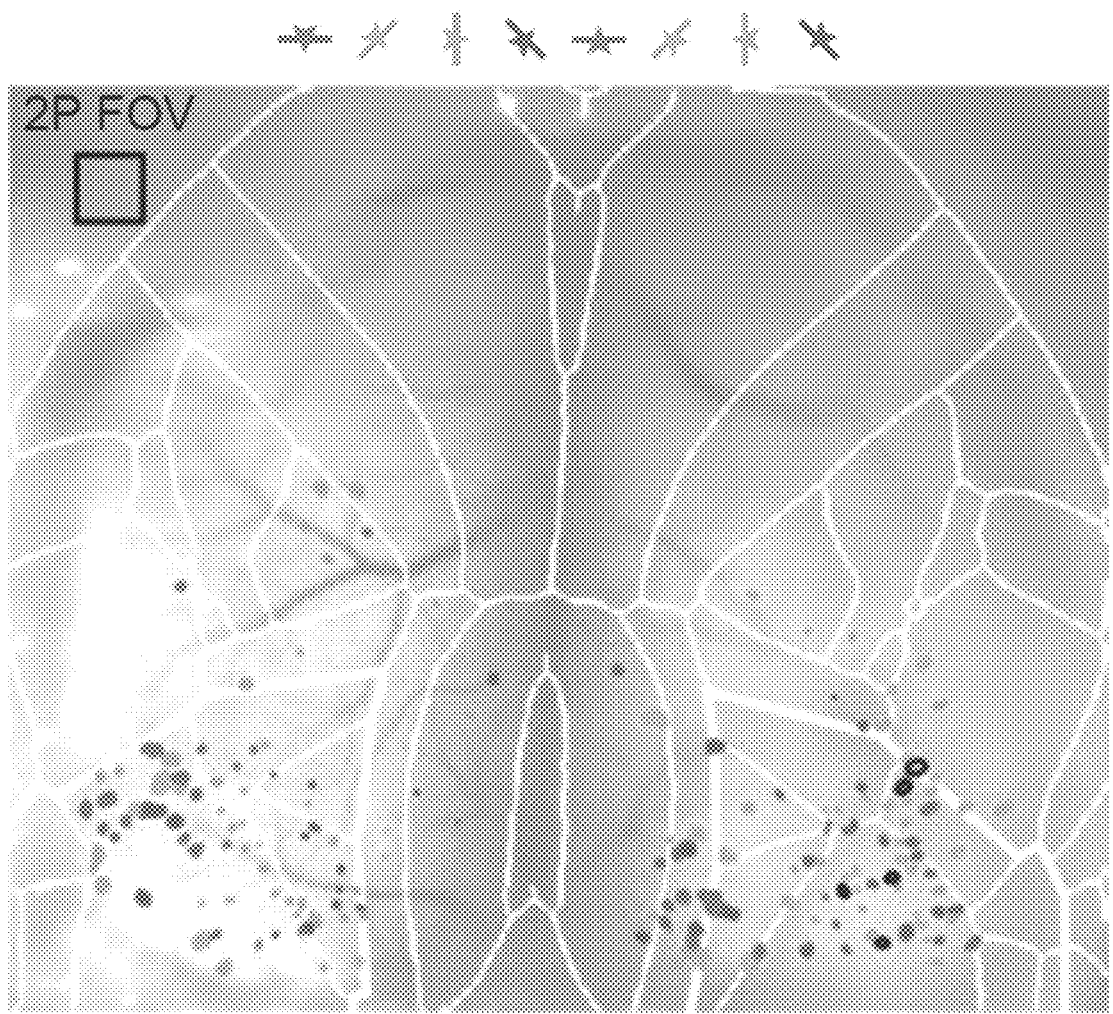
Figure 2C:
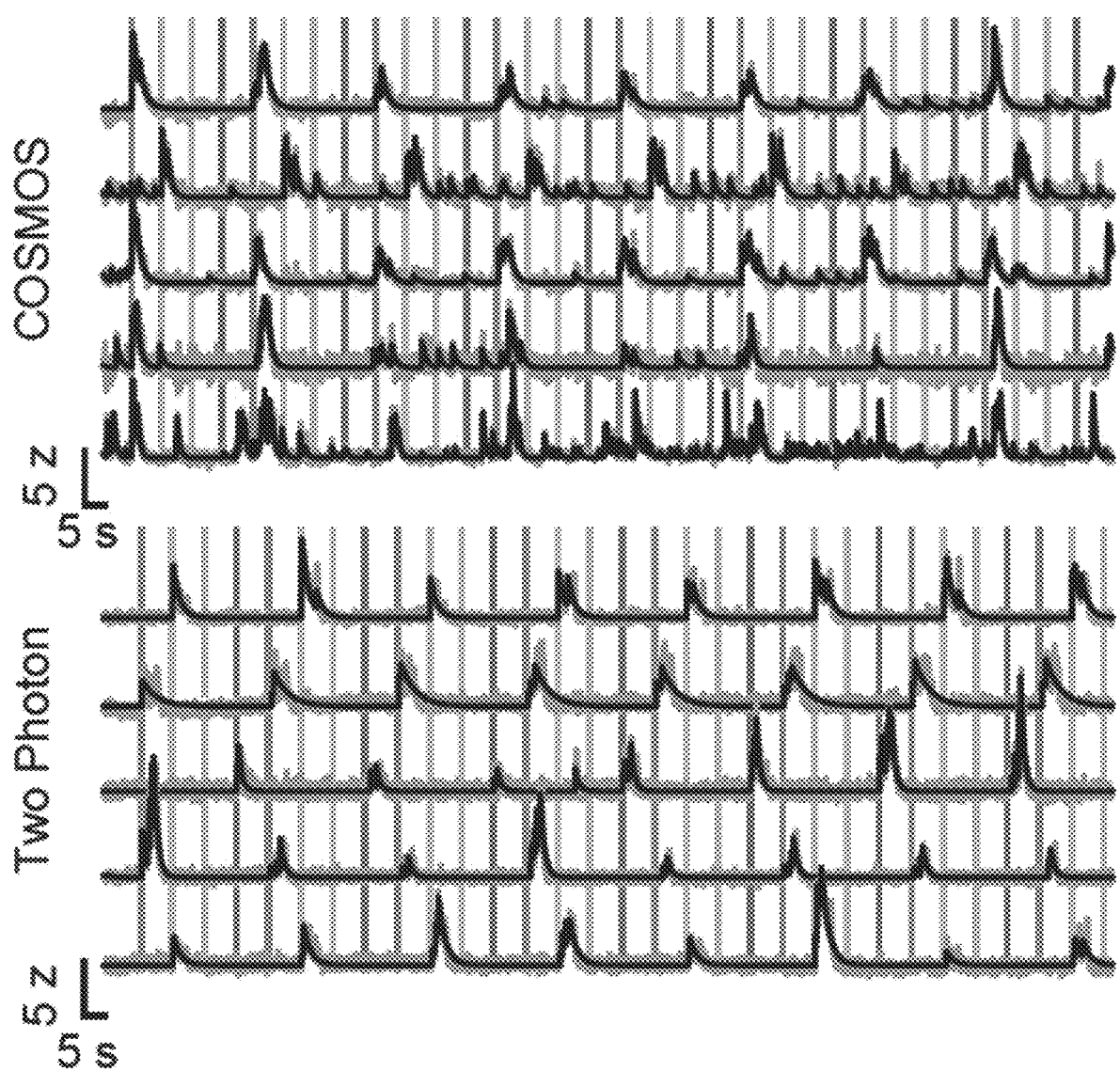
Figure 2D:
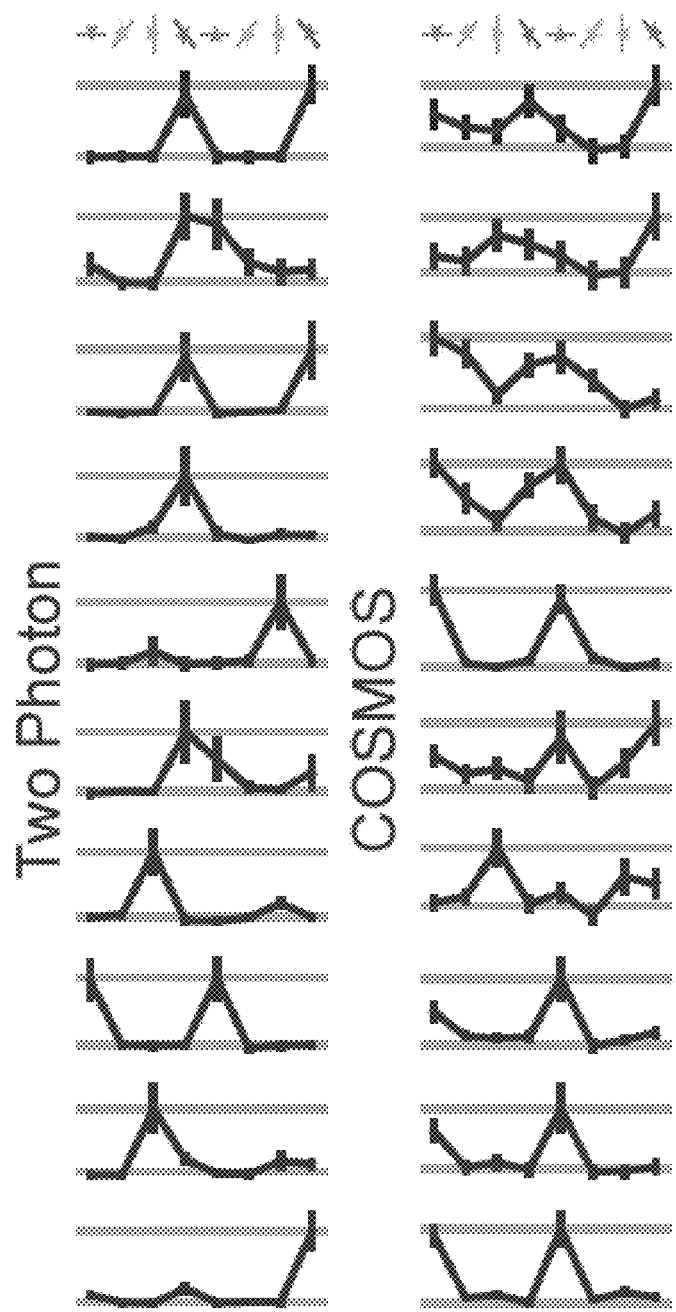
Figure 2E:
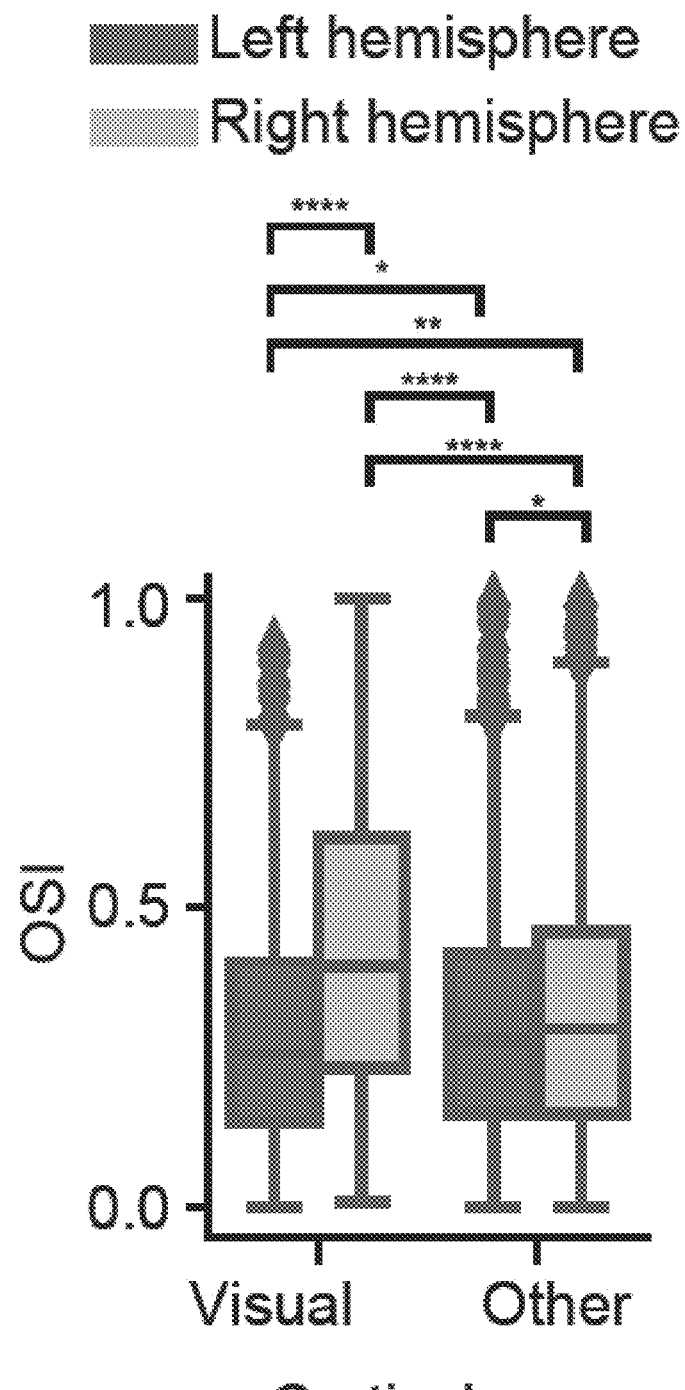
Figure 2F:
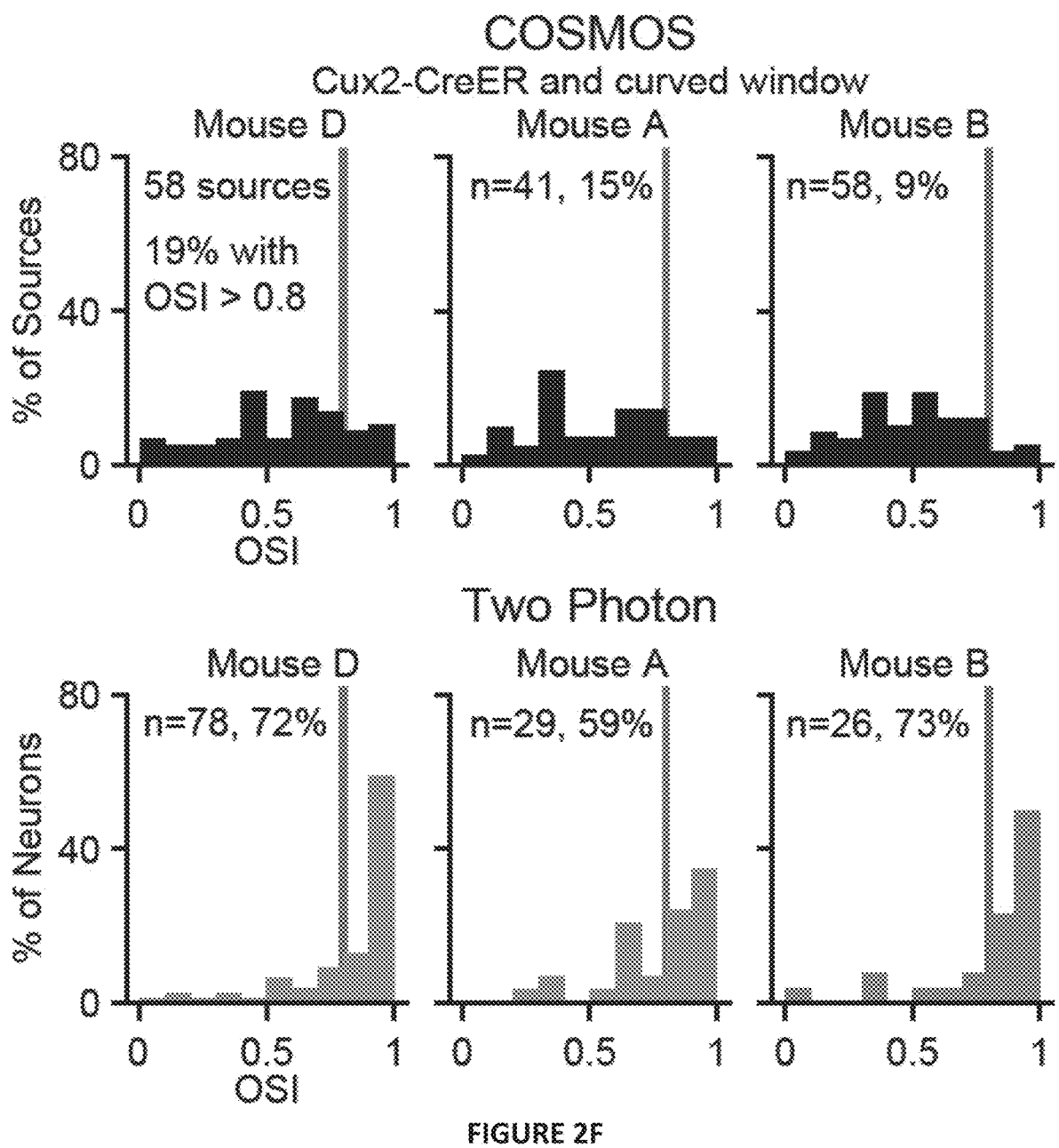
Figure 2G:
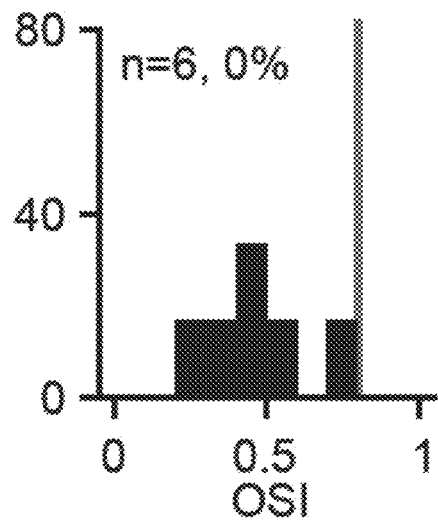
Figure 2G:
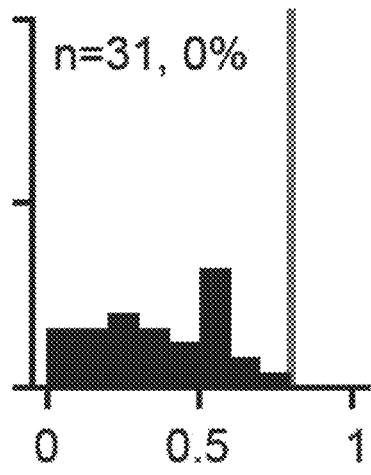

Using COSMOS, orientation tuning was measured in response to a drifting grating stimulus centered on the left eye (FIG. 2A; the monitor provided weaker visual input to the right eye). Nearly all orientation-tuned sources were confined to visual cortex (FIG. 2B; visually responsive sources highlighted; one-way ANOVA, p<0.01; on superimposed atlas, the border around visual cortex is shown with thicker white lines). This procedure was repeated with each mouse, using a two-photon microscope with a high-magnification objective (Nikon 16×/0.8 NA) positioned over right visual cortex (note much smaller size of two-photon imaging field indicated by box in FIG. 2B). Both COSMOS and two-photon datasets contained sources exhibiting highly selective orientation-tuning consistent with reported single neuron responses measured with GCaMP6F in V1 (Chen et al., 2013) (FIG. 2C-D). As expected, the average orientation selectivity index (OSI) of COSMOS sources in right visual cortex was higher than in any other cortical region (FIG. 2E, Mann-Whitney U Test analyzing all visually responsive sources from 3 different mice; corrected p<0.0001 for all comparisons vs. right visual areas). Furthermore, across 3 mice, 14% of all visually responsive sources had OSIs >0.8 (FIG. 2F, top row). In two-photon data from the same mice, 68% of visually responsive sources had orientation tunings >0.8 (FIG. 2F, bottom row).

Figure 11A:
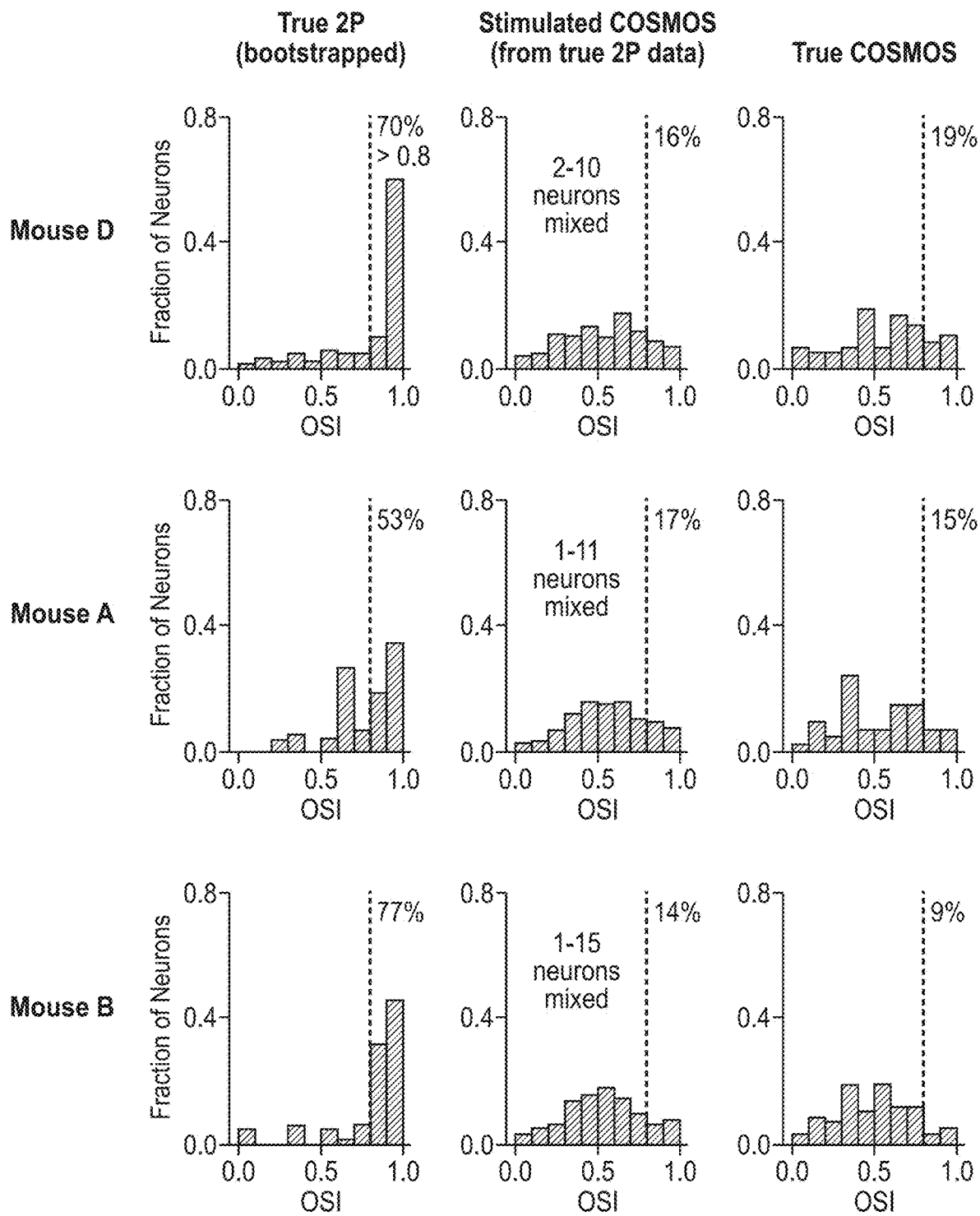
Figure 11A:
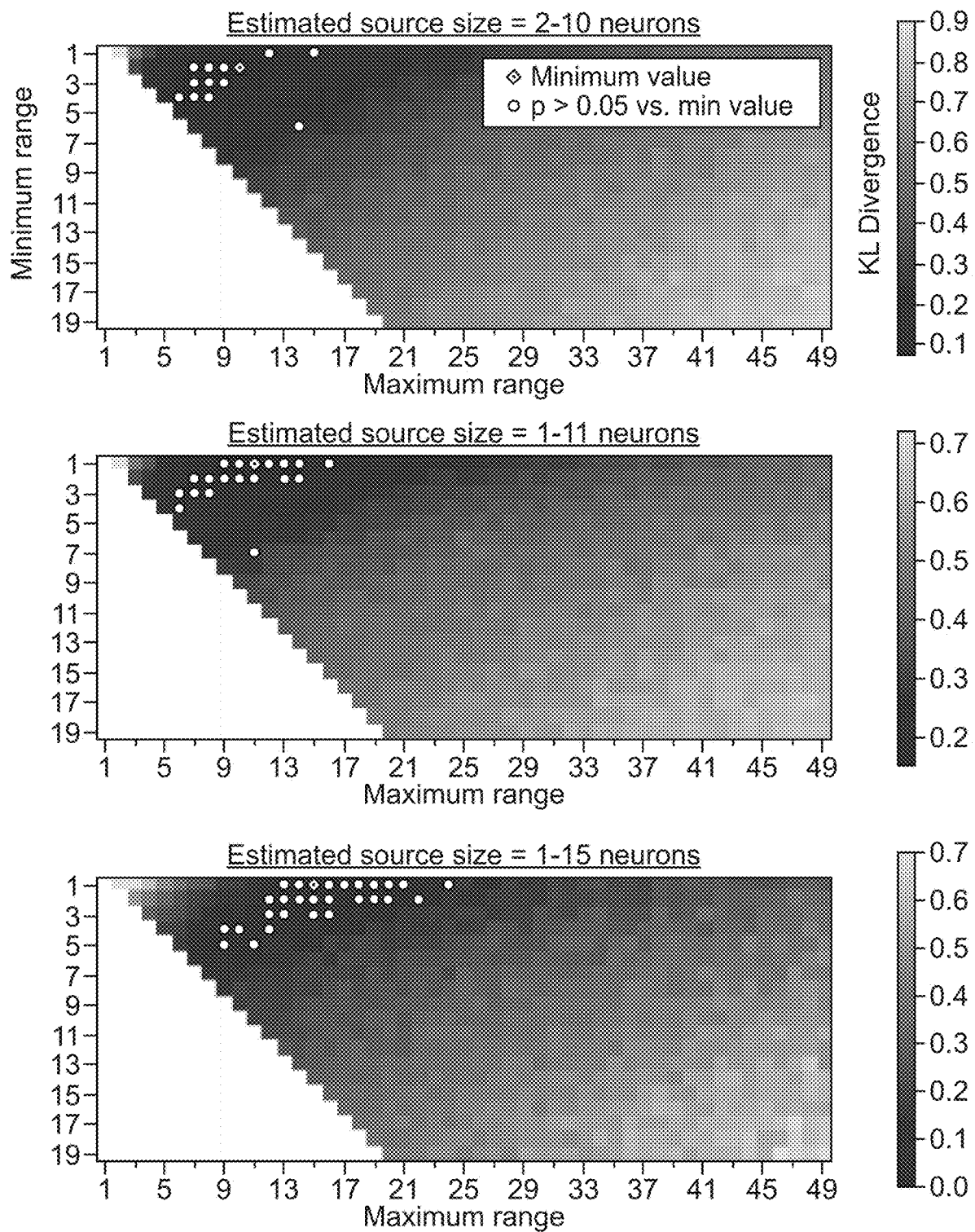
Figure 11B:
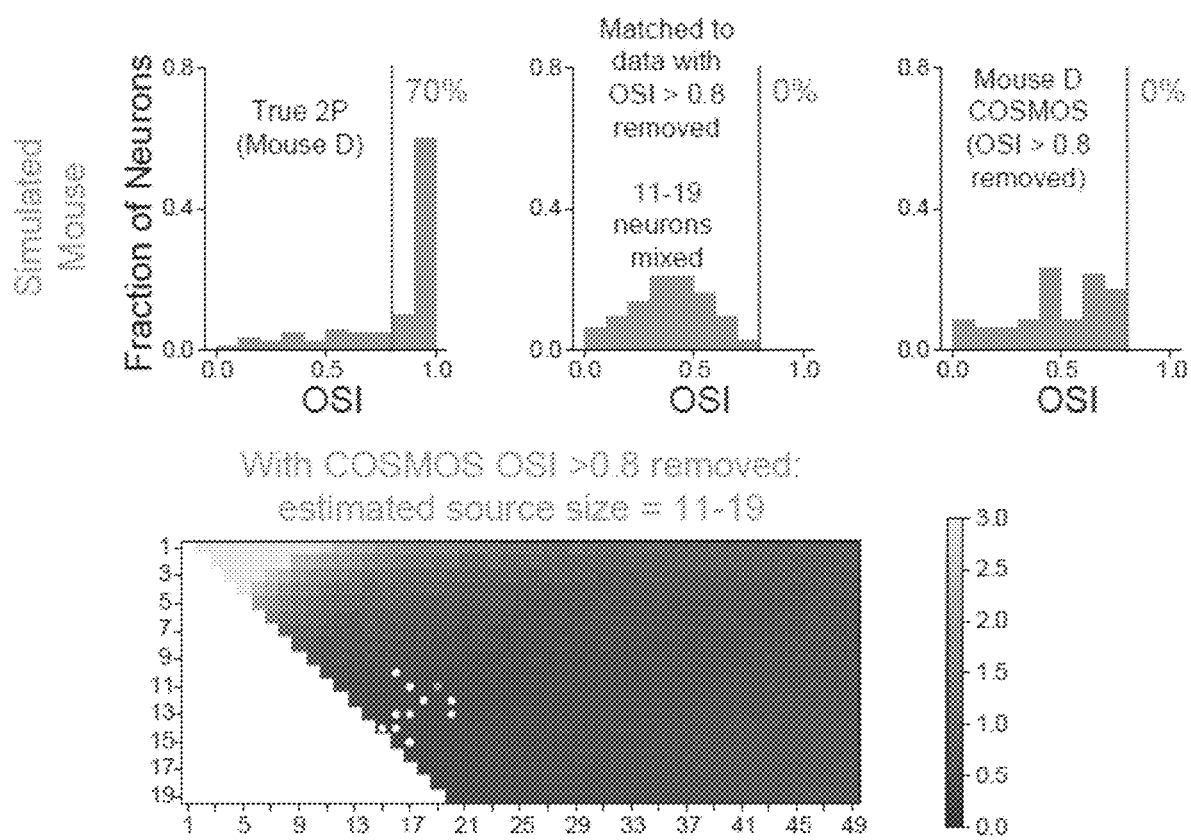
Figure 11C:
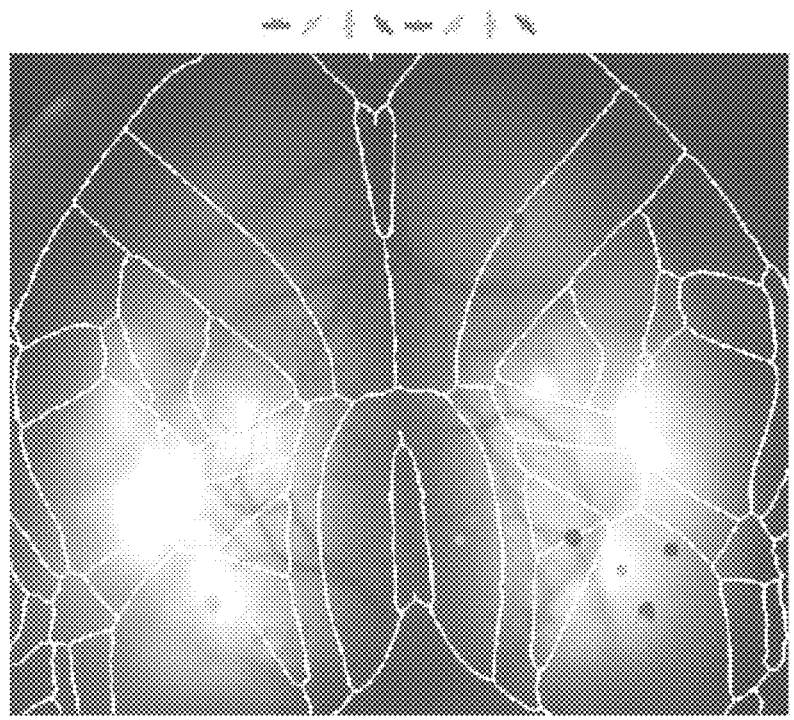
Figure 11D:
Figure 11D:
Figure 11D:
Figure 11D:
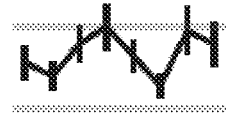
Figure 11D:
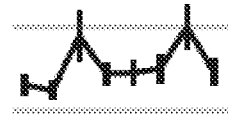
Figure 11D:
Figure 11E:
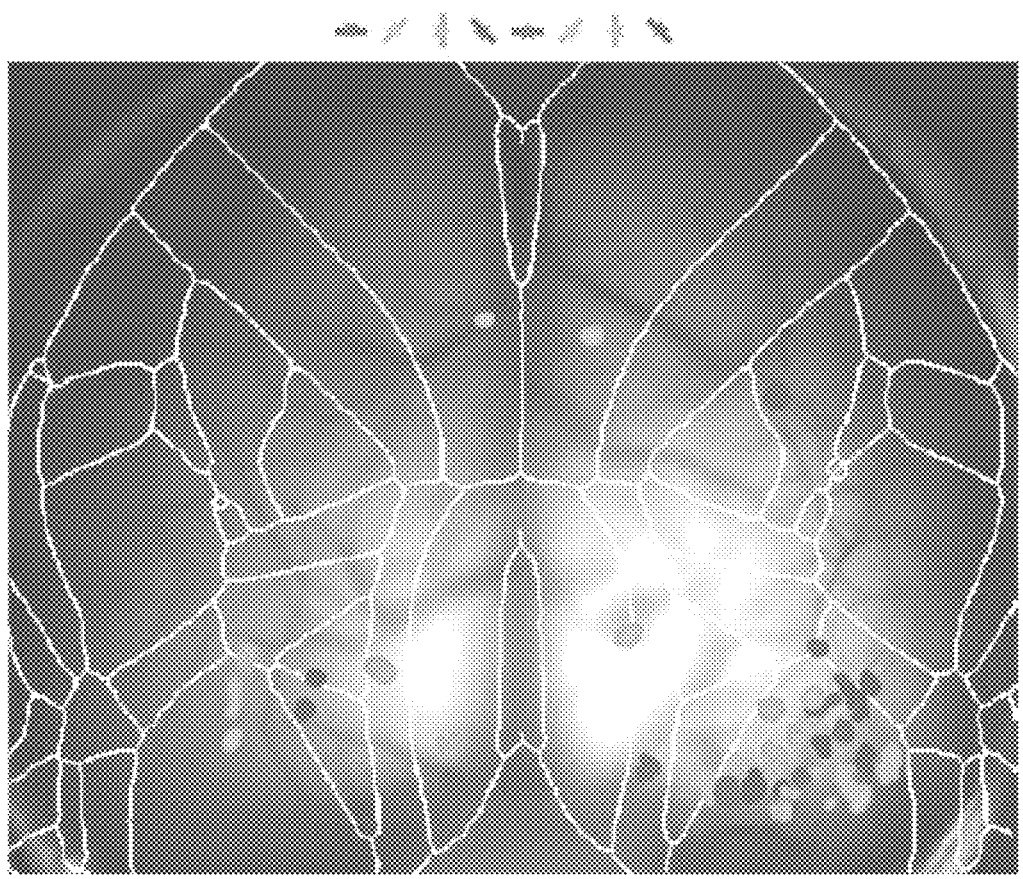
Figure 11F:
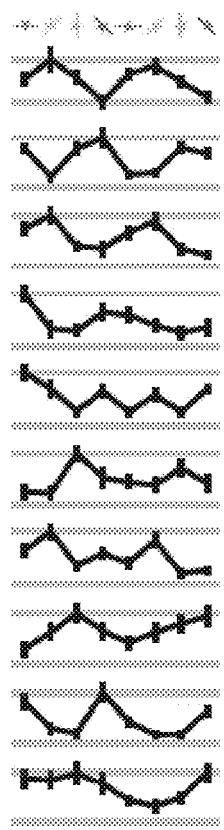
Figure 11G:
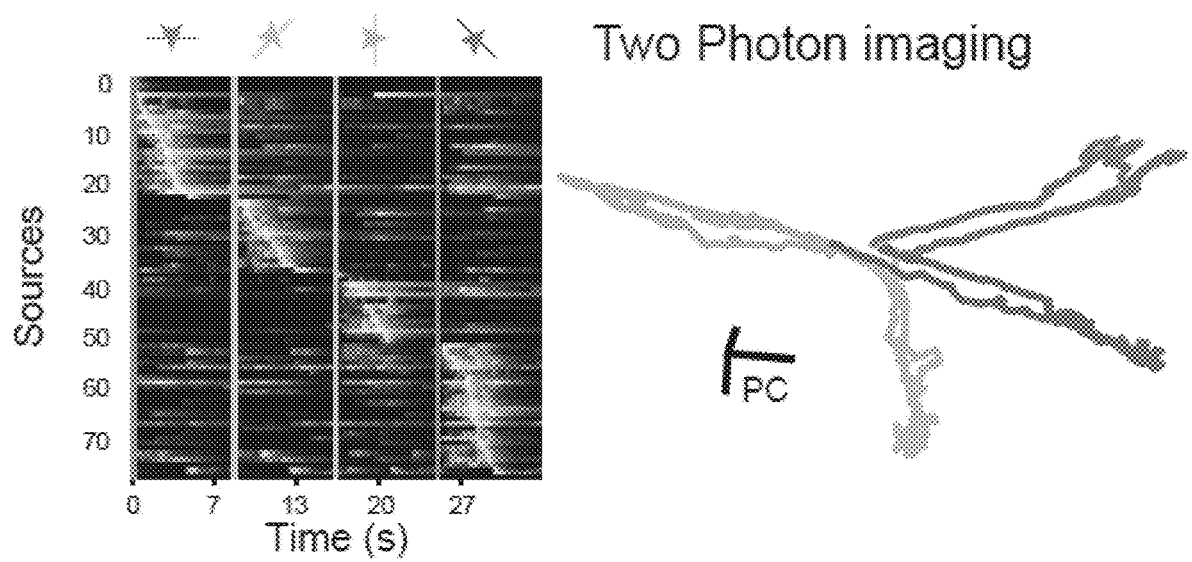
Figure 11H:
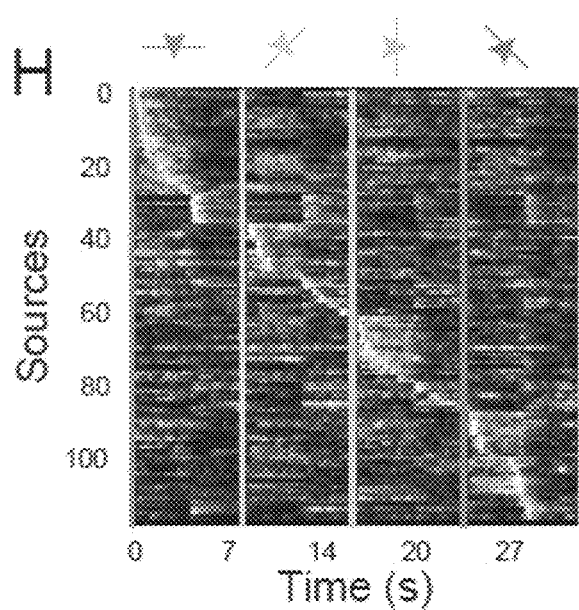
Figure 11H:
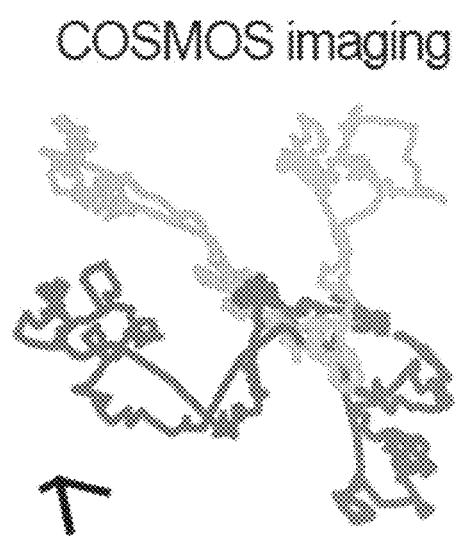

To further assess the COSMOS sources, mixtures of single-neuron signals obtained with two-photon data to reproduce the COSMOS OSI distributions were simulated. Across mice, the COSMOS OSI distributions could be explained by the presence of sources representing mixtures of signals from 1-15 neurons (FIG. 11A). The presence of sources with OSI>0.8 is not trivial; if zero high OSI sources were observed, the COSMOS OSI distributions would be instead more consistent with mixtures of 11-19 neurons-well outside the single-neuron regime (FIG. 11B; STAR methods; importantly, though. no particular source is required to be a single neuron, and the analyses are structured accordingly).

To test the importance of the overall COSMOS preparation in achieving this key result, the same procedure was performed on conventional cleared-skull widefield preparations with two genetically-specified expression profiles: Thy1-GCaMP6s and Cux2-CreER; Ai148 (Allen et al., 2017; Makino et al., 2017; Wekselblatt et al., 2016; FIG. 11C-H). Following identical imaging and data processing as with the earlier mice, even in the best of three Thy1-GCaMP6s mice zero neurons with OSI>0.8 (FIG. 2G) were found. Additionally, with both genotypes, fewer total sources were extracted. the spatial footprint of each source was larger, and there were fewer visually responsive sources (FIG. 11C-F).

Figure 2H:
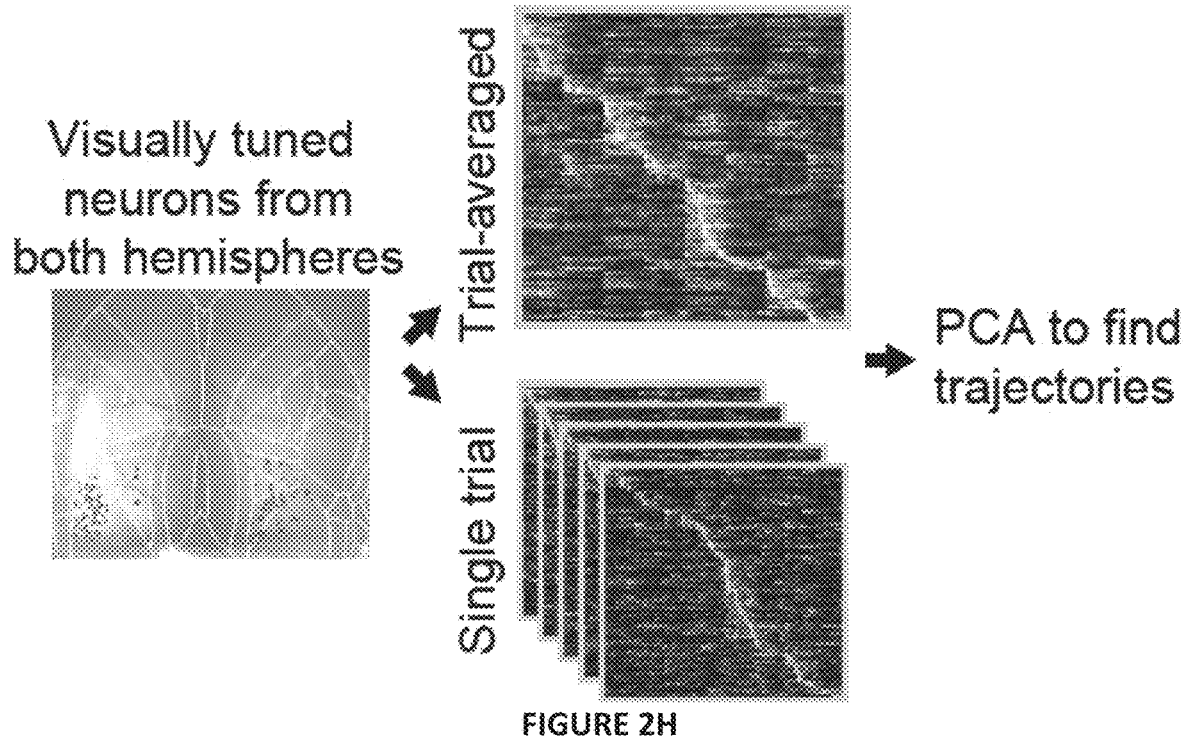
Figure 2I:
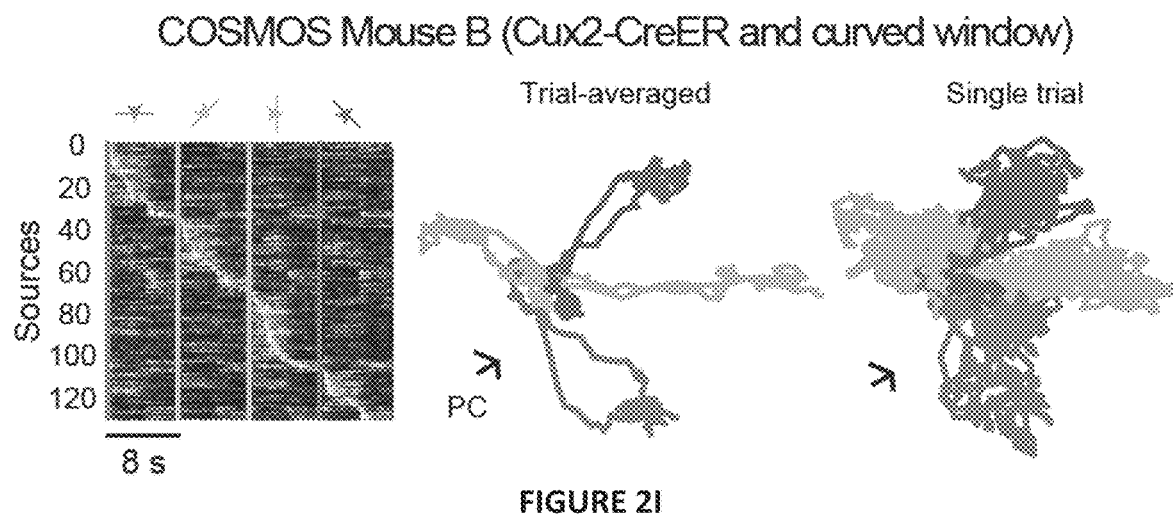
Figure 2J:
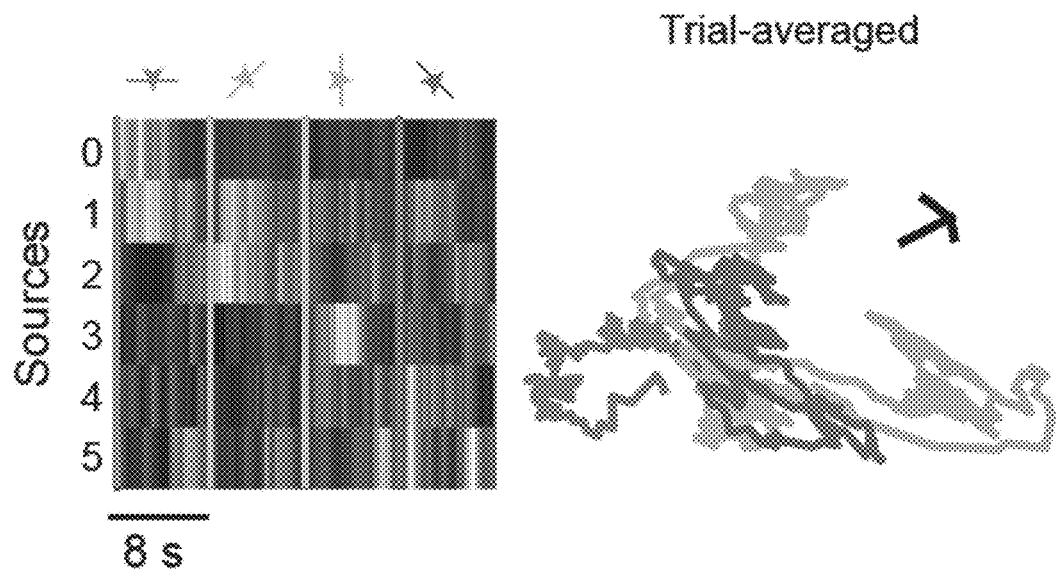
Figure 2K:
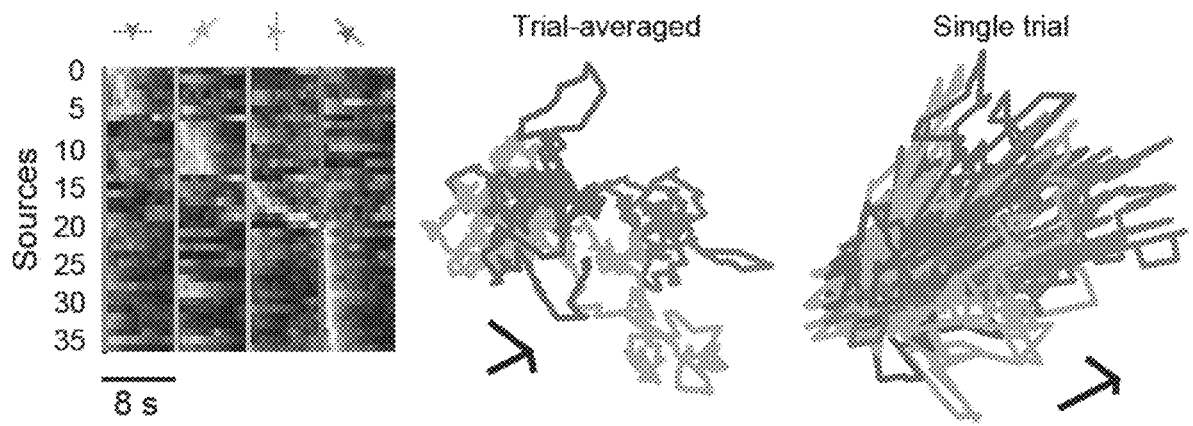

To further explore the improved capability of COSMOS relative to existing widefield techniques, a population encoding of the visual stimuli was computed. By applying Principal Components Analysis (PCA) to trial-averaged traces. a low-dimensional basis was computed for representing high-dimensional trial-averaged or single-trial neural population activity (FIG. 2H). Trajectories corresponding to each visual stimulus orientation were well-separated with COSMOS (FIG. 2I) and trial-averaged two-photon data (compare FIGS. 11G and 11H), but not with conventional widefield preparations (FIGS. 2J-K). Only with COSMOS could robust trajectories of neural population dynamics be measured that encompassed synchronously-recorded activity from across the full extent of dorsal cortex.

Cortex-Wide Recording During a Head-Fixed Lick-to-Target Task

Using COSMOS, a proof-of-principle investigation of cortex-wide representations of targeted actions was performed in the context of a head-fixed lick-to-target task. Mice were trained to lick one of three waterspouts in response to a single "go" odor, and to take no action in response to a second "no go" odor (FIG. 3A). In this more complex variant of a previously studied task (Allen et al., 2017; Komiyama et al., 2010), sessions consisted of blocks with 15-20 trials, where a water droplet reward was available from one active spout per block (FIG. 3B). The "go" odor remained constant, even as the rewarded active spout changed. Thus, no cue ever indicated which spout was active; the next reward was simply more likely to come from the spout that had delivered the previous reward, 5-10 s prior to the current trial. Successful actions were thus history-guided: they depended upon integrating experience from recent trials, as opposed to just responding to an immediate cue. Mice were rewarded if the first lick following a 0.5 s delay after odor-offset was toward the active spout. Licking an inactive spout at this time yielded a penalty (a reduced-size water droplet from the active spout). Although other licks did not affect the outcome, mice tended to lick the active spout shortly after odor onset. To facilitate exploration during the first three trials of each block, a full-sized reward was dispensed from the new active spout if any spout was licked following the "go" odor.

Head-fixed mice reliably learned to lick each spout (FIG. 3C)—with a bias to the active spout (FIG. 3D,E). Furthermore, consistent with a strategy that integrates information across multiple previous trials (spanning tens of seconds), specificity of pre-reward anticipatory licking to the new active spout progressed over the first three trials of a block (FIG. 3F,G; lick selectivity increased from trials 1 to 2, and 2 to 3, of each block; corrected p <0.05, paired t-test, data pooled across sessions, n=4 mice). Mice rarely licked on "no go" trials (FIG. 3D,F).

Figure 12A:
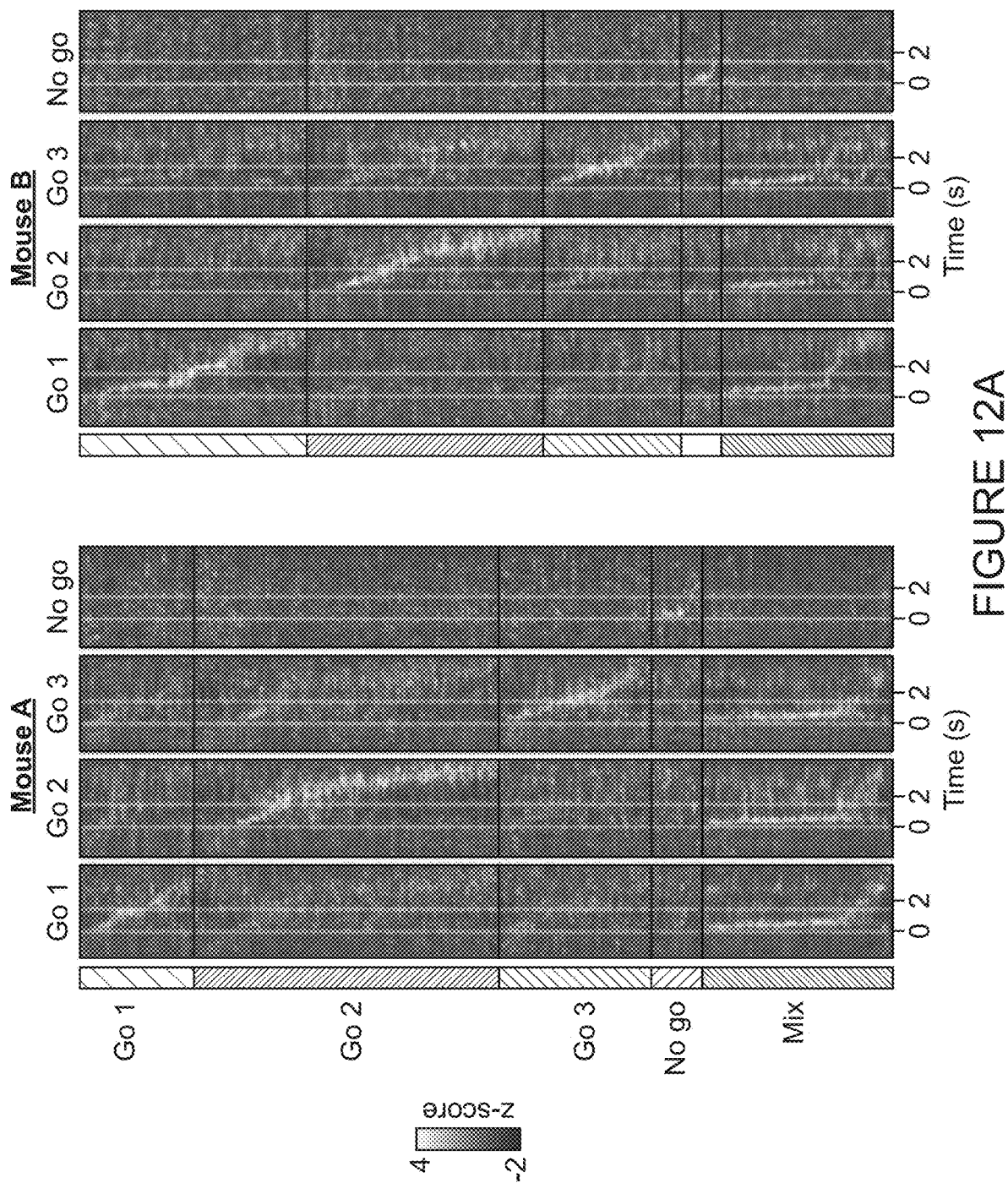
Figure 12A:
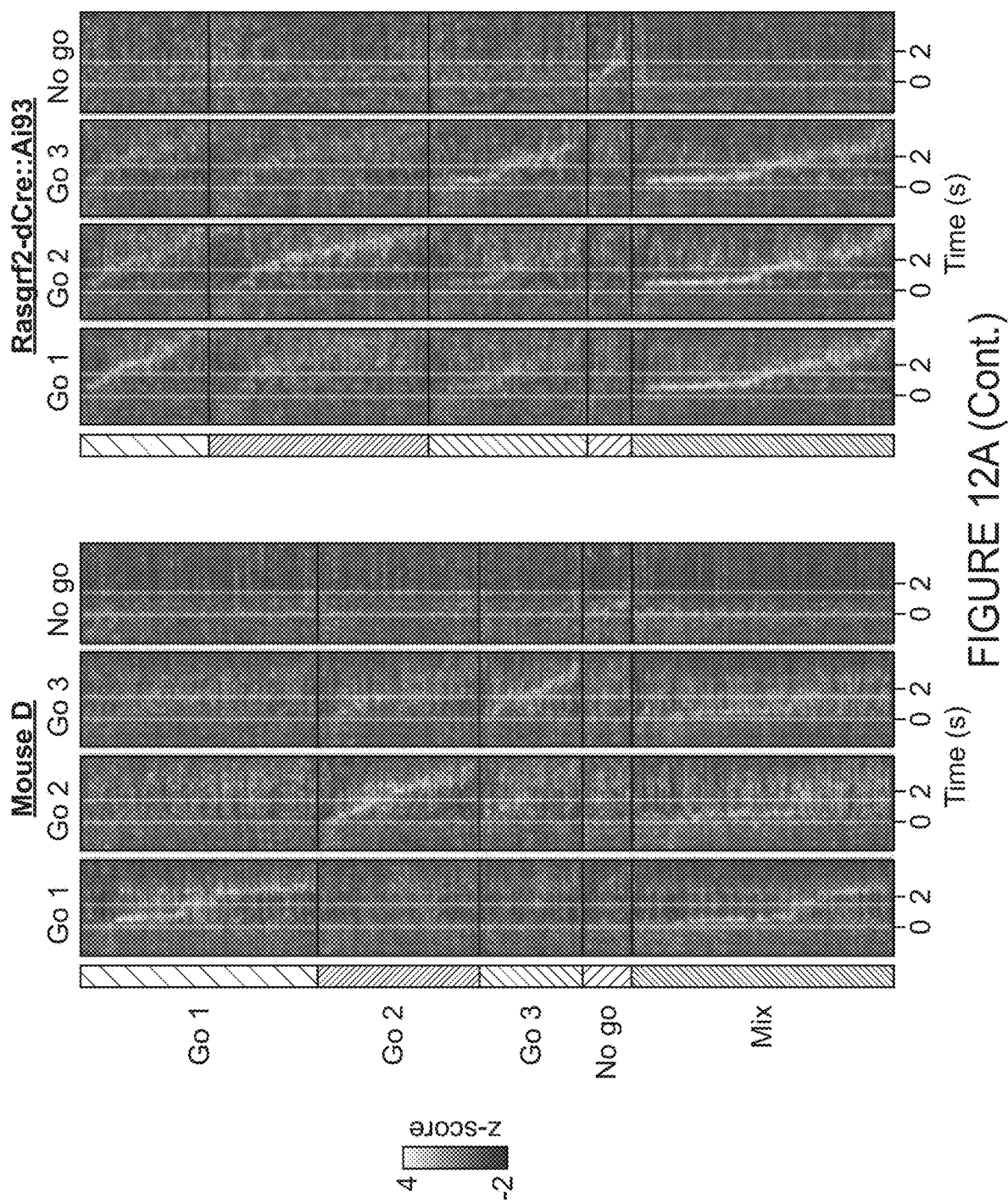
Figure 12B:
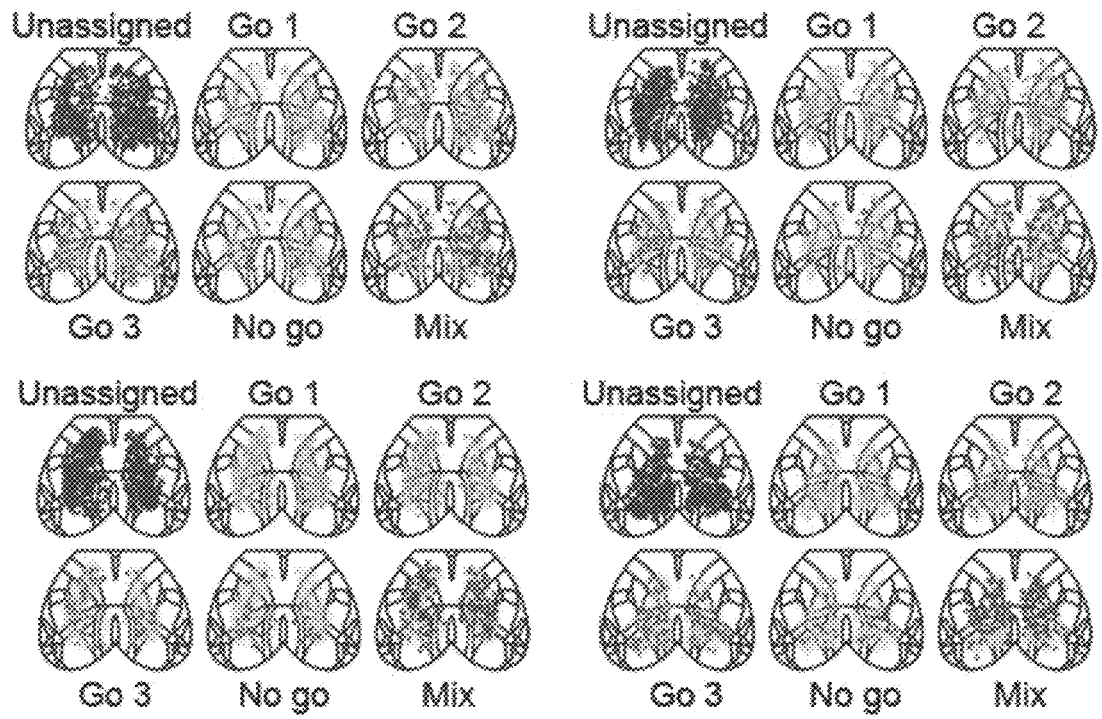
Figure 12C:
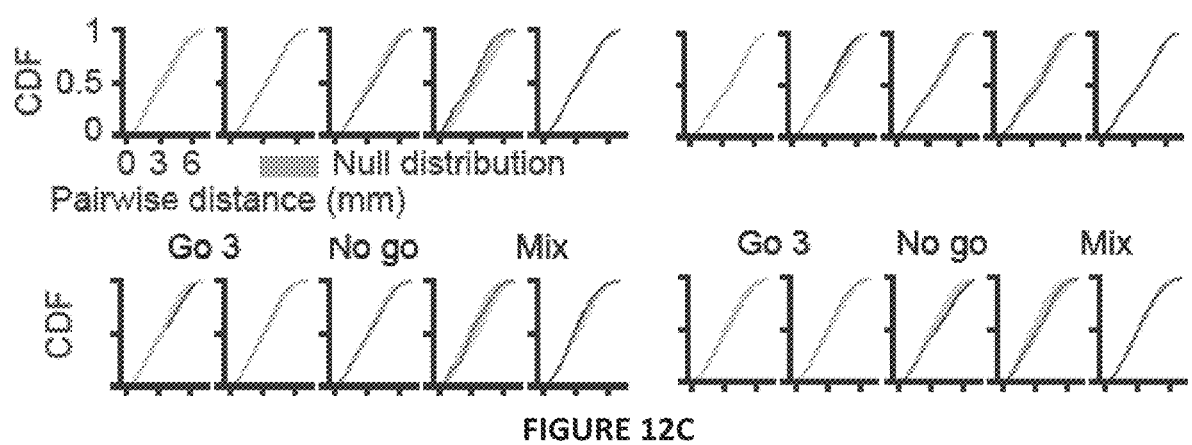
Figure 12D:
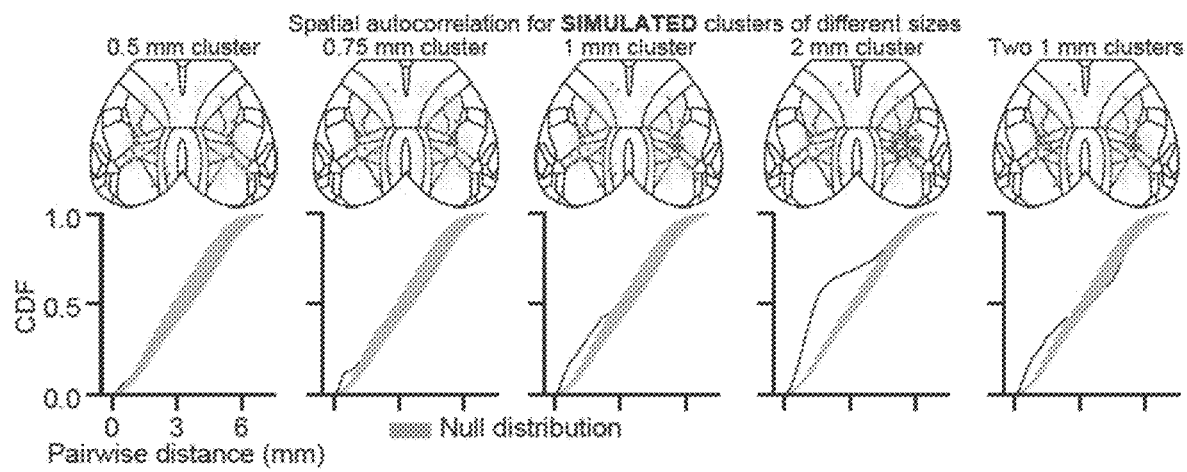
Figure 12E:
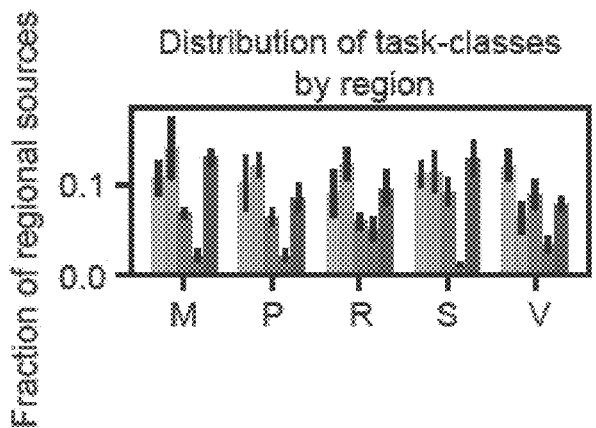
Figure 12F:
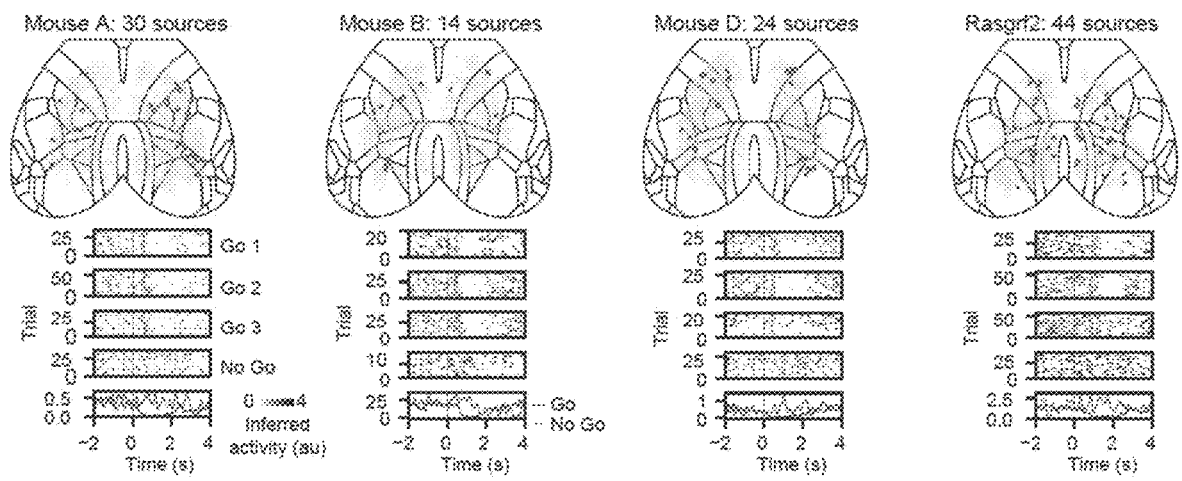

In four well-trained mice, dorsal cortex was imaged during this task (all mice yielded >1000 neuronal sources/session, mean=1195). After observing sources with reliable trial type-related dynamics, sources were assigned to one of five task-related classes: responsive selectively for one trial type (Go 1, Go 2, Go 3, or No Go), or responsive to a mixture of trial types (Mix) (FIG. 3H-J; consistent results were observed across these mice and also in a different genotype, Rasgrf2-dCre; Ai93D; CaMK2a-tTA, also targeting layer 2/3 neurons, FIG. 12A-B). Sources from each class appeared randomly distributed across dorsal cortex (FIGS. 3K and 12C; there was no consistently significant spatial pattern across mice for corrected p<0.05, permutation test, STAR Methods; this analysis is sensitive to clusters >1 mm in diameter, FIG. 12D; Hofer et al., 2005). For each task class, sources were present in all regions (FIG. 12E). Sources were found across cortex with clear encoding of each trial type (FIG. 3L), and a subclass of sources with sustained activity during the pre-odor period followed by reduced activity at odor onset of "go" trials (FIGS. 3M-N and 12G; fraction of sources across n=4 mice: 1.8±0.4%, mean±s.d.).

Correlations of Unaveraged Activity Exhibit Localized Spatial Structure

Figure 4A:
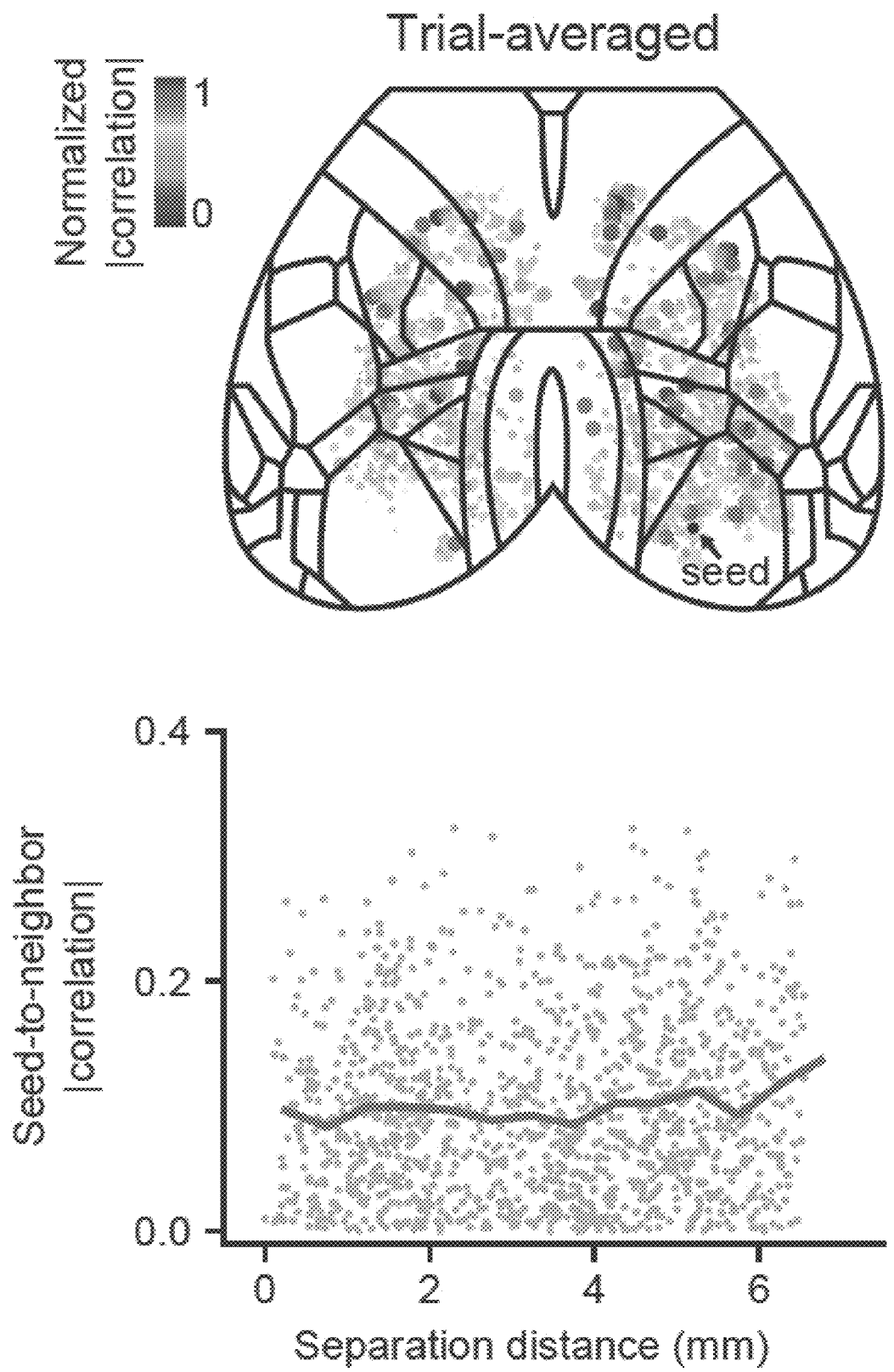
Figure 4B:
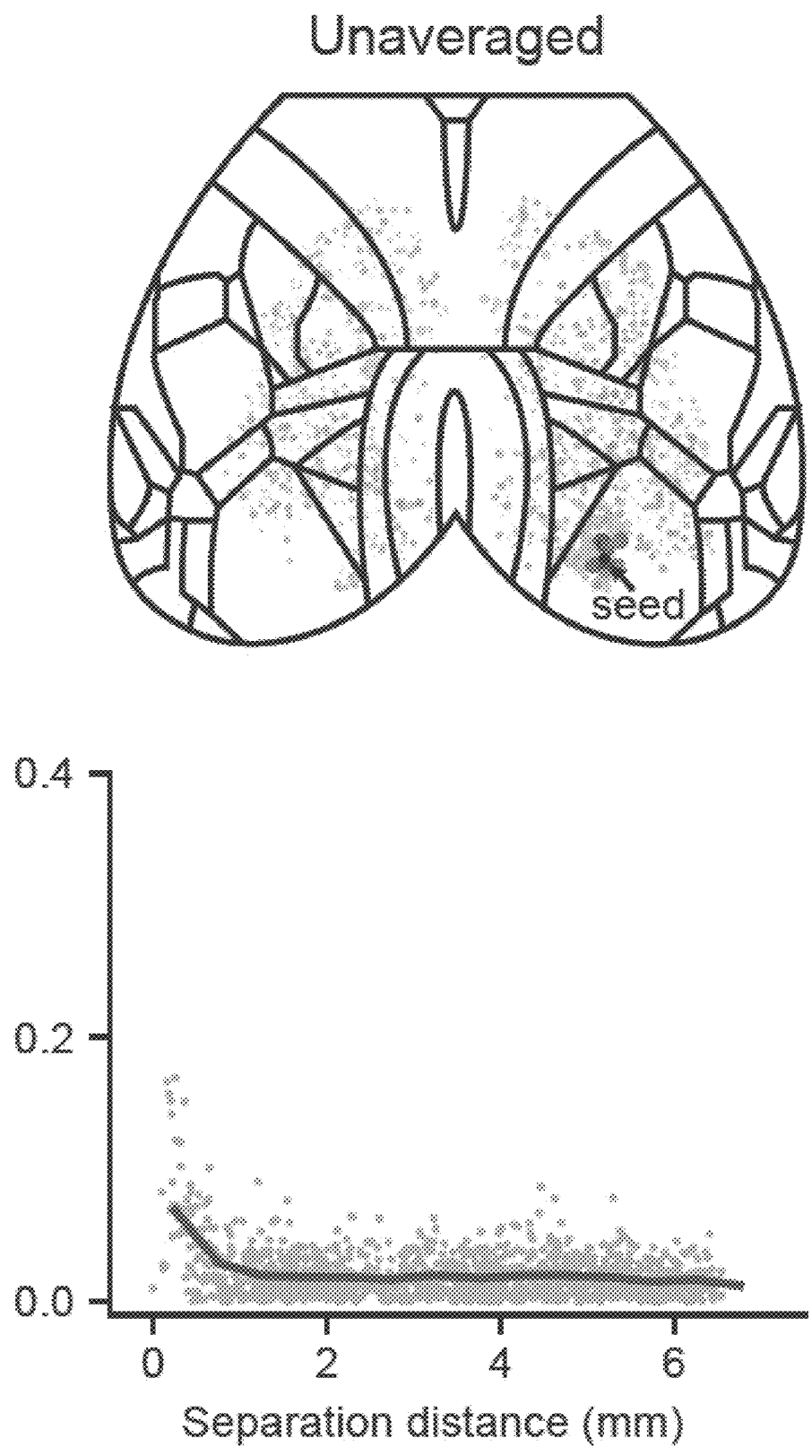
Figure 4C:
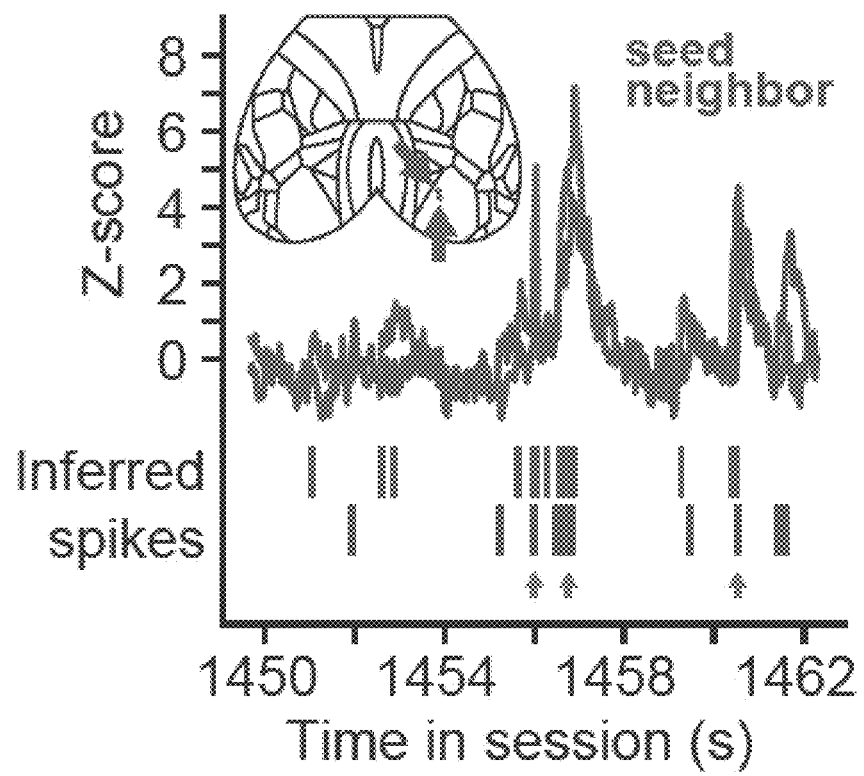
Figure 4D:
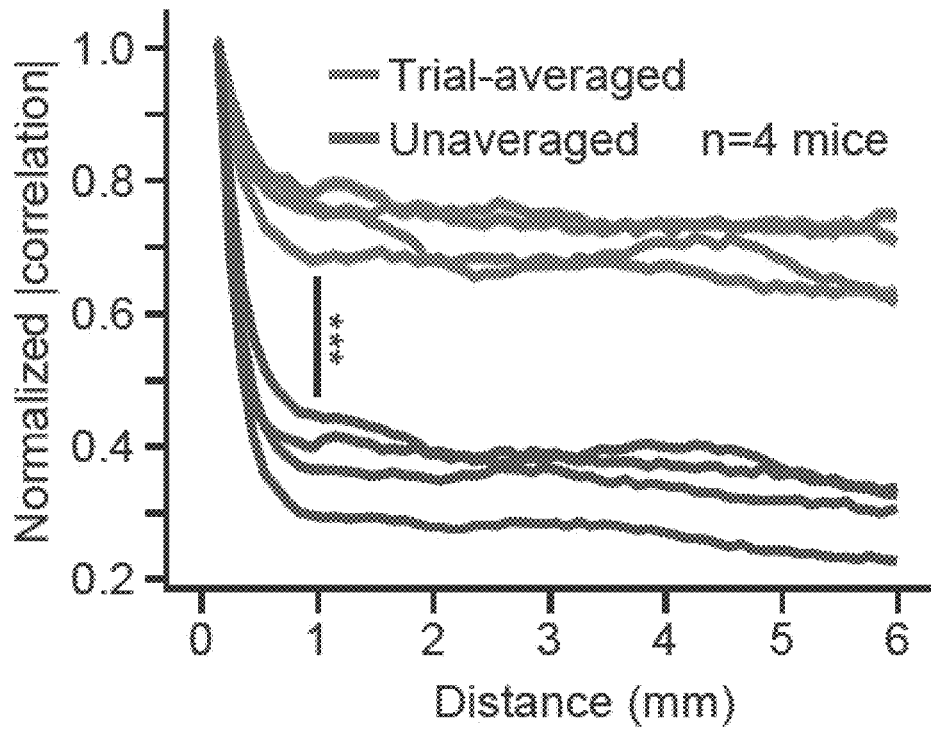
Figure 5A:
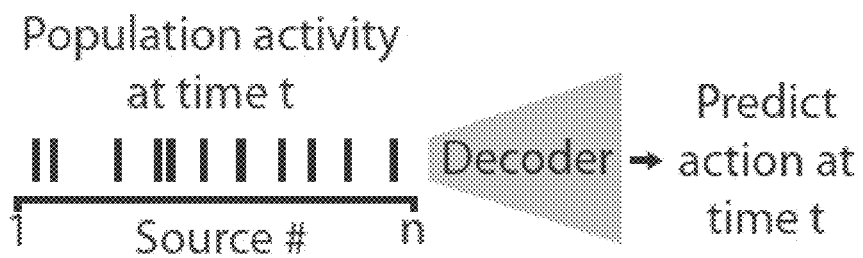
Figure 5B:
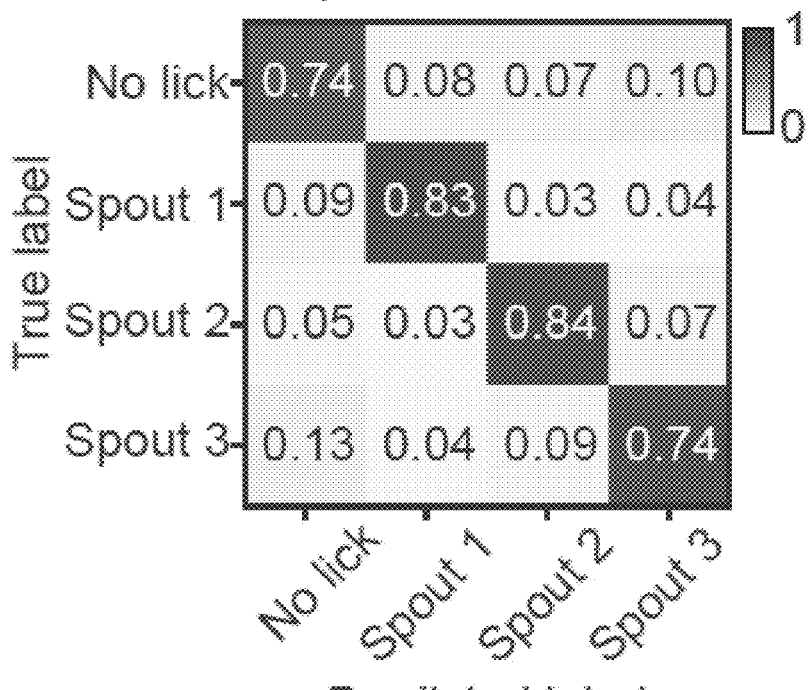
Figure 5C:
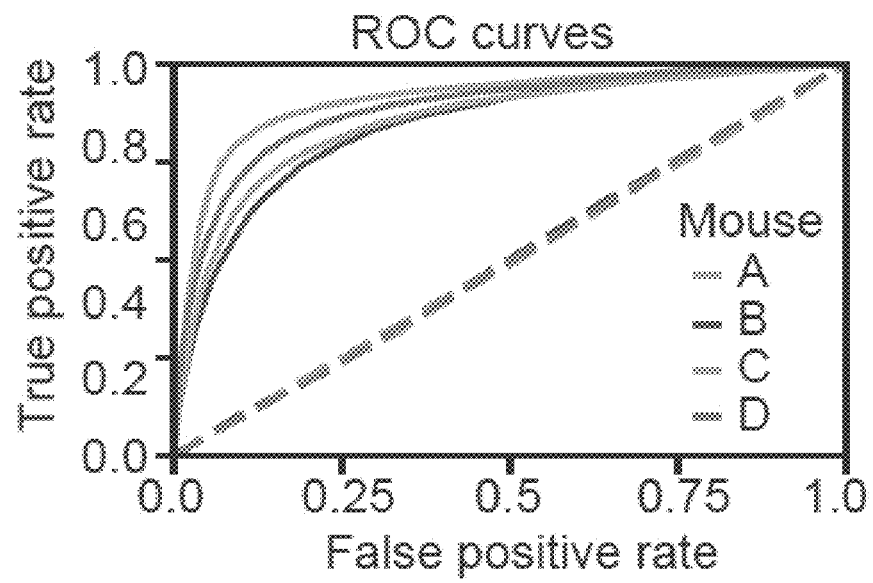
Figure 5D:
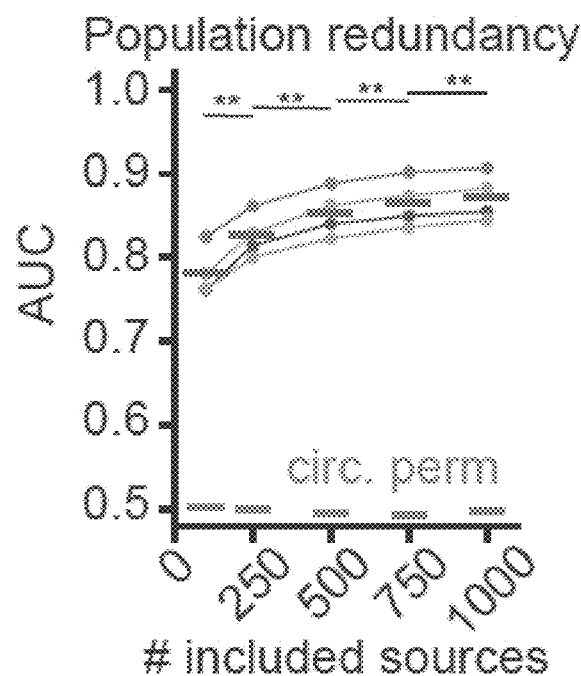
Figure 5E:
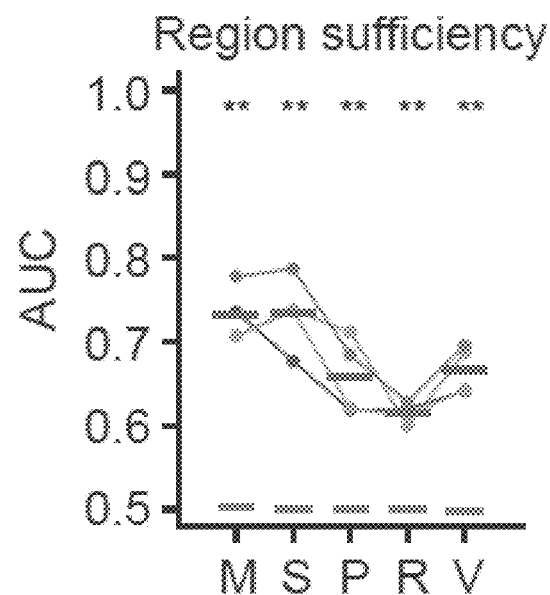
Figure 5F:
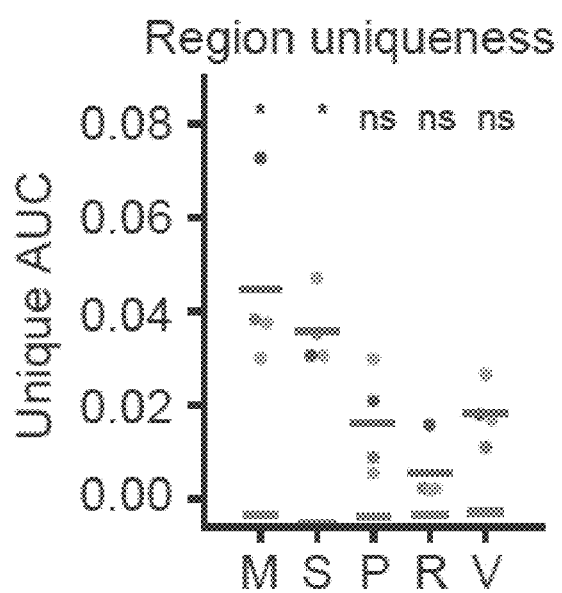

Next, the structure of correlated neural activity across cortex was investigated-taking advantage of the simultaneity of the large-scale data disclosed herein-via correlation maps, where the correlation magnitude was computed of the 29.4 Hz activity of a seed source with that of every other source (at zero lag with Gaussian-smoothed, s.d.=50 ms, deconvolved spiking activity; STAR methods). This correlation map was computed using either unaveraged traces from the whole session (i.e. the concatenated time series from all single trials after removing the variable-length intertrial interval) or concatenated trial-averaged traces (similar to FIG. 3J). With trial-averaged data, sources with high correlation to the seed source were distributed widely, in support of the initial observations (FIG. 4A). In contrast, with unaveraged data many instances were found of localized correlation structure, for seeds located throughout cortex (FIG. 4B, 13). This correlation did not result from a localized imaging artifact, as raw extracted fluorescence traces demonstrated that although neighboring sources exhibited occasionally correlated firing, they had distinct activity patterns (FIG. 4C). Additionally, there existed bilaterally symmetric correlations (FIG. 13B). When summarizing the correlation versus distance for all pairs of sources, a consistent pattern was observed across mice (FIG. 4D). For example, at a separation distance of 1 mm, unaveraged correlations were consistently lower than trial-averaged correlations (p=0.0001, paired t-test, n=4 mice). Thus, although sources throughout cortex exhibited similar activity when averaged according to trial-type, correlations in unaveraged cortical activity showed increased dependence on spatial proximity.

Single-Trial Representations of Distinct Motor Actions are Distributed Across Cortex The synchronous-recording capability of COSMOS was used to assess how populations of sources jointly encoded information about ongoing behavior on single trials.

Figure 14A:
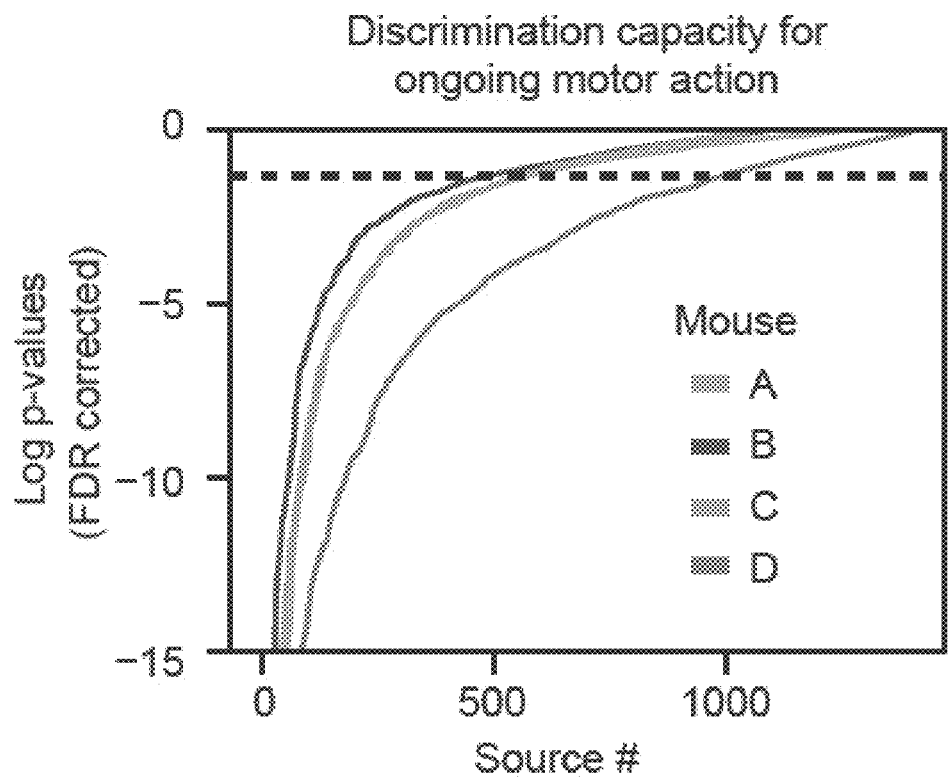
Figure 14B:
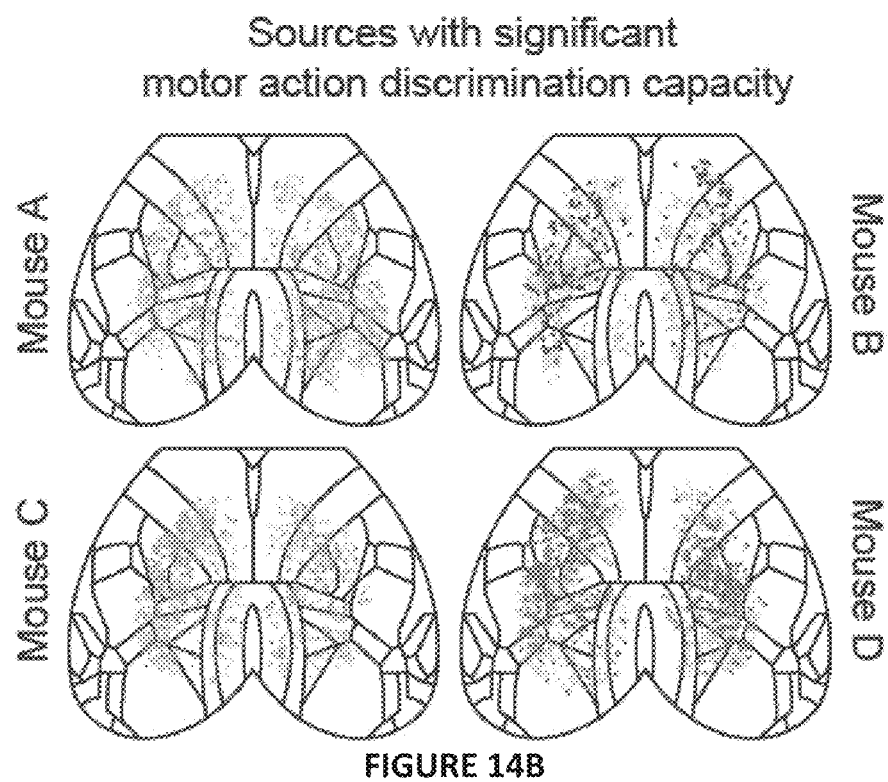
Figure 14C:
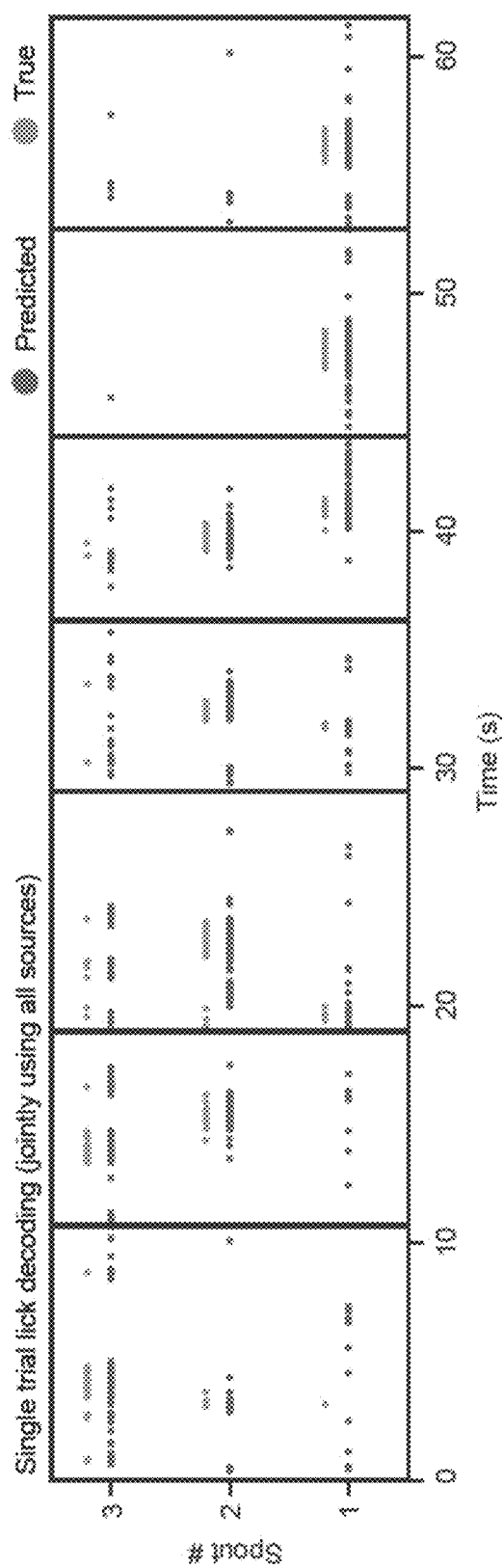

First, the ability was characterized of each individual source to discriminate any of four different ongoing actions: licking to spout 1, to spout 2, to spout 3, or not licking at all. Most of the sources detected in each mouse exhibited significant discrimination capacity (78±4% of all neuronal sources for n=4 mice), where discrimination capacity was defined for each source as corrected p<0.05 (Kruskal-Wallis H-test for whether the source time-series could discriminate any of the four actions; FIG. 14A). These discriminating sources were distributed across all dorsal cortical regions (FIG. 14B).

Next, it was tested how cortical neurons jointly encoded information about ongoing actions. Across all four mice, a linear decoder could predict lick direction at the frame rate of the deconvolved $Ca^{2+}$ data (29.4 Hz) with high accuracy on single trial data (FIG. 5A-C; STAR methods). Indeed, as demonstrated in FIG. 14C, individual lick bouts to different spouts were readily decoded, even when interleaved within a single trial. Thus, ongoing motor actions of the mouse are represented with high temporal fidelity by neuronal sources in dorsal cortex.

Finally, decoding performance was compared when using different numbers of sources. To provide a fair comparison, only the most-discriminative sources were used for decoding (according to the ordering in FIG. 14A), and all decoding models had the same number of parameters. A monotonic increase was found in decoding performance as more sources were included (FIG. 5D, corrected p<0.01, paired t-test comparison vs. AUC with next closest number of sources, n=4 mice). To further examine this phenomenon, lick events were decoded using only the 75 most discriminative sources from each region (merged across hemispheres). Each region could decode lick direction far above chance (FIG. 5E, corrected p <0.01 for all regions, t-test vs. AUC=0.5, n=4 mice). Finally, by comparing decoding using all but one region with decoding using all regions (again using only the top 75 sources per region), it is demonstrated that at least some cortical regions-somatosensory and motor in this case-contained significant unique information that was not present in the top sources sampled from other regions (FIG. 5F; corrected p<0.05, t-test vs. unique AUC=0, n=4 mice).

History-Guided Motor Plans are Encoded by Neuronal Populations Across Cortex

Figure 6A:
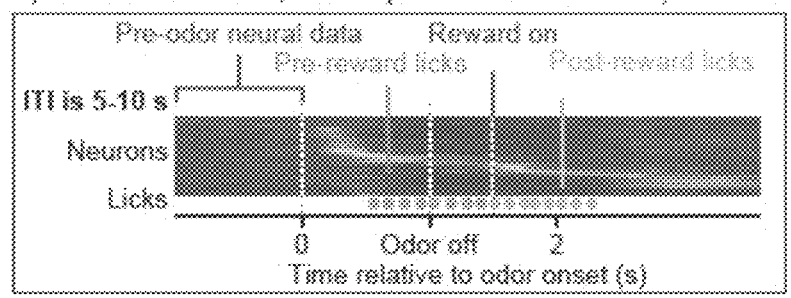

In this history-guided task, the mouse must maintain information during the pre-odor intertrial interval about where it plans to lick at odor onset. To detect and localize neural representations of this information, decoders were trained using "pre-odor" denoised neural $Ca^{2+}$ data taken from the final 2.2 seconds of the intertrial interval-which preceded any stimulus or licking. The spout could be successfully predicted that was most-licked between odor and reward onsets (the "preferred spout"), using a linear technique (Partial Least Squares Regression. PLS; FIG. 6A). Trials containing pre-odor licks were not used for prediction (0.1-10.3% of all recorded licks were during the pre-odor period).

Figure 6B:
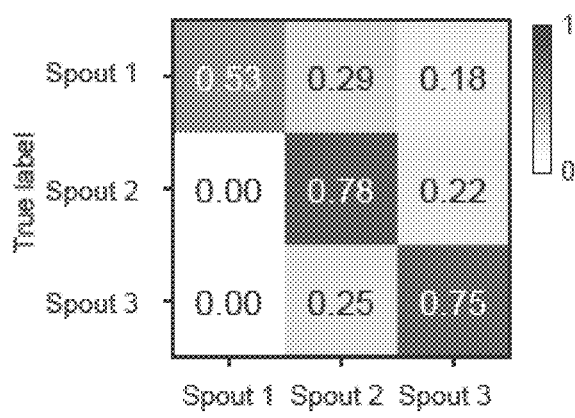
Figure 6C:
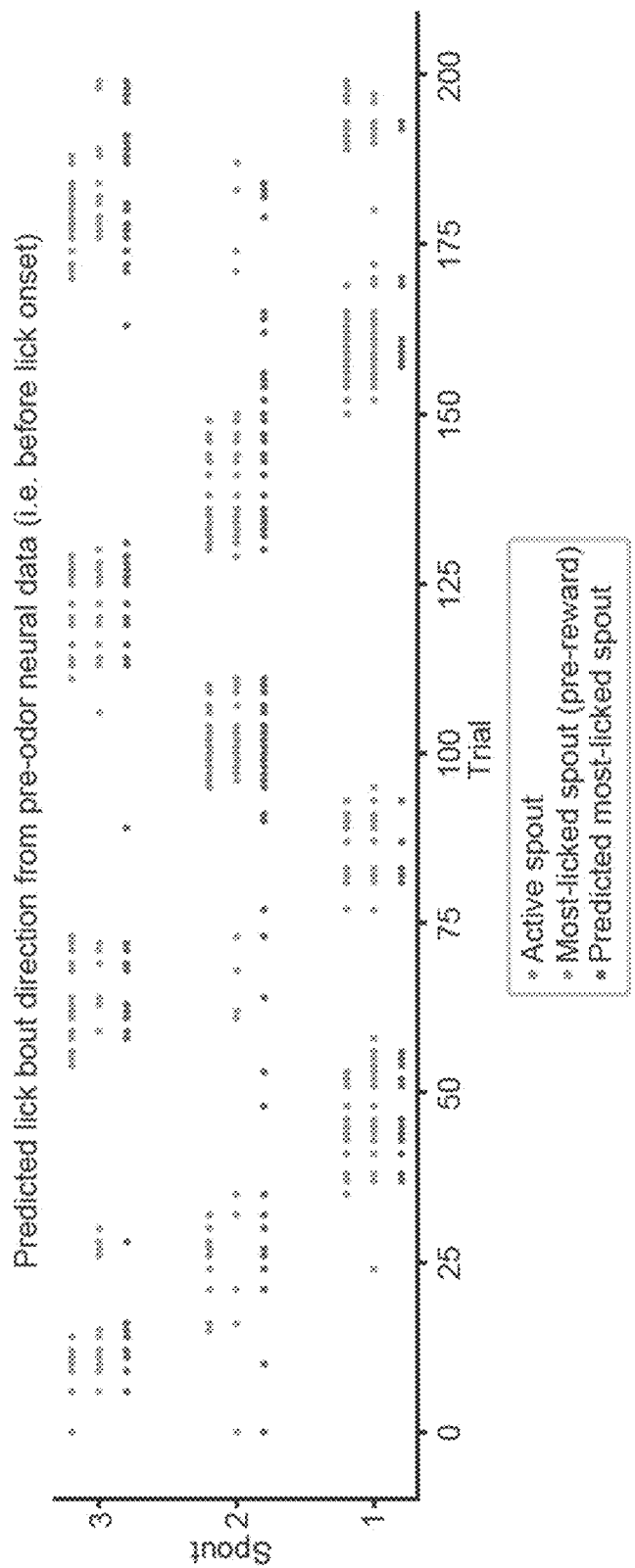
Figure 6D:
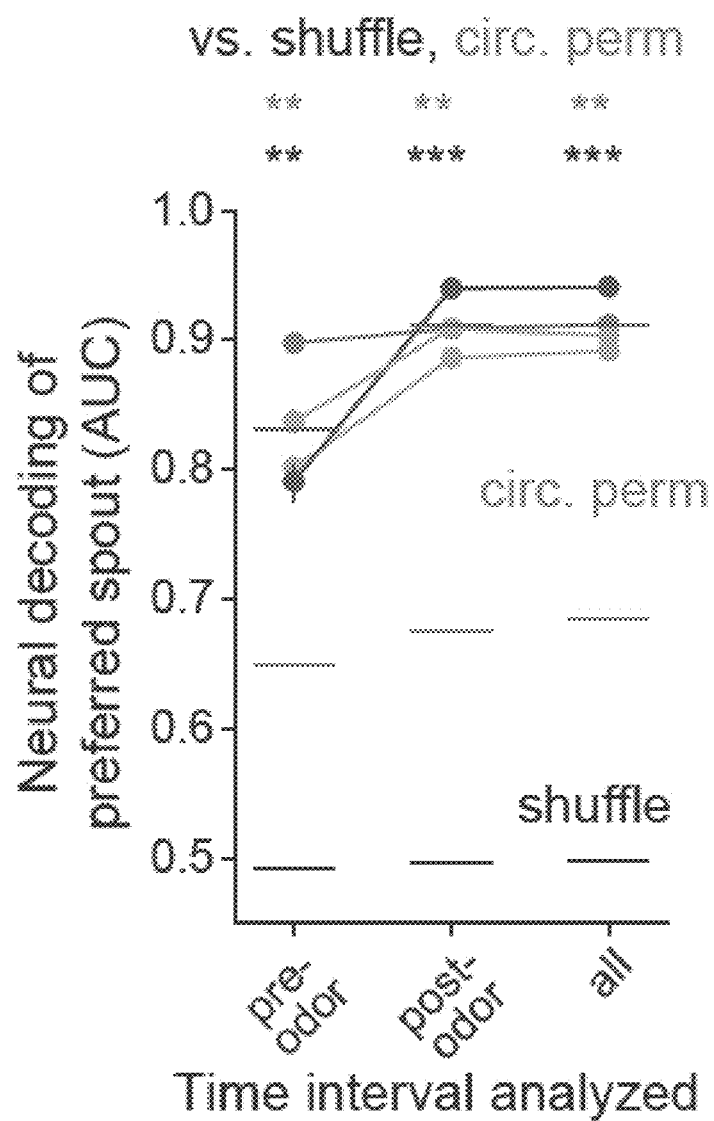
Figure 14D:
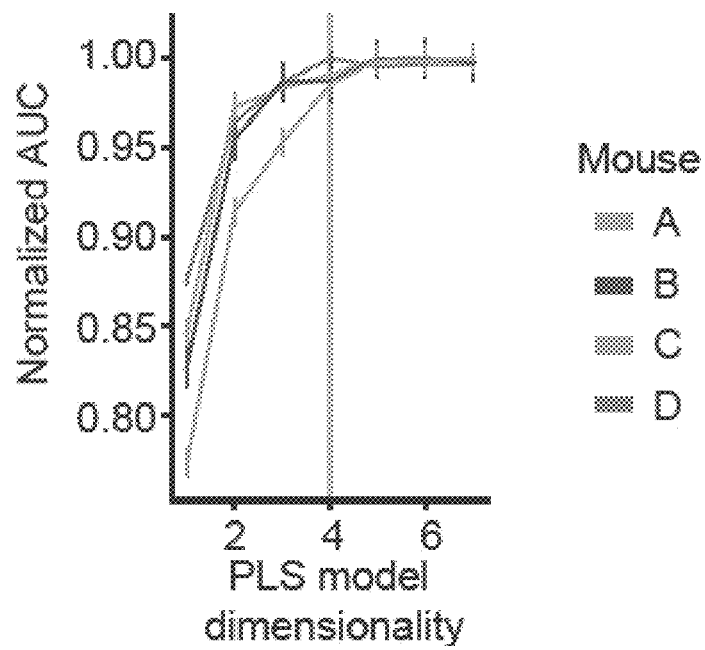
Figure 14E:
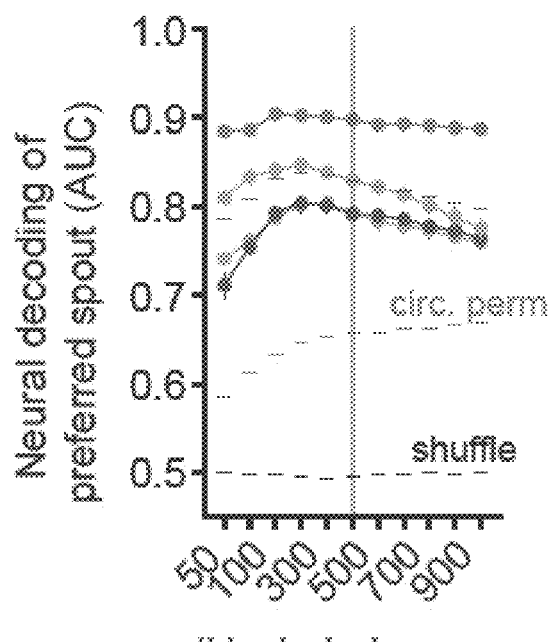
Figure 14F:
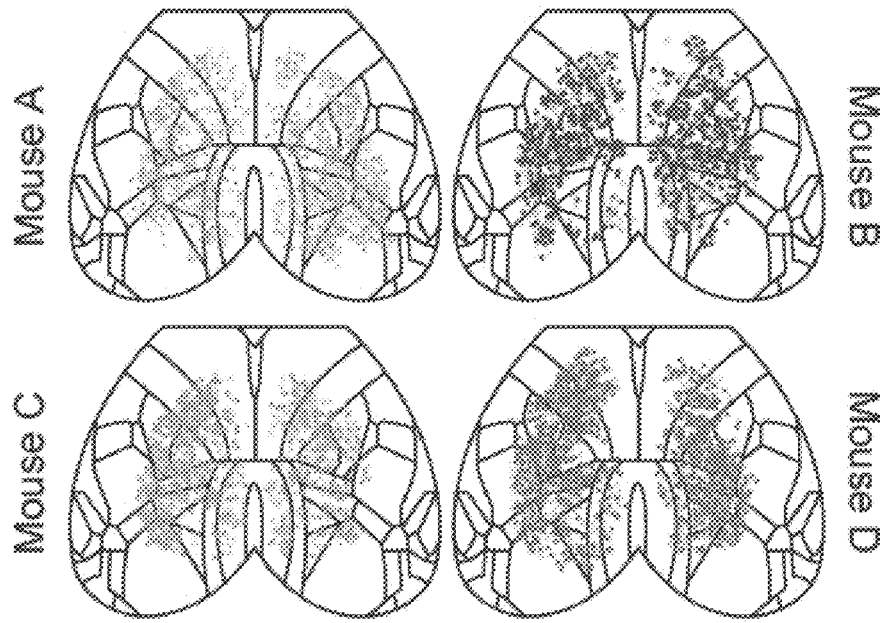
Figure 14G:
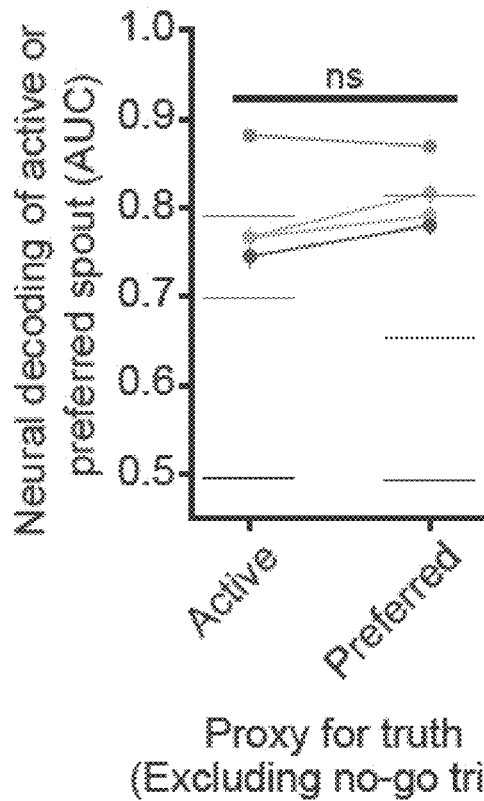

These PLS-based decoders exhibited above-chance performance, as exemplified in the predictions for a representative dataset (FIG. 6B-C; four dimensions and up to 500 sources were used for training; see FIGS. 14D-E and STAR Methods for fitting details; sources were ordered by discrimination ability, FIG. 14F). These decoders could predict the preferred spout using neural activity taken from the entire trial, the pre-reward period, or just the pre-odor period (FIG. 6D). Performance was quantified by comparison with randomized controls with shuffled preferred spout labels. Shuffling was either performed randomly or, more conservatively, by circularly permuting the labels by random numbers of trials. Decoding was significant relative to either control (FIG. 6D; corrected p<0.01. paired t-tests vs. randomly shuffled; corrected p<0.01 vs. circularly-permuted).

The decoding performance was next tested of different cortical regions, using only the 75 most discriminative sources from each region. Areas across cortex was found to yield above-chance performance (FIG. 6E; corrected p<0.05, paired t-tests vs. random shuffle; corrected p<0.05 for all areas but parietal vs. circular permutation). including visual cortex-even though no task elements were visible to the mouse. Decoder prediction of the true active spout was comparable to that of the preferred spout (FIG. 14G; paired t-test, corrected p=0.42. n=4 mice; only trials where the preferred and active spouts were identical were used for model training in all PLS analyses; in the test set these labels were similar but not identical).

Figure 14H:
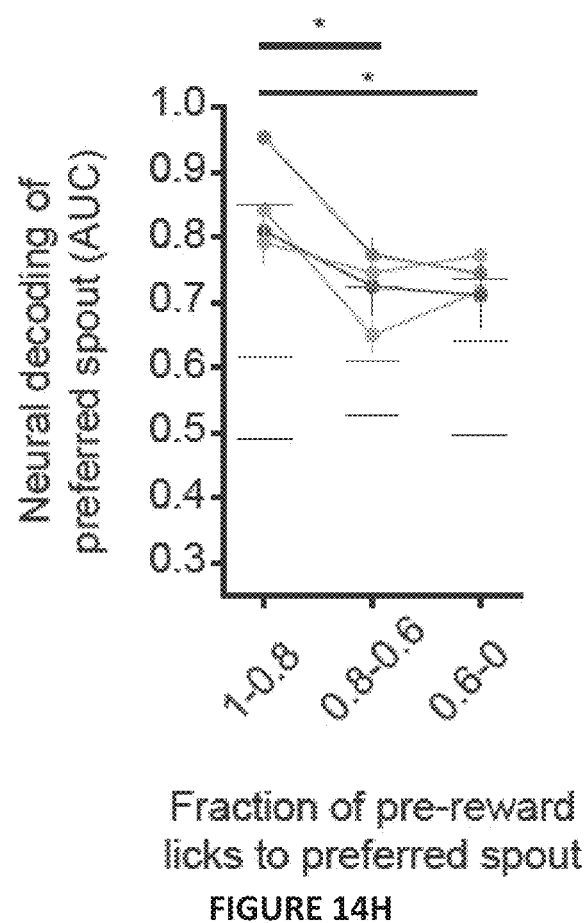
Figure 14I:
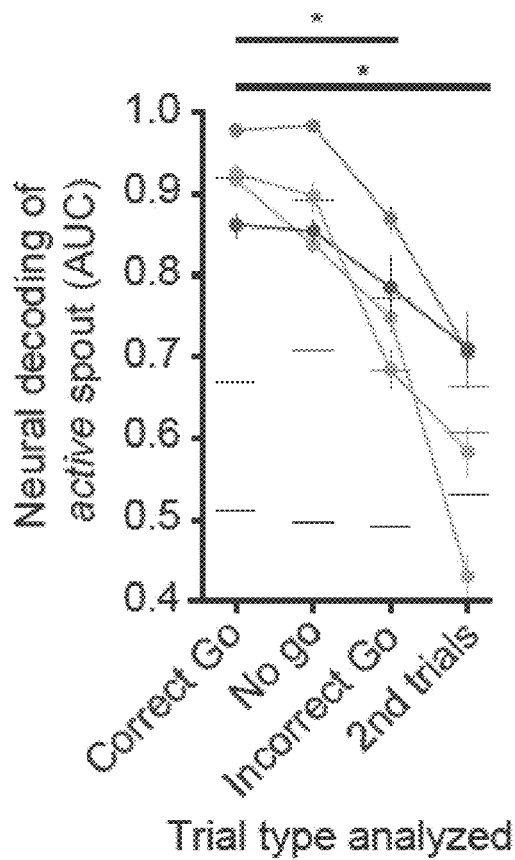

Additionally, the ability to predict the preferred spout changed within each block of trials was investigated. Multiple trials were required for licking to adapt to a new active spout (FIG. 6F, cyan points; comparison of trial 1 to trial 2 or 3. paired t-test, corrected p<0.01). In contrast, preferred spout decoding performance remained relatively constant over this period (purple points; comparison of trial 1 to trial 2 or 3. corrected p=0.43). However, a relationship was found between decoding and lick selectivity, with significantly greater performance on trials with >80% of pre-reward licks to a preferred spout compared with trials where <80% of licks were selective (corrected p<0.05. paired t-test, n=4 mice; FIG. 14H). Thus, while future actions throughout trial blocks were successfully predicted, performance is reduced when future licking behavior is less selective. Moreover, when decoding the true active spout (instead of the preferred spout), performance with "correct go" trials where >70% of all licks were toward the active spout was significantly higher than with either "incorrect go" trials where <70% of licks were towards the active spout. or with the error-prone $2^{nd}$ trials of each block (FIG. 14I; corrected p<0.05 paired t-test).

Figure 6E:
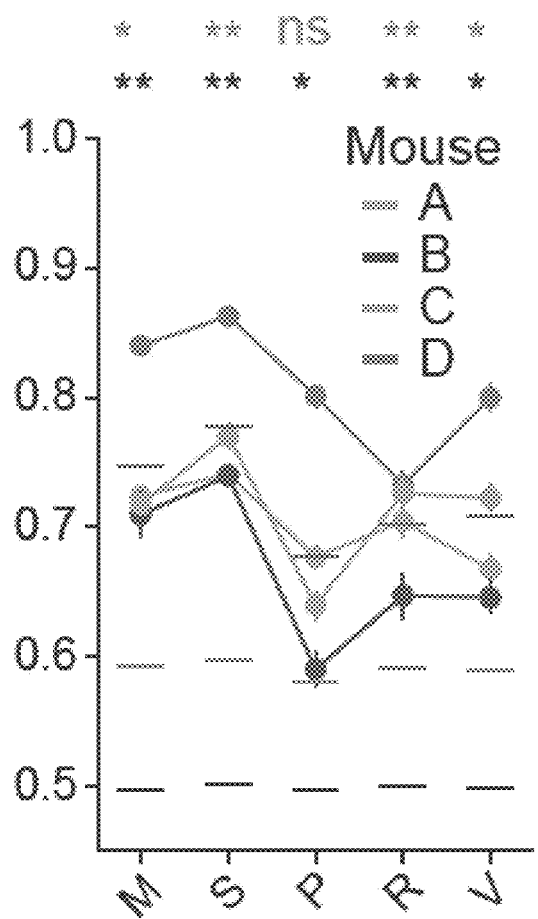
Figure 15A:
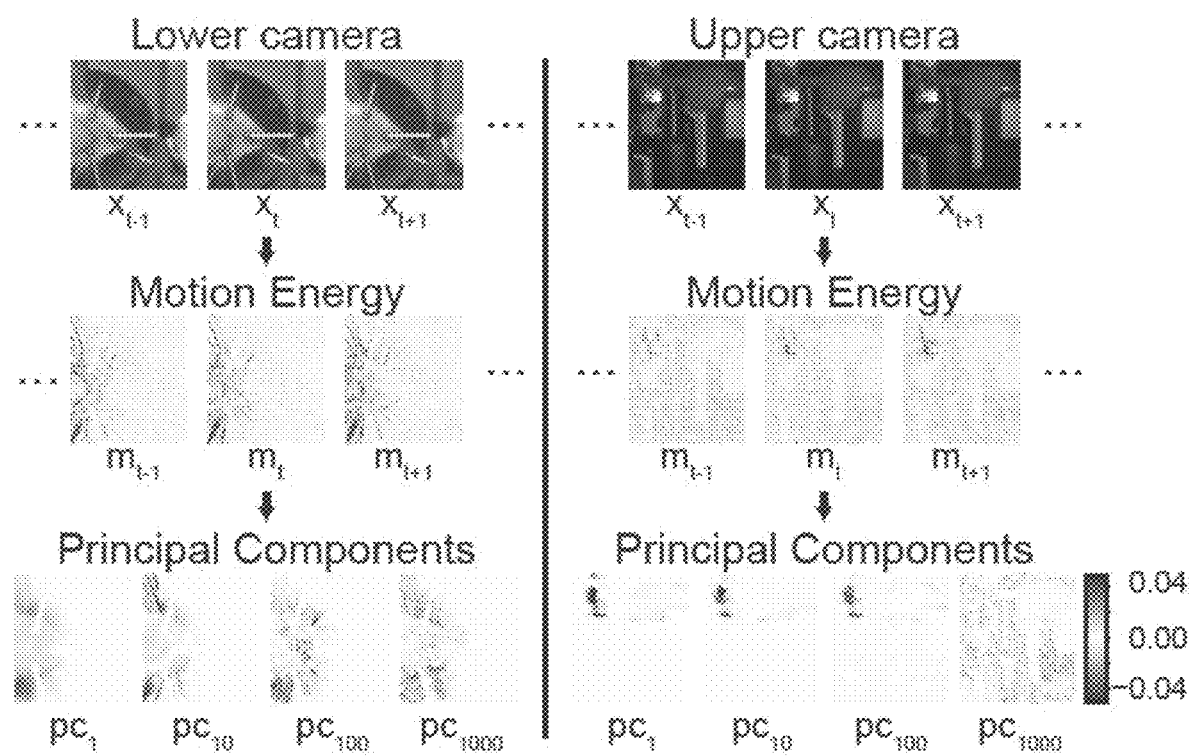
Figure 15B:
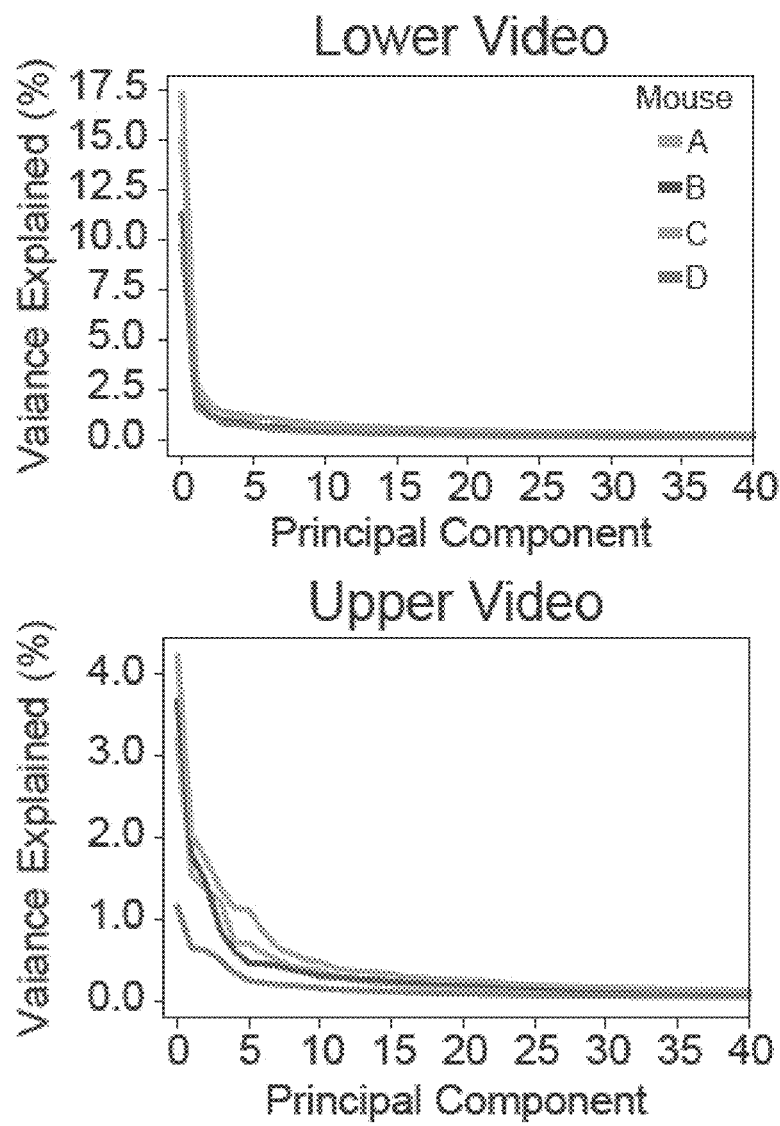
Figure 15C:
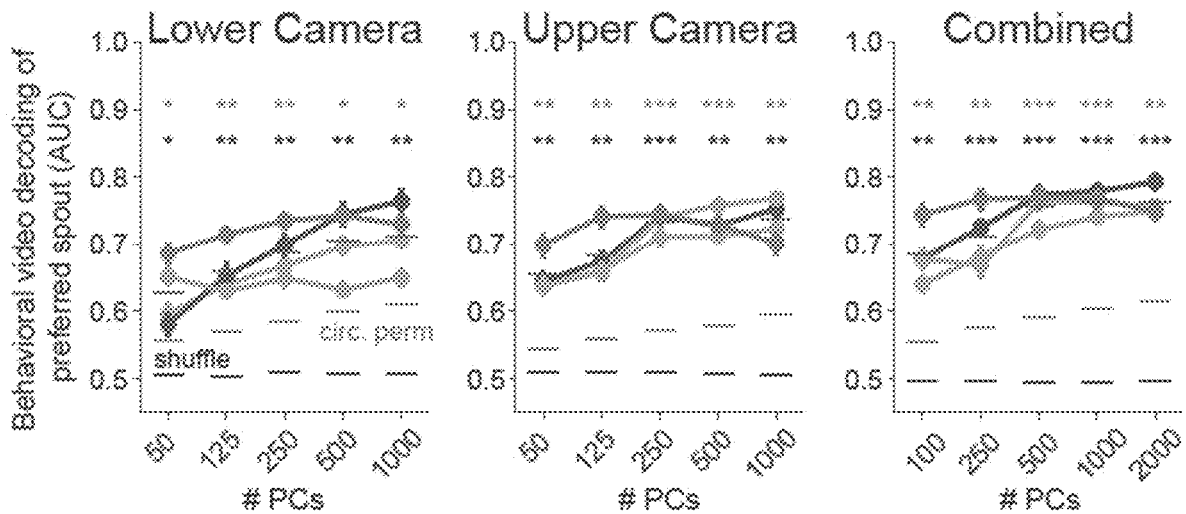
Figure 15D:
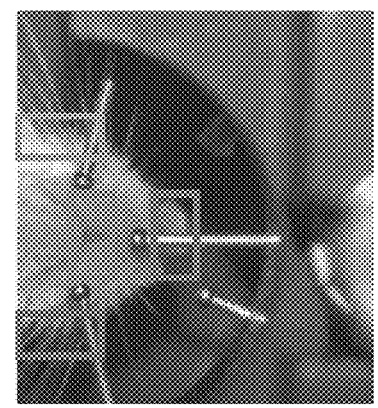
Figure 15D:
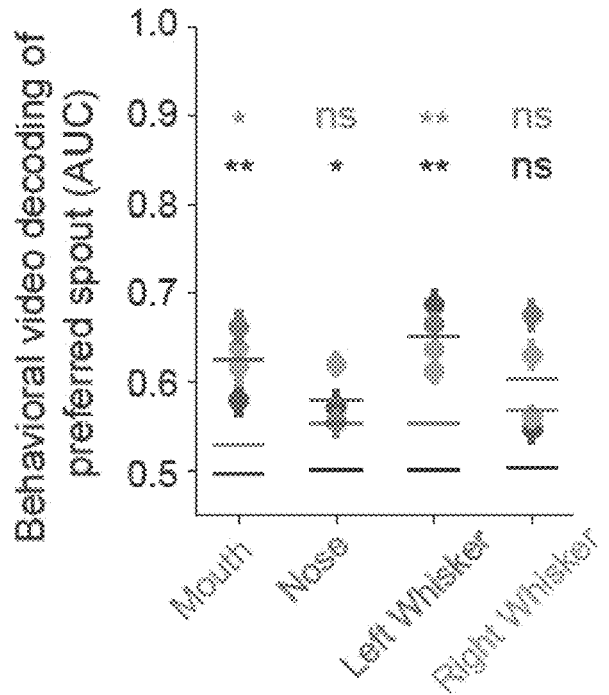

Finally, it was explored whether this ability to use neural data to predict upcoming actions might also be manifested in the visible behavior of the animal during the pre-odor period. It was attempted to decode the preferred spout using only video of behavior (200 Hz video recordings of the face and body of each animal during neural data acquisition). The preferred spout was predicted using the top 1000 principal components from each video (and then using PLS and identical training/test trials as with the neural analyses). It was indeed possible to decode the preferred spout based on behavior (corrected p<0.001 vs. shuffle, corrected p<0.01 vs. circularly permuted labels; FIG. 6G; FIG. 15A-C). By decoding using specific regions of interest, movements of the mouth and whiskers were determined to contain information about the preferred spout during the pre-odor period, despite exclusion of all trials with detected licking to spouts during the pre-odor period (FIG. 15D). Consistent with a neural representation of the upcoming spout target. distributed bodily signals well before lick onset may represent a physical readout of this neurally-maintained information.3

Figure 7A:
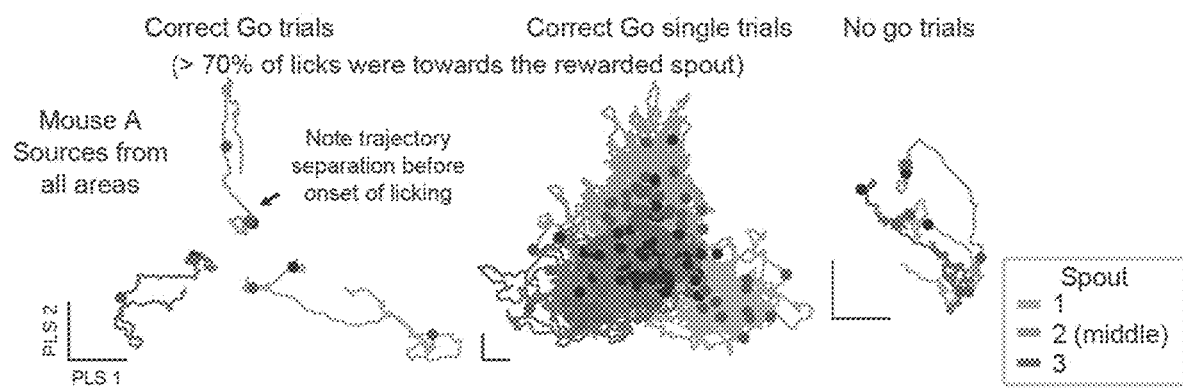
Figure 7B:
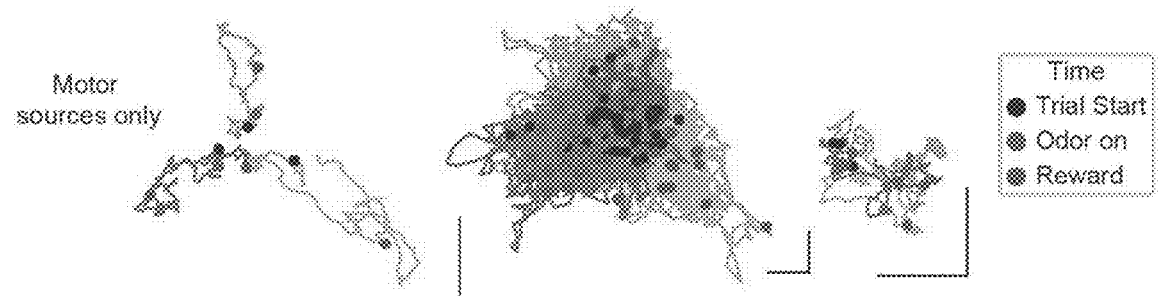
Figure 7C:
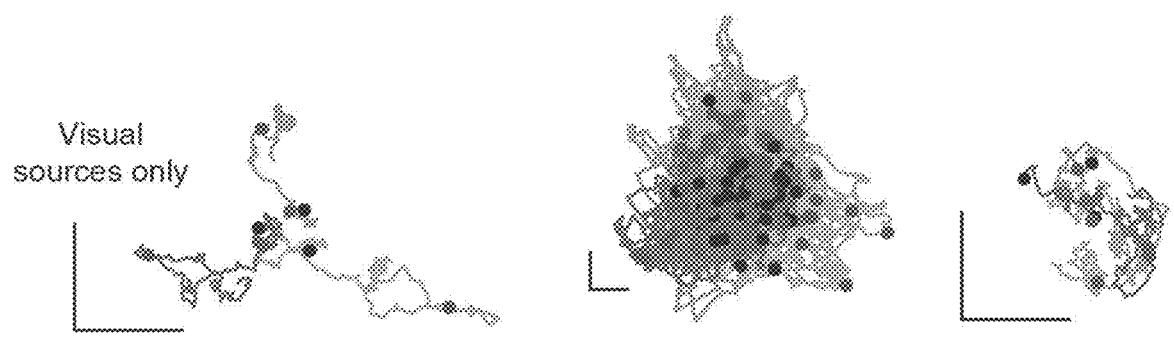
Figure 7D:
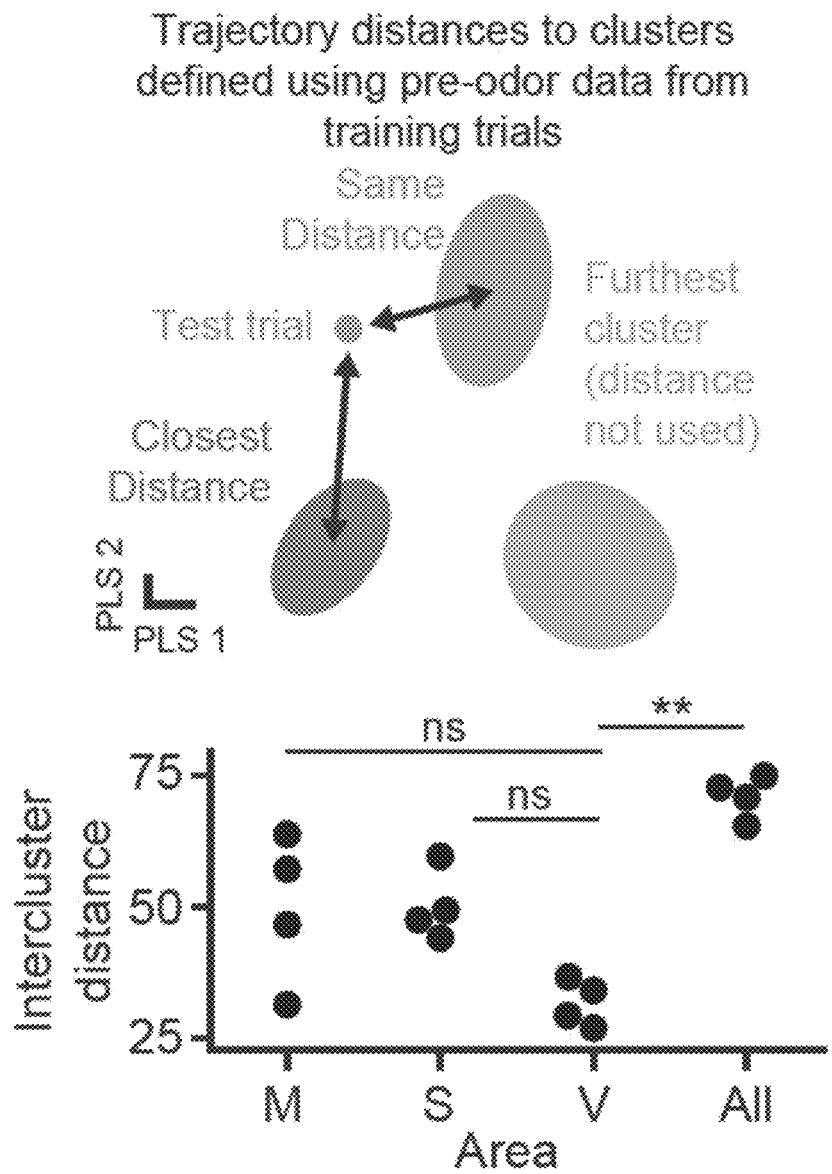
Figure 14J:
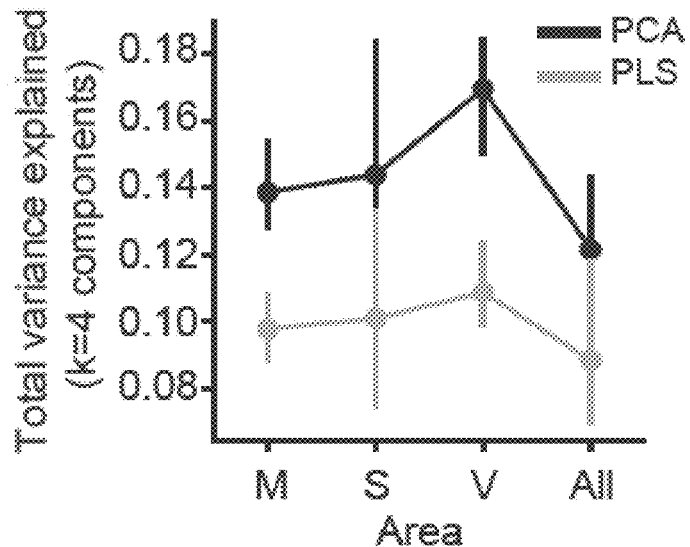

Distinct Patterns of Population Neural Activity Encode Different Motor Plans and Actions Next was examined population dynamics by projecting neural activity onto the four-dimensional PLS basis that defined the decoders disclosed herein (which was optimized to discriminate preferred spout direction, not to explain the most variance; FIG. 14J). On correct trials, trial-averaged neural trajectories were already segregated into distinct zones in state space at trial onset (black dots), before diverging further upon lick onset (using held-out "correct go" trials where >70% of all licks were toward the active spout, and thus the preferred and active spouts were always identical; FIG. 7A, left). This dynamical structure appeared reproducibly. albeit with greater noise, when examining held-out single-trial data (FIG. 7B. middle). On "no go" trials, which were indistinguishable from "go" trials before odor onset, clear separation was seen of the trial types at trial start, but trajectory differences diminished as mice forewent licking. Furthermore, qualitatively consistent dynamics were observed when repeating this analysis with neuronal sources taken from only motor (FIG. 7B) or only visual areas (FIG. 7C).

Next, the consistency across single trials of the pre-odor trajectory segregation was investigated. Pre-odor population activity occupied clusters in state space corresponding to the preferred spout on that trial (for all training trials used to define clusters, active and preferred spouts were identical). The separation distance between clusters was not the same in each area, with visual cortical clusters significantly closer than all-area clusters (FIG. 7D, bottom, corrected $p<0.05$. paired t-test vs. visual). An index was compared representing the distance from the average pre-odor position in state space of a given trial to the cluster corresponding to the preferred spout on that trial, minus its distance to the next closest cluster (FIG. 7E; see STAR Methods); negative values indicate that population activity is nearest the preferred spout cluster. "Correct go" and "no go" trials had distributions centered below zero (except for visual cortex, which was not significantly positive).

In contrast, on error trials, this trend was expected to be weakly present-if at all—as the trajectory could encode confusion or incorrect spout preference evident in the animal's subsequent behavior. "$2^{nd}$ trials" (where there was uncertainty in behavior after an active spout change, FIG. 3G) highlighted data wherein mice often lick to the wrong spout-but after demonstrating awareness of the correct spout on the preceding trial (only 50±38%, mean±s.d., of pre-reward licks on "$2^{nd}$ trials" were towards the active/correct spout, while 74%±17% of reward period licks were towards the active spout on corresponding "$1^{st}$ trials"; 37 trials pooled over 4 mice). "Incorrect go" (<30% of trial licks were towards the correct spout) and "$2^{nd}$ trials" (situations with many licks to spouts besides the active/correct one) both had distributions centered above zero. The index was significantly lower for "correct go" trials than for "incorrect go" and "$2^{nd}$ trials" (corrected $p<0.05$ or less, Mann-Whitney U test) across all cortical areas analyzed (consistent with FIG. 14I).

Figure 7E:
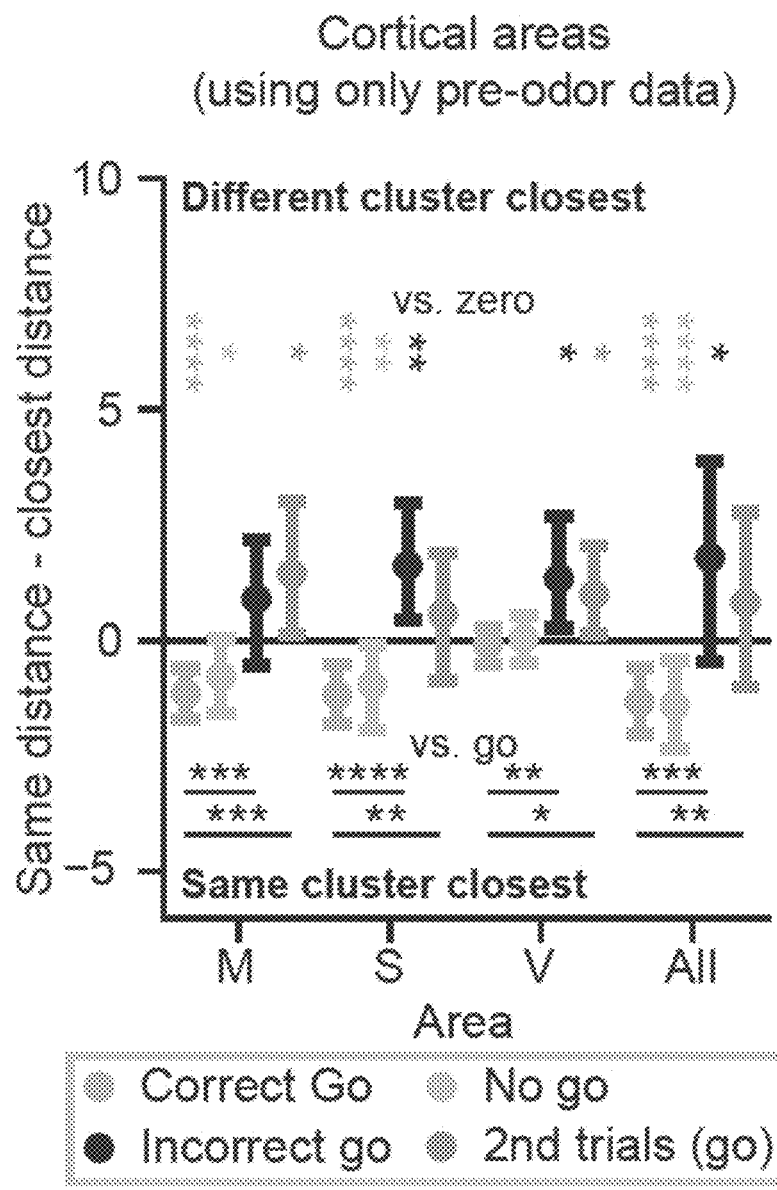
Figure 7F:
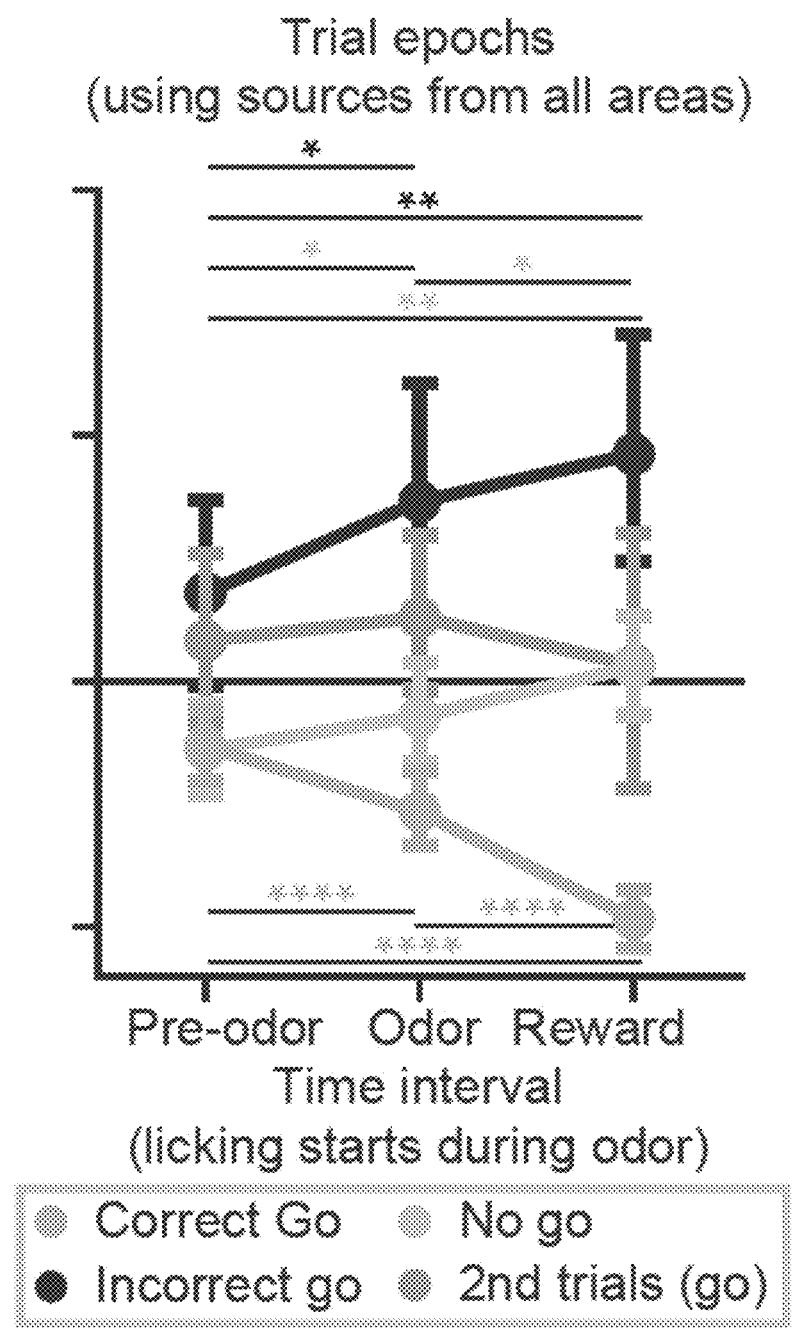

This index was tracked across time by repeating the analysis using data either following odor onset or reward onset (FIG. 7F; see STAR Methods). During "correct go" trials the neural trajectories moved even further along the direction of the preferred spout cluster (corrected $p<0.001$, Wilcoxon test vs. pre-odor). In contrast. "incorrect go" trial trajectories moved away from the preferred spout cluster as mice licked toward incorrect spouts (corrected $p <0.05$, pre-odor epoch vs. odor and reward epochs). "No go" trajectories also moved away from the preferred spout cluster as mice suppressed licking (corrected $p<0.05$ for all comparisons between epochs).

Figure 15E:
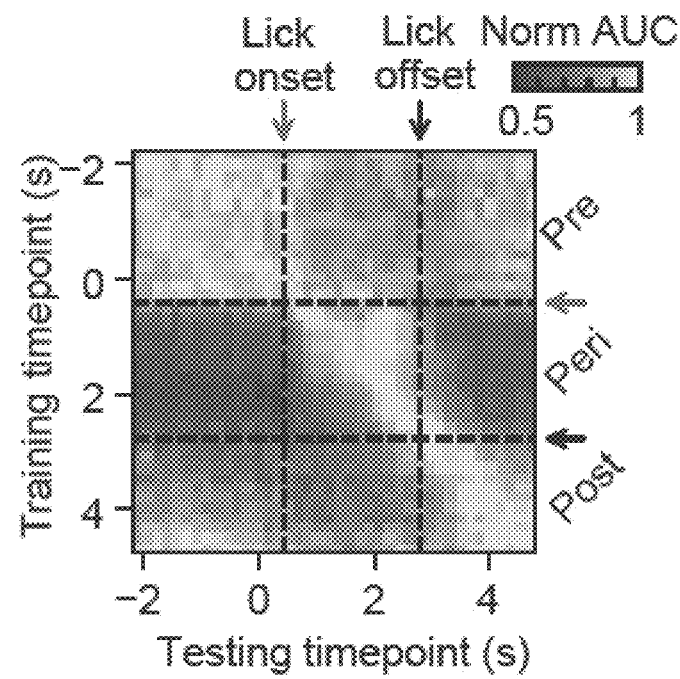
Figure 15F:
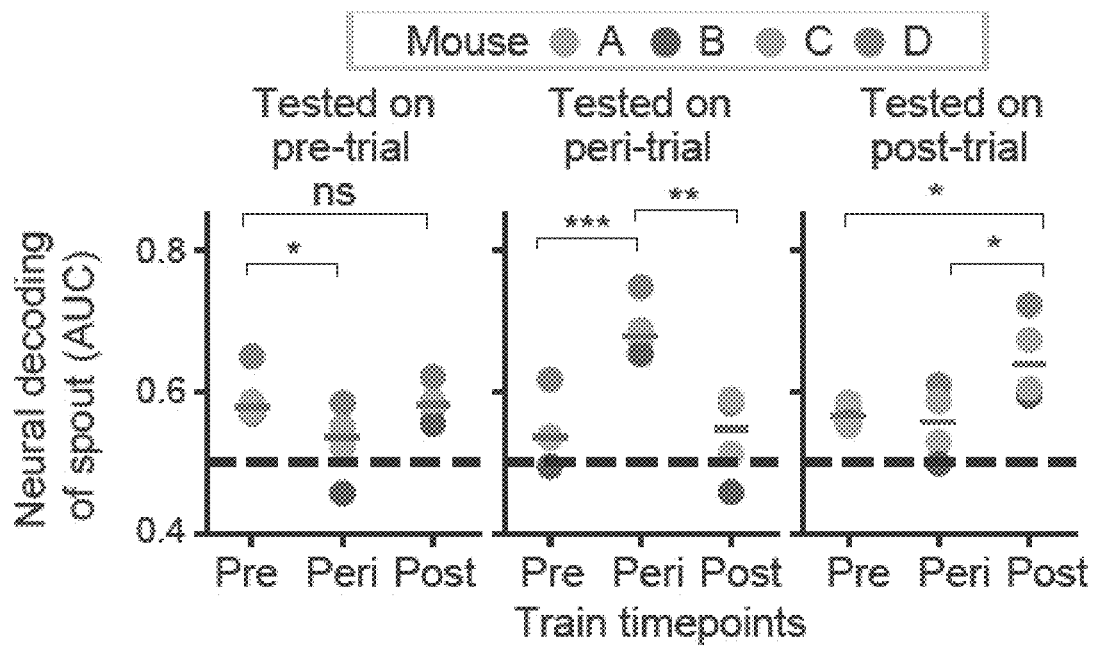
Figure 15G:
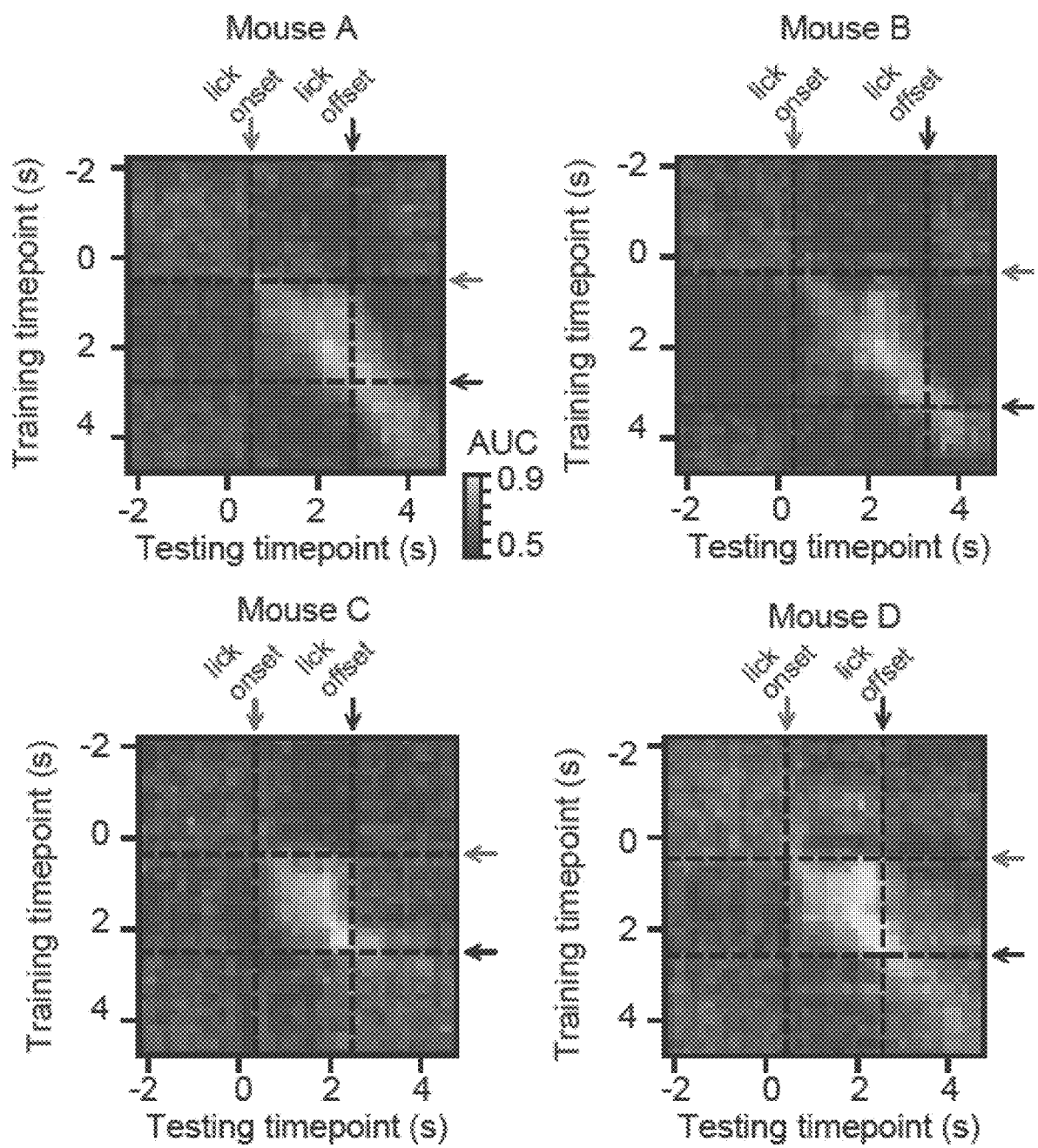

Together, these findings further support the presence of a population representation of targeted action-related motor plans across cortex. Additional analyses suggest that there is a distinction between the population representation of motor plans versus motor plan execution (FIG. 15E-G). Finally, multi-region optogenetic inhibition revealed evidence for a potential causal role of non-motor regions in motor plan execution (FIG. 16).

Discussion

Here a new technique is developed, COSMOS, for simultaneously measuring the activity of over a thousand neuronal sources spread across the entirety of mouse dorsal cortex. COSMOS is well-suited for studying population dynamics across many cortical areas, with resolution enabling recovery of sources composed of ~1-15 neurons over a centimeter-scale field of view at ~30 Hz. COSMOS was used to investigate cortical neuronal population dynamics during a three-spout lick-to-target task. Although single-trial correlations exhibit localized spatial structure, widespread populations of neurons—with no apparent mesoscale spatial structure—encode targeted motor actions and history-dependent plans on single trials.

Distributed Cortical Computation

Certain observations indicate that ongoing and planned motor actions are encoded in the joint firing of superficial cortico-cortical projection neurons (derived from the Cux2 lineage; Franco et al., 2012; Gil-Sanz et al., 2015) throughout dorsal cortex. Recent work has demonstrated that many cells throughout the brain exhibit mixed-selectivity tuning which can be driven strongly by ongoing, spontaneous movement (Allen et al., 2017; Musall et al., 2019; Stringer et al., 2019). Building upon this work, the extent to which the joint activity of many neurons together could encode targeted motor behaviors was assessed, rather than seeking to explain the activity of individual neurons based on a breakdown of contributing behavioral factors. As more neuronal sources were used for training classifiers, the ability to decode ongoing lick actions improved, a hallmark of distributed codes (Rigotti et al., 2013).

Modes of neural activity that predicted future history-guided motor actions were found. The ability to simultaneously measure the multi-unit activity of many neurons across dorsal cortex on single trials-in addition to the specific behavioral task-may account for the fact that a population was found encoding of future actions beyond frontal cortex, unreported in previous work (Steinmetz et al., 2019). Interestingly, on trials with nonselective licking, neural decoding performance for the preferred spout (FIG. 14H), and the active spout (FIG. 14I), was significantly reduced. On these trials with disorganized behavior, the mouse is potentially in a distinct brain state that does not map onto the subspace defined using correct trial data.

Certain results disclosed herein suggest that neural representations of history-guided motor plans may not be confined to cortical regions predicted to be involved in the task, at least for layer 2/3 neurons. A widespread population was identified encoding of targeted motor actions and plans, a lack of structure in the spatial distribution of trial type selective sources, and diffuse trial-averaged seeded correlations. At first glance, these results could be consistent with a non-hierarchical view of cortical computation (Hunt and Hayden, 2017)—or even with a weak version of Lashley's "law of mass action" (Kolb and Whishaw, 1988). But localized spatial structure was observed when analyzing cortex-wide single-trial correlations. There thus may be an interplay between local and global computation, whereby individual neurons intermittently encode task-related information but a reliable population code still persists (Gallego et al., 2020).

Two potential interpretations are proposed for certain observations of widespread encoding of motor plans and actions. First, information arising across cortex (itself predictive of future actions) may converge onto classical motor regions, as local "specialist" areas process and transmit disparate information streams that are integrated into a plan in motor cortex. Second, an efference-copy-like plan may be generated in motor cortex and broadcast widely, potentially as a contextual signal to aid in distributed processing or learning. In a predictive coding framework, for example, widespread motor plan encodings could contribute to a predictive signal in each region against which ongoing activity is compared (Friston, 2018; Keller and Mrsic-Flogel, 2018; Schneider et al., 2014). To distinguish between these hypotheses will likely require the ability to simultaneously record from and inhibit large regions of cortex (Sauerbrei et al., 2019), which could be built upon COSMOS.

Certain results disclosed herein also showed that upcoming licking can be decoded from gross body movements observed before the onset of licking. These predictive body movements could represent a consequence, rather than a cause, of the observed predictive cortical activity patterns (like a poker tell, or an instance where a latent brain state manifests physically, Dolensek et al., 2020). As the mouse cannot determine which spout is active by sensing the pre-odor environment, a broadcast signal could facilitate global preparation for the upcoming targeted action. Alternatively, these subtle movements could help the mouse remember the information (like a physical mnemonic), guided by centrally-derived neural activity. Distinguishing between these possibilities will require targeted manipulations, potentially by disrupting the mouse's ability to move its body (as in Safaie et al., 2019).

Imaging Large-Scale Population Dynamics

Over the past decade, one-photon $Ca^{2+}$ imaging-using widefield macroscopes or microendoscopic approaches—has seen renewed popularity due to comparative technical simplicity and compatibility with increasingly sensitive and bright genetically encoded $Ca^{2+}$ sensors (Allen et al., 2017; Chen et al., 2013; Scott et al., 2018; Ziv et al., 2013). Early microendoscopic imaging in hippocampal CA1 (Ziv et al., 2013), where sparsely active neurons are stratified into a layer only 5-8 cells thick (Mizuseki et al., 2011), provided evidence that activity signals in single neurons could be resolved. But cellular resolution does not appear to hold universally across all systems. In the birdsong system, one-photon imaging data (Liberti et al., 2016) yielded results in conflict with a follow-up two-photon imaging study (Katlowitz et al., 2018) that showed significantly more stable single-neuron representations than in the earlier work.

As certain results estimate that each COSMOS source is likely a mixture of 1-15 neurons (akin to multi-unit spiking activity), neuronal sources arising from COSMOS should not be treated as single units unless so validated. High resolution two-photon, or electrophysiological approaches would be better suited for questions that require true single-cell resolution, albeit over smaller fields of view. However, COSMOS data also exist in a regime complementary to previous methods, and as demonstrated, key population analyses that work with COSMOS cannot be performed using conventional widefield imaging data.

Much work in the realm of large-scale neural population dynamics leverages dimensionality reduction techniques that estimate a neural state vector as a linear combination of the activities of individual neurons (Churchland et al., 2012). Recent work has begun to investigate the idea that major results derived from sorted individual unit recordings can be recapitulated just as well from multi-unit activity (Trautmann et al., 2019), and likely also COSMOS data.

Indeed, as attention in systems neuroscience increasingly broadens from a focus on individual neurons to more abstract population codes (Saxena and Cunningham, 2019; Yuste, 2015), COSMOS provides a means of measuring distributed codes in genetically-defined populations of neurons across cortex—and for testing how cortical dynamics vary across diverse behaviors.

Advantages & Improvements

Faster imaging across a larger field of view with similar resolution and light sensitivity (~30 Hz over 1 cm×1 cm×1.3 mm volume). Single camera operation. Uses triplet aspherical achromatic lenses. Less expensive, and easy to assemble. Unambiguous single-cell resolution was not necessary for optical neural decoding.

Example 2—Experimental Model and Subject Details

All procedures were in accordance with protocols approved by the Stanford University Institutional Animal Care and Use Committee (IACUC) and guidelines of the National Institutes of Health. The investigators were not blinded to the genotypes of the animals. Both male and female mice were used, aged 6-12 weeks at time of surgery. Mice were group housed in plastic cages with disposable bedding on a standard light cycle until surgery, when they were split into individual cages and moved to a 12 h reversed light cycle. Following recovery after surgery, mice were water restricted to 1 mL/day. All experiments were performed during the dark period. The mouse strains used were Tg(Thy1-GCaMP6s)GP4.3Dkim (Thy1-GCaMP6s, JAX024275), Cux2-CreERT2 (gift of S. Franco, University of Colorado), Ai148(TIT2L-GC6f-ICL-tTA2)-D (Ai148, Jax 030328) (gift of H. Zeng, Allen Institute for Brain Science), B6.Cg-Tg(Slc32a1-COP4*H134R/EYFP)8Gfng/J (VGAT-ChR2-EYFP, Jax 014548), B6; 129S-Rasgrf2tm1(cre/folA)Hze/J (Rasgrf2-2A-dCre, Jax 022864), and gs7tm93.1(tetO-GCaMP6f)Hze Tg(Camk2a-tTA)1Mmay (Ai93(TITL-GCaMP6f)-D; CaMK2a-tTA, Jax 024108), all bred in a mixed C57BL6/J background. Mice homozygous for Ai148 and heterozygous for the CreER transgenes were bred to produce double transgenic mice with the genotype Cux2-CreER; Ai148.

To induce GCaMP expression in Cux2-CreER; Ai148 mice, tamoxifen (Sigma-Aldrich T5648) was administered at 0.1 mg/g. Preparation of the tamoxifen solution followed (Madisen et al., 2010). Specifically, tamoxifen was dissolved in ethanol (20 mg/1 mL). Aliquots of this solution were stored indefinitely at −80 C. On the day of administration, an aliquot was thawed, diluted 1:1 in corn oil (Acros Organics, AC405430025) into microcentrifuge tubes, and then vacuum centrifuged (Eppendorf Vacufuge plus) for 45 minutes (V-AQ setting). After vacuuming, no ethanol should be visible, and the tamoxifen should be dissolved in the oil. Each mouse was weighed, and for every 10 g of mouse, 50 μL of solution was injected intraperitoneally.

To induce GCaMP expression in Rasgrf2-2A-dCre; Ai93D; CaMK2a-tTA mice, trimethoprim (Sigma-Aldrich T7883-25G) was dissolved in DMSO (Sigma-Aldrich 472301) at 10 mg/mL and administered at 50 μg/g. Each mouse was weighed, and for every 10 g of mouse, 50 μL of solution was injected intraperitoneally.

Method Details

Optical Implementation Details

The COSMOS macroscope uses a 50 mm f/1.2 camera lens (Nikon) as the main objective. It is mounted on a 60 mm cage cube (Thorlabs LC6W), which was modified to be able to hold a large dichroic (Semrock FF495-Di03 50 mm×75 mm). It is also possible, though not optimal, to use an unmodified cage cube with a 50 mm diameter dichroic. Illumination is provided by an ultra-high power 475 nm LED (Prizmatix UHP-LED-475), passed through a neutral density filter (Thorlabs NE05A, to ensure that the LED driver was never set to a low-power setting, which could cause flickering in the illumination), an excitation filter (Semrock FF02-472/30), and a 50 mm f/1.2 camera lens (Nikon) as the illumination objective. An off-axis beam dump is used to capture any illumination light that passed through the dichroic. The detection path consists of an emission filter (Semrock FFO1-520/35-50.8-D), followed by a multi-focal dual-lenslet array which projects two juxtaposed images onto a single sCMOS camera sensor (Photometrics Prime 95B 25 mm). Raw images collected by the COSMOS macroscope contain sub-images from each lenslet, each focused at a different optical plane. The camera has a particularly large area sensor with a 25 mm diagonal extent. The lenslet array is fabricated by mounting two modified 25 mm diameter, 40 mm focal length aspherized achromats (Edmund Optics #49-664) in a custom mount (fabricated by Protolabs.com, CAD file provided upon request). To maximize light throughput as well as position the optical axis of the two lenslets such that the two images fit side-by-side on the sensor, 7.09 mm was milled away from the edge of each lenslet (using the university's crystal shop). The mount was designed to offset the vertical position and hence the focal plane of each lenslet by a specified amount—for example, 600 µm. The mount was further designed to position the camera sensor at the midpoint between the working distance of each lenslet. A small green LED (1 mm, Green Stuff World, Spain) was placed close to the primary objective such that it did not obstruct the image but was visible to the sensor and was synchronized to flash at the beginning of each behavioral trial. The point spread function was measured of each sub-image using a 10 µm fluorescent source; the focal planes were offset by 620 µm, close to the designed 600 µm.

There were a number of factors contributing to this final system design.

First, based on the simulation analyses in FIG. 9, it was determined that a multi-focal approach would yield the highest signal-to-noise ratio (SNR) across the target field of view. In particular, a dual-focal design best leveraged all of the light passing through the main objective, achieving a balance between increasing the total transmitted signal from each neuronal source and keeping the signal from each source compact. Although one obvious approach to increasing the depth of field of an imaging system is to simply close down the aperture, this comes at the cost of reducing the light throughput, SNR, and maximum spatial resolution of the system (Brady and Marks, 2011). Such a trade-off has spurred the development of multiplexed computational imaging approaches for extending the depth of field while maintaining high SNR. Computational imaging yields performance advantages specifically when the average signal level per pixel is lower than the variance of signal-independent noise sources, such as read noise (Cossairt et al., 2013). In particular, multiplexing approaches begin to fail when the photon noise of the signal overwhelms the signal-independent noise (Schechner et al., 2007; Wetzstein et al., 2013). As shown in FIG. 9, the imaging paradigm falls within the regime where computational imaging ought to be beneficial. In particular, this is due to the bright background from autofluorescence and out-of-focus fluorescence that adds significant noise to the neuronal signal.

An approach was developed suitable for the requirements of the preparation: large field of view, microscopic resolution, high light-collection, high imaging speed, and minimal computational cost. In particular, there exist a number of potentially applicable extended depth of field (EDOF) imaging techniques, including use of a high-speed tunable lens (Liu and Hua, 2011; Wang et al., 2015), multi-focal imaging (Abrahamsson et al., 2013; Levin et al., 2009), light field microscopy (Levoy et al., 2006), and wavefront coding (Dowski and Cathey, 1995). While these techniques extend the depth of field, they require deconvolution to form a final image, which is computationally expensive and, as demonstrated later in the noise analysis, also provides a lower SNR for shot noise-limited applications such as those disclosed herein. Additionally, further analyses of these techniques have demonstrated that the performance of any EDOF camera is improved if multiple focal settings are used during image capture (Brady and Marks, 2011; Hasinoff et al., 2009; Levin et al., 2009). A multi-focal imaging approach was pursued to design the system such that post-processing did not require a spatial deconvolution step.

Second, the maximum illumination power is limited, and it was therefore essential to optimize the light throughput of the detection path to achieve maximum SNR. Empirically, there was a maximum allowable illumination power density: continuous one-photon illumination intensity of around 500 mW/cm$^2$ yielded adverse effects on the mouse, including an enhanced risk of blood vessel rupture. Thus, indeterminately turning up the illumination power to increase signal is not an option, even if ultra-bright light sources exist.

Third, high image quality was required across a large, centimeter-scale field of view. When paired with the light throughput requirement, this means the optical system must have high etendue; without the use of large and extremely expensive custom optics, it is difficult to simultaneously maintain image quality and prevent light loss when passing the image through relay optics. Designs were preferred that minimized the number of optical components in the detection path. In particular, rather than demagnifying an image onto a smaller camera sensor, flexibility was gained by using a large area sensor. Furthermore, it was also problematic to use a beam-splitter approach followed by relaying images to separate cameras, in terms of light throughput, image quality, and data acquisition complexity. Not only is a multi-camera beam-splitter approach costly and complex, but the beam-splitter approach is worse than the lenslet approach: in this setup, each image from the beam-splitter shares light that passed through the same central region of the aperture of the main objective; on the other hand, each lenslet image uses light that passed through one of two non-overlapping regions of the aperture of the main objective. Thus, for a given depth of field of each sub-image, and consequent f/# of either the lenslet or post-beam-splitter relay optics, each lenslet image will receive twice as much light as compared with the each beam-splitter image. Finally, because the lenslets themselves are physically large, aberrations (geometric and chromatic) induced by the lenslets should be considered. For microlenslets, this is less of an issue and is often ignored. The easiest, most cost-effective, and most reproducible way to fabricate high performance lenslets is to leverage the design of commercial off-the-shelf aspherized achromats. With minor machined modifications to existing optics, it was possible to produce lenslets with the right physical dimensions while maintaining the high performance associated with aspheric optics. In the end, the image quality and light throughput of each lenslet image was on par with an image from a simple macroscope with equivalent aperture-size (as shown in FIG. 1G, H); the multi-focal design is thus uniformly better than the conventional approach. Note that to generate FIG. 1H, the two focally offset sub-images (in Photoshop, Adobe) were manually merged. This was the only instance in which the image data needed to be merged; for all other processing, each sub-image was processed separately and then merged the extracted neural sources.

The resolution of certain systems disclosed herein was characterized in FIG. 9N, and was found to be sufficient for the application. The resolution of the system would likely be improved with smaller pixels; at the time of development, the only sCMOS camera available with a large enough sensor and fast enough framerate had 11 μm pixels, which with the magnification of the exemplary system yields pixels that sample from 13.75 μm in the specimen. However, the current resolution is likely acceptable for a number of reasons. First, cortical neuron somas are around 10-20 μm in diameter; with scattering, the point spread function of each neuronal source is further enlarged. Second, the current labeling strategy also labels dendrites, which serves to further increase the spatial spread of each source. Third, although an increased resolution could potentially help in distinguishing nearby sources, because of scattering it is unlikely that a slightly increased resolution would fundamentally change the data. Fourth, an increased resolution would lead to larger dataset sizes and consequent processing times without a concomitant increase in capability. Nevertheless, future improvements in the design will likely harness increased resolution. In particular, the most immediate improvements to the system could be achieved by using a custom primary objective with larger numerical aperture, or a camera with a larger or higher resolution sensor. Additionally, use of structured illumination is a viable route for potentially reducing the effect of scattering and for increasing the ability to discriminate between nearby sources.

Neuronal Source Extraction Pipeline

The first step of processing raw videos collected on the COSMOS macroscope was to load the video (i.e. image stack) into memory from a remote data server, followed by cropping and then saving out to a local workstation separate image stacks for the top-focused and bottom-focused regions of interest (ROI). Rigid motion correction was used to each lenslet sub-image independently. Each ROI was motion corrected with a translation shift that was computed using the peak in the autocorrelation of a few sub-ROIs relative to the first frame in the stack. The motion correction was tested by plotting the maximum shift associated with additional test sub-ROIs, as well as manually inspecting each video, to ensure that motion throughout the video is smaller than 1 pixel in radius and that there are no large nonrigid movements. A proper surgery and rigid head fixation were adequate to maintain image stability.

Motion corrected stacks were then processed using Constrained Nonnegative Matrix Factorization for microendoscopic data, implemented in MATLAB (CNMF-E; Zhou et al., 2018). This algorithm is an improved version of the original CNMF (Pnevmatikakis et al., 2016), which has been modified primarily to incorporate better background subtraction, specifically for one-photon data. This background subtraction is very important for COSMOS data, since one-photon widefield recordings can be contaminated by large scale fluctuations in blood-flow related fluorescence modulation (Allen et al., 2017). Importantly, since signal was extracted from sparse point sources, it is possible to separate the spatially broad background fluctuations from the more spatially compact neuronal signals—this was not the case in previous widefield preparations such as (Allen et al., 2017). In particular, the CNMF-E algorithm excels at this background removal. As parameters for CNMF-E, a ring background model was used, with a 21-pixel source diameter initialization. For initializing seed pixels, a minimum local correlation of 0.8 was used, and a minimum peak-to-noise ratio of 7. To analyze a 60,000-frame dataset, on a workstation with 512 GB of RAM, 7 cores can be used in parallel without running out of memory. With less available RAM, the number of parallel cores must be correspondingly scaled down. Since the algorithm is factorization based, the time for processing a dataset depends on the number of neuronal sources and the length of the video. Processing the top-focused and bottom-focused videos for a 60,000-frame dataset (equivalent to a 30-minute recording) requires about 36 hours in total. There are a number of paths to making this more efficient in the future: multiple workstations could be used to separately process the top-focused and bottom-focused videos; source extraction could be run only on the in-focus regions of the top-focused and bottom-focused stacks; and the improved background removal of CNMF-E could be applied to OnACID, an online version of the original CNMF algorithm that has demonstrated real-time processing speeds (Giovannucci et al., 2017). While all processing and analysis code for this project was written in Python, to use the MATLAB implementation of CNMF-E was elected because, as of the time when the data analysis pipeline was implemented (in early 2018), the CNMF-E implementation in Caiman (Giovannucci et al., 2019) returned inferior results because it only initialized neural components with the full CNMF-E background model and then performed iterative update steps using a simpler background model.

Once CNMF-E has extracted neuronal sources (i.e. their spatial footprints and corresponding denoised time series) from the top-focused and bottom-focused videos, the best in-focus sources were merged from each focal plane, while ensuring that no sources were double counted by finding a classification line that spatially segmented the in-focus region of each sub-image. First, using a pair of manually selected keypoints, easily selected just once per dataset, the top-focused and bottom-focused coordinate systems was aligned. Then, in a semi-automated manner, a separation curve was drawn for each cortical hemisphere, such that on one side of the separation curve sources extracted from the bottom-focused plane were use, and on the other side of the curve sources from the top-focused plane were used. This curve traces out the crossover in focus-quality between the two focal settings along the curved cortical surface. Due to different positioning and tilt of the headbar, these curves are not always in the same location across mice, even if the implanted glass window has identical curvature. Here, the radius of the source spatial footprints was use as a proxy for focus-quality across the field of view.

After merging sources from the top-focused and bottom-focused videos, the quality of each source was verified. First, for each source the deconvolved trace returned by CNMF-E was ensured to have a correlation of at least 0.75 with the corresponding non-deconvolved trace. The deconvolution algorithm assumes that the traces are generated by GCaMP, with a fast onset and a slow, exponential decay. Thus, any sources for which the deconvolved trace does not match the raw trace are likely not GCaMP signal. Second, all remaining traces were manually inspected, only keeping sources that are not located over blood vessels, that have radially symmetric spatial footprints, or that have a high signal-to-noise ratio.

This process provides confidence that high-quality sources with minimal contamination were used. Finally, the atlas was manually aligned to each dataset based on the intrinsic imaging alignment assay, such that sources from all mice are situated in the same coordinate system.

Comparison of COSMOS with Conventional Macroscope

One mouse with good GCaMP expression and a clear window was used for this experiment. Over one hour, three independent videos each of 1800 frames were recorded at each macroscope setting: f/1.2, f/2, f/2.8, f/4, f/5.6, f/8, as well as with the detection lens replaced by the multifocal lenslet array. The mouse was awake but was sitting in a dark and quiet environment while not performing any behavioral task. The recordings for each macroscope setting were interleaved with one another throughout the session, such that recordings of the same setting were not captured sequentially, to mitigate the impact of any changes in the mouse's behavioral state. The intensity of the excitation light at the sample remained constant throughout the experiment. In particular, changing the detection aperture setting did not alter the illumination, as the aperture was only changed on the detection lens as opposed to on the primary objective. The videos were processed using the same neuronal source extraction pipeline used throughout this paper, with identical parameter settings. During manual quality inspection and culling of the recovered sources, the operator was blinded to the macroscope setting of that video.

The COSMOS macroscope outperformed a comparable conventional macroscope in terms of depth of field while maintaining equivalent light throughput. The fidelity and depth-of-field of an image captured with a f/2 macroscope was qualitatively compared to an image generated by merging the lenslet sub-images. Whereas a conventional macroscope offered nearly zero contrast at the lateral edges. the COSMOS macroscope provided good contrast laterally with only slightly reduced contrast medially. Light throughput of each lenslet was the same as that of a standard macroscope with the aperture set to f/2. and the light from defocused emitters was not diminished by vignetting.

The resolution of COSMOS was characterized using two approaches. The point spread function was acquired using a 10 μm precision pinhole (Thorlabs P10D) atop a fluorescent slide (Thorlabs FSK5, green). Additionally, an image was acquired of a USAF 1951 resolution chart (Thorlabs R3L3S1N) atop a fluorescent slide.

Intrinsic Imaging for Atlas Alignment

Based on (Garrett et al., 2014; Juavinett et al., 2017; Nauhaus and Ringach, 2007), a macroscope was constructed using two back-to-back 50 mm f/1.2 F-mount camera lenses (Nikon), mounted using SM2 adapters (Thorlabs), and an sCMOS camera (Hamamatsu Orca Flash v4.0). A 700/10 nm optical filter (Edmund Optics) was inserted between the lenses. Illumination was provided using a fiber-coupled 700 nm LED (Thorlabs M700F3) that was positioned for each mouse so as to maximize coverage of the left posterior region of cortex (contralateral to the right visual field). A small green LED (1 mm, Green Stuff World, Spain) was inserted after the optical filter and was synchronized to flash for 30 ms at the beginning of every trial. Mice were lightly sedated using chlorprothixene (Sigma-Aldrich C1671-1G, 2 mg of chlorprothixene powder in 10 mL of sterilized saline, administered 0.1 mU20 g per mouse), and inhaled isoflurane at 0.5% concentration throughout the acquisition session. Mice were visually monitored during the session to ensure that they were awake.

The visual stimulus was generated using PsychoPy. Based on (Zhuang et al., 2017), it consisted of a bar being swept across the monitor. The bar contained a flickering black-and-white checkerboard pattern, with spherical correction of the stimulus to stimulate in spherical visual coordinates using a planar monitor (Marshel et al., 2011). The pattern subtended 20 degrees in the direction of propagation and filled the monitor in the perpendicular dimension. The checkerboard square size was 20 degrees. Each square alternated between black and white at 6 Hz. The red channel of all displayed images was set to 0, to limit bleed-through onto the intrinsic imaging camera. To generate a map, the bar was swept across the screen in each of the four cardinal directions, crossing the screen in 10 s. A gap of 1 s was inserted between sweeps, resulting in repetition period of 11 s. Owing to the large size of the stimulus monitor, a spherical warping transformation (PsychoPy function psychopy.visual.windowwarp) was also used to simulate the effect of a spherical display using a flat monitor.

Figures 10A, 10B:
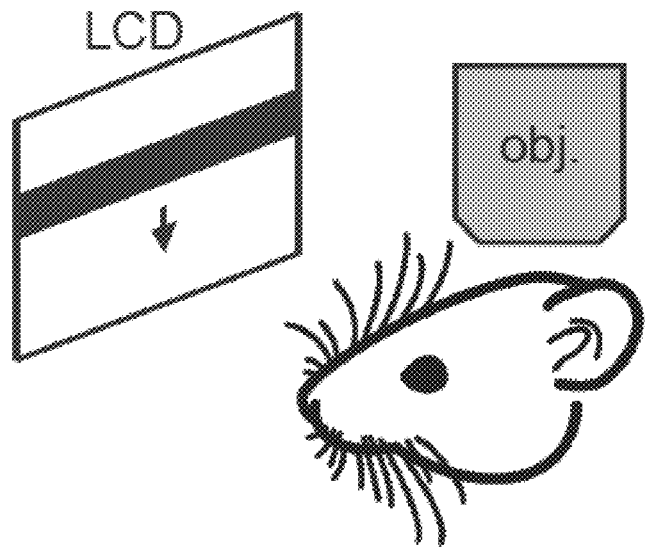
Figure 10C:
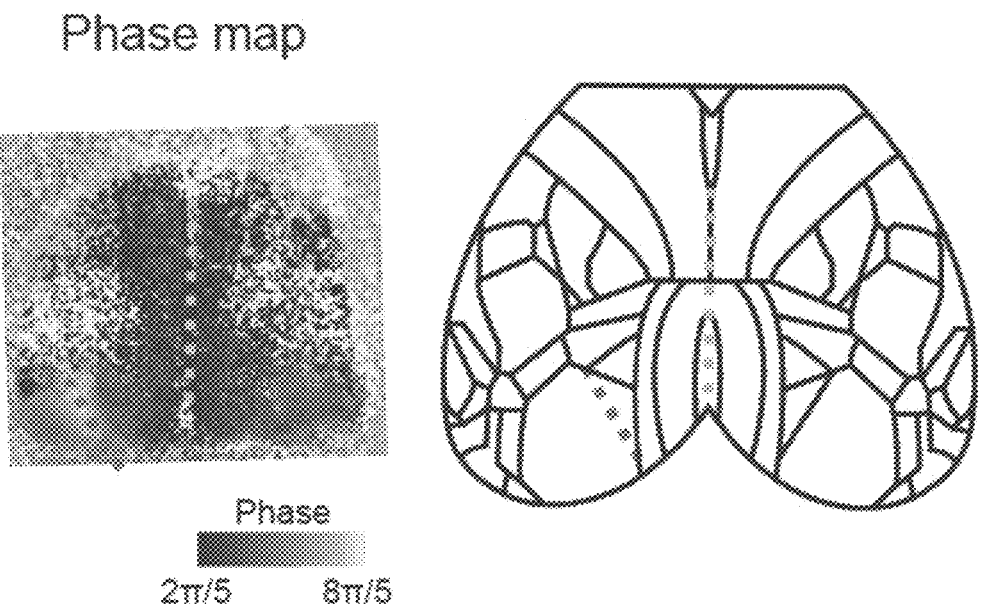
Figure 10D:
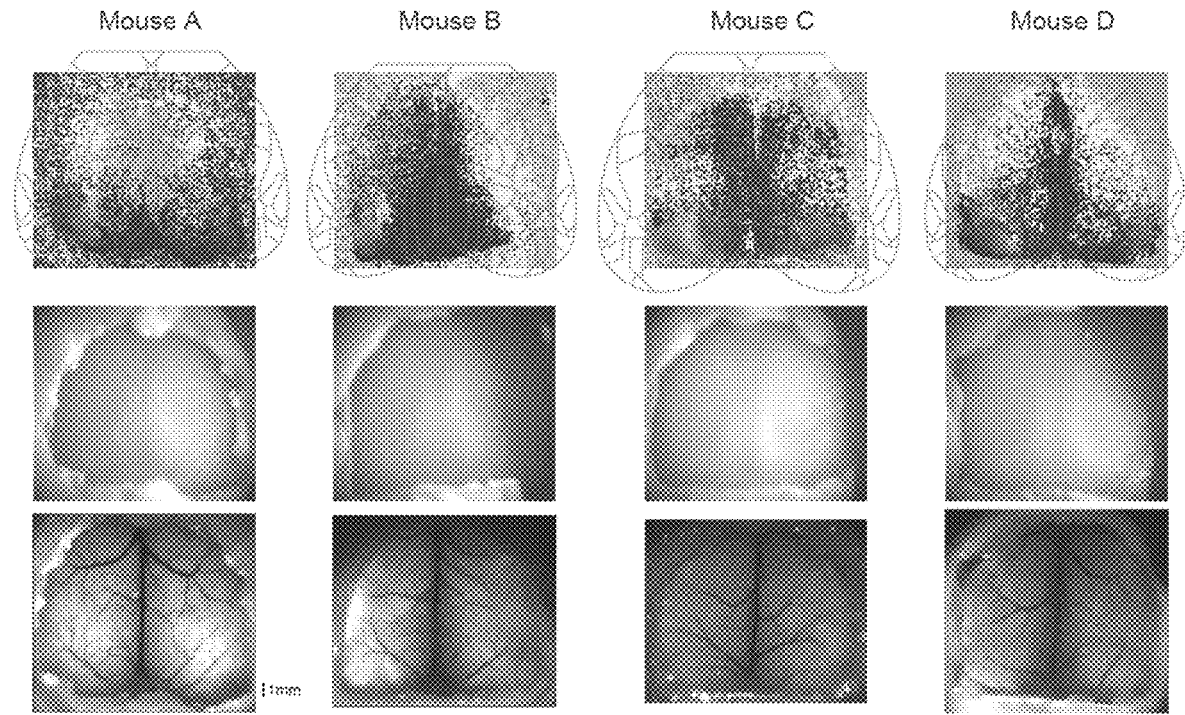
Figure 10E:
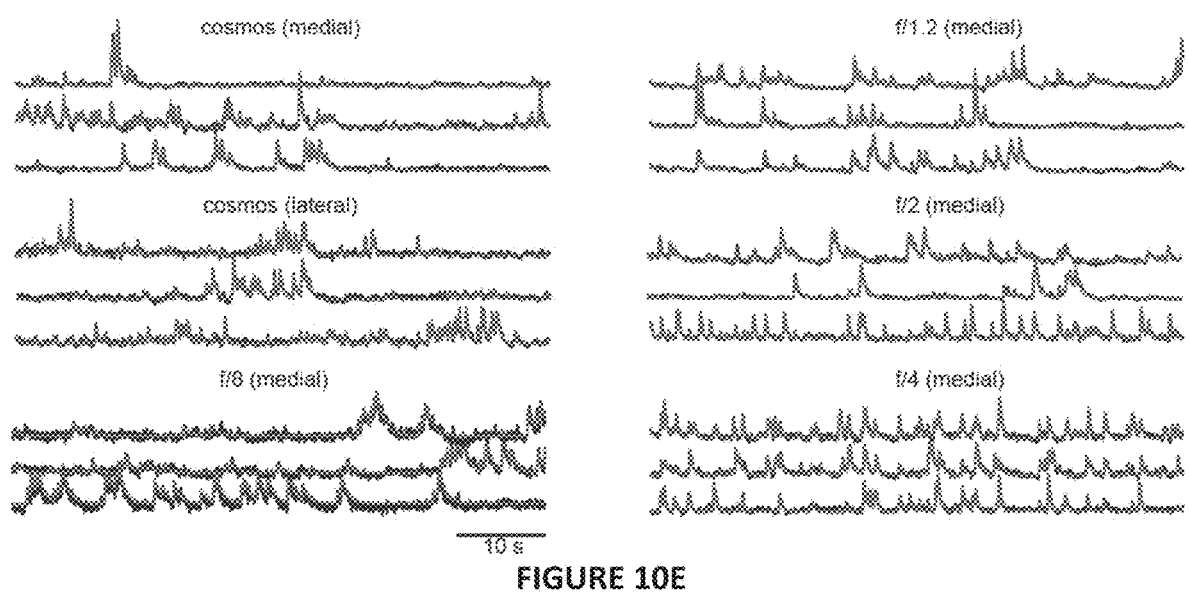

Finally, a protocol was developed for aligning a standardized atlas (Lein et al., 2007). shown in FIGS. 2J and 10C-D. to each recorded video. The retinotopic sign reversal that occurs on the border between visual areas VI and PM (Garrett et al., 2014) was used. Optical intrinsic imaging was used to record low spatial resolution neural activity in response to a drifting bar visual stimulus (Garrett et al., 2014; Juavinett et al., 2017) yielding a clear border between visual regions that can be computationally processed to define a phase map indicating the V1/PM border (Supplementary Video 3). This landmark, in combination with the midline blood vessel can be used to scale and align the atlas to each mouse (FIG. 10C). In FIG. 10D, the atlas alignment is provided for all mice in the cohort. Intrinsic imaging was used since, due to the sparsity of the cellular labeling in the Cux2-CreER mice. GCaMP imaging did not provide a spatially smooth enough signal to extract a phase map.

150 repeats of the stimulus were performed. This number of repeats is higher than previous reports likely due to the 10× smaller pixel well capacity of the camera (5e4 electrons, compared with the 5e5 electron well depth of the Dalsa Pantera 1m60 used in (Juavinett et al., 2017; Nauhaus and Ringach, 2007), and subsequent increase in the minimum variance of photon shot noise.

The computer monitor was oriented at 60 degrees lateral to the midline of the mouse, tilted down 20 degrees, and placed 10 cm away from the right eye. Tape was placed around the around the headbar to prevent the mouse's whisker and body from entering the imaging field of view. The mouse and microscope were covered with black cloth to occlude any external visual stimuli. Video was recorded at 20 Hz with 2×2 pixel binning, with an effective pixel size of 13 μm at the sample. These acquisition parameters trade off dynamic range with dataset size. Illumination was adjusted to fill the dynamic range of the camera.

To process the video, it was first scaled down by a factor of 2 in x, y, and t dimensions. Trial start frames were extracted using the flashes from the synchronization LED. Trials of the same orientation were averaged together into an average video. In this average video, one should be able to see a bar propagating in one direction across V1 and a second bar propagating in the opposite direction across AM. A phase map was computed from this video by, for each pixel, finding the frame when the signal reached its minimum (corresponding to maximum hemodynamic absorption when the visual stimulus passes within the retinotopic field of view of that pixel). A 2D top-projection atlas was generated from the annotated Allen Brain Atlas volume, version CCFv3 (Lein et al., 2007), in MATLAB (MathWorks). The atlas was aligned to the phase map based on the location of the border between V1 and AM, and the midline. By aligning the intrinsic imaging field of view to the COSMOS field of view using landmarks along the edge of the window, the atlas could then be aligned to the COSMOS recordings.

Visual Orientation Selectivity Assay

Sinusoidal visual gratings were presented to mice under the COSMOS macroscope using a small 15.5 cm×8.5 cm (width×height)-sized LCD display mounted horizontally on an optical post (ThorLabs). The monitor (Raspberry Pi Touch Display) was centered 7.5 cm in front of the left eye of the mouse (at a 30° offset from perpendicular with the center of the eye). Contrast on the display was calibrated using a PR-670 SpectraScan Spectroradiometer (Photo Research). Significantly, this orientation of the monitor stretched across the midline of each animal and thus delivered some visual stimulation to both eyes. To block stray stimulation light from reaching the cranial window on the mouse, a light-blocking cone was attached that was designed to attach to the head bar of each animal (FIG. 9K).

Gray sinusoidal grating stimuli were generated using PsychoPy (running on a Raspberry Pi 3 Model B). Eight stimuli (separated by 45°) were successively presented to each mouse (4 seconds per stimulus, with a 4 second intertrial interval). Each stimulus was presented five times, each time in the same order. The spatial frequency of the grating pattern was 0.05° and its temporal frequency was 2 Hz.

Comparison of COSMOS with Two-Photon Imaging

The same three mice that had their visual responses characterized using drifting gratings under the COSMOS microscope were also imaged beneath a two-photon microscope (Neurolabware). Data were obtained at 30 Hz using an 8 kHz resonant scanner. A Nikon CF LWD 16× water dipping objective (Thorlabs N16XLWD-PF) was used with clear ultrasound gel used as an immersion medium (Aquasonic, Parker Laboratories) between the surface of the cranial window and the objective itself. Following motion correction using moco (Dubbs et al., 2016), activity traces were extracted using the standard CNMF algorithm implemented the February 2018 version of Caiman (Giovannucci et al., 2019).

An identical visual stimulation system (the same model computer and display) was used with the two-photon microscope as with the COSMOS microscope. The display was calibrated to use the same contrast settings and the computer was loaded with identical stimulus code. Because the whole visual stimulation apparatus was mounted on an optical post, alignment relative to the mouse was similar in both settings.

The results from this characterization reveal that the present preparation affords an intermediate, complementary level of resolution relative to other techniques. A field of view was accessed equivalent to existing widefield techniques, but with greatly improved near single-neuron-scale resolution; and recording was done with reduced single-neuron detection ability compared with two-photon microscopy, but across a much larger field of view. The details are described in the "Source Mixing Model," in the methods section.

Robotic Surgery Protocol

Following (Kim et al., 2016), a curved window was implanted over dorsal cortex. The dimensions of the window are described in FIG. 8. The window was fabricated by first having glass blanks cut to the specified dimensions (TLC International) as shown in FIG. 8, and then curved to the specified radius (Glaswerk).

A semi-automated protocol was developed for performing consistent large area craniotomies, which is one of the most crucial steps of the surgery. A computer-controlled drill and motorized stereotactic system (Neurostar GmbH, mounted on Kopf Model 900) was used.

In FIG. 8E-J, the state of the craniotomy was shown at key steps during the surgery. In FIG. 8C are the coordinates of the keypoints used for defining the drill path, as well as the approximate skull thickness at each location across mice. The keypoints (yellow) and interpolated drill positions (blue) are shown graphically in FIG. 8B. In FIG. 8D is a photograph of the robotic drill and the vacuum mount used for positioning the window implant (a 20-gauge needle with the sharp tip removed using a saw).

The surgical protocol is as follows:

Anesthetize mouse with isoflurane (3%, adjust to 1.5% after mouse is unconscious).

Position mouse on stereotaxic bite bar, do not engage earbars. Ensure mouse is breathing consistently and is unresponsive to toe pinch. Turn down the isoflurane to (1.5%).

Sterilize the skin and hair with an alcohol pad and cut off at least 1cm diameter circle of skin on the top of the head.

Secure mouse tightly with the ear bars. Push the skin down (i.e. with a cotton swab) while positioning the ear bars, such that the ear bars are in direct contact with the muscle, and the skin is fully out of the working area. Level the mouse.

Clean off and dry the skull completely. Use back side of cotton swab stick to pull back muscle on the posterior left and right corners.

Apply eye ointment to both eyes.

Clean the copper grounding clip connected to the Neurostar drill (i.e. with an alcohol wipe-you want to make sure there will be good conductive contact), and clip it to the skin on side of the skull and position the clip such that the clip is out of the way. Ensure there is a good connection with the moist underside of the skin. Ensure the clip is not in contact with the ear bars.

Open the Neurostar software. Tools→Project→New project. If you have previously used the same drilling coordinates that you will use for this surgery, you can 'Select a template project', and check the box 'Keep Protocol elements'.

Use flat drill bit (Neurostar). This facilitates drilling along the curved lateral edges of the skull. A standard spherical drill bit may work, but not as well.

In the Neurostar software, open Tools→Correct for Tilt and Scaling.

Find and set bregma for the drill (Ensure that 'Drill' is selected. See Neurostar documentation for navigation directions. Arrow keys and pg-up/pg-down control drill movement). Do not set lambda (this will rescale the window coordinates, which is undesired because the window is of fixed dimensions). Ensure that midline is straight, parallel to the anterior-posterior axis of the drill. Ensure that angle of stereotax is set to 0. Ensure that anterior blood vessel (between the olfactory bulb and prefrontal cortex) is no closer than +3.25 AP. Adjust bregma if this is not the case. Ensure that −4.90AP looks reasonable at the back (i.e. it should be slightly behind the lambdoid suture).

Open drill menu. If you have never input the drill keypoint coordinates, then do so at this time (see Neurostar documentation for more detail). Press Ctrl+Shift+D so you can see details about the seed points. Turn on auto-stop.

Press F6. Turn 'auto-speed' on.

Go to next seed. Manually move the drill until it is touching the surface of the skull. Click 'set surface.' Press the ADVANCE button to advance the drill in 50 μm steps slowly until the conductance drops. Pause between each advance to ensure that the skull has time to settle. Click 'set dura.' Repeat. Note: The first depth should be between 300-600 μm. If autostop is not working (which sometimes happens), then there are other ways to determine whether you have drilled deeply enough. These include: observing bleeding (this means you probably drilled slightly too far); listening for the drill to not be going through bone anymore—there is a subtle but detectable difference in the sound of drilling through bone versus past the bone; and drilling to within the range of average thickness for that seed point location.

Ensure the auto cut edge-scaling is set to the second highest setting.

Inject 0.5 mL saline subcutaneously.

Press 'autocut.' Check for bleeding during autocutting. If there is significant bleeding at any point, pause autocutting and use Gelfoam (Pfizer) soaked in saline to stop the bleeding.

After autocut is finished, ensure that each location has been drilled through. You can right click on a point and select go-to drill depth, and then manually advance from there. The skull flap should be detached all the way around—lightly touching near each edge with a scalpel or needle should cause the skull flap to move.

When skull is detached fully, you can move the drill out of the way, to coordinates AP 35, ML 25, DV −35.

Apply a generous amount of saline to the skull. Clean away any hairs.

Inject mouse subcutaneously with 1 mL of saline.

Pull off the skull flap in one go, pulling up and away. Be sure to get a good grip using forceps and grab on the left posterior corner. In order to get a grip with the forceps, with the other hand, use a syringe filled with saline to lift up the skull flap, while simultaneously injecting saline. As a layer of saline begins to float the skull flap, grab it with the forceps and after ensuring a tight grip, pull the skull flap off in one motion. This is the most difficult and variable part of the surgery to do consistently and may take some practice. There will be bleeding. However, the blood should all be above the dura and can be cleaned with a Sugi absorption spear. The key thing to look for here is that the dura is intact and not folded over. If the dura is indeed intact, then you can spend time cleaning up the blood before implanting the window. This cleaning step can take tens of minutes, especially if you are waiting for the bleeding to stop. If the dura is not intact, then you can attempt to unfold it, however the likelihood for a successful surgery is lower.

Wash with saline. If you ever touch a Sugi spear to the brain, first ensure that is wet (dip it in saline first).

Submerge a Sugi spear in saline so that it is fully wet (dripping wet) and use that to wipe off blood on the surface of the brain. Keep the brain wet and be gentle.

When blood is clear from the brain surface, mount the window on the vacuum holder. The vacuum holder consists of a needle (16-20 gauge) with the sharp tip drilled off. The needle is connected to a vacuum tube and mounted on the robotic stereotax. Using a syringe, drip saline onto the bottom of the window so that there is saline between the window and brain, and slowly bring the window down from above (You can press F6→Change the DV speed to something small such as 10 μm/s).

Push the window down so that all accessible parts of cortex contact the window. If you do not push down far enough, then a number of bad things can happen: the brain will move when the animal moves, leading to motion artifacts; there will be tissue growth between the window and brain over time; and Vetbond glue (3M) may seep under the window during the next step of the surgery. If you push down too far, however, then you may cut off blood supply through the central blood vessel. Ensure that the blood flow is not restricted (the vessels should not lose color).

When the window is held down successfully, pause for a minute to ensure that no bleeding begins. If bleeding does begin then there are two options: either remove the window, clean things up, and wait for the bleeding to stop; or raise the window slightly and inject saline under the window while using a Sugi to draw the water and blood out of the other side of the window. Once the window is in place with no bleeding, then dry the tissue/bone surrounding to the window (while ensuring that you do not dry up the water layer between the window and brain) and apply Vetbond around the edges of the window. Do not use too much Vetbond, as it will then take longer to dry. Ensure that no Vetbond is seeping under the window: if it is, then push the window down further.

Once the Vetbond has dried, apply Metabond (C&B, Parkell). At this step, it is key to ensure that there is a very good bond with the front of the skull. In particular, be sure that the bone anterior even to the olfactory bulb is visible, accessible and dry. You can additionally use a surgical blade to score the surface of the skull to provide additional surface area for bonding cement. If this bond is not good, then when the mouse is first head mounted, the head bar and window may detach.

After the cement dries, if mouse is doing okay, you can optionally attach the headbar using additional Metabond. This step can also be performed in the future (i.e. a few days later) after the mouse has had a chance to recover.

Inject mouse with saline and painkiller (buprenorphine).

Immediately after surgery, there should ideally be no big blood splotches, and in general the window should be clear. This does not guarantee that the window will remain clear, and there is a chance that window gets worse. However, sometimes if there is some blood in the window it may actually clear up. The key to at least having a chance for a good, clear window, however, is that the dura is intact and not folded over—it will be impossible to image through areas with a damaged dura, and this will not heal with time.

Animal Behavior Hardware

As in (Allen et al., 2017), a microcontroller-based real-time behavioral system (Sanworks, Bpod State Machine r1) was used to control delivery of stimuli and water reward. Three independent waterspouts (Popper animal feeding needle, 22 gauge, 1.5" length, Lab Supply Outlaws part #01-290-2B) were arranged using a custom mount (fabricated by Protolabs.com, CAD file provided upon request), positioned at 75 degree intervals, with the tips of the spouts aligned along a circle of radius 5 mm (determined by an appropriately sized drill bit). Licks were detected independently for each spout, with a lickometer built using a capacitive touch sensor (Sparkfun Tinkerkit) and a microcontroller (Arduino Uno). Water was delivered by a gravity-assisted syringe attached to the lickometer and controlled by a quiet solenoid valve (Lee Valve LHDA1231115H). For olfactory stimuli, an olfactometer was constructed using pure odorants (ethyl acetate and 2-pentanone, Sigma) diluted to 4% v/v in paraffin oil (Sigma) and pressurized with air (1 L/min). Two 3-way valves (NResearch #161T031) controlled odor delivery, with the normally open port connected to a blank vial and the normally closed port connected to an odor vial. Odor delivery was controlled by actuating solenoid valves to switch airflow away from a blank valve and to the odor valve. Odors were delivered through a Teflon tube (NResearch, #TBGM109 with #102P109-10 connectors), placed ~1 cm from the mouse's nose.

Two cameras (Basler acA1300-200uc), one with a 25 mm lens (Edmund Optics #59871), and the other with a 4.5 mm lens (Edmund Optics #86900), were positioned below the mouse to monitor its tongue and whiskers and to the side to monitor the face and body, respectively. Video acquisition was performed using custom software (Python, using pypylon). A small green LED (1 mm Green Stuff World, Spain) was placed in front of each camera, and was synchronized by Bpod to flash at the beginning of each trial. All valve openings were controlled with Bpod, which also recorded the time of licks to each spout.

Animal Behavioral Training

After waiting at least a week after surgery, mice were water restricted to 1 mL/day while maintaining >80% pre-deprivation weight. After several days of handling and habituation to head fixation, mice were trained to lick for free reward (2-3 µL) from a single spout. Once mice could reliably lick for water, they were started on a shaping protocol that automatically provided water reward (2-3 µL) 500 ms after the offset of either of the two odors (delivered for 1 s). Initially, mice were trained to receive water reward from the central spout in response to the odor. After succeeding at this, they progressed to a protocol where water was provided from each of the three spouts, but only from one spout on each trial. The spout from which reward was delivered remained consistent for blocks of 35-40 trials. The mice received the full reward if they licked any of the spouts during the response interval. For the next stage, a distinction was made between the two odors such that only one of the odors corresponded to a reward trial. Finally, after the mice demonstrated that they could distinguish between the "go" and "no go" odor, and that they are able to consistently obtain reward from all three spouts, they progressed to the final stage. For the final protocol, mice learned to lick only to the active spout of the current block in response to the go odor. Specifically, if the first lick during the response period (which begins 0.5 s after odor offset) was to the active spout, then the mice would receive a full reward (2-3 µL) from the active spout. If the mice responded by licking to a different spout, then they would instead receive a small reward (0.25 µL) from the active spout. No reward was delivered if the mice licked during a "no go" odor. Although the mice were only required to lick to the active spout during a very specific time interval, in general they learned to lick almost exclusively to that spout starting at odor onset. More complicated schemes requiring the mouse to not lick to any of the other spouts were too difficult during training and led to demotivation. The whole training process takes 2-8 weeks, with some mice learning faster than others. "No go" trials were chosen by randomly sampling from a Bernoulli distribution with a fixed ratio such that there was a 20% chance that any given trial would be "no go".

Histology and Tissue Imaging

Animals were transcardially perfused with 4% paraformaldehyde in PBS. The brain was removed from the skull and post-fixed in 4% paraformaldehyde in PBS at 4° C. overnight. Tissue sections (75 µm) were cut with a vibrating microtome (Leica).

Sections were mounted on glass slides with liquid mounting medium (Fluoromount-G with DAPI, ThermoFisher Scientific). Images were acquired either on the custom-built tandem lens macroscope described earlier or using a confocal microscope (TCS SP5, Leica).

Multi-Region Optogenetic Inhibition

VGAT-ChR2 mice were prepared with a cleared skull and headbar as in (Guo et al., 2014). The positions of lambda and bregma were marked. Mice were trained to >80% performance on the three-spout block-structured task described earlier. On successive days, different regions of cortex were inhibited. Specifically, all reachable dorsal cortical regions, just M1 and M2 motor regions, or all reachable regions except for M1 and M2 were targeted. Stimulation occurred either during the 2 seconds preceding odor onset (Pre-odor), or during the 1.5 seconds following odor onset (Peri-odor). This protocol restricted optical stimulation to the interval of time when either motor plans were maintained. or motor plan execution initiated. Stimulation turned off before the response period, during which the first lick the mouse makes is counted as the selected spout. Thus, there was never inhibition during the time when the mouse actually indicated the selected spout; there was only inhibition during the preceding period when the mouse would otherwise anticipatorily lick towards the selected spout. Optical patterning was accomplished using a digital micromirror device (DMD, Polygon400, Mightex Systems) with a large field of view macroscope (OASIS Macro, Mightex Systems). A 5W 488 nm laser (Genesis, Coherent) was fiber-coupled into the DMD, after passing through a laser-mode mixer (LMX-015-0400, Mightex Systems). The field of view accessible for stimulation was about 7 mm diameter, with a power density of 0.5-1 mW/mm$^2$ after correction to ensure similar intensity across the field of view. Based on the characterizations performed in (Guo et al., 2014), this power density should be adequate to achieve a significant decrease in spike rate while also providing high spatial resolution (<1 mm diameter of influence per pixel). Custom-written software was used to align the projected light pattern based on the lambda and bregma markings as imaged using an alignment camera, ensuring consistent alignment across days. The power distribution and vignetting were calibrated by recording power measurements sequentially throughout the field of view (Thorlabs S175C). A software correction was applied to correct for a nonuniform power transmission. The displayed stimulation pattern was controlled through MATLAB using HDMI and treating the DMD as an external display. A blue fiber-coupled LED (Thorlabs M470F3) was directed into the mouse's right eye. For eye-LED control sessions, an LED was turned on in place of DMD stimulation, only during stimulation trials. For stimulation sessions, the LED was turned on for all trials during the time period within the trial corresponding to stimulation. Sessions were only included if the performance on non-stimulation trials reached a pre-defined threshold of at least 80% correct. For each stimulation pattern and for each mouse, data was used from at least two complete sessions. Within each session, two thirds of the blocks were stimulation blocks, and there was at least one non-stimulation block for each of the three possible active spouts. The ordering of blocks was randomized.

Optical Design Principles

In this section, the analysis is described underlying the principles used to design the COSMOS macroscope. As the primary metric for comparing optical designs, the signal-to-noise ratio (SNR) of the reconstructed neural signal was used. There are two primary sources of noise in the system: signal-dependent photon shot noise $\gamma_s$, and signal-independent photon shot noise $\gamma_b$. With modern sCMOS cameras, read noise and dark current can essentially be ignored. Instead, $\gamma_b$ derives primarily from the background fluorescence that is incident on each pixel, composed of autofluorescence and nonspecific neuropil fluorescence, and which has a mean value and variance which is roughly independent of how the signal from each individual neuron is fluctuating. For certain applications disclosed herein, the mean value of the Poisson distributed $\gamma_s$ and $\gamma_b$ is in the thousands to tens of thousands (as shown in FIGS. 9A-B), and they are therefore well approximated as Gaussian distributed. To represent the noise-induced variance, zero-mean Gaussian random variables $\eta_s$ and $\eta_b$ were used, which have variances equal to that of $\gamma_s$ and $\gamma_b$, respectively. The image formation is modeled as $$\hat{y} = ac + b + \eta_s + \eta_b \quad (1)$$

where $\hat{y} \in \mathcal{R}^{m \times t}$ for m pixels and t timepoints is the sensor video; $a \in \mathcal{R}^{m \times n}$ for n neurons is the sensor point spread function of each neuron; $c \in \mathcal{R}^{n \times t}$ is the time course of each neuron's signal; $b \in \mathcal{R}^m$ is the background at each pixel; $\eta_s \in \mathcal{R}^m$ is the zero-mean signal-dependent noise at each pixel; $\eta_b \in \mathcal{R}^m$ is the zero-mean signal-independent noise at each pixel. Following (Cossairt et al., 2013; Wetzstein et al., 2013), signal reconstruction was modeled using least squares inversion.

$$\hat{c} = a^\dagger(y - b) \quad (2)$$

where $a^\dagger = (a^T a)^{-1} a^T$. As derived in the 'Noise analysis full derivation' section, the SNR can be written for a single emitting neuron (i.e. n=1) as $$SNR = \frac{\text{signal}}{\sqrt{MSE}} \quad (3)$$

$$= \frac{c}{\sqrt{\frac{1}{n} \text{Trace}\left[a^\dagger \text{Cov}(\eta_s + \eta_b) a^{\dagger T}\right]}} \quad (4)$$

$$= \frac{\sqrt{\alpha} c_0}{\sqrt{\sum_{i=1}^{m} (a^\dagger[i])^2 (a[i] c_0 + b_0[i])}} \quad (5)$$

where MSE is the mean-squared-error in the reconstructed signal; $c = \alpha c_0$ is the measured value of the signal of a point emitter, where a is the scalar fraction of the full aperture that is transmissive and scalar $c_0$ is the peak value of the signal if the aperture were fully open; a E W represents the footprint of the emitted light incident on the sensor; at is the pseudo-inverse used for reconstructing c; $b_0 \in \mathcal{R}^m$ is the mean value of the background signal incident on each sensor pixel. The three main design principles presented in the main text can be extracted from Equation 5:

1. Background fluorescence substantially degrades SNR if greater than the signal per pixel. 2. SNR increases as total light transmission a increases. 3. SNR increases when signal photons are dense, as opposed to spread out, on the sensor. This is the case when an emitter is in focus.

In simulation, the validity was verified of these principles and explored the repercussions for various potential designs. In FIGS. 9C-E, the background was quantified, blur defocused, and signal photons characteristics of the competing designs were recovered. In FIG. 9F, the SNR is summarized at each position along the curved window, based on the data in FIGS. 9C-E. Although the f/1.4 and f/2 macroscope configurations perform best near their single focal plane, the dual-lenslet design performs well across the entire curved field of view. In FIG. 9G the gain in improvement offered by the dual-lenslet design relative to the other approaches is summarized, in terms of the median SNR per pixel across the field of view. In conclusion, informed by this analysis, the dual-lenslet, dual-focus design was pursued.

Noise Analysis Full Derivation

In this Example, a full derivation is provided of Equation 5, which was fundamental to determining the principles that guided optical design in certain embodiments.

Additionally, the ramifications of Equation 5 are explored. For the application disclosed herein, optical designs which spread light out and rely on post-capture image deconvolution make SNR strictly worse and should be avoided. In particular, it is demonstrated that if there is a background flux of photons incident on each pixel, then signal recovered from an emitter degrades when a fixed amount of emission light is spread across a larger number of sensor pixels. The key assumption is that the background brightness is independent of the signal from the emitter and is incident on all sensor pixels. Locally, this assumption is approximately true in the COSMOS preparation. The implication of this result is that it is better to design a system where as much signal as possible is in-focus and concentrated, rather than attempting to deconvolve or demultiplex a blurred or distributed signal.

The analysis was started with the simple case of a background of constant mean value incident on each sensor pixel, for a single time point. Let $\hat{y} \in \mathcal{R}^m$ represent the noisy, measured value of each of the m pixels, $b \in \mathcal{R}^m$ represent the noiseless background value, s E $\mathcal{R}^m$ represent the noiseless signal value of a single emitter, $\gamma_b \in \mathcal{R}^{m^{iid}} \sim \text{Poisson}(b)$ the photon shot noise associated with b, and $\gamma_b \in \mathcal{R}^{m^{iid}} \sim \text{Poisson}(s)$ the photon shot noise associated with s. For high rates Poisson distributions become approximately Gaussian with a variance equal to the mean (Cossairt et al., 2013). Since the total signal is in the tens of thousands of photons, this approximation is valid and the noise can be approximated as additive but signal dependent. The noise is represented in the image formation model as $\eta_b \in \mathcal{R}^{m^{iid}} \sim \mathcal{N}(0, b)$ the noise associated with b, and $\eta_s \in \mathcal{R}^{m^{iid}} \sim \mathcal{N}(0, s)$ the noise associated with s. This can be written as $\hat{y}$ in terms of its underlying noiseless values and the added noise.

$$\hat{y} = s + b + \eta_s + \eta_b \quad (6)$$

It can be assumed that s can be factored as the product of a spatial and temporal matrix, s=ac, where $s \in \mathcal{R}^m$, $a \in \mathcal{R}^{m \times k}$, and $c \in \mathcal{R}^{k \times t}$, with m as the number of pixels, k as the number of neurons, and t as the number of time points. It can also be assumed that a is known: that is, the spatial sensor footprint is known, or point spread function, associated with the emitter. Two more assumptions can be added: each column of a sums to 1, and differences can be accounted for in aperture light transmission as $c = \alpha c_0$, where $0 \leq \alpha \leq 1$ represents the fraction of the full aperture that is open, and $c_0$ represents the total signal transmitted with the aperture fully open. Further, it can be assumed that b is known, and defined it as $b = \alpha b_0$, where $b_0$ is the mean background per pixel with the aperture fully open. The goal is then to recover c as the maximum likelihood estimate under the noise assumptions. According to the signal-dependent noise assumptions, Var $(\eta_s) = ac = a \alpha c_0$ and Var $(\eta_b) = b = \alpha b_0$. c can be estimated by minimizing the squared error $$\hat{c} = \min_c \|\hat{y} - ac - b\|^2 \quad (7)$$

If the variance was the same for each pixel, this would be the maximum likelihood estimate under Gaussian noise. Although this is explicitly not the case in scenario described in this Example, a simplifying assumption can be made here that the least squares estimate is adequate; this also aligns ultimately with the factorization-based source extraction algorithm used on the actual data. For known ŷ, a, and b, this is a simple least squares problem, which is minimized using the normal equation (here, any non-negativity constraints were ignored).

$$\hat{c} = a^\dagger(\hat{y} - b) \quad (8)$$
$$= a^\dagger(s + \eta_s + \eta_b) \quad (9)$$
$$= a^\dagger(ac + \eta_s + \eta_b) \quad (10)$$

where $a^\dagger = (a^T a)^{-1} a^T$. For a single emitter, a and b are each a single column-vector, and $a^T a$ is a scalar. For a single timepoint, c is a scalar. Equation 10 can be reduced to:

$$\hat{c} = c + a^\dagger(\eta_s + \eta_b) \quad (11)$$

The ultimate interest was in the signal-to-noise ratio (SNR), defined as the ratio between the signal mean and the standard deviation of the noise (i.e. the square root of the mean-square-error, or MSE). The MSE can be computed as the trace of covariance matrix of the noise in the reconstruction. Let $\eta = \eta_s + \eta_b$, where $\eta \in \mathcal{R}^m$, and $R = a^\dagger \eta$ is the noise propagated through the reconstruction, with $R \in \mathcal{R}^k$.

$$MSE = E[(R - \mu_R)^2] \quad (12)$$
$$= E[(a^\dagger(\eta - \mu_\eta))^2] \quad (13)$$
$$= \frac{1}{k} \sum (a^\dagger(\eta - \mu_\eta))^2 \quad (14)$$
$$= \frac{1}{k} \text{Trace}(\text{Cov}(a^\dagger \eta)) \quad (15)$$
$$= \frac{1}{k} \text{Trace}(a^\dagger \text{Cov}(\eta) a^{\dagger T}) \quad (16)$$

where Equation 16 results from $\text{Cov}(Ax) = A \text{Cov}(x) A^T$, which can be derived by expanding $\text{Cov}(Ax, Ay) = E[(A(x - \mu_x))(A(y - \mu_y))^T]$. a full expression for the SNR can be written.

$$SNR = \frac{\text{signal}}{\sqrt{MSE}} \quad (17)$$
$$= \frac{c}{\sqrt{\frac{1}{k} \text{Trace}[a^\dagger \text{Cov}(\eta_s + \eta_b) a^{\dagger T}]}} \quad (18)$$

Here, the equation can be simplified by assuming that the signal is recovered of a single emitter, such that k=1. Furthermore, since the noise at each pixel is assumed to be independent of the noise at other pixels, the off-diagonal terms in $\text{Cov}(\eta_s + \eta_b)$ are zero. Therefore, Eq. 18 can be reduced.

$$SNR = \frac{c}{\sqrt{\sum_{i=1}^{m} (a^\dagger[i])^2 (\text{Var}(\eta_s[i]) + \text{Var}(\eta_b[i]))}} \quad (19)$$

$$= \frac{\alpha c_0}{\sqrt{\sum_{i=1}^{m} (a^\dagger[i])^2 (a[i] \alpha c_0 + \alpha b_0[i])}} \quad (20)$$

$$= \frac{\sqrt{\alpha} c_0}{\sqrt{\sum_{i=1}^{m} (a^\dagger[i])^2 (a[i] c_0 + b_0[i])}} \quad (21)$$

where i is used to index into each vector. Thus deriving Equation 5.

With Equation 21, one can determine how SNR changes as a, $b_0$, and $\alpha$ change, where a is the spatial footprint of a single emitter, $b_0$ is the mean background level per pixel relative to the signal level $c_0$, and $\alpha$ is the fraction of the full aperture that is open.

To begin, an analytical expression can be derived for how the SNR changes as the emission light is spread across more sensor pixels if a simple representation of a is used. In particular, it can be assumed that if there are n non-zero entries in a, then each non-zero entry has value 1/n, i.e. that light is distributed uniformly within the point spread function. If $H = \{i | a[i] > 0\}$, then for $i \in H$, $a[i] = 1/n$, and $\sum_{i=1}^{m} a[i] = \sum_{i \in H} a[i] = 1$. Here, only a single timepoint id dealt with, such that $c = \alpha c_0$ is scalar. It follows that only for $i \in H$ is $s[i] > 0$, and thus $\sum_{i=1}^{m} s[i] = \sum_{i \in H} s[i] = c$. The $a^\dagger$ can be computed:

$$a^T a = \sum n \frac{1}{n^2} = \frac{1}{n} \quad (22)$$
$$(a^T a)^{-1} = n \quad (23)$$
$$a^\dagger = n a^T \quad (24)$$

Thus, at is the same as a, except that each non-zero entry has a value of 1 instead of 1/n. From Eq. 10, thus $$\hat{c} = \sum_{i=1}^{m} a^\dagger[i](s[i] + \eta_s[i] + \eta_b[i]) \quad (25)$$
$$= \sum_{i \in H} s[i] + \eta_s[i] + \eta_b[i] \quad (26)$$
$$= c + \sum_{i \in H} \eta_s[i] + \eta_b[i] \quad (27)$$

Because $\eta_b$ is composed of independent random variables, their variances add. It can be assumed that $b = B\mathbf{1}$ for scalar B. Because $\eta_b[i] \sim \text{Pois}(B)$, $\text{Var}(\eta_b[i]) = B$. Thus $$\text{Var}(\Sigma_{i \in H} \eta_b[i]) = \Sigma_{i \in H} B = nB \quad (28)$$

In contrast, the variance of ns does not depend on n, $$\text{Var}(\Sigma_{i \in H} \eta_s[i]) = \Sigma_{i \in H} s[i] = c \quad (29)$$

and thus, $$\text{Var}(\hat{c}) = nB + c \quad (30)$$

SNR can also be directly computed based on Eq. 21, $$SNR = \frac{\sqrt{\alpha} c_0}{\sqrt{c_0 + nB_0}} \quad (31)$$

The result is thus that as n, the number of sensor pixels over which the light from an emitter is spread, increases, so does the variance of the recovered signal. If the light from a single emitter is spread across more pixels, then the relative influence of the background shot noise is higher. That is, the recovered signal is noisier and the SNR degrades. Again, the implication of this result is that the best design should have high overall light transmission, but with the signal photons focused in as concentrated manner onto as few pixels as possible.

Simulation Details

The following describes details of how the simulation results in FIG. 9 were generated.

The level was estimated of the background signal relative to the somatic signal based on the output of CNMF-E, which estimates the background as part of the source extraction process. Three one-minute long videos were captured with the aperture open to f/1.4 with 50 mW illumination with a Cux2-CreER; Ai148 mouse. Using the quantum efficiency conversion factor of the Prime95b camera (0.93 across the green part of the spectrum), the number of photons incident on the sensor were estimated. The total signal per neuron was computed as the median across neurons of the maximum signal (across the video) for each neuron, multiplied by the sum across the footprint weights for each neuron. The number of pixels per neuron was computed based on the number of pixels in the footprint required to reach 90% of the total weight across the footprint. For the background, the reconstructed background output from CNMF-e was used. This provides a background image for each frame in the video. The median background value for each pixel across time was computed, and then using the pixels with values in the middle eight deciles, the median background value per pixel was computed. These results, in addition to results for other aperture settings as well as for the dual lenslet design, are shown in FIG. 9A-B. For f/1.4, averaged across the three videos, the mean background photons per pixel was $\eta_{background}=10e3$, and the total signal per source was $n_{emission}=13e4$.

Defocus Blur

The simulated defocus blur was compared across the extent of the curved glass window for each the following imaging approaches: stopping down the aperture on a conventional macroscope; a pellicle beamsplitter with two cameras; a multi-focal lenslet array; and an oscillating tunable lens. The curved geometry of the window is demonstrated in FIG. 8A.

To simulate defocus blur, the analysis begins with a simple ray-optics model and modifying it to include the effects of aperture-induced diffraction. 1:1 magnification was assumed. The angle was determined of the marginal ray based on the f-number, N, as $$\theta_{marg} = \arctan\left(\frac{D/2}{f}\right) = \arctan\left(\frac{1}{2N}\right) \quad (32)$$

The blur radius at each location along the window was determined based on the axial distance to the nearest native focal plane, $z_{near}$. For the conventional macroscope, there was one focal plane, for the bi-focal plane, there were two, and for the lenslet array, there were two focal planes.

$$b=|z-z_{near}|\tan(\theta_{marg}) \quad (33)$$

For the tunable lenses, a slightly different approach was used. In order to image at 30 Hz, the tunable lenses must oscillate across the focal volume, as opposed to stepping between fixed focal planes. The effective blur radius was modeled as the average blur radius across a focal sweep from $z_0$ to $z_1$. For an axial position z between $z_0$ and $z_1$, the average radius is $$r = \frac{1}{|z_0 - z_1|} \int_{z_0-z}^{z_1-z} |ch| dh \quad (34)$$

$$= \frac{1}{|z_0 - z_1|} \frac{1}{2} (ch^2) \text{ sign } (ch)\Big|_{z_0-z}^{z_1-z} \quad (35)$$

where $c=\tan(\theta_{marg})$.

To incorporate the effects of diffraction into this simplified model, a constant blur was added at all depths with a radius computed according to the Rayleigh resolution criterion, as $$r_{diffraction} = \frac{0.61\lambda}{NA} = (0.61\lambda)(2N) \quad (36)$$

where the approximation was used of the numerical aperture NA in terms of the f-number N $$NA = n\sin\theta_{marg} = \left(\arctan\frac{D}{2f}\right) \approx \frac{1}{2N} \quad (37)$$

where n≈1 in air.

As is visible in FIG. 9D, the maximal defocus blur is substantially smaller for larger f-numbers. However, both the mirror and lenslet designs achieve similar depth-of-field performance.

Light Throughput

The detected light throughput of each design was considered. Although a smaller aperture yields smaller defocus blur, it also throws away light. It was established experimentally that with 470 nm light, a total constant excitation illumination intensity of 500 mW across the field of view, i.e. 5 mW/mm$^2$, causes significant damage to the brain. As it is essential long imaging sessions could be performed, a maximum threshold of 50 mW illumination was chosen. With an upper limit on excitation power, sufficient light collection would be required.

Light collection was compared simply based on the open area of the aperture. For the lenslet array, it was conservatively assumed that when reconstructing neuronal traces, for each location across the window light from one of the lenslet images was used, and thus the image effectively had an f-number of F/D=40/21.9=1.8 where F=40 mm is the focal length of each lenslet, and D=21.9 mm is the diameter of a circular lens with the same area as a 25 mm diameter lens with 7 mm milled off from the edge. For the beamsplitter, to yield adequate depth-of-field the f-number was set to be f/2. For the tunable lens, the diameter of the aperture was set to be the size of the clear aperture of the tunable lens. All aperture areas were normalized based on the total area of the maximum f/1.4 aperture area. These results are shown in FIG. 9C.

Overall SNR

A measure was constructed that incorporates both light throughput and blur size, incorporating the effects of shot noise from background fluorescence. The process was initiated by computing the number of photons per sensor pixel detected from an individual emitting point source in the specimen. This is an important measurement because there is a relatively high intensity background signal in the COSMOS imaging preparation, which according to the noise analysis derivation influences the overall SNR of an optical design. This background derives primarily from diffuse and defocused neuropil fluorescence and tissue autofluorescence, which is particularly strong around the emission spectrum of GCaMP. For the purposes of this analysis, the background was treated as a mean constant intensity addition to each sensor pixel.

Importantly, however, although the mean intensity is constant, there is photon shot noise that adds variance to the background. In particular, for a background of mean photon count B, the standard deviation in photon counts is $\sqrt{B}$.

Next, the number of photons per pixel from a single neuronal emitter were computed, at each point along the curved glass window. The size was determined of the blur disc based on the blur radii shown in FIG. 9D, according to $a=\pi r^2$. The blur disc was then multiplied by the normalized light collections of FIG. 9C. Multiplying this by $n_{emission}$ yielded the number of photons within the blur disc. This was normalized by the number of pixels within the blur disc (for pixels of sidelength 11 μm). As shown in FIG. 9E, the multi-focal designs lead to a substantially higher density of collected photons on average.

Now, the SNR per pixel were computed. The footprint a was approximated as Gaussian weighted across pixels within the blur disc, with a standard deviation equal the half of the number of pixels within the blur disc. Using at =(ara)-lar, SNR was computed as light transmission according to Equation 21, with $c=n_{emission}$ and $b=\eta$background.

As shown in FIG. 9F, while the large aperture macroscope designs offer the highest peak SNR, there are large stretches where the SNR is much lower, i.e. where everything is out of focus. The multifocal designs, however, maintain a good compromise, with fairly even performance across the field of view, as well as a higher minimum SNR than the other designs.

In particular, as shown in FIG. 9G, the dual-focus lenslet provides the best overall performance across the extent of the curved field of view.

Quantification and Statistical Analysis
Open Source Packages Used

The following open source libraries were used in the statistical analyses of the data presented in this paper:
  IPython (Pérez and Granger, 2007)
  Numpy (Van Der Walt et al., 2011)
  Matplotlib (Hunter, 2007)
  Pandas (McKinney, 2010)
  Scikit-learn (Pedregosa et al., 2011)
  SciPy (Oliphant, 2007)
  Seaborn (Waskom et al., 2017)
  Statsmodels (Seabold and Perktold, 2010)
  Keras (Chollet and others, 2015)
  PsychoPy (Peirce, 2007)
  Micromanager (Edelstein et al., 2014)
  Fiji (Schindelin et al., 2012)
Statistical Analysis The number of subjects used in each experiment was based on numbers used in previous studies. Unless otherwise specified, statistics were reported as means and S.E.M. values.

Probabilities from multiple hypothesis tests were corrected using the Benjamini-Hochberg correction (alpha=0.05) in all cases, unless otherwise indicated.

A single session of imaging data from each mouse with the Cux2-CreER; Ai148 genotype that were fully trained on the task (defined as reaching 80% correct in at least three sessions) was included in all imaging analyses. This single session of data was chosen in each case based only on high behavioral performance. Main experimental analyses were not additionally run on any other undisclosed datasets.

For the optogenetic inhibition experiments, mice had to achieve at least 75% performance on the task in two consecutive sessions, with the eye-LED on for a subset of trials, before attempting a day with optogenetic perturbation. Then, for each optogenetic stimulation condition, data were included from each mouse where they had at least two sessions worth of data with performance during the no-stimulation blocks averaging >80%. If more than two sessions from a given mouse and condition had no-stimulation performance greater than this threshold, the best two sessions were used.

Orientation Selectivity Analysis

To compute the orientation selectivity of COSMOS and two-photon data taken during visual grating presentation, the following definition was used of the orientation selectivity index (OSI):

$$OSI = \frac{r_{pref} - r_{orth}}{r_{pref} + r_{orth}}$$

where $r_{pref}$ is the maximum trial-averaged fluorescence in response to any grating orientation and $r_{orth}$ is the response to the 90° offset grating using the raw fluorescence traces extracted from CNMF-E. OSI histograms only show values from sources that pass a one-way ANOVA comparing the average response to the grating stimuli vs. blank periods with p<0.01. These methods are similar to those previously used in (Chen et al., 2013) to characterize GCaMP6 under two-photon microscopy and yielded similar results for the two-photon data.

Source Mixing Model

The number was estimated of neurons underlying each extracted COSMOS source using a simple averaging model. First, the OSI histogram was computed for the visual drifting grating data obtained from each of three mice taken under the two-photon microscope and, separately, under the COSMOS macroscope using the procedure described in the previous section. Next, for each mouse, COSMOS OSI histogram was simulated by using mixtures of neurons from the two-photon data. To do this, samples were taken from all of the neurons that comprised the two-photon OSI histogram 500 times, each time generating a "mixed" trace by averaging over a random number of sources. The number of sources to average over on each iteration was chosen from a uniform distribution. Once 500 sources had been generated using this approach, the OSI histogram for that simulation were then regenerated.

This process was repeated 10 times (with different random seeds) for different uniform distributions (i.e. source mixing ranges). All combinations were searched of uniform distributions [min, max], where min ranged from 1-20 and max ranged from 1-50. Combinations where min was greater or equal to max were not used.

Finally, the optimal min and max parameter were computed to approximate the empirical COSMOS OSI histogram by computing the parameters that minimized the mean Kullback-Leibler divergence between each of the 10 models for a given parameter choice and the empirical OSI distribution.

The consistency of this observation between animals is likely related to the similar density of neurons in each animal (owing to similar tamoxifen dosing of 0.1 mg/g); these results could change under a stimulus that recruits a different fraction of the network (the visual stimuli here may drive particularly strong correlations).

Region Specific Analyses

After registering the Allen Brain Atlas volume, version CCFv3, to each mouse (using the procedure described the "intrinsic imaging for atlas alignment" section), five groups were identified of cortical areas that were analyzed separately at many points in the paper (motor, somatosensory, parietal, retrosplenial, and visual). Each of these areas is a "parent" node for all the "child" nodes saved in the Allen Atlas. For example, "secondary motor area" (ID=993) has parent node ID=500, "somatomotor areas." All sources coming from these "somatomotor areas" are therefore analyzed when the analysis was restricted to motor. These are the parent nodes that were analyzed (that are all children of the "isocortex" node):

Motor="somatomotor areas", ID=500
Somatosensory "somatosensory areas", ID=453
Parietal="posterior parietal association areas", ID=315
Retrosplenial="retrosplenial area" 254
Visual="visual areas", ID=669

Task-Related Class Assignment

Using deconvolved spike events smoothed with a Gaussian (s.d.=50 ms), the mean trace was computed for each of the four trial types (go-left, go-middle, go-right, no go), for the 2.5 s interval beginning at odor onset. The mean trace was computed on a set of training trials, and then using a separate set of testing trials the $R^2$ correlation was computed between the mean trace and each single-trial trace of the corresponding trial type. The mean correlation could be used as a proxy for the unique variance explained by each trial-type for each source. Five-fold cross-validation was used, and the overall correlation was computed as the mean of the correlation on each fold. A bootstrap shuffling procedure was used to determine the significance of the trial-type correlations for each source. Specifically, for each shuffle, a random set of 50 trials (the mean number of trials per trial type per session) was used to define a trial type, and the above five-fold cross validation procedure was performed. A total of 10,000 shuffles was run. For each source, the maximum correlation value across all shuffles was used as the threshold for determining significance ($p<0.05$ with Bonferroni correction; across n=4 mice, the fraction of sources that were assigned: 44%+/−1.1%, mean+/−s.d.). Each source was assigned with significant correlation to any of the trial types to one of 5 groups: lick-left selective, lick-middle selective, lick-right selective, "no go" selective, and lick-direction independent. Insignificant correlations were set to zero, and the correlation to each trial type was normalized by summed correlation to all trial types. Sources were assigned to a task-related class based on the relative strength of correlation to each trial type. A source was assigned to one of the selective groups if the normalized correlation to that trial type was above 0.6, and the maximum normalized correlation to any other trial type was below 0.3. A source was assigned to the 'mixed' group if the normalized correlation to at least three trial types was above 0.2. Sources that did not meet any of these criteria were not assigned to a class.

Spatial Pattern Analysis

To assess whether there was any regularity or clustering in the spatial distribution of sources within each task-class, the spatial autocorrelation was analyzed and compared it with a null distribution derived from random spatial distributions. The centroid was transformed of each source into units of mm based on the measured equivalent pixel size. Then for all sources assigned to each task-class, the pairwise distance was computed between each source and every other source. The empirical cumulative density function (CDF) of probability for each pairwise distance was then computed. To generate the null distribution, a shuffling procedure was used: the task-class labels were randomly permuted across sources, such that each task-class maintained the same total number of member sources, and the pairwise distance histogram was computed. This procedure was run for 10,000 shuffles. Using these shuffle distributions, a p-value was computed for each value in the corresponding empirical CDF, based on the percentile of the measured value within the shuffle distributions. This p-value was corrected for multiple comparisons using Benjamini-Hochberg FDR correction, across all values within a single session (i.e. across all trial types and discretized CDF values). Using these corrected p-values, a threshold of 0.05 was used to determine whether a CDF value was significantly different from the null distribution.

Across five mice, each with five task classes, only 5/25 CDFs yielded any significant values, albeit with a small effect size. Furthermore, there was no consistency across mice in terms of which task class displayed significance. Thus, there was no consistent pattern in the spatial distribution of sources associated with each task class.

As a positive control, and to assess the sensitivity of this analysis, distributions were simulated of sources with known spatial structure. The same analysis was then applied to these simulated distributions to assess whether the structure was detectable using the shuffle-based procedure. The simulated distributions consisted of a random selection of ⅓ of the sources within a circle of specified diameter, in addition to the selection of 30 random sources distributed across the rest of the field of view. By varying the diameter, simulated distributions were generated with spatial features of different sizes. Thus, this procedure has a sensitivity to spatial features around 1 mm diameter and above.

Detecting Lick-Off Sources

Only trials where lick onset occurred 300 ms after odor onset were included. For each trial, for each source, mean activity was computed across pre- and post-lick-onset periods (each 2 s in duration). Separately for each trial type, it was determined whether there was a significant decrease in activity across trials (one-sided t-test, Bonferroni corrected across sources, $p<0.001$). Then sources were found that decreased on any "go" trial, but that did not decrease on "no go" trials. The possibility was allowed that a source may decrease on just one trial type or on multiple trial types. The locations of these lick-off sources are plotted in the figure and showed no apparent spatial pattern or restriction that was consistent across mice. To summarize across mice, the mean was computed across trials and lick-off cells for each mouse. For visualization, from each trace was subtracted the mean activity during the first 300 ms of the baseline.

Single-Trial Vs. Trial-Averaged Correlations

Centroid locations were scaled to units of mm using the measured equivalent pixel size. Gaussian smoothed deconvolved spikes (s.d.=50 ms) were used. The Spearman correlation coefficient was computed between all pairs of sources, using either the full, single-trial dataset consisting of concatenated trials from the entire session (thus excluding the variable-length part of the ITI), or using trial-averaged traces consisting of a concatenation of the average trace from each trial type (go 1, go 2, go 3, no go). The distance was also computed between each pair of sources. Each pair was only counted once. The absolute value of the correlation was used, to assess the magnitude of the correlation. Correlation magnitude values were binned based on the distance of the corresponding pair of sources, with a bin size of 100 µm. Source pairs within 150 µm of one another were excluded from the analysis. Within each bin, the mean and s.e.m. correlation values were computed. The resulting correlation vs. distance curves were normalized by (i.e. divided by) the maximum value of the curve. A p-value was computed for the mean correlation value at a distance of 1 mm, using a paired t-test between the means for each mouse using either single-trial or trial-averaged correlations. For spatial plots related to a single seed source, the radius, colormap, and alpha value were set according to the correlation magnitude, normalized by the maximum non-self correlation value. For correlation vs. distance plots related to a single seed, a bin size of 500 µm was used.

Decoding Lick Direction

To analyze the information represented by different subsets of neuronal sources on a single-trial basis, a decoding approach (Glaser et al., 2017) was used. Specifically, a classification algorithm was trained to predict from the activity of a subset of sources whether the mouse was performing one of four actions: licking to spout #1, licking to spout #2, licking to spout #3, or not licking. The behavioral data were binned at a temporal resolution of 29.4 Hz, and prediction was performed based on the neural timepoints (also binned at 29.4 Hz) centered on the labeled behavioral timepoint. This centered timepoint was used because here no claims are explicitly made about predicting future action; rather, it is claimed that the ongoing behavior is represented by the neural activity (which may include delayed neural response to the sensory stimuli associated with the licking action). The unsmoothed deconvolved event output was used from CNMF-E as the neural data. Trials are randomly assigned to training, cross-validation, and test sets with a ratio of 0.5:0.25:0.25. There were at least 180 trials per mouse, and a trial consisted of 200 timepoints, yielding a total of at least 36,000 data points split between the training, validation, and test sets. There were at least 1000 neuronal sources for each mouse, and 1 timepoint was used for each source, yielding at least 1000 parameters to be fit when decoding using all sources. A linear model was used with a softmax over 4 outputs and a categorical cross-entropy loss function, implemented using Keras. The Adam optimizer was used to train the parameters. During optimization, datapoints were weighted according to the inverse of the frequency of the corresponding class (i.e. because there are so many more "no lick" datapoints, each such data point was weighted in an accordingly decreased manner). Investigations were also performed using more complicated networks with hidden layers as well as with nonlinear activation functions, however no appreciable increase in classification performance was found.

This is potentially interesting because it either implies that information represented by the simultaneously recorded neurons can be characterized in a linear manner, or that enough data was not available to adequately fit information stored in nonlinear interactions between neural activation states. To account for the noisiness of the neural signal and the relative paucity of training data, using cross-validation-based early stopping was regularized. Specifically, after each training epoch, the loss was computed on the cross-validation set. The parameters were used that were set during the best epoch across 20 total epochs. Classification performance was evaluated using the test dataset, which the algorithm never saw during training. This whole process was repeated for 4 folds, such that each data point was used in a fold-test dataset once.

To account for the disparity in class sizes (there were many more datapoints where the mouse did not lick than when the mouse did lick to any of the spouts), a normalized confusion matrix was computed. Each row was normalized by the sum that row, or (True Positives+False Negatives). The diagonals of the normalized confusion matrix thus represented the True Positive Rate, (# True Positives/# Total Actual Positives).

The Receiver Operating Curve (ROC) was computed for each class in a one vs. all manner, by varying the classification threshold and computing the corresponding True Positive Rate and False Positive Rate. This was performed for each class for each fold. The ROC curves were resampled such that they all had the same discretization of False Positive Rate, and then they were averaged together (this is the 'macro' average in the parlance of sklearn), yielding an overall ROC curve to summarize the classification for that session. Likewise, the area under the ROC curve (AUC) was computed for each fold and class, and then averaged together. This AUC was used as the measure for characterizing classification performance across different conditions.

When comparing the information contained in different subsets of neuronal sources, a number of steps were taken to ensure that the comparisons were fair. First, all sources were ordered based on the extent to which they were capable of distinguishing between any of the behavioral conditions. Specifically, for each source there were around 36,000 time points of neural activity, and an associated label for each time point indicating whether the mouse was licking to spouts 1, 2, or 3 or not licking. For each source, a Kruskal-Wallis H-test was performed to determine whether the distributions of neural activity during any of the four behavioral conditions were significantly different. The p-value output was used from this test as a proxy for the ability of that source to distinguish the behavioral conditions. P-values were adjusted for multiple comparisons using the Benjamini-Hochberg correction. Using these p-values, all neuronal sources were ranked based on their ability to distinguish the behavior, as shown in FIG. 14A-B. Importantly, though, for the comparisons in FIGS. 5D-F, for each subset of sources included in each test condition the highest ranked sources were used, that is, the sources that contained the most decoding information according to the H-test. Although not guaranteeing that the best combination of sources for decoding were used, heuristically this approach ensures that an unfairly bad combination of sources was not used.

Additionally, it was ensured that even if different numbers of neuronal sources were included in each subset, the number of model parameters was exactly the same. To accomplish this, PCA was performed on the [sources×time] matrix and used the 75 dimensions that explained the most variance. This [75×time] matrix was then passed into the decoding algorithm. Thus, there is no chance for the model to overfit for one subset simply based on the number of model parameters. Decoding the preferred spout position from neural data Partial Least Squares regression was used to simultaneously perform linear regression and dimensionality reduction (sklearn class cross_decomposition.PLSRegression, which implements the PLS2 algorithm). In contrast to the lick decoding analysis, here the denoised $Ca^{2+}$ signal was used rather than the deconvolved spike trains. This smoother signal over time enhanced the ability to construct intelligible single-trial neural trajectories (see subsequent section "Computing low-dimensional trajectories . . . " for more details)—which was crucial as the same decoding model was used for both purposes. The PLS models all used k=4 components, which was found to be the minimum value that approximately maximized the normalized model prediction accuracy on held-out test data across all four experimental mice (as defined as the area under the ROC; see FIG. 14D).

In a similar manner to the approach used in an earlier analysis, region specific analyses were performed using the 75 sources from each area with most discrimination ability for the preferred spout (in FIG. 6E) or all sources from each area (in FIG. 7). In order to avoid overfitting on analyses that used sources from all regions in FIG. 6, a maximum of 500 sources for model training/evaluation were used, choosing first those with the lowest p-values as for the region-specific analyses. The impact of using different numbers of sources can be seen in FIG. 14E, using more than 500 sources appears to show reduced model prediction performance on held out test data. The preferred spout is defined as the one with the most licks in the interval of time between odor onset and reward onset.

To identify the preferred spout discrimination ability of each source, a Kruskal-Wallis H-test was performed that, for each source and timepoint, compared the source's activity between trials where different spouts were active (in FIG. 14F). Only timepoints where the maximum denoised $Ca^{2+}$ across trials exceeded 0.1 were quantified here. In this way, sources were each assigned the lowest p-value observed across all timepoints evaluated. All sources were then sorted by their p-values such that the sources with lower p-values were defined as having more discrimination ability.

PLSRegression, a linear approach, was used instead of a more complex nonlinear algorithm because it was desired to fit the least complex model possible in order to aid interpretability and because a model with considerably more parameters would take more data to train. The fact that PLSRegression models simultaneously fit regression weights as well as identifying a related low-dimensional basis (that could be projected single-trial neural activity into) greatly aided us in this with respect to interpretability.

Each model was fitted using 30 total training trials (10 for each active spout condition), out of the approximately 200 trials from each experimental session (meaning approximately 15% of each dataset for training was used). These 30 training trials were randomly selected from a list of all "go" trials where at least 80% of all licks on that trial at any time were towards the active spout. It was also explicitly enforced that identity of the active spout matched the preferred spout on each training trial. The training data matrix ([frames*training trials]xsources) then consisted of all denoised $Ca^{2+}$ signal time points from either the 75 sources with best discrimination ability in the region under analysis, or by using up to 500 sources for non-regional analyses. All frames on a given training trial were used for training. Trials that had licks during the "pre-odor period" were not excluded from training if they met the other requirements because training was always performed on all trial frames (including those with licks). However, these trials with pre-odor licks were always excluded when testing model performance. The target regressor vectors (([frames*training trials]xspouts) for each training trial comprised a binary indicator matrix denoting the active spout on each trial—which was constant across each frame within a trial.

Model evaluation was performed individually on all held-out trials, but specifically enforcing that all evaluated trials had zero licks during the "pre-odor period," which was the final 2.2 seconds of the intertrial interval. Evaluation was specifically performed on the mean of all time points acquired from this interval of time (a vector of length equal to the number of sources). This resulted in a prediction vector of size 3 (the number of spouts). The reported prediction of the preferred spout was then defined as the spout with the highest numerical value in the prediction vector at the optimal classifier setpoint, argmax(predictions*[1−setpoint]), here the setpoint vector is three-dimensional and '*' denotes element-wise multiplication. For computing model performance (AUC of the ROC), unthresholded predictions were used to compute 'macro' AUC values in an identical manner to that described in the previous section ("decoding lick direction").

The only exception to the above training procedure is in FIG. 15E-G, where models were trained and evaluated on different temporal epochs of data. Here, trials with a nonzero number of licks during the "pre-odor period" were excluded from both training and testing (vs. just testing). When training on all frames from a trial (as in FIGS. 6 and 7), models were already exposed to licks later in every trial, so those trials were not removed to leave more selective "go" trials available for training/testing.

The optimal classifier setpoint was computed by generating a ROC curve using both the true preferred spout and raw predictions on the training trials. This setpoint was used to fit to training data on the held-out test data. The optimal setpoint was defined as the threshold that maximized the difference between the true positive rate and the false positive rate. The confusion matrix in FIG. 6B was normalized using the same procedure as described in the "decoding lick direction" section earlier in the methods. In FIGS. 6D-E and FIG. 14G-H 20 models were trained for each condition of each analysis. The resultant distributions of model performance were statistically compared to an equally large set of models trained on identical training data, but data where the active spout information was randomly permuted across trials. This permutation was done in two ways: either by randomly shuffling the correct spout labels or by circularly permuting the labels. The simple random shuffling procedure breaks the temporal autocorrelation structure of the task. Therefore, it could destroy long-timescale fluctuations resulting from making the same movement many times in a row that could persist over many seconds (and thus beyond trial boundaries).

To better control for this, and therefore more solidly test whether predicting upcoming actions vs. simply decoding a neural state generated by repeated past actions, a much more conservative null model for comparison was used where, instead of shuffling, the trial labels were circularly rotated by a random shift of between 0 and the number of trials in the experiment. This manipulation perfectly preserves the temporal autocorrelation structure of the active spout identity over a session. However, because of the long block length, any rotations that are shorter than a block (15-20 trials) will overlap heavily with the true class labels-making this a harsher control. Statistics were therefore presented vs. both the shuffle and this circular permutation control.

Figure 6F:
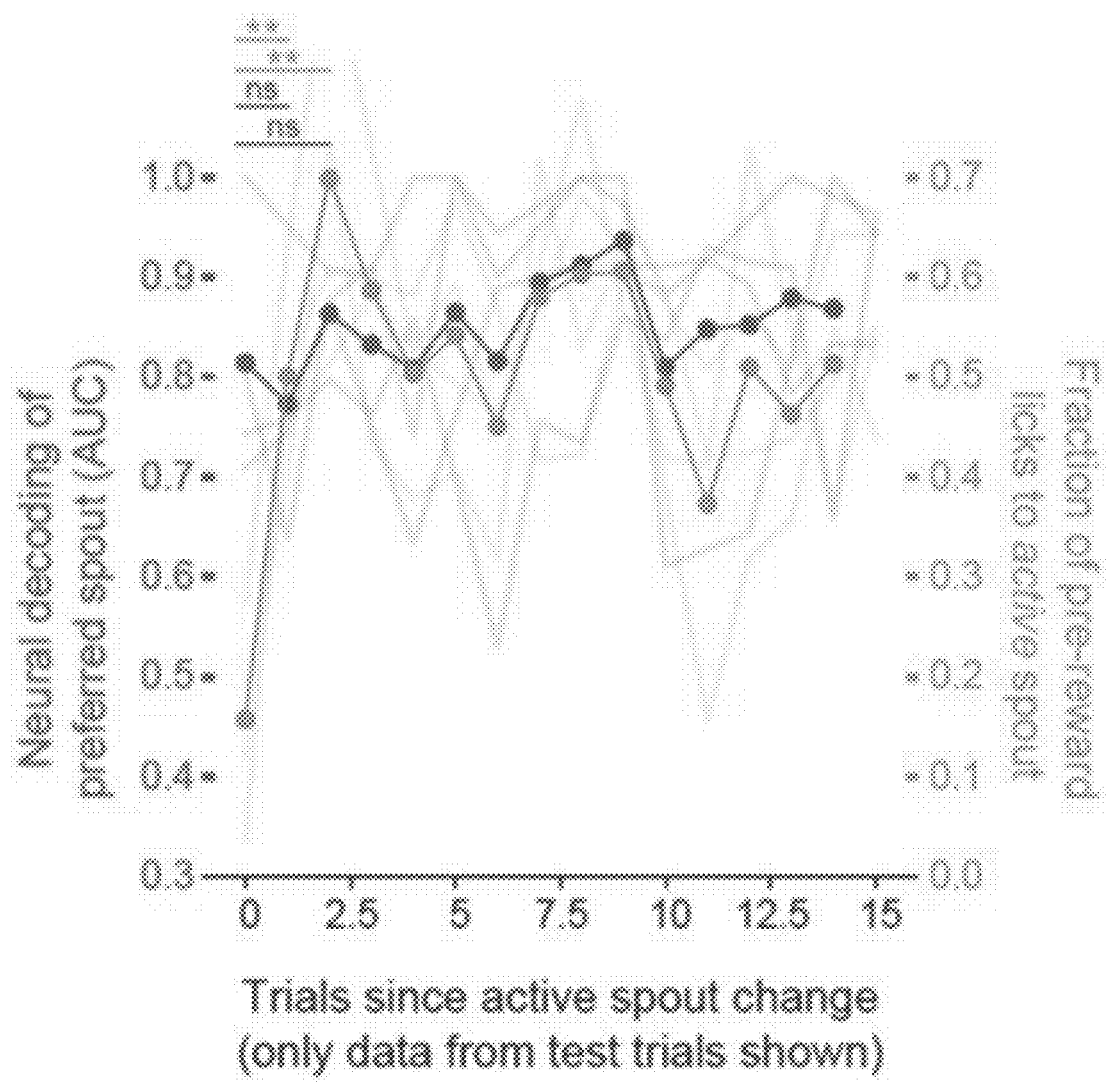
Figure 6G:
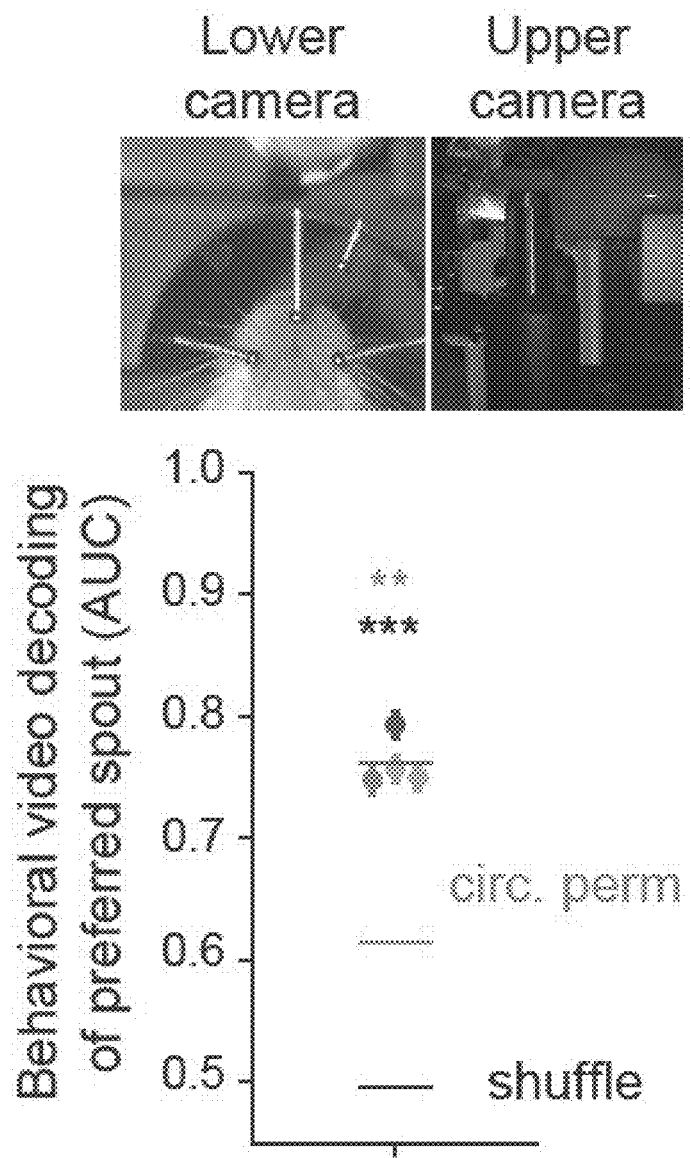

As shown in FIG. 6F, interpolation was performed between some adjacent points in the lines drawn using data from individual mice. This was done when there were gaps in the data at some trial indices that arose from excluding trials where there were a nonzero number of pre-odor licks. The same analysis was performed either using binning, or by including the currently excluded trials. In both cases, similarly statistically significant results were found.

To quantify the variance explained by a low-dimensional (k=4) basis provided by PLS and PCA (FIG. 14I), all sources were used from each area or the top 500 sources with most spout discrimination ability if pooling over all areas. Then PLS and PCA models were fit to data taken from all "go"

trials where at least 80% of all licks were towards the active spout. Given the fitted PLS basis vectors, the total explained variance was computed as:

$$\frac{\text{Var}(X \cdot W_{PLS})}{\Sigma \text{Var}(X)}$$

where X is the mean centered neural data and W are the basis vectors from PLS (stored in the x_rotations_variable in the PLSRegression model object). This value was computed for the PCA basis in a similar manner. All timepoints were used from each trial in this calculation.

Decoding the Preferred Spout Position from High-Speed Video Data

PLSRegression was used to predict the preferred spout from the pre-odor behavior of the animal measured using high-speed (200 Hz) videos taken from below the head and to the side of the body. First, the movies was converted to grayscale and computed their "motion energy" (Stringer et al., 2019) as the magnitude of the framewise difference in pixel intensities. Treating each motion energy movie as a centered data matrix $X \in \mathbb{R}^{N \times M}$ where N is the number of pixels and M is the number of timepoints, the eigendecomposition of the pixelwise covariance matrix $C = M^{-1}XX^T = V\Lambda V^T$ was found, yielding the left (spatial) eigenvectors of X and their associated eigenvalues. Then the right (temporal) eigenvectors was computed as $U = \Lambda^{-1/2}V^T X$, i.e. the motion energy principal components (PCs), and keep the top 1000 to use as features for prediction. The same PLS approach was applied for neural decoding described above to predict the preferred spout from pre-odor motion energy PCs. To summarize each trial, the average was compute of each PC over the 2.17 s (434 frames) preceding odor onset, and the PLS models were trained and tested on the identical sets of trials used for neural decoding, varying the number of PCs used for prediction. To assess the sufficiency of different orofacial components for decoding the active spout, data was extracted from 512-pixel regions of interest covering the nose, mouth, and whiskers and applied the same PCA+PLS decoding analysis on the top 250 PCs separately for each region.

Computing Low-Dimensional Trajectories and Analysis of Condition Type Separability To compute low-dimensional neural trajectories (as shown in FIG. 7), again PLSRegression models were used that were trained using all timepoints from each training trial (as in FIG. 6). But instead of predicting the preferred spout on each trial using only the "pre-odor" data, every time point was instead projected during each trial into the low dimensional basis found by PLSRegression. Parietal and retrosplenial areas had the fewest average sources across mice and also had lowest decoding performance (FIG. 6E) and therefore were not analyzed individually here. Training data and testing trials were selected as described in the previous section for active spout decoding. For evaluation, all "go" trials with at least 80% of licks to the active spout, and zero pre-odor licks, were projected into the PLS basis in order to plot the dataset-averaged or single trial trajectories. These were defined as "correct go" trials. "Incorrect go" trials were defined as "go" trials where the fraction of licks to the active spout is 30% or worse. "No go" trials were subject no further requirements. "$2^{nd}$ trials" simply consisted of all trials that were second in a block, discarding only those with pre-odor licks. For single region trajectories (e.g. visual only), all sources in the region selected were used, when pooling across areas, all available sources in each mouse were used.

To quantify the separation between the position of neural trajectories during the pre-odor period (as shown in FIG. 7E-F), a PLS model was first fitted to the area under analysis (in the same manner as was done to plot neural trajectories). Then, each training trial was projected into a 4-dimensional PLS basis (as described in the previous section of the methods) and computed the average position of each of these training trajectories during the pre-odor period. This defined a single point for each training trial (its "pre-odor position"). These "pre-odor-positions" were grouped for all trials from each active spout type—defining a set of three means and covariances.

Then, for each testing trial, "pre-odor position," "odor position," and "reward position" were computed and the Mahalanobis distance was measured (in the full 4-dimensional space) between each point and the three different spout-specific clusters. Given these three distances between the test trial and each cluster (see cartoon in FIG. 7D), the statistic was computed: "same distance"—"different distance". Here the "same distance" is the distance between the trial and its homonymous cluster (e.g. if a Spout 2 trial is evaluated, this is the distance between that trial and the Spout 2 cluster). The "different distance" is the distance between the trial and the closest of the other two clusters.

The "pre-odor position" was defined by averaging over the frames between trial onset and odor onset, the "odor position" averaged over frames between odor onset and reward onset, and the "reward position" averaged over a period following the reward of equal length to the odor-reward duration.

In FIG. 14H the analysis was conducted in an identical manner to the analyses shown in FIG. 6D-E, except decoding the active spout instead of the preferred spout. In addition, "incorrect go" trials were defined as those with less than 70% of total licks towards the active spout (instead of 30% or worse). "correct go" trials were still defined as those with at least 70% of trials towards the active spout. A less conservative threshold was used for defining a trial as "incorrect" here (versus in FIG. 6D-E) because data was required for all three active spout types to compute the AUC as done previously.

The temporal consistency analysis (FIG. 15E-G) was done by training 40 PLS models on sequential sets of data (each of 170 ms in duration). The key concern of this analysis was to determine how neural representations varied over time. Therefore, deconvolved spiking activity was used rather than denoised $Ca^{2+}$ for only this PLS analysis. Training data was selected as previously described and used all available sources for decoding. But here model evaluation training was performed only on trials where the active spout identity matched the preferred spout identity (trials where this was not true were always removed from all training using PLS models). Ensuring that the preferred and active spouts always matched was done to avoid the chance that block-like structure was artifactually imposed when the mouse switched from licking one spout pre-reward to lick another post reward. The 'macro' AUC-ROC was reported here as in all other similar analyses.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

We claim:

1. A macroscope comprising an objective apparatus comprising a multifocal widefield optics for a single detection path, the multifocal widefield optics comprising a multi-focus lenslet array comprising two or more lenses configured to simultaneously focus on two or more planes.

2. The macroscope of claim 1, wherein multifocal optics comprises a dual-focus array of lenses configured to focus on two planes.

3. The macroscope of claim 1, wherein the multifocal optics comprises an array of lenses configured to focus on more than two planes.

4. The macroscope of claim 1, further comprising a camera configured to simultaneously capture a plurality of images captured by the macroscope, wherein the plurality of images are focused on the plurality of planes.

5. The macroscope of claim 4, wherein the camera comprises:
 a) a field of view of at least 1 cm in the longest dimension;
 b) a frame rate of greater than 10 Hz; and/or
 c) a pixel size of between 10 µm to 20 µm.

6. The macroscope of claim 4 operably connected to a processor and a non-transitory machine-readable medium encoding instructions, which when executed by the processor, cause the processor to process the plurality of images captured by the camera.

7. The macroscope of claim 6, wherein the non-transitory machine-readable medium encodes instructions, which, when executed by the processor, cause the processor to merge the focused regions from the plurality of images captured by the camera to produce an image that is focused in substantially the entire field of view.

8. A method for analyzing a three-dimensional specimen, the method comprising obtaining, via a macroscope, synchronous multifocal optical images of a plurality of planes of the three-dimensional specimen, wherein the macroscope comprises an objective apparatus comprising a multifocal widefield optics for a single detection path, wherein the multifocal widefield optics comprises a multi-focus lenslet array comprising two or more lenses configured to simultaneously focus on two or more planes.

9. The method of claim 8, wherein the multifocal optics comprises a dual-focus array of lenses configured to focus on two planes.

10. The method of claim 8, wherein the multifocal optics comprises an array of lenses configured to focus on more than two planes.

11. The method of claim 8, wherein the macroscope further comprises a camera configured to simultaneously capture a plurality of images captured by the macroscope, wherein the plurality of images are focused on the plurality of planes.

12. The method of claim 8, wherein the camera comprises:
 a) a field of view of at least 1 cm in the longest dimension;
 b) a frame rate of greater than 10 Hz; and/or
 c) a pixel size of between 10 µm to 20 µm.

13. The method of claim 11, wherein the macroscope is operably connected to a processor and a non-transitory machine-readable medium encoding instructions, which when executed by the processor, cause the processor to process the plurality of images captured by the camera.

14. The method of claim 13, wherein the machine-readable medium encodes instructions, which when executed by the processor, cause the processor to merge the focused regions from the plurality of images to produce an image that is focused in substantially entire field of view.

15. The method of claim 13, wherein the machine-readable medium encodes instructions, which when executed by the processor, cause the processor to extract information of interest from the plurality of images focused on a plurality of planes without making a single-focused image.

16. The method of claim 8, wherein the three-dimensional specimen is a biological tissue and obtaining optical images of the plurality of planes of the biological tissue indicates cellular activity in the biological tissue.

17. The method of claim 16, wherein the biological tissue is selected from brain, placenta, eyes, pineal gland, pituitary gland, thyroid gland, parathyroid glands, thorax, heart, lung, esophagus, thymus gland, pleura, adrenal glands, appendix, gall bladder, urinary bladder, large intestine, small intestine, kidneys, liver, pancreas, spleen, stoma, ovaries, uterus, testis, skin, a cultured organoid, and a cultured cell.

18. The method of claim 17, wherein the biological specimen is an organoid or a cultured cell, the method further comprising contacting the organoid or the culture cell with a compound and imaging the organoid or the culture cell cellular activity in the biological specimen.

19. The method of claim 8, wherein the three-dimensional specimen comprises particles in motion and the optical imaging of the three-dimensional specimen indicates the movement of the particles in the specimen.

20. The method of claim 8, wherein the three-dimensional specimen has a thickness of between 1 and 5 mm.

* * * * *